US007336279B1

(12) United States Patent
Takiguchi

(10) Patent No.: US 7,336,279 B1

(45) Date of Patent: Feb. 26, 2008

(54) INTUITIVE HIERARCHICAL TIME-SERIES DATA DISPLAY METHOD AND SYSTEM

(75) Inventor: Hideo Takiguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 590 days.

(21) Appl. No.: 08/573,519

(22) Filed: Dec. 15, 1995

(30) Foreign Application Priority Data

| | | |
|---|---|---|
| Dec. 16, 1994 | (JP) | 6-313704 |
| Mar. 23, 1995 | (JP) | 7-064310 |
| Mar. 23, 1995 | (JP) | 7-064311 |

(51) Int. Cl.
*G06T 13/00* (2006.01)

(52) U.S. Cl. ........................ 345/473

(58) Field of Classification Search ........ 395/133–140, 395/356, 357; 345/433–440, 356, 357, 419, 345/427–428, 473–474, 581, 660–661, 963, 345/663–664; 715/739, 788

See application file for complete search history.

(56) References Cited

U.S. PATENT DOCUMENTS

| | | | | |
|---|---|---|---|---|
| 5,555,354 A * | 9/1996 | Strasnick et al. | ....... | 395/139 X |
| 6,335,746 B1 | 1/2002 | Enokida et al. | ............. | 715/839 |

FOREIGN PATENT DOCUMENTS

| | | |
|---|---|---|
| EP | 0103317 | 3/1984 |
| EP | 0348884 | 1/1990 |
| EP | 0 436263 A1 | 7/1991 |

(Continued)

OTHER PUBLICATIONS

Mackinlay et al., "Developing Calendar Visualizers for the Information Visualizer", ACM, Nov. 1994, pp. 109-118.*

(Continued)

*Primary Examiner*—Almis R. Jankus

(74) *Attorney, Agent, or Firm*—Fitzpatrick, Cella, Harper & Scinto

(57) ABSTRACT

The present invention provides a time-series data display method and system for displaying time-series data items so that a user can grasp time more intuitively. First data associated with a desired date is retrieved and displayed, second data associated with a contiguous date is retrieved, and a display screen for the second data is displayed smaller than that for the first data in a temporal direction starting with the desired date. Third data is associated with a date contiguous to the second date retrieved, and is displayed inside the second data with a smaller display area. Also, in a hierarchical data display method and browser system, a display area is divided into an area where icons representing data items belonging to one level are displayed, and an area where child levels are displayed. As hierarchical depth increases, the data icons are made smaller and simpler. The hierarchical structure of a file system or data base can be displayed as a Venn diagram. Data items belonging to child levels are not hidden but displayed as reduced images, whereby intended data can be located effortlessly. A cutout form and image are registered mutually independently. An identifier, position, and size of the cutout form are specified as the attributes of the image. Thus, an image can be fetched into album software by performing a simple operation, or a cutout can be changed in size.

41 Claims, 100 Drawing Sheets

1

3b

3a

2a

2b

FOREIGN PATENT DOCUMENTS

| | | | |
|---|---|---|---|
| EP | 0 609 030 | A1 | 8/1994 |
| FR | 2 680896 | | 3/1993 |
| GB | 2 187 580 | A | 9/1987 |
| GB | 2278702 | | 12/1994 |
| JP | 5-143588 | | 6/1993 |
| JP | 6-180661 | A | 6/1994 |
| JP | 6-251062 | | 9/1994 |

OTHER PUBLICATIONS

Jock D. Mackinlay et al., "Developing Calendar Visualizers for the Information Visualizer" 1994, ACM UIST '94, pp. 109-118.

Perlin et al., *Pad, an Alternative Approach to the Computer Interface*, Aug. 1993, ACM, pp. 57-64.

Bedersen et al., *Pad++: A Zooming Graphical Interface for Exploring Alternative Interface Physics*, Nov. 1994, ACM, pp. 17-26.

* cited by examiner

APPLICATION SOFTWARE
DATE-ORDERLY DATA DISPLAY SYSTEM
DATE MANAGING MODULE
DATA DISPLAY MODULE
OPERATING SYSTEM
INPUT DEVICE MANAGEMENT SYSTEM
DRAWING MANAGEMENT SYSTEM
FILE SYSTEM
HARDWARE
KEYBOARD INTERFACE
MOUSE INTERFACE
VIDEO INTERFACE
DISK I/O INTERFACE
HARD DISK (FLOPPY DISK)
501
502
503
504
505
506
507
508
509
510
512
513
514
515
302
303
305

50 CELL
DAY
51 DATA ITEMS
10/6 10/7 10/8
ONE DAY
12:00 18:00
SIX HOURS
13:00 14:00
ONE HOUR
40 50
TEN MINUTES
44 45
ONE MINUTE
0 10
TEN SECONDS
IMAGE OBJECT

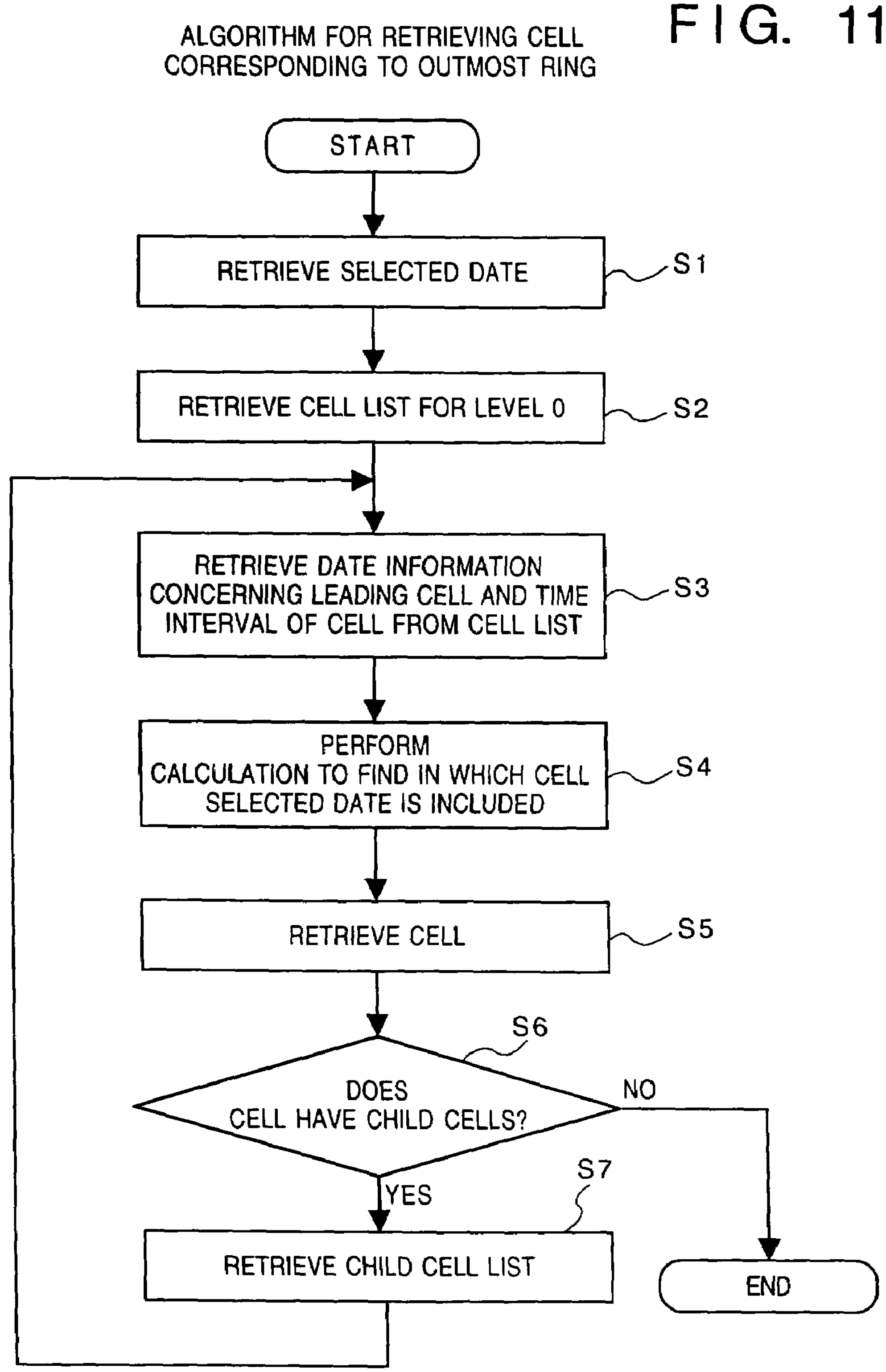
FIG. 11
ALGORITHM FOR RETRIEVING CELL CORRESPONDING TO OUTMOST RING
START
RETRIEVE SELECTED DATE
S1
RETRIEVE CELL LIST FOR LEVEL 0
S2
RETRIEVE DATE INFORMATION CONCERNING LEADING CELL AND TIME INTERVAL OF CELL FROM CELL LIST
S3
PERFORM CALCULATION TO FIND IN WHICH CELL SELECTED DATE IS INCLUDED
S4
RETRIEVE CELL
S5
S6
DOES CELL HAVE CHILD CELLS?
NO
YES
S7
RETRIEVE CHILD CELL LIST
END

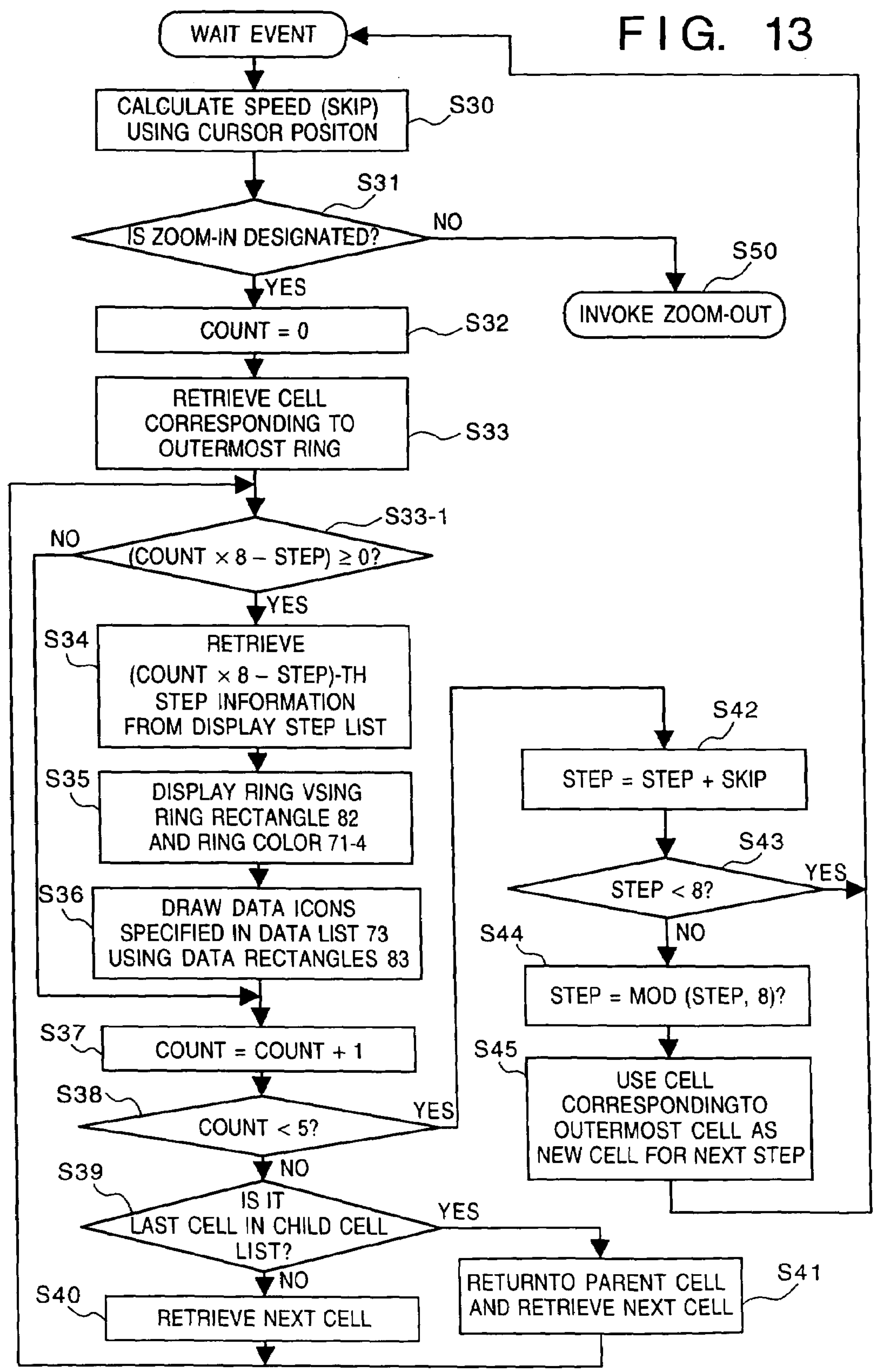
FIG. 13
WAIT EVENT
CALCULATE SPEED (SKIP) USING CURSOR POSITON
S30
S31
IS ZOOM-IN DESIGNATED?
NO
YES
S50
INVOKE ZOOM-OUT
COUNT = 0
S32
RETRIEVE CELL CORRESPONDING TO OUTERMOST RING
S33
S33-1
NO
(COUNT × 8 − STEP) ≥ 0?
YES
S34
RETRIEVE (COUNT × 8 − STEP)-TH STEP INFORMATION FROM DISPLAY STEP LIST
S35
DISPLAY RING VSING RING RECTANGLE 82 AND RING COLOR 71-4
S36
DRAW DATA ICONS SPECIFIED IN DATA LIST 73 USING DATA RECTANGLES 83
S37
COUNT = COUNT + 1
S38
COUNT < 5?
YES
NO
S39
IS IT LAST CELL IN CHILD CELL LIST?
YES
NO
S40
RETRIEVE NEXT CELL
RETURNTO PARENT CELL AND RETRIEVE NEXT CELL
S41
S42
STEP = STEP + SKIP
S43
STEP < 8?
YES
NO
S44
STEP = MOD (STEP, 8)?
S45
USE CELL CORRESPONDINGTO OUTERMOST CELL AS NEW CELL FOR NEXT STEP

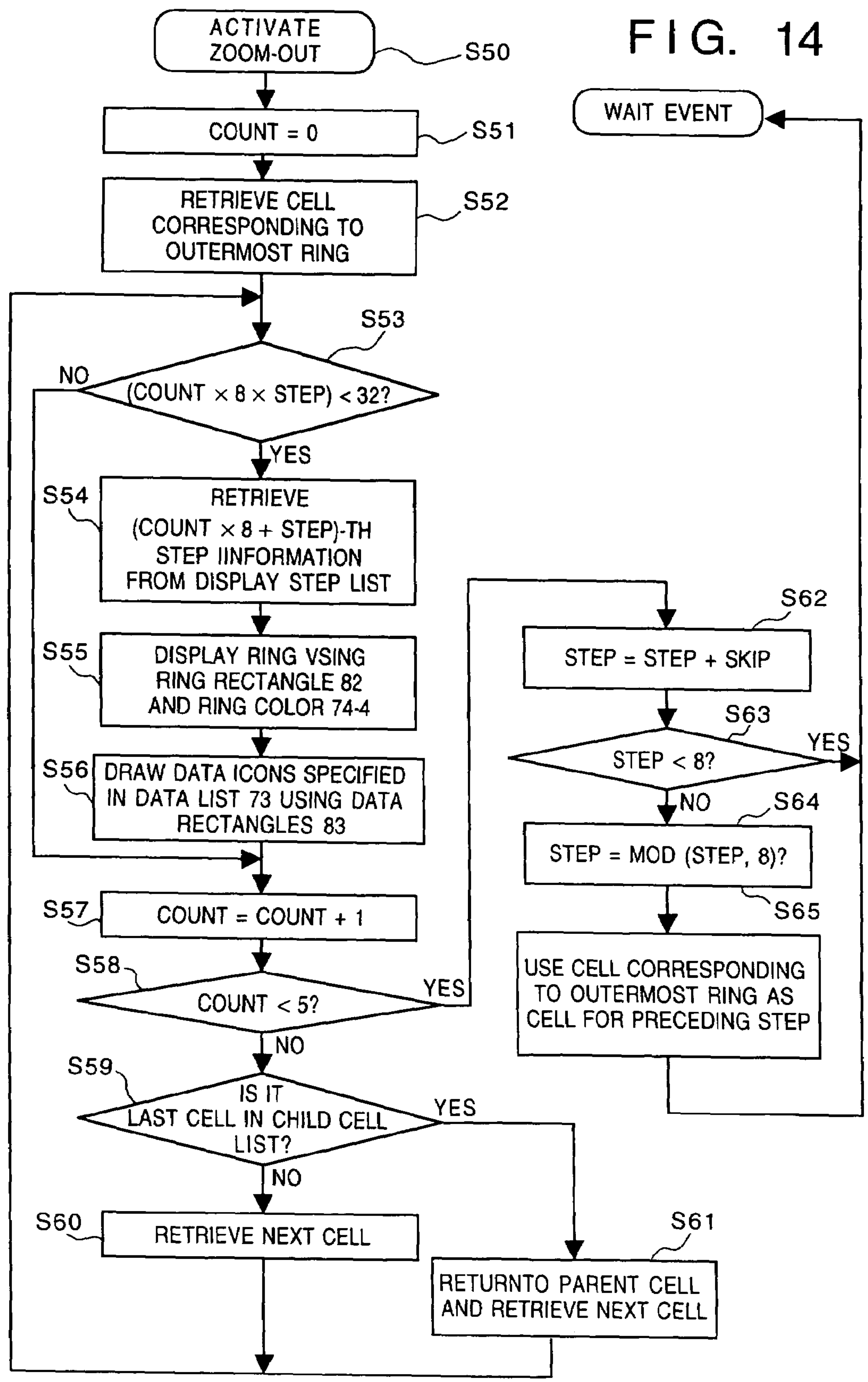
FIG. 14
ACTIVATE ZOOM-OUT
S50
COUNT = 0
S51
RETRIEVE CELL CORRESPONDING TO OUTERMOST RING
S52
S53
(COUNT × 8 × STEP) < 32?
NO
YES
S54
RETRIEVE (COUNT × 8 + STEP)-TH STEP IINFORMATION FROM DISPLAY STEP LIST
S55
DISPLAY RING VSING RING RECTANGLE 82 AND RING COLOR 74-4
S56
DRAW DATA ICONS SPECIFIED IN DATA LIST 73 USING DATA RECTANGLES 83
S57
COUNT = COUNT + 1
S58
COUNT < 5?
YES
NO
S59
IS IT LAST CELL IN CHILD CELL LIST?
YES
NO
S60
RETRIEVE NEXT CELL
S61
RETURNTO PARENT CELL AND RETRIEVE NEXT CELL
WAIT EVENT
S62
STEP = STEP + SKIP
S63
STEP < 8?
YES
NO
S64
STEP = MOD (STEP, 8)?
S65
USE CELL CORRESPONDING TO OUTERMOST RING AS CELL FOR PRECEDING STEP 115
116
117
118
119
120
121
122
A
B
C
R-1
C-1
D
E
D-1
D-2

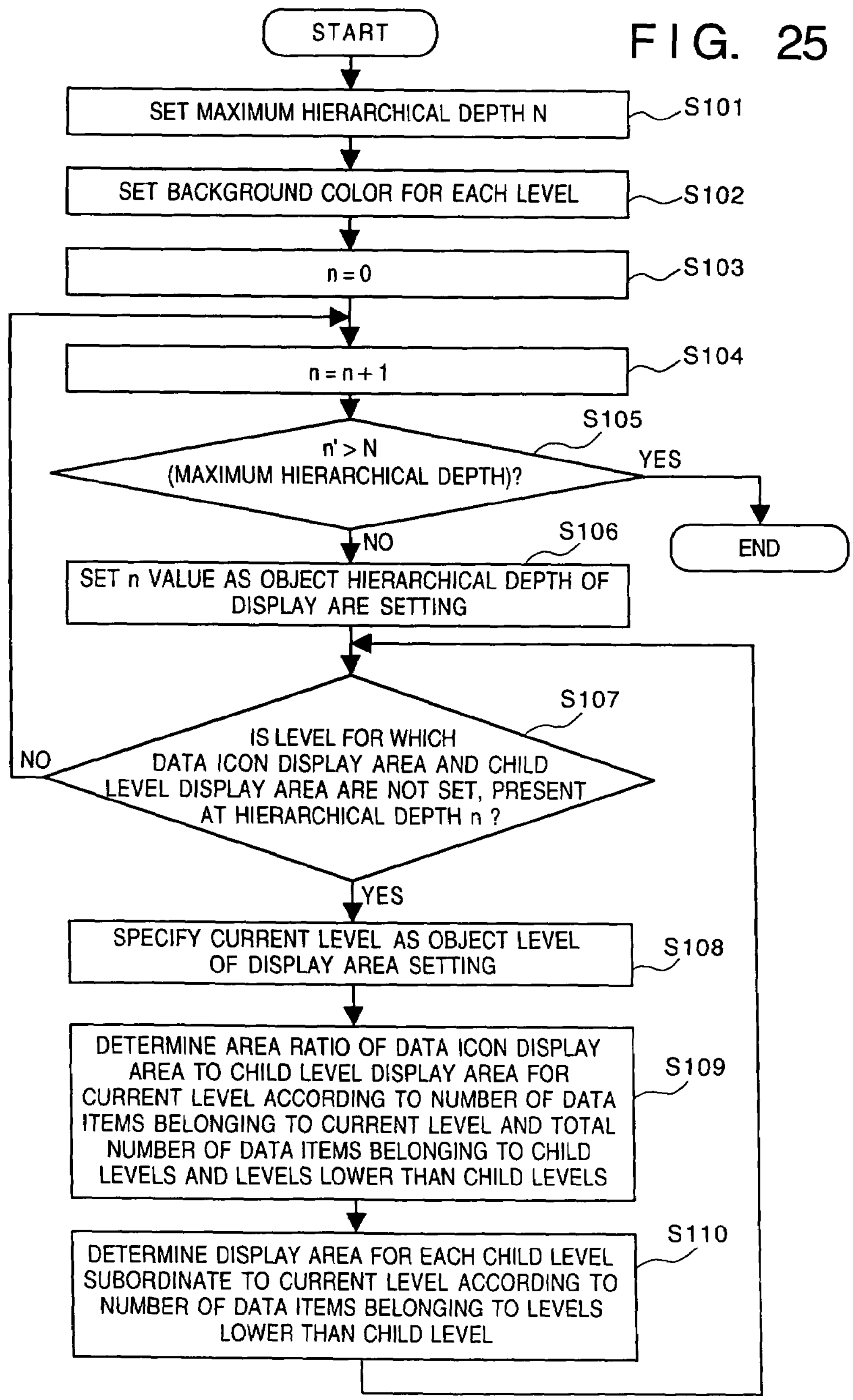
FIG. 25
START
SET MAXIMUM HIERARCHICAL DEPTH N
S101
SET BACKGROUND COLOR FOR EACH LEVEL
S102
n=0
S103
n=n+1
S104
n' > N
(MAXIMUM HIERARCHICAL DEPTH)?
S105
YES
END
NO
SET n VALUE AS OBJECT HIERARCHICAL DEPTH OF DISPLAY ARE SETTING
S106
IS LEVEL FOR WHICH DATA ICON DISPLAY AREA AND CHILD LEVEL DISPLAY AREA ARE NOT SET, PRESENT AT HIERARCHICAL DEPTH n ?
S107
NO
YES
SPECIFY CURRENT LEVEL AS OBJECT LEVEL OF DISPLAY AREA SETTING
S108
DETERMINE AREA RATIO OF DATA ICON DISPLAY AREA TO CHILD LEVEL DISPLAY AREA FOR CURRENT LEVEL ACCORDING TO NUMBER OF DATA ITEMS BELONGING TO CURRENT LEVEL AND TOTAL NUMBER OF DATA ITEMS BELONGING TO CHILD LEVELS AND LEVELS LOWER THAN CHILD LEVELS
S109
DETERMINE DISPLAY AREA FOR EACH CHILD LEVEL SUBORDINATE TO CURRENT LEVEL ACCORDING TO NUMBER OF DATA ITEMS BELONGING TO LEVELS LOWER THAN CHILD LEVEL
S110

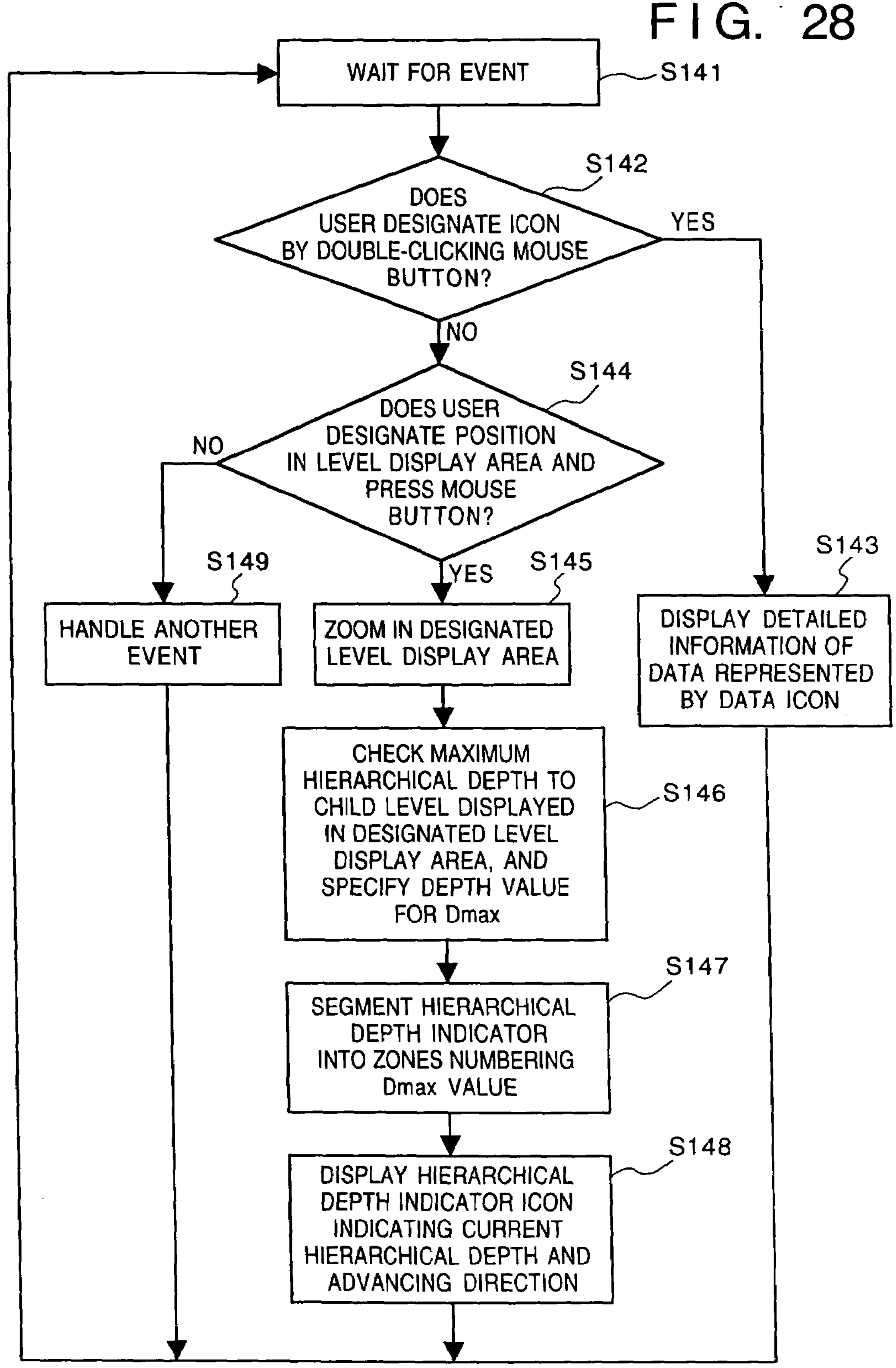
FIG. 28
WAIT FOR EVENT
S141
S142
DOES USER DESIGNATE ICON BY DOUBLE-CLICKING MOUSE BUTTON?
YES
NO
S144
DOES USER DESIGNATE POSITION IN LEVEL DISPLAY AREA AND PRESS MOUSE BUTTON?
NO
YES
S149
HANDLE ANOTHER EVENT
S145
ZOOM IN DESIGNATED LEVEL DISPLAY AREA
S143
DISPLAY DETAILED INFORMATION OF DATA REPRESENTED BY DATA ICON
CHECK MAXIMUM HIERARCHICAL DEPTH TO CHILD LEVEL DISPLAYED IN DESIGNATED LEVEL DISPLAY AREA, AND SPECIFY DEPTH VALUE FOR Dmax
S146
S147
SEGMENT HIERARCHICAL DEPTH INDICATOR INTO ZONES NUMBERING Dmax VALUE
S148
DISPLAY HIERARCHICAL DEPTH INDICATOR ICON INDICATING CURRENT HIERARCHICAL DEPTH AND ADVANCING DIRECTION APPLICATION SOFTWARE
HIERARCHICAL DATA BROWSER
LEVEL MANAGING MODULE
LEVEL DISPLAY MODULE
1501
1502
1503
OPERATING SYSTEM
INPUT DEVICE MANAGEMENT SYSTEM
DRAWING MANAGEMENT SYSTEM
FILE MANAGEMENT SYSTEM
MEMORY MANAGEMENT SYSTEM
505
506
507
508
516
HARDWARE
KEYBOARD INTERFACE
MOUSE INTERFACE
VIDEO INTERFACE
DISK I/O INTERFACE
HARD DISK (FLOPPY DISK)
CPU
MEMORY
509
510
512
513
514
515
517
518
519
302
303
305

1501
1503
1502
LEVEL MANAGING MODULE
LEVEL DISPLAY MODULE
MINIMUM DATA ICON IMAGE DISPLAY SIZE TABLE
741
DATA NAME DISPLAY FONT SIZE TABLE
740
HIERARCHICAL DATA BROWSER
501

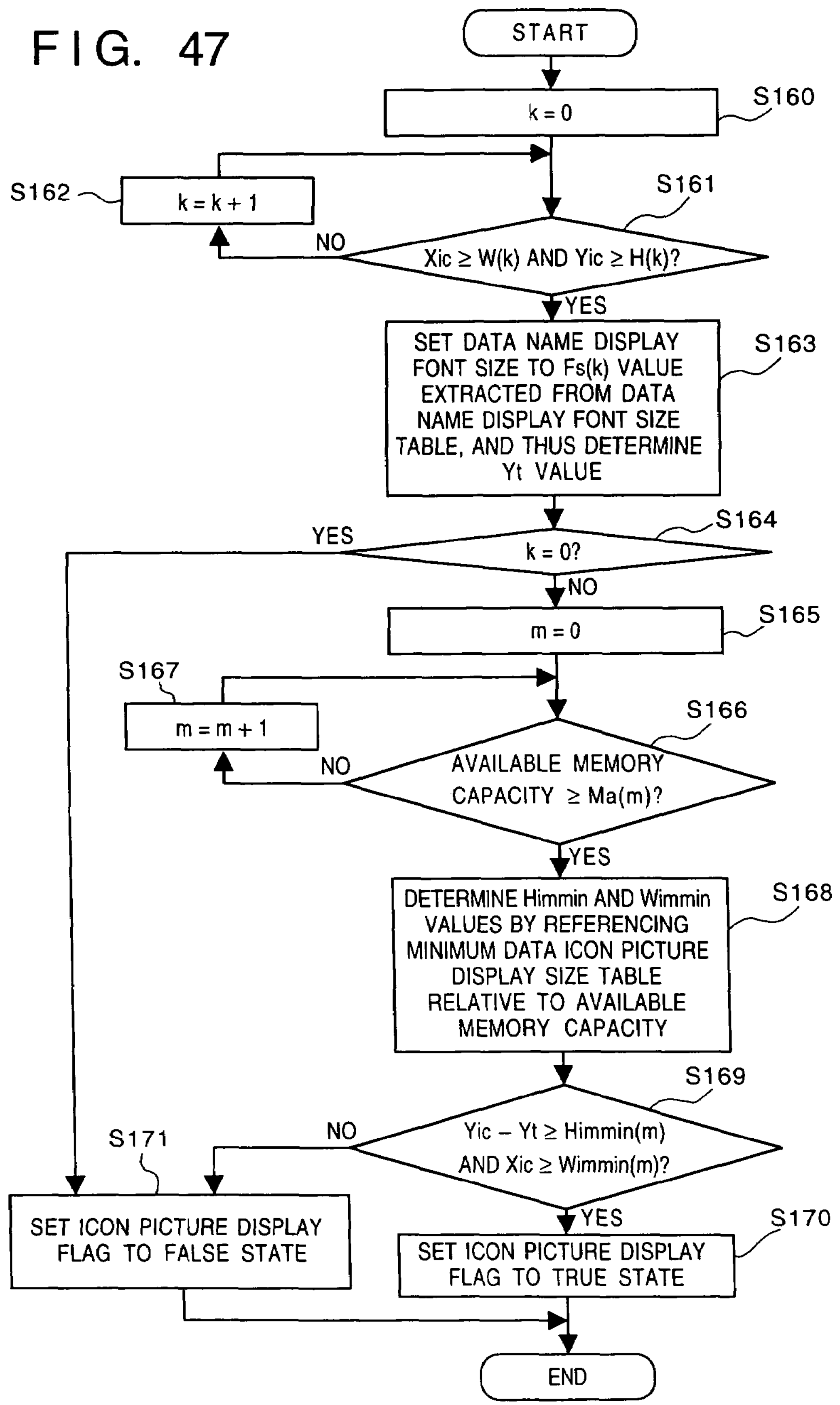
FIG. 47
START
k = 0
S160
S161
S162
k = k + 1
NO
Xic ≥ W(k) AND Yic ≥ H(k)?
YES
SET DATA NAME DISPLAY FONT SIZE TO Fs(k) VALUE EXTRACTED FROM DATA NAME DISPLAY FONT SIZE TABLE, AND THUS DETERMINE Yt VALUE
S163
S164
YES
k = 0?
NO
m = 0
S165
S167
m = m + 1
S166
NO
AVAILABLE MEMORY CAPACITY ≥ Ma(m)?
YES
DETERMINE Himmin AND Wimmin VALUES BY REFERENCING MINIMUM DATA ICON PICTURE DISPLAY SIZE TABLE RELATIVE TO AVAILABLE MEMORY CAPACITY
S168
S169
NO
Yic – Yt ≥ Himmin(m) AND Xic ≥ Wimmin(m)?
S171
YES
SET ICON PICTURE DISPLAY FLAG TO FALSE STATE
SET ICON PICTURE DISPLAY FLAG TO TRUE STATE
S170
END

DATA NAME DISPLAY FONT SIZE TABLE

| k | W (k) | H (k) | Fs (k) |
|---|---|---|---|
| 0 | 0 | 0 | 0 |
| 1 | w1 | h1 | fs1 |
| 2 | w2 | h2 | fs2 |
| 3 | w3 | h3 | fs3 |

MINIMUM ICON PICTURE DISPLAY AREA SIZE TABLE

| m | AVAILABLE MEMORY CAPACITY Ma (m) | Wimmin (m) | Himmin (m) |
|---|---|---|---|
| 0 | ma0 | wm0 | hm0 |
| 1 | ma1 | wm1 | hm1 |
| 2 | ma2 | wm2 | hm2 |
| 3 | ma3 | wm3 | hm3 |

FIG. 50

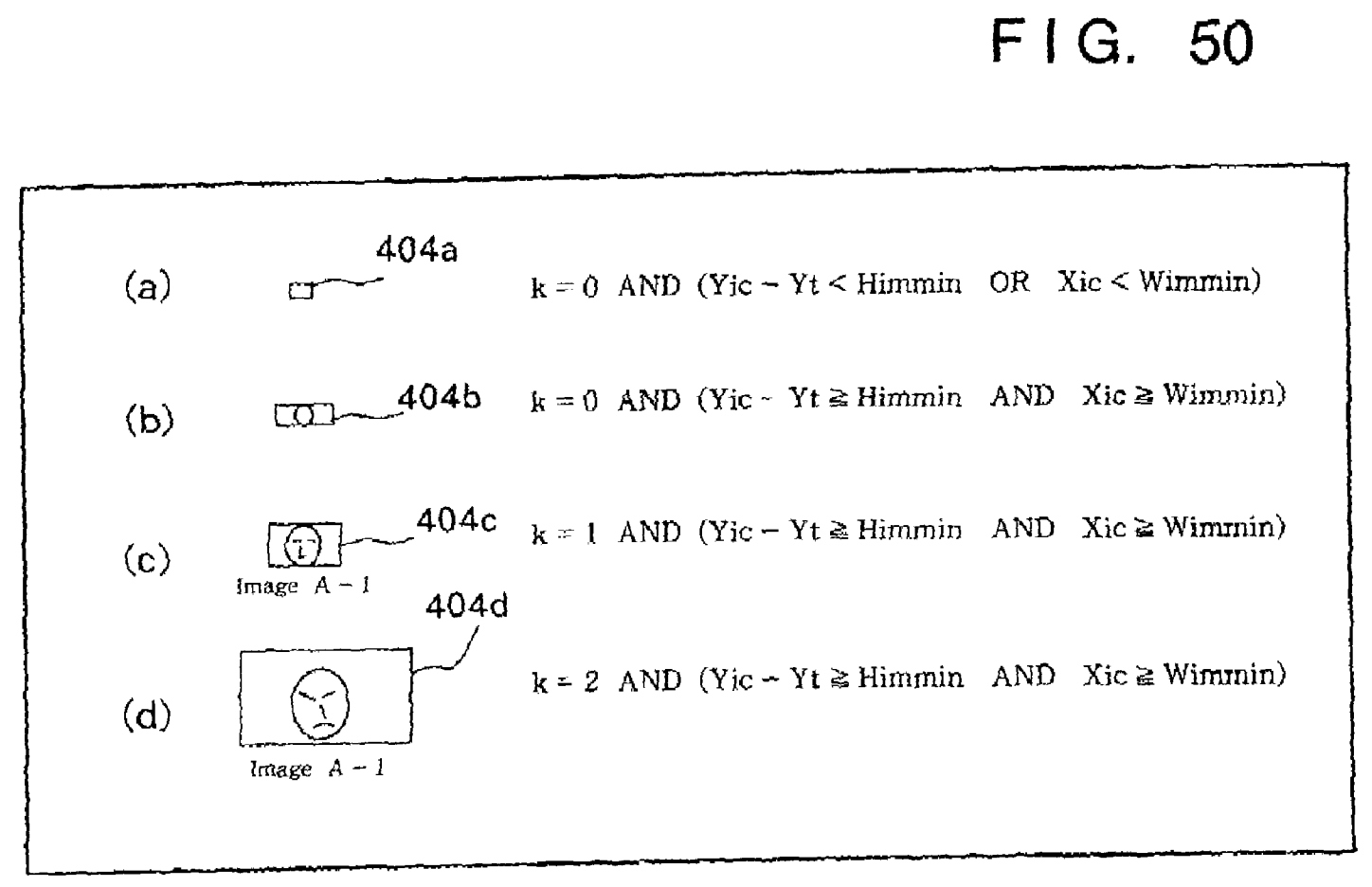

(a) 404a $k = 0$ AND ($Yic - Yt < Himmin$ OR $Xic < Wimmin$)

(b) 404b $k = 0$ AND ($Yic - Yt \geqq Himmin$ AND $Xic \geqq Wimmin$)

(c) 404c Image A - 1 $k = 1$ AND ($Yic - Yt \geqq Himmin$ AND $Xic \geqq Wimmin$)

(d) 404d Image A - 1 $k = 2$ AND ($Yic - Yt \geqq Himmin$ AND $Xic \geqq Wimmin$)

404c
404b
404a
Category A
Category B
Category C
Category D
Image B-1
Image B-2
Image B-3
Image B-4
Image A-1
Image A-2
Image A-3
404d G:
Ben KC Zurch
Ben's House
Ben's Health
Ben's Money
711
712
713
714
720
722
729
821

FIG. 59

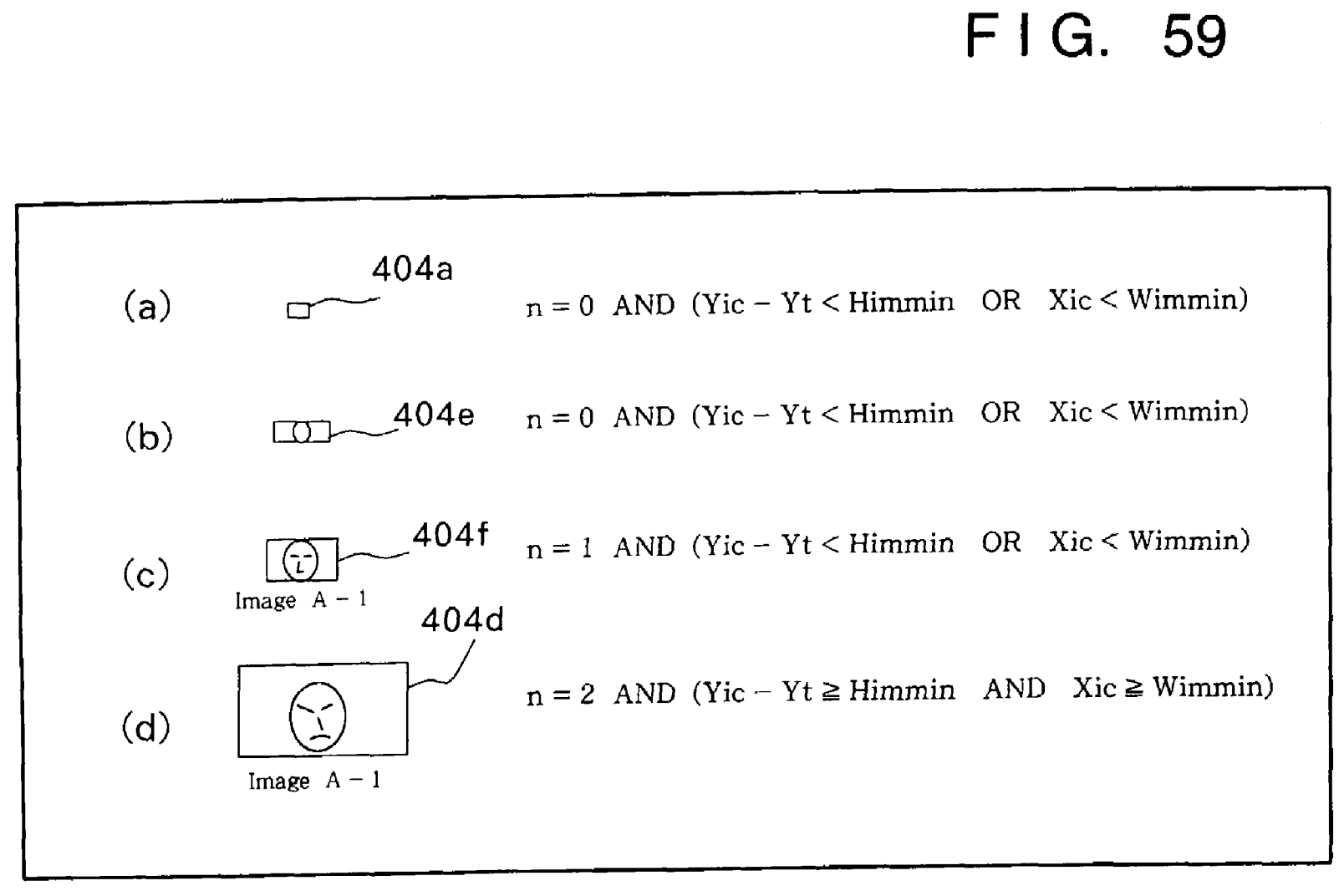

(a) 404a $n = 0$ AND $(Yic - Yt < Himmin$ OR $Xic < Wimmin)$ (b) 404e $n = 0$ AND $(Yic - Yt < Himmin$ OR $Xic < Wimmin)$ (c) 404f Image A-1 $n = 1$ AND $(Yic - Yt < Himmin$ OR $Xic < Wimmin)$ (d) 404d Image A-1 $n = 2$ AND $(Yic - Yt \geqq Himmin$ AND $Xic \geqq Wimmin)$

FIG. 62

START
S210
IS FRAME REGISTERED IN PALETTE USE?
NO
YES
S213
IS SIMPLE FRAME TO BE CREATED?
NO
YES
S214
USE DRAWING FACILITY OF ALBUM SOFTWARE TO CREATE FRAME
S217
USE DRAWING SOFTWARE TO CREATE FRAME
DEFINE TRANSPARENT PORTION AND HIDING PROTION OF FRAME
S215
REGISTER FRAME IN PALETTE
S216
SELECT IMAGE, AND PICK UP FRAME FROM PALETTE
S211
DETERMINE FRAME POSITION AND SIZE
S212
END

IMAGE DATA
930
IMAGE ATTRIBUTE DATA
931
FRAME NUMBER
932
FRAME POSITION
933
FRAME SIZE
FRAME DATA
934
935
FRAME ATTRIBUTE DATA
936
FRAME NUMBER
937
TRANSMISSION AREA
939
PALETTE ATTRIBUTE DATA
940
FRAME LIST
941
FRAME NUMBER
942
FRAME POSITION
943
FRAME SIZE
FRAME LIST
FRAME NUMBER
FRAME POSITION
FRAME SIZE

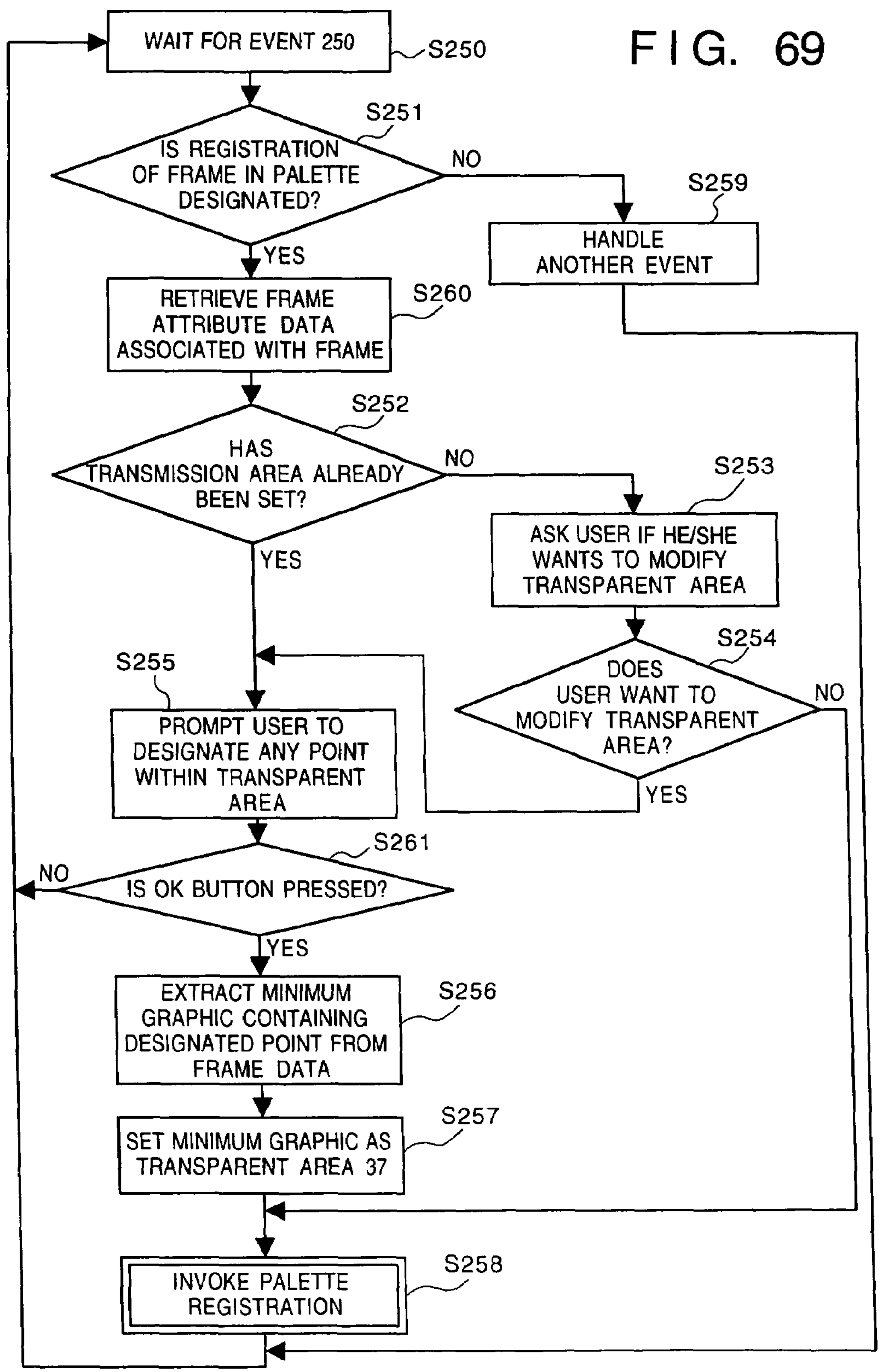
FIG. 69
WAIT FOR EVENT 250
S250
S251
IS REGISTRATION OF FRAME IN PALETTE DESIGNATED?
NO
YES
S259
HANDLE ANOTHER EVENT
RETRIEVE FRAME ATTRIBUTE DATA ASSOCIATED WITH FRAME
S260
S252
HAS TRANSMISSION AREA ALREADY BEEN SET?
NO
YES
S253
ASK USER IF HE/SHE WANTS TO MODIFY TRANSPARENT AREA
S254
DOES USER WANT TO MODIFY TRANSPARENT AREA?
NO
YES
S255
PROMPT USER TO DESIGNATE ANY POINT WITHIN TRANSPARENT AREA
S261
IS OK BUTTON PRESSED?
NO
YES
EXTRACT MINIMUM GRAPHIC CONTAINING DESIGNATED POINT FROM FRAME DATA
S256
SET MINIMUM GRAPHIC AS TRANSPARENT AREA 37
S257
INVOKE PALETTE REGISTRATION
S258

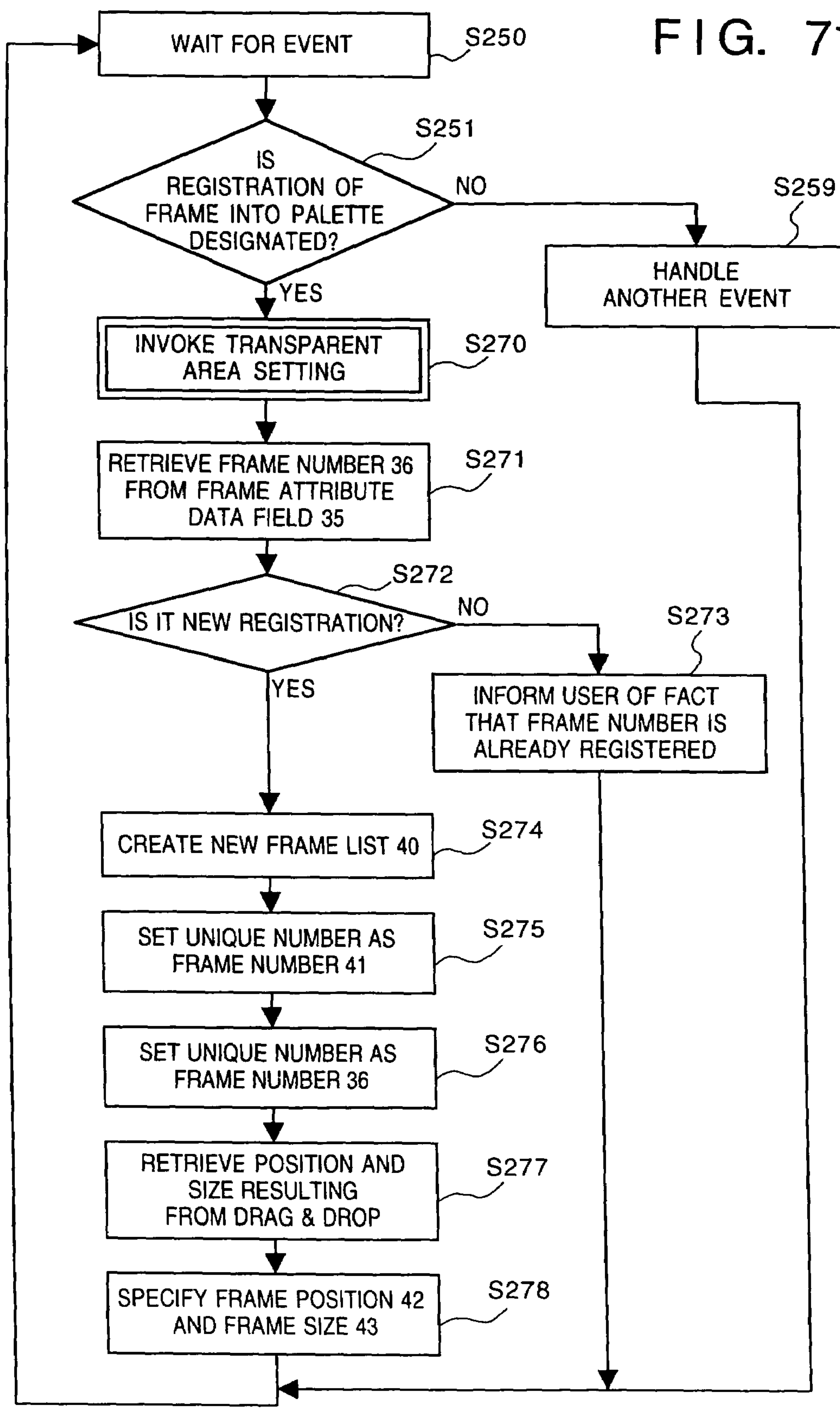
FIG. 71
WAIT FOR EVENT
S250
IS REGISTRATION OF FRAME INTO PALETTE DESIGNATED?
S251
NO
YES
S259
HANDLE ANOTHER EVENT
INVOKE TRANSPARENT AREA SETTING
S270
RETRIEVE FRAME NUMBER 36 FROM FRAME ATTRIBUTE DATA FIELD 35
S271
IS IT NEW REGISTRATION?
S272
NO
YES
S273
INFORM USER OF FACT THAT FRAME NUMBER IS ALREADY REGISTERED
CREATE NEW FRAME LIST 40
S274
SET UNIQUE NUMBER AS FRAME NUMBER 41
S275
SET UNIQUE NUMBER AS FRAME NUMBER 36
S276
RETRIEVE POSITION AND SIZE RESULTING FROM DRAG & DROP
S277
SPECIFY FRAME POSITION 42 AND FRAME SIZE 43
S278

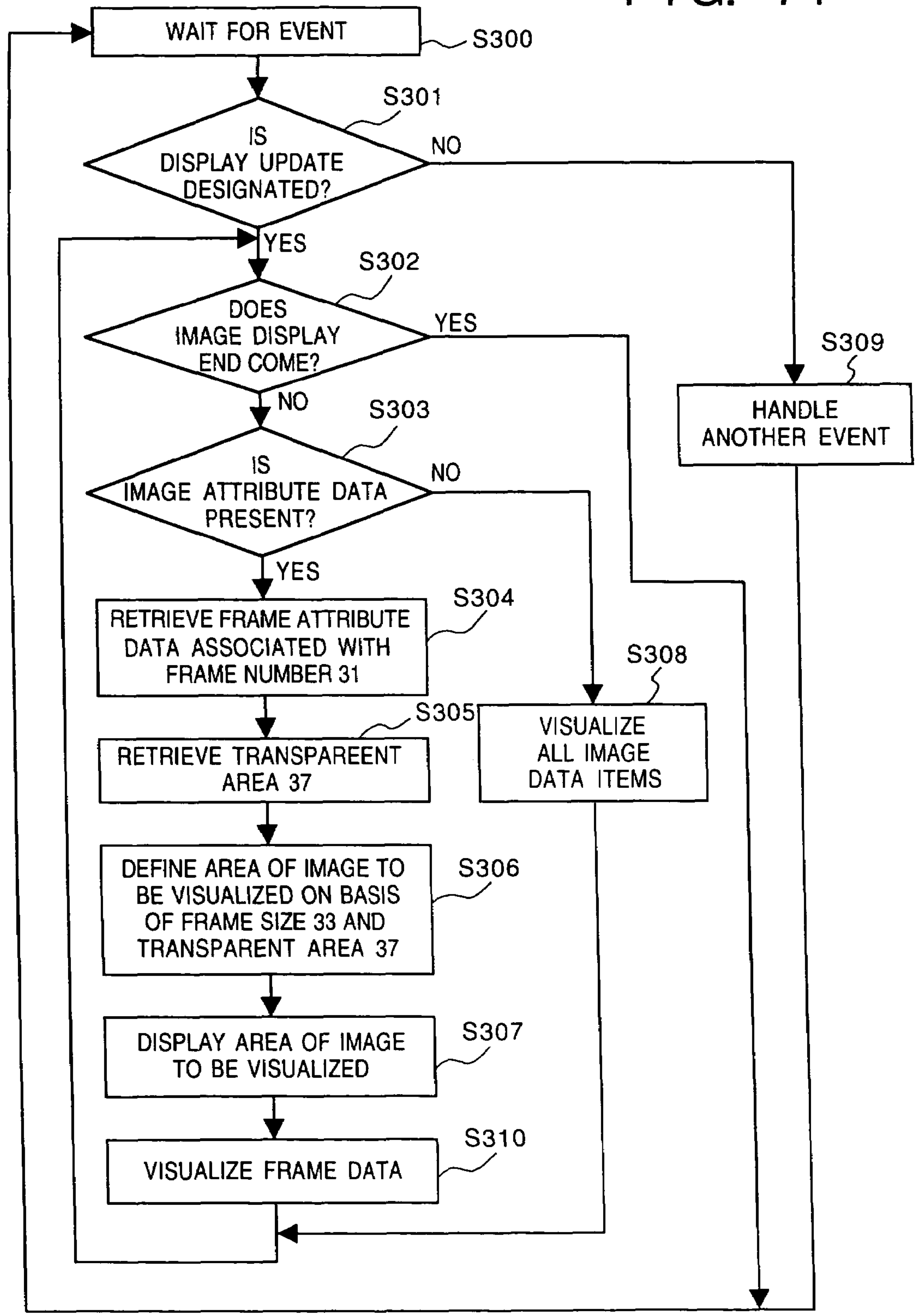
FIG. 74
WAIT FOR EVENT
S300
S301
IS DISPLAY UPDATE DESIGNATED?
NO
YES
S302
DOES IMAGE DISPLAY END COME?
YES
NO
S303
IS IMAGE ATTRIBUTE DATA PRESENT?
NO
YES
S304
RETRIEVE FRAME ATTRIBUTE DATA ASSOCIATED WITH FRAME NUMBER 31
S305
RETRIEVE TRANSPAREENT AREA 37
S306
DEFINE AREA OF IMAGE TO BE VISUALIZED ON BASIS OF FRAME SIZE 33 AND TRANSPARENT AREA 37
S307
DISPLAY AREA OF IMAGE TO BE VISUALIZED
S310
VISUALIZE FRAME DATA
S308
VISUALIZE ALL IMAGE DATA ITEMS
S309
HANDLE ANOTHER EVENT

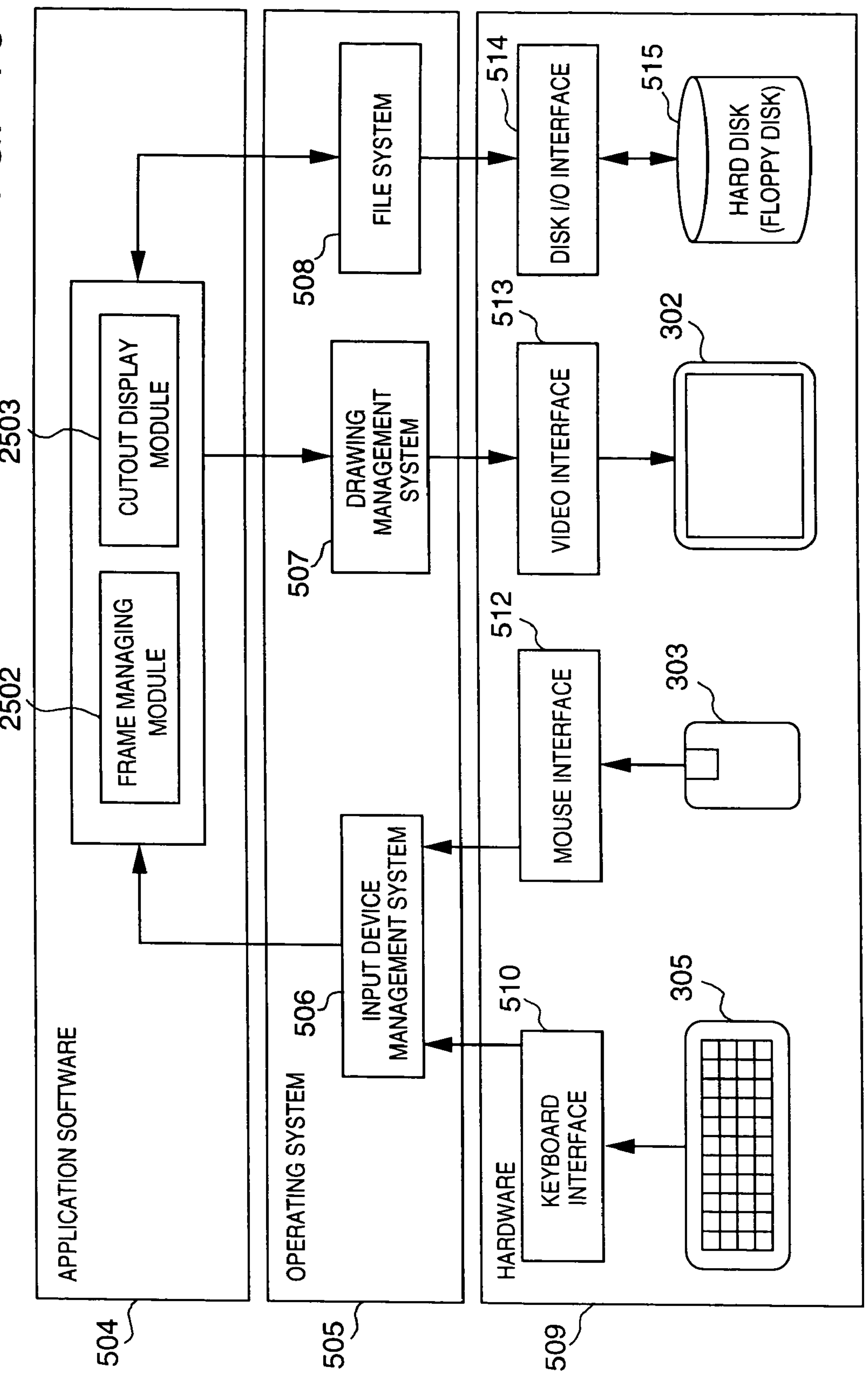
F I G. 75
APPLICATION SOFTWARE
FRAME MANAGING MODULE
CUTOUT DISPLAY MODULE
2502
2503
504
OPERATING SYSTEM
INPUT DEVICE MANAGEMENT SYSTEM
DRAWING MANAGEMENT SYSTEM
FILE SYSTEM
506
507
508
505
HARDWARE
KEYBOARD INTERFACE
MOUSE INTERFACE
VIDEO INTERFACE
DISK I/O INTERFACE
HARD DISK (FLOPPY DISK)
510
512
513
514
515
305
303
302
509

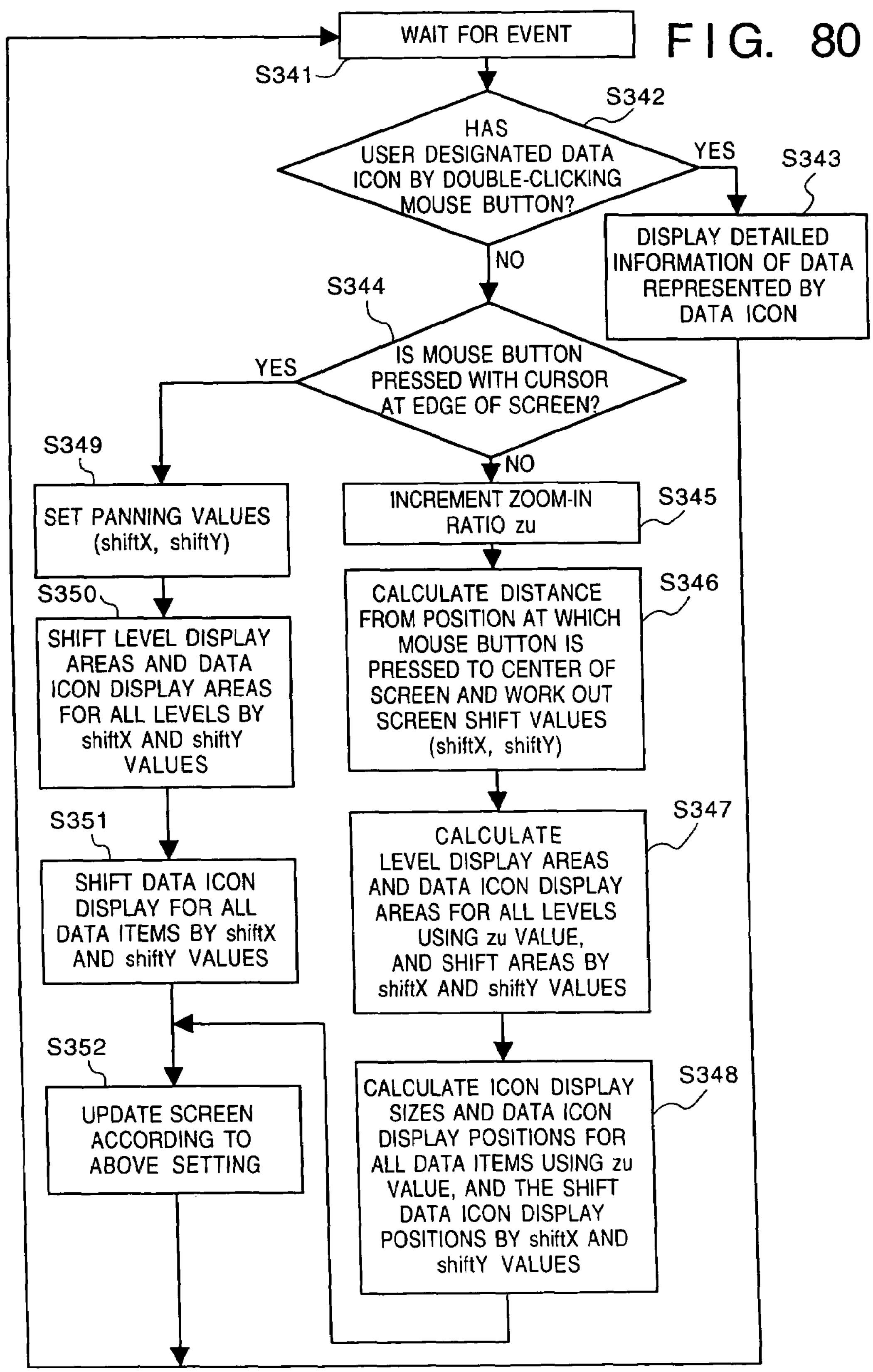
FIG. 80
WAIT FOR EVENT
S341
S342
HAS USER DESIGNATED DATA ICON BY DOUBLE-CLICKING MOUSE BUTTON?
YES
S343
DISPLAY DETAILED INFORMATION OF DATA REPRESENTED BY DATA ICON
NO
S344
IS MOUSE BUTTON PRESSED WITH CURSOR AT EDGE OF SCREEN?
YES
NO
S349
SET PANNING VALUES (shiftX, shiftY)
S345
INCREMENT ZOOM-IN RATIO zu
S350
SHIFT LEVEL DISPLAY AREAS AND DATA ICON DISPLAY AREAS FOR ALL LEVELS BY shiftX AND shiftY VALUES
S346
CALCULATE DISTANCE FROM POSITION AT WHICH MOUSE BUTTON IS PRESSED TO CENTER OF SCREEN AND WORK OUT SCREEN SHIFT VALUES (shiftX, shiftY)
S351
SHIFT DATA ICON DISPLAY FOR ALL DATA ITEMS BY shiftX AND shiftY VALUES
S347
CALCULATE LEVEL DISPLAY AREAS AND DATA ICON DISPLAY AREAS FOR ALL LEVELS USING zu VALUE, AND SHIFT AREAS BY shiftX AND shiftY VALUES
S352
UPDATE SCREEN ACCORDING TO ABOVE SETTING
S348
CALCULATE ICON DISPLAY SIZES AND DATA ICON DISPLAY POSITIONS FOR ALL DATA ITEMS USING zu VALUE, AND THE SHIFT DATA ICON DISPLAY POSITIONS BY shiftX AND shiftY VALUES START
size = 0.0
S1020
S1021
DOES DATA COME TO END?
YES
NO
RETRIEVE DATA ATTRIBUTE DATA 609 ASSOCIATED WITH DATA
S1022
S1023
IS ACCESS FREQUENCY EQUAL TO 0?
= 0
> 0
S1024
S1025
size ← size + 1.0 + (ACCESS FREQUENCY × ENLARGEMENT RATIO)
size ← size + 1.0
NUMBER OF DATA ITEMS ← size
S1026
DEFINE DATA ICON DISPLAY AREA aprop PROPORTIONALLY
S1027
DETERMINE SIZES AND POSITIONS OF DATA ICONS
S1028
END

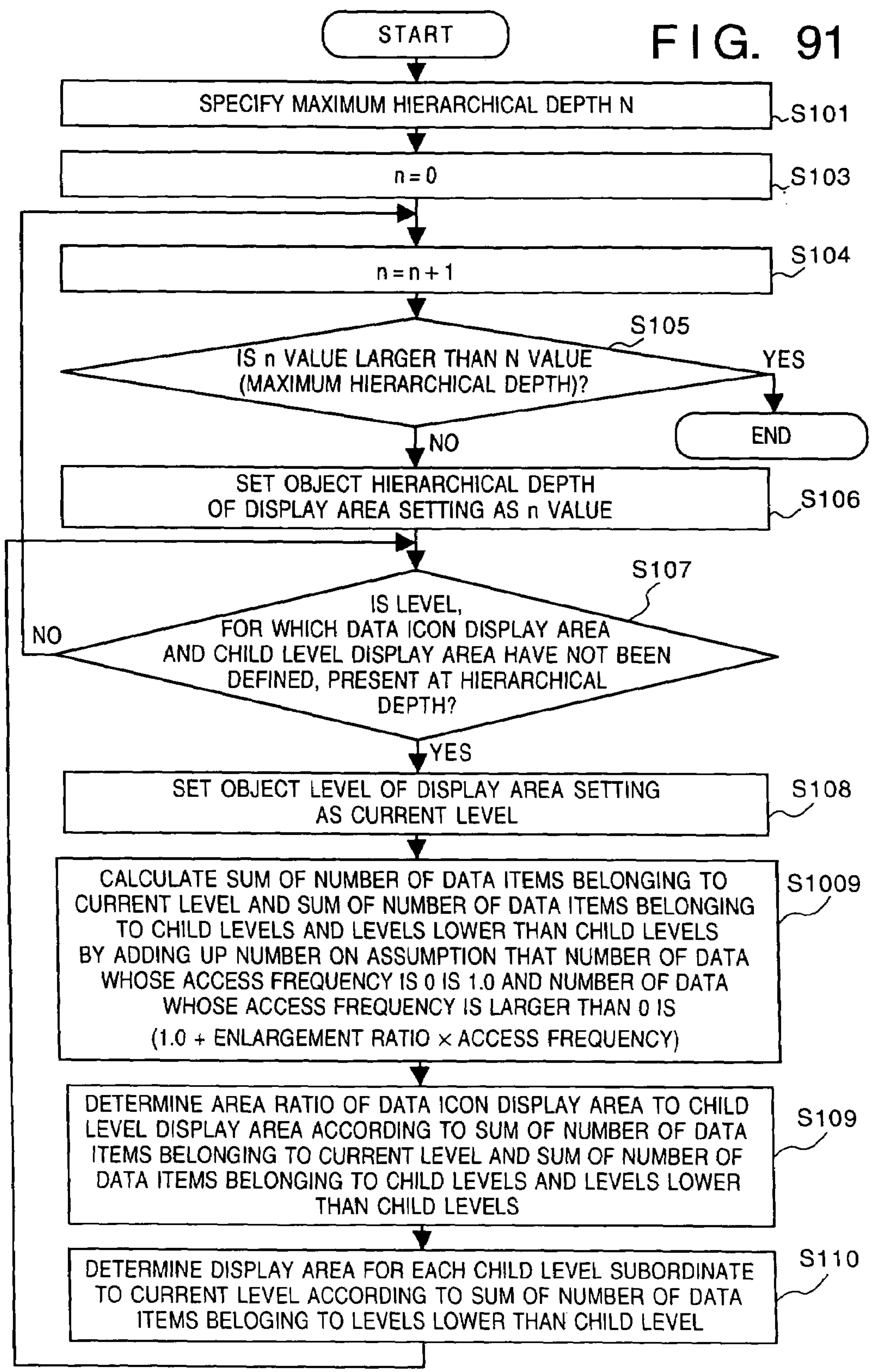
FIG. 91
START
SPECIFY MAXIMUM HIERARCHICAL DEPTH N
S101
n = 0
S103
n = n + 1
S104
IS n VALUE LARGER THAN N VALUE (MAXIMUM HIERARCHICAL DEPTH)?
S105
YES
END
NO
SET OBJECT HIERARCHICAL DEPTH OF DISPLAY AREA SETTING AS n VALUE
S106
IS LEVEL, FOR WHICH DATA ICON DISPLAY AREA AND CHILD LEVEL DISPLAY AREA HAVE NOT BEEN DEFINED, PRESENT AT HIERARCHICAL DEPTH?
S107
NO
YES
SET OBJECT LEVEL OF DISPLAY AREA SETTING AS CURRENT LEVEL
S108
CALCULATE SUM OF NUMBER OF DATA ITEMS BELONGING TO CURRENT LEVEL AND SUM OF NUMBER OF DATA ITEMS BELONGING TO CHILD LEVELS AND LEVELS LOWER THAN CHILD LEVELS BY ADDING UP NUMBER ON ASSUMPTION THAT NUMBER OF DATA WHOSE ACCESS FREQUENCY IS 0 IS 1.0 AND NUMBER OF DATA WHOSE ACCESS FREQUENCY IS LARGER THAN 0 IS (1.0 + ENLARGEMENT RATIO × ACCESS FREQUENCY)
S1009
DETERMINE AREA RATIO OF DATA ICON DISPLAY AREA TO CHILD LEVEL DISPLAY AREA ACCORDING TO SUM OF NUMBER OF DATA ITEMS BELONGING TO CURRENT LEVEL AND SUM OF NUMBER OF DATA ITEMS BELONGING TO CHILD LEVELS AND LEVELS LOWER THAN CHILD LEVELS
S109
DETERMINE DISPLAY AREA FOR EACH CHILD LEVEL SUBORDINATE TO CURRENT LEVEL ACCORDING TO SUM OF NUMBER OF DATA ITEMS BELOGING TO LEVELS LOWER THAN CHILD LEVEL
S110

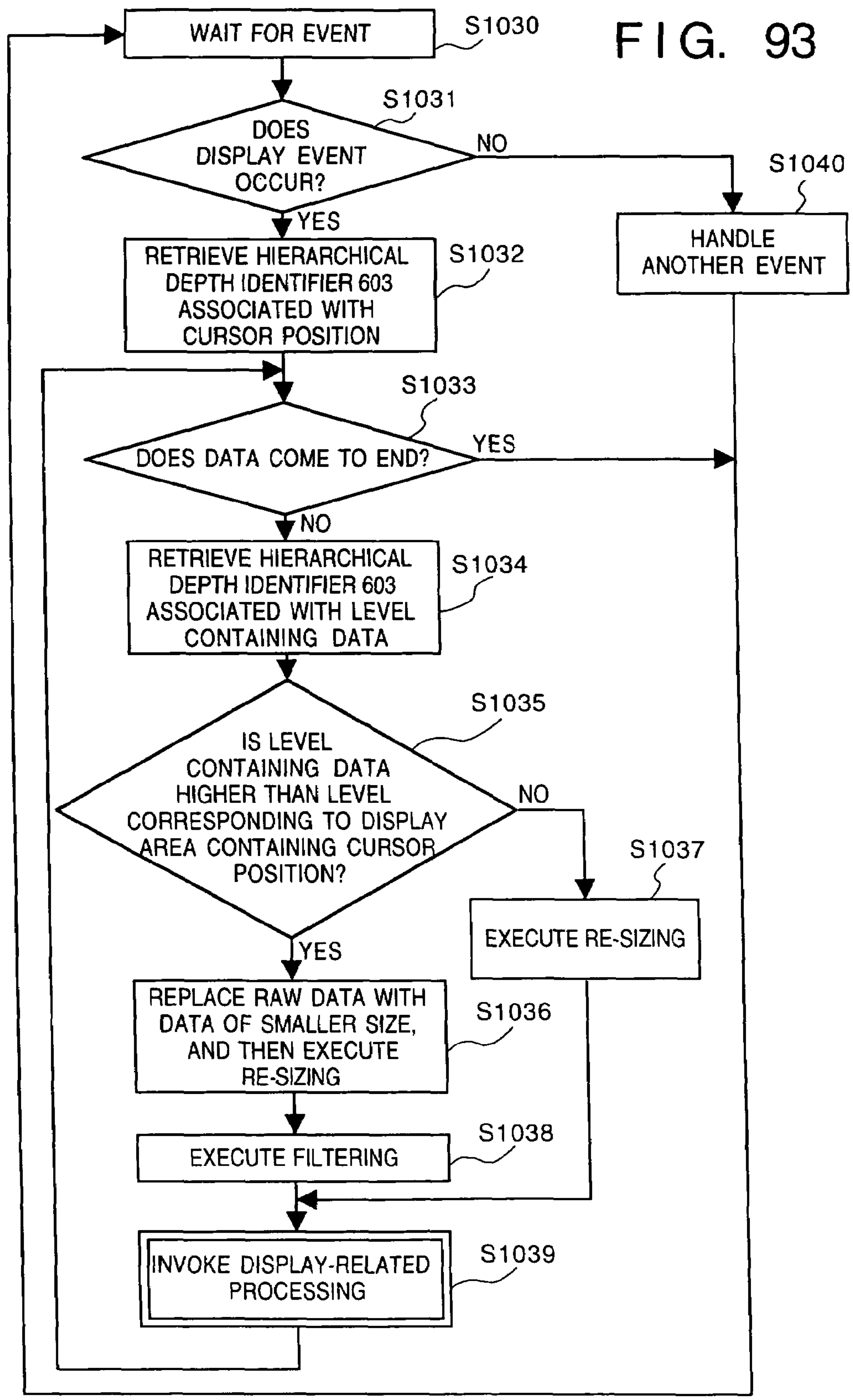
FIG. 93
WAIT FOR EVENT
S1030
DOES DISPLAY EVENT OCCUR?
S1031
NO
YES
S1040
HANDLE ANOTHER EVENT
RETRIEVE HIERARCHICAL DEPTH IDENTIFIER 603 ASSOCIATED WITH CURSOR POSITION
S1032
S1033
DOES DATA COME TO END?
YES
NO
RETRIEVE HIERARCHICAL DEPTH IDENTIFIER 603 ASSOCIATED WITH LEVEL CONTAINING DATA
S1034
S1035
IS LEVEL CONTAINING DATA HIGHER THAN LEVEL CORRESPONDING TO DISPLAY AREA CONTAINING CURSOR POSITION?
NO
S1037
EXECUTE RE-SIZING
YES
REPLACE RAW DATA WITH DATA OF SMALLER SIZE, AND THEN EXECUTE RE-SIZING
S1036
EXECUTE FILTERING
S1038
INVOKE DISPLAY-RELATED PROCESSING
S1039

1054
1055
1056
1052
1057
1058
1053
1051
1050
E

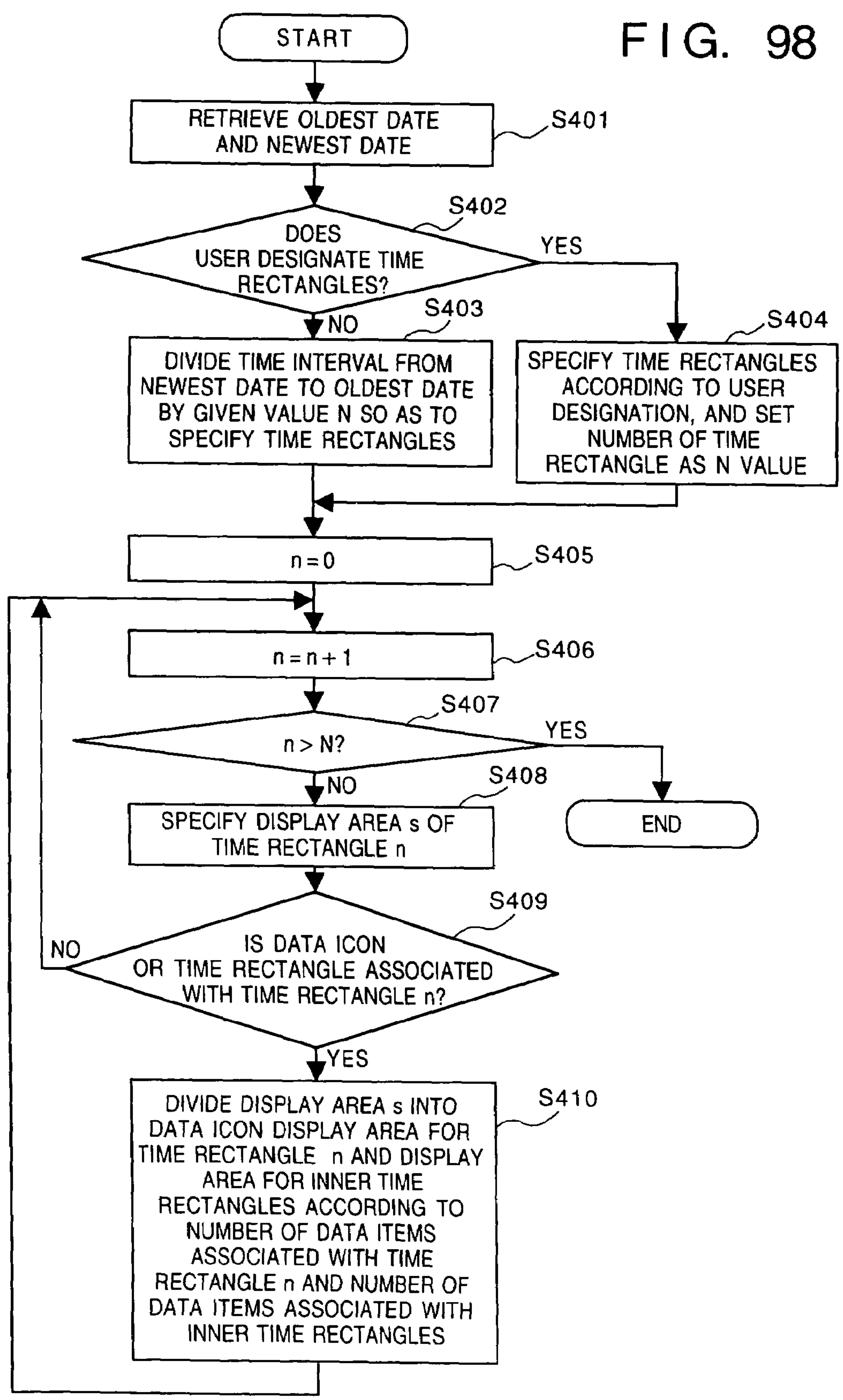
FIG. 98
START
RETRIEVE OLDEST DATE AND NEWEST DATE
S401
DOES USER DESIGNATE TIME RECTANGLES?
S402
YES
NO
S403
DIVIDE TIME INTERVAL FROM NEWEST DATE TO OLDEST DATE BY GIVEN VALUE N SO AS TO SPECIFY TIME RECTANGLES
S404
SPECIFY TIME RECTANGLES ACCORDING TO USER DESIGNATION, AND SET NUMBER OF TIME RECTANGLE AS N VALUE
n=0
S405
n=n+1
S406
n>N?
S407
YES
NO
END
SPECIFY DISPLAY AREA s OF TIME RECTANGLE n
S408
IS DATA ICON OR TIME RECTANGLE ASSOCIATED WITH TIME RECTANGLE n?
S409
NO
YES
DIVIDE DISPLAY AREA s INTO DATA ICON DISPLAY AREA FOR TIME RECTANGLE n AND DISPLAY AREA FOR INNER TIME RECTANGLES ACCORDING TO NUMBER OF DATA ITEMS ASSOCIATED WITH TIME RECTANGLE n AND NUMBER OF DATA ITEMS ASSOCIATED WITH INNER TIME RECTANGLES
S410

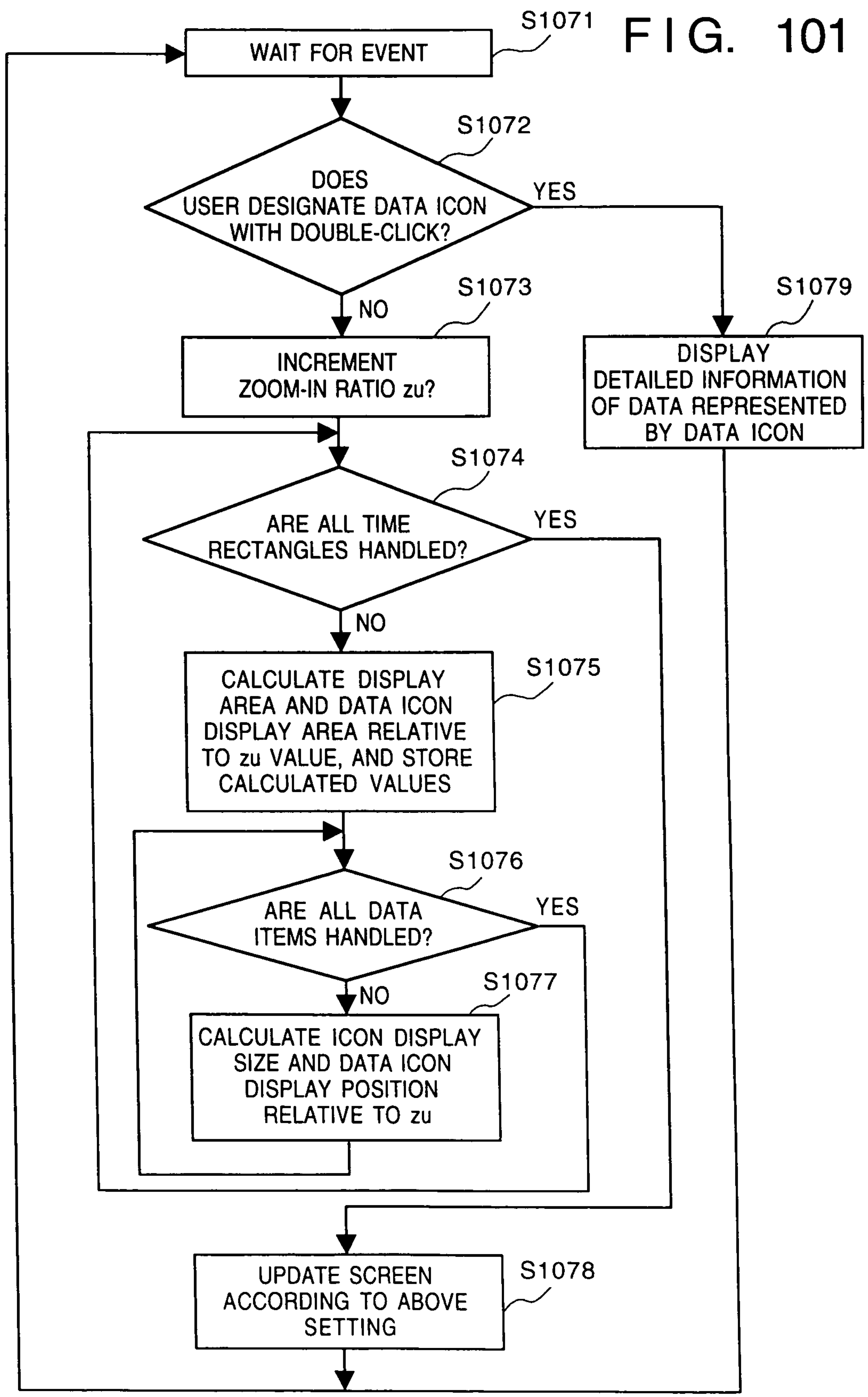
FIG. 101
S1071
WAIT FOR EVENT
S1072
DOES USER DESIGNATE DATA ICON WITH DOUBLE-CLICK?
YES
NO
S1073
INCREMENT ZOOM-IN RATIO zu?
S1079
DISPLAY DETAILED INFORMATION OF DATA REPRESENTED BY DATA ICON
S1074
ARE ALL TIME RECTANGLES HANDLED?
YES
NO
S1075
CALCULATE DISPLAY AREA AND DATA ICON DISPLAY AREA RELATIVE TO zu VALUE, AND STORE CALCULATED VALUES
S1076
ARE ALL DATA ITEMS HANDLED?
YES
NO
S1077
CALCULATE ICON DISPLAY SIZE AND DATA ICON DISPLAY POSITION RELATIVE TO zu
S1078
UPDATE SCREEN ACCORDING TO ABOVE SETTING

INTUITIVE HIERARCHICAL TIME-SERIES DATA DISPLAY METHOD AND SYSTEM

BACKGROUND OF THE INVENTION

The present invention relates to a hierarchical data display method for retrieving and displaying data from a data base, file system, or the like in which a plurality of data items are managed hierarchically, and to a browser system.

More particularly, the present invention relates to a time-series data display method for displaying a plurality of data items that are managed using associated dates, and to an information processing system for realizing the method.

The present invention also relates to an image editing method and system to be implemented in drawing software for handing images or a data base system.

In a file management system or data base system for a computer, a technique of managing data hierarchically is often used to manage numerous data items. In a file system, especially, under almost all operating systems (hereinafter OSs), the whole of the file system is segmented and managed using a plurality of hierarchical directories. As far as recently-released OSs are concerned, it is a matter of common practice to adopt a browser system in which a graphical user interface (hereinafter a GUI) is used to display a hierarchical structure of a file system or the like on a screen, and a pointing device such as a mouse is used to point out intended data, and thus data such as a file is accessed.

In the foregoing known browser system for visualizing a hierarchical structure for a user, a tree display shown in FIG. 18 or a hierarchical list box display shown in FIGS. 19A and 19B is used to express a hierarchical structure.

FIG. 18 shows an example of expressing a hierarchical file system in the form of a tree structure. Directory levels are depicted with icons of folders 101, 103, 105, 108, 110, and 113. Files are depicted with icons of documents 102, 104, 106, 107, 109, 111, 112, and 114. The hierarchical interrelations are thus expressed in the form of a tree structure.

In FIG. 18, reference numeral 101 denotes a root directory. The root directory 101 contains file R-1 102. The root directory 101 subordinates directory A 103, directory B 105, and directory C 108. The directory A 103 contains file A-1 104. The directory B 105 contains file B-1 106 and file B-2 107. The directory C 1-8 contains file C-1 109 and subordinates directory D 110. The directory D 110 contains file D-1 111 and file D-2 112 and subordinates directory E 113. The directory E 113 contains file E-1 114.

As mentioned above, files of all levels are displayed in the form of a tree structure. An intended file can be selected easily.

FIGS. 19A and 19B show an example of a hierarchical list box expressing the same hierarchical file system as the one shown in FIG. 18. FIG. 19A shows a state in which an attempt is made to access a file and directory subordinate to directory C 116. In the drawing, reference numeral 115 denotes a list box for displaying files and directories of the first level. 117 denotes a scroll bar used when the number of files or directories exceeds the number of items that can be displayed. 118 denotes a scroll up button. 119 denotes a scroll down button. 116 denotes directory C.

After directory C 116 is selected from the list box 115, when a button on a pointing device is clicked, the display of the directory C 116 is reversed, and file C-1 and directory D 121 subordinate to the directory C 116 are displayed in a list box 120 for listing files and directories of the second level.

FIG. 19B shows a state in which directory D 121 is selected from the list box 120 by clicking a button on the pointing device. In the drawing, when the directory D 121 is designated by clicking a button on the pointing device, directory E, file D-1, and file D-2 subordinate to the directory D 121 are displayed in a list box 122 for listing files and directories of the third level. Thus, an intended file is accessed by selecting lower levels step by step.

A system for displaying a hierarchical file system using metaphors of folders, such as, the one installed in the OS for the Macintosh trademark of Apple Computer or the OS/2 trademark of IBM has become popular.

When a hierarchical file system is expressed in the form of a tree structure in the same manner as the known hierarchical file system shown in FIG. 18, if the number of files or directories is too large, all icons representing the files or directories cannot be displayed in a screen. A means for scrolling a whole screen is required in order to search for an intended directory or file. This makes it rather hard to locate an intended directory or file. The display of a lower level becomes laterally long. The display of a level containing numerous files and directories becomes vertically long. The whole of a screen cannot often be used effectively for display. A screen must be scrolled more frequently.

As for the browser system using the known list box shown in FIGS. 19A and 19B, hierarchical browsing is enabled despite a narrow screen. However, unless a directory is selected, files and directories subordinate to the directory do not appear. It is therefore difficult to grasp the whole hierarchical structure. An intended file cannot be located quickly.

As for the known system using metaphors of folders for expressing a hierarchical structure, what kind of data is contained in a folder cannot be found until the folder is opened. The whole image of a hierarchical structure nested to two or more levels cannot be grasped. Every time a folder is opened, a new window is opened. A window showing an opened folder messes up a screen of a desktop computer. Intended data is liable to be lost.

The foregoing drawbacks also lie in a browser system using a data base in which data is categorized hierarchically and adopting either of the foregoing display methods.

In a file management system or data base system for a computer, a date is used as an important parameter for managing numerous data items. In the file management system, for example, a date of creation of a file or a date of correction thereof is appended automatically as an attribute of the file. In the data base system, a date field is defined in data. A date entered in the field is used to manage the data.

A personnel management data base 30 shown in FIG. 5 will be taken for instance. A date of birth is entered in a date field 31 and used for personnel management.

In schedule table application software (hereinafter, a scheduler), schedules themselves are managed using dates. For example, when the contents of a schedule indicate a conference, document files scheduled to be used at the conference are registered in the form of a data base. It will be able to check what kinds of materials were used at the conference. This is convenient.

For retrieving intended data from a data base that is a set of data items, the foregoing data is used as an important parameter. In the file management system, files are sorted by date of creation or date of correction and then displayed. This enables a user to memorize creation or correction of files and to search for intended data. In the data base system, for example, in a personnel management data base system, retrieval and display in order of date of birth are normally adopted. In the scheduler, a desired relevant data file can be located by checking the contents of schedules by date.

For users, the most typical unit of memory can be said to be a date. A date of creation or correction of a file is memorized vaguely in general. Even if a user forgets a file name, he/she can locate the file by collating his/her memory with a date of a file. The same applies to the scheduler. Desired contents can be retrieved on the basis of a vague memory of a date. In the data base system, when files are retrieved in order, for example, by date of birth, data can be checked orderly.

However, in the known file management system, it cannot be found explicitly whether dates associated with files displayed vertically adjacently in a list are close to or separated from each other. A user must therefore carry out the work of: checking dates; estimating a time interval between each pair of dates whichever the dates are close to or separated from each other; collating his/her memory with a date of a file, and then locating a desired file. FIG. 4 shows an example 20 of a known display of the file management system. As shown in FIG. 4, files contained in a designated directory 21 are displayed in descending order of date. However, a date display column 22 must be checked item by item in order to grasp what data is created at what date.

As for a display of a data base system, when data items are displayed in order of date of birth, even if there may be a difference of one year or ten years in age between a certain person and the next person, the data items concerning the persons are displayed at one and next position orderly. A user therefore must check dates associated with data items numerically, and estimate a difference between each pair of dates. When there are many people of a certain generation but few people of a certain generation, if a user wants to understand an overall trend, time-consuming work is needed. In reality, dates of birth are sorted chronologically and displayed or plotted as a graph in an effort to grasp the overall trend.

There is an increasing demand for a system enabling a user to grasp time intuitively and sensuously.

Recently, what is called catalogue software has made its debut as data base software running in a personal computer. The catalogue software is a data base handling graphics, documents, and images mainly. Fundamentally, a reduced image (hereinafter a "thumbnail image") is created for each data, and desired data is searched by checking (browsing) the reduced images.

For supplementing retrieval based on browsing, what is called a free keyword is usually appended. The free keyword is a keyboard to which no field is allocated. A keyword to which a field is allocated is specified in a field defined in a relational data base or card type data base. As far as the catalogue software is concerned, retrieval using a free keyword is possible. Desired data is picked up using a result of retrieval in combination with browsing.

A kind of catalogue software putting an emphasis on images may sometimes be called album software. In the album software, as its name assigned in consideration of an album for making a collection of photographs implies, images are mainly stored in a data base. A wanted image is picked up, fundamentally, on the basis of browsing and a supplemental free keyword.

In the case of an album for making a collection of photographs, a user not only inserts photographs but also writes down comments or overlays a sheet of paper shown in FIG. 62 (hereinafter, a "frame"), which reveals any specific part of a photograph and hides the other part thereof, on a photograph. This is a commonly adopted technique for attracting attention to a specific photograph or highlighting an impressive photograph.

For implementing the technique shown in FIG. 62 in album software, very complex operations are needed to cut out an image using a user-specific frame and store a resultant image. FIG. 63 is a flowchart describing the operating procedure. At step S201, application software for drawing graphics (hereinafter drawing software) is activated, and a frame is created. In FIG. 64, reference numeral 901 denotes an example of a frame created. At step S202, an image is read into the drawing software, and superposed on the frame by adjusting the size of the image. In FIG. 64, 902 denotes an example of the image superposed on the frame. At step S203, application software for manipulating or editing an image (hereinafter, photo retouch software) is activated. The image superposed on the frame is fetched into the photo retouch software via a clipboard. Within the drawing software, a frame and image can be handled separately from each other. Once fetched into the photo retouch software, the frame and image are made into one image. At step S204, a portion of the image outside the frame is erased within the photo retouch. Reference numeral 904 in FIG. 64 denotes an example of erasure. At this time, an area designation tool and eraser tool of the photo retouch software are used. 904 in FIG. 64 denotes an example of a resultant corrected image. At step S205, the corrected image is saved as a new image in a file. At step 206, the image is fetched into the album software.

The known procedure of cutting out an image and fetching it into the album software involves activation of several software packages. The procedure is very complex and the work is hard. For carrying out the foregoing operations, a user needs a certain amount of expertise.

Another problem is that a frame and image are made into a single image. When the shape of the frame or a visible portion of an image is wanted to be changed from one portion to another, the procedure described in the flowchart of FIG. 63 must be performed from the beginning. Moreover, images that have not been corrected are usually stored as they are. Two kinds of images; raw images and images cut out in combination with frames are stored separately.

For these reasons, an easier method for creating a frame and producing a cutout image and a flexible method permitting future correction are needed.

It is important that a frequently-used file can be easily located or retrieved from among numerous files. In the example shown in FIG. 18, when a frequently-used file resides at a deep position in a hierarchy or many files and directories are present at the same hierarchical level, the frequently-used file cannot be located easily. Even in the example shown in FIGS. 19A and 19B, it is rather hard to retrieve a frequently-used file.

The same applies to a browser system using a data base in which data items are categorized hierarchically.

SUMMARY OF THE INVENTION

The first object of the present invention is to provide a hierarchical data display method and browser system in which the hierarchical structure of a file system or data base having a hierarchical structure is displayed in the form of a Venn diagram so that the whole structure can be grasped intuitively, data belonging to child hierarchical levels is not hidden but displayed in the form of reduced images so that intended data can be located easily.

There is provided a hierarchical data display method and browser system in which a deep hierarchical structure can be displayed within a screen of a limited area, a zoom-in means makes it possible to visualize detailed information concerning an intended hierarchical level quickly, and a zoom-out means makes it possible to obtain a brief idea on a hierarchical structure viewed from an higher level.

There is provided a hierarchical data display method and browser system in which since it is indicated a level of which hierarchical depth is currently zoomed in, a current hierarchical depth can be grasped intuitively during navigation.

For accomplishing the above objects, a hierarchical data display method of the present invention for displaying data items managed hierarchically is characterized in that a display area is divided into an area in which data icons representing data items belonging to one level and an area in which child levels are displayed, and the data icons are displayed with a size varied depending on a hierarchical depth.

The data icons are made smaller in size as the hierarchical depth increases, and the data icons are made simpler as the hierarchical depth increases. The sizes of the division areas are determined on the basis of the number of data items belonging to one level and the numbers of data items belonging to child levels. When there are a plurality of child levels, a display area for each child level is determined according to the number of data items belonging to levels subordinate to the child level. The child levels are displayed in a background representing the parent level. The background is selected and displayed so that a hierarchical depth can be recognized. As the hierarchical depth increases, the background is displayed in deeper color. A procedure for zooming in a desired level is realized by designating the display area for the desired level and then carrying out a given operation. A procedure for displaying the detailed contents of a desired level is realized by performing a given operation after designating the display area for the desired level. A procedure is provided for zooming out a level, which has zoomed up by performing the given operation, so as to transfer a view point to a parent level. A procedure is provided for grouping a plurality of desired data icons and displaying a leading data icon in such a way that the group of data icons can be recognized. A procedure is provided for displaying a list of a plurality of data icons grouped. In addition, procedures are provided for rearranging a plurality of data icons grouped, releasing a group, and deleting a desired data icon from among a plurality of data icons grouped.

A hierarchical data browser system of the present invention for displaying data items managed hierarchically comprises a display area dividing means for dividing a display area into an area, in which data icons representing data items belonging to one level are displayed, and an area in which child levels are displayed, and a data icon display means for displaying the data icons with a size varied depending on a hierarchical depth.

The data icon display means makes the data icons smaller in size as the hierarchical depth increases.

The data icon display means makes the data icons simpler as the hierarchical depth increases. The display area dividing means determines the sizes of the division areas according to the number of data items belonging to one level and the number of data items belonging to child levels. When there are a plurality of child levels, the display area dividing means determines a display area for each child level according to the number of data items existent at levels subordinate to the child level. The data icon display means includes a background display means for displaying the contents of one level in the same background. The child levels are displayed in a background representing the parent level. The background is selected so that the hierarchical depth can be recognized. The background is displayed in deeper color as the hierarchical depth increases. Moreover, a zoom-in means is provided for zooming in a desired level by performing a given operation after designating the display area for a desired level. A detailed contents display means is provided for displaying the detailed contents of a desired level by performing a given operation after designating the display area for a desired level. A zoom-out means is provided for zooming out a level, which has been zoomed in by performing the given operation, so as to display a parent level. A grouping means is provided for grouping a plurality of desired data icons and displaying a leading data icon so that the it can be recognized that a plurality of data icons are grouped together. A list display means is provided for displaying a list of a plurality of data icons grouped together. Means are provided for changing a representative picture of a plurality of data icons grouped together from one picture to another, for releasing a group, and for deleting a desired data icon from a plurality of data icons grouped together.

The hierarchical data browser system of the present invention includes a hierarchical data managing means that manages a plurality of data items hierarchically, and a level display means for defining an area, in which all data items belonging to one level and child levels are displayed, with a border encircling the whole area according to the information representing levels which is retained by the hierarchical data managing means, displays the area as an area having a background painted in given color, expresses the data items to be displayed in the display area in the form of data icons serving as data identification information, and depicts display areas for levels to be displayed in the display area; that is, the child levels within the level display area using the same component elements.

The level display means includes an area defining means that calculates a minimum necessary area in advance so as to display data icons within one level display area, and defines a display area for child levels and a display area for data icons proportionally according to a ratio of the number of all data items belonging to the child levels and levels subordinate to the child levels to the number of data items belonging to a marked level to such an extent that the display area for data icons will not be smaller than the minimum necessary area. The level display means makes the data icons smaller in size and simpler as the hierarchical depth increases. The level display means further includes a zoom-in means for zooming in a level so as to move a view point to a deeper position in a hierarchy, a zoom-out means for zooming out a level so as to move a view point to a shallower position in the hierarchy, and a hierarchical depth indicating means for indicating the hierarchical depth of a zoomed-in level and a zoom direction. As for the zoom direction, when the zoom-in means is selected, a direction toward a deeper position in a hierarchy is indicated. When the zoom-out means is selected, a direction toward a shallower position in the hierarchy is indicated. The level display means includes an assessing means for assessing the size of an area allocated to one data icon relative to a threshold of the size of a hierarchical area used as a reference in assessing the size of an area allocated to one data icon, and a setting means for setting at least one of presence or absence of an icon picture expressing a data icon, presence or absence of a data name, a font size used to display a data name, and a size of an icon picture on the basis of the result of assessment. When an available memory is small, the assessing means accordingly increases the threshold of the size of an area allocated to one data icon used to determine whether icon picture display should be executed. A grouping means is provided for grouping a plurality of data icons for management and displaying the plurality of data icons as a group icon. Further included are a list display means for use in displaying a list of data icons belonging to a designated group by designating a group icon, and a detailed information display means for use in displaying detailed information of designated data by designating a desired data icon selected from the list. Means are provided for changing a representative picture of a plurality of data icons grouped together from one picture to another, for releasing a group, and for deleting a desired icon from a plurality of data icons grouped together.

The second object of the present invention is to provide a time-series data display method for displaying time-series data items so that a user can grasp time more intuitively and sensuously, and an information processing system for realizing the time-series data display method.

For accomplishing the above object, a time-series data display method of the present invention for displaying accumulated time-series data items time-sequentially is characterized in that first data associated with a desired date is retrieved and displayed, and second data associated with a date contiguous to the desired date is retrieved and displayed in a temporal direction starting on the desired date so that the second data can be distinguished from the first data.

For the distinguishable display, the display area for the second data is made smaller than the display area for the first data. The first data is displayed at an outermost position in a display screen, and the second data is displayed inside the first data with the display area therefor made smaller. A third data associated with a date contiguous to the date of the second data is retrieved, and displayed inside the second data with the display area therefor made smaller. The display of each date is limited to a given number of data items. When the number of data items exceeds the given number, the data items are classified in units of a finer date and displayed mutually distinguishably. When zoom-in is designated for a screen display, the display positions for the first to third data items are shifted outward. The display areas for the first to third data items are made larger accordingly. The zoom-in mode continues for a designated period of time. The first data is moved out of the display screen. New data associated with a date contiguous to the date of the data displayed at an innermost position is retrieved and displayed at the innermost position. When zoom-out is designated for a screen display, the display positions for the first to third data are shifted inward. The display areas for the first to third data are made smaller accordingly. The zoom-out mode-continues for a designated period of time. The data displayed at an innermost position is moved out of the display screen. New data associated with a date contiguous to the date of the data displayed at an outermost position is retrieved and displayed at the outermost position. Zoom-in or zoom-out is designated in a screen, and the speed of shifting display positions is varied depending on a designated position in the screen. With the displays of data items, graphics such as rings or squares indicating dates of the displays are nested and displayed. For the nested display, the graphics such as rings or squares representing dates associated with displays are displayed concentrically in units of a given date. Data items are sorted accordingly and displayed on the graphics. The graphics such as rings or squares representing dates associated with displays are displayed in different colors associated with dates. The data items are positioned in the graphics at random. The random positions are specified at the time of data registration. The accumulated time-series data includes data items accumulated in one-to-one correspondence to dates of creation of data files, data items accumulated in one-to-one correspondence to dates of correction of files, and data items accumulated in one-to-one correspondence to designated dates registered by a user.

A time-series data display method of the present invention for displaying accumulated time-series data items time-sequentially is characterized in that data items are accumulated in one-to-one correspondence to dates of a schedule table, the schedule table is displayed, and data associated with a desired date is displayed by designating the desired date of the schedule table.

An information processing system of the present invention for displaying accumulated time-series data items time-sequentially comprises an accumulating means for accumulating data items in one-to-one correspondence to dates, a retrieving means for retrieving data associated with a desired date and data associated with a date contiguous to the desired date responsively to designation of a desired date, and a display means for displaying retrieved data distinguishably in a temporal direction starting on the desired date.

The display means displays the data associated with a date contiguous to the desired date with the display area therefor made smaller than the one for the data of the desired date according to an elapsed time. The display means displays the data of the desired date at an outermost position in a display screen, and displays the data of the date contiguous to the desired date inside the data of the desired date with the display area therefor made smaller in proportion to an elapsed time. The display means includes a display limiting means for limiting the display of each date to a given number of data items, and a display dividing means that when the number of data items exceeds the given number, classifies the data items in units of a finer date and displays the data items mutually distinguishably. The accumulating means includes a subdividing and accumulating means for subdividing a data accumulation unit in units of a finer date until the number of data items does not exceed the given number. Further included are a zoom designation means for use in designating zoom-in or zoom-out for a screen display, and a zoom control means that when zoom-in is designated, shifts the display positions for data items outward so as to increase the display areas therefor, and that when zoom-out is designated, shifts the display positions of data items inward so as to decrease the display areas therefor. The zoom control means includes a display data updating means that when zoom-in is designated, moves the data of a desired date out of the display screen, retrieves new data associated with a date contiguous to the date of the data displayed at an innermost position, and displays the new data at the innermost position, and that when zoom-out is designated, moves the data displayed at the innermost position out of the display screen, retrieves new data associated with a date contiguous to the date of the data displayed at an outermost position, and displays the new data at the outermost position. The zoom designation means includes a designation input means for use in making designation in a screen. The zoom control means varies the speed of shifting the positions of data items according to a designated position in a screen. The display means includes a means for concentrically displaying graphics such as rings or squares representing dates associated with displays in units of a given date, and a means for displaying data items orderly in the graphics. The graphics such as rings or squares indicating dates associated with displays are nested and displayed together with the displays of data items. The display means displays the graphics such as rings or squares representing dates associated with displays in different colors associated with the dates. The display means positions data items in the graphics at random. The accumulating means specifies the random positions at the time of data registration. The accumulated time-series data items include data items accumulated in one-to-one correspondence to dates of creation of data files, data items accumulated in one-to-one correspondence to dates of correction of files, and data items accumulated in one-to-one correspondence to designated dates entered in by a user.

An information processing system of the present invention for displaying accumulated time-series data time-sequentially comprises an accumulating means for accumulating data items in one-to-one correspondence to dates of a schedule table, a first display means for displaying the schedule table, and a second display means for displaying data associated with a desired date of the schedule table responsively to designation of the desired data.

The third object of the present invention is to provide an image editing method and system in which an image can be cut out by performing a simple operation and fetched into album software, or the size of a cutout can be varied.

There is provided an image editing method and system in which a whole hierarchical structure can be grasped easily and an intended file can be located effortlessly, and an image editing method and system in which a frequently-used file can be picked up from among numerous files effortlessly.

For accomplishing the aforesaid object, an image editing method of the present invention for cutting out a designated area of an image in given form has as one feature that a plurality of cutout forms are registered, one of the registered cutout forms is designated and placed at a desired position in an image, the cutout form is enlarged or reduced to a desired size, and then the portion of the image inside the cutout form is output as a cutout image.

An image editing method of the present invention for cutting out a designated area of an image in given form is characterized in that a cutout form and image are registered mutually independently, an identifier, position, and size of the cutout form are registered as attributes of the image, and the registered cutout form is placed at a desired position in the image. When the cutout form is enlarged or reduced to a desired size, the identifier, position, and size of the cutout form are registered as attributes of the image. Based on the registered attributes of the image, the portion of the image inside the cutout form is output as a cutout image.

The cutout form is placed on the center of a portion of an image to be cut out, and then enlarged or reduced with the center fixed. The cutout form is composed of a form used to cut out an image and a form to be output as a perimeter of the cutout. The cutout image is used as a Sumner image in a data base system.

An image editing method of the present invention to be implemented in a hierarchical data management system for managing a plurality of data items hierarchically has the feature that an icon display size representing a size of a icon to be displayed and a data icon display position representing a display position for an icon are registered as attributes of each data. An icon display size and data icon display position are determined in hierarchical order, whereby data icons serving as data identification information can be displayed with a size made different in hierarchical order so that data icons belonging to the same level can be distinguished from those belonging to other levels.

By varying an icon display size and data icon display position, a level or data icon is zoomed in, panned, or zoomed out. An access frequency meaning the number of accesses gained to data is included in the attributes of the data. A data icon representing data whose access frequency is relatively high is displayed with a relatively large size.

An image editing method of the present invention to be implemented in a hierarchical data management system for managing a plurality of data items hierarchically has the feature that data icons serving as data identification information are displayed with a size made different in hierarchical order, a desired data icon is designated in order to access the data, and a data icon representing data whose access frequency is relatively high is displayed with a relatively large size.

Data icons belonging to the same level are displayed distinguishably from those belonging to other levels. A level to which data having a relatively high access frequency belongs is displayed with a relatively large size. When a data icon displayed with a relatively large size is not accessed for a period of time exceeding a certain period, the data icon is reduced in proportion to the period during which it is not accessed or a frequency by which any other data is accessed. A desired level or data icon is designated, and then zoomed in, panned, or zoomed out. Data icons belonging to a level subordinating a marked level are vignetted and displayed. Vignetting is achieved by enlarging raw data representing a number of pixels smaller than the number of pixels to be displayed. Data icons belonging to a higher level are vignetted more intensely. The data attributes include one of date information representing a date of creation of data, date information representing a data of access gained to data, and date information specified in data. An icon display size and data icon display position are determined date-orderly, whereby data icons serving as data identification information are displayed with a size made different date-orderly so that data icons associated with the same date can be displayed distinguishably from those associated with other dates. By varying an icon display size and data icon display position, data icons associated with the same date are zoomed in or out. Moreover, either hierarchical display or date-orderly display can be selected. A position in a entire hierarchy being currently displayed in a screen is displayed within a separate window in the form of a position on a plane defined with vertical and lateral lines and a position in a depth direction. When a desired position is designated in the separate window, a desired level can be displayed at a desired enlargement ratio.

An image editing system of the present invention for cutting out a designated area of an image in given form comprises a registering means for registering a plurality of cutout forms, a situating means for use in designating one of the registered cutout forms and situating it at a desired position in an image, a changing means for use in changing the size of a cutout form into a desired size, and a cutout means for outputting a potion of an image inside a cutout form as a cutout image.

An image editing system of the present invention for cutting out a designated area of an image in given form comprises a registering means for registering a cutout form and image mutually independently, a situating means for use in situating a registered cutout form at a desired position in an image by performing a given operation, a changing means for use in enlarging or reducing the cutout form into a desired size by performing a given operation, an attribute registering means for registering an identifier, position, and size of the cutout form as attributes of the image, and an image output means for outputting the portion of the image inside the cutout form as a cutout image according to the registered attributes of the image.

The situating means aligns the center of a cutout form with the center of a portion of an image to be cut out. The changing means enlarges or reduces a cutout form with the center thereof fixed. The registering means registers each cutout form as a form used to cut out an image and a form to be output as a perimeter of a cutout. The image editing system is implemented in a data base system. A cutout image is used as a Sumner image.

An image editing system of the present invention to be implemented in a hierarchical data management system for managing a plurality of data items hierarchically comprises an attribute registering means for registering an icon display size representing a size of an icon to be displayed and a data icon display position representing a display position for an icon as attributes of each data, and a first display means for determining an icon display size and data icon display position in hierarchical order, and thus displaying data icons serving as data identification information with a size made different in hierarchical order so that data icons belonging to the same level can be distinguished from those belonging to other levels.

A first display changing means is provided for zooming in, panning, or zooming out a level or data icon by varying an icon display size and data icon display position. A second display changing means is provided for registering an access frequency meaning the number of accesses gained to data as an attribute of the data and for displaying a data icon representing data whose access frequency is relatively high with a relatively large size.

An image editing system of the present invention to be implemented in a hierarchical data management system for managing a plurality of data items hierarchically comprises a display means for displaying data icons serving as data identification information with a size made different in hierarchical order, an access means for use in accessing data corresponding to a desired data icon by designating the data icon, and a second display changing means for displaying a data icon representing data whose access frequency is relatively high with a relatively large size.

The display means displays data icons belonging to the same level distinguishably from those belonging to other levels. The second display changing means displays a level to which data whose access frequency is relatively high belongs with a relatively large size. When a data icon displayed with a relatively large size has not been accessed for a period exceeding a certain period of time, the second display changing means reduces the data icon in proportion to the period during which the data icon is not accessed or a frequency by which any other data is accessed. A first display changing means is used to designate a desired level or data icon and to zoom in, pan, or zoom out the level or data icon. The first display changing means includes a vignetting means for vignetting data icons belonging to a level subordinating a marked level and then displaying the data icons. The vignetting means achieves vignetting by enlarging raw data representing a number of pixels smaller than the number of pixels to be displayed. The vignetting means vignettes data icons belonging to a higher level more intensely. The attribute registering means includes a second display means for registering one of date information representing a date of creation of data, date information representing a date of access gained to data, and date information specified in data as an attribute of each of the data, for determining an icon display size and data icon display position based on date-order, and thus displaying data icons serving as data identification information with a size made different date-orderly so that data icons associated with the same date can be distinguished from those associated with other dates. A third display changing means is provided for zooming in or out data icons associated with the same date by varying an icon display size and data icon display position. A switching means is provided for selecting either the first display means or second display means. The first and second display means display a position in an entire hierarchy, which is currently displayed in a screen, in a separate window in the form of a position on a plane defined with vertical and lateral lines and a position in a depth direction. A display designating means is used to designate a desired position in the separate window so as to display a desired level at a desired enlargement ratio.

Other features, objects and advantages of the present invention will become apparent from the following description of a preferred embodiment with reference to the drawings in which like reference characters designate like or corresponding parts throughout several views.

BRIEF DESCRIPTION OF THE DRAWINGS

FIG. 11 is a flowchart describing a sequence for acquiring a cell corresponding to an outermost ring;

FIG. 13 is a flowchart describing a sequence of display during zoom-in;

FIG. 14 is a flowchart describing a sequence of display during zoom-out;

FIG. 25 is a flowchart describing a sequence according to which a level display means sets the sizes of level display area for a level and of data icons;

FIG. 28 is a flowchart describing a sequence for zooming in a given level;

FIG. 34 shows a state in which the level display area for directory C is zoomed in;

FIG. 35 shows a state in which the level display area for directory E is zoomed in;

FIG. 36 shows a state in which the level display area for directory B is zoomed in;

FIG. 47 is a flowchart describing a sequence for determining a data icon display format according to a size of a display area allocated to one data icon at step 125 in the flowchart of FIG. 30;

FIG. 48 shows an example of a data name display font size table;

FIG. 49 shows an example of a minimum data icon picture display size table;

FIG. 50 shows examples of data icon display formats determined as described in the flowchart of FIG. 47;

FIG. 59 shows examples of data icon display formats determined according to the sequence described in the flowchart of FIG. 47 and used when an available memory is limited;

Figure 62:
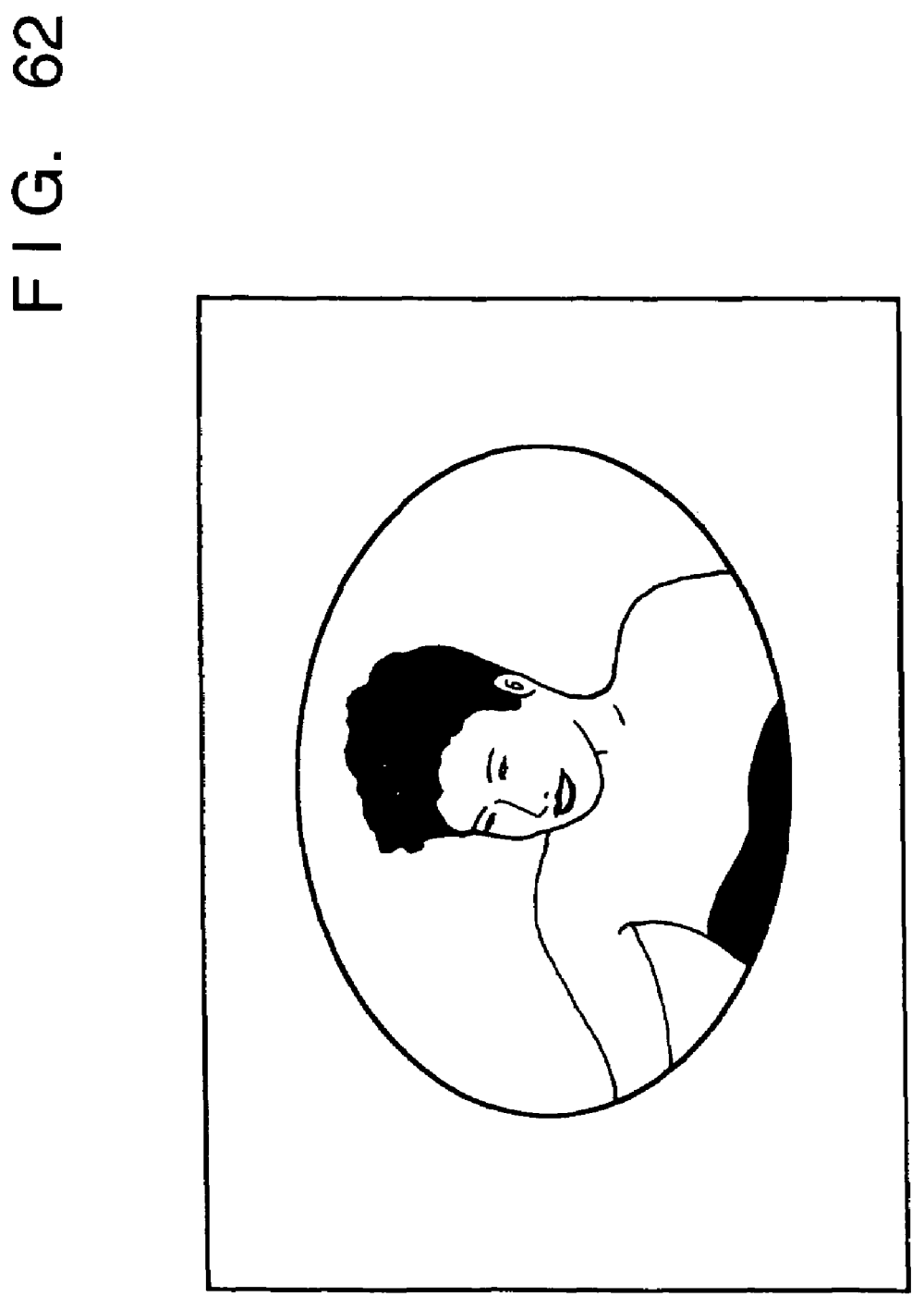

FIG. 62 shows an example of a photograph preserved in an album;

FIG. 69 is a flowchart describing a sequence for setting a transparent area in the fourth embodiment;

FIG. 71 is a flowchart describing a sequence of palette registration in the fourth embodiment;

FIG. 74 is a flowchart describing a sequence for displaying a cutout state of an image in the fourth embodiment;

FIG. 75 is a block diagram showing the internal configuration of a personal computer in the fourth embodiment;

FIG. 80 is a flowchart describing a sequence of zoom-in or panning display in the fifth embodiment;

FIG. 91 is a flowchart describing a sequence for setting the sizes of a level display area and data icons in the fifth embodiment;

FIG. 93 is a flowchart describing a sequence of image enlargement in the fifth embodiment;

FIG. 98 is a flowchart describing a sequence for setting a time rectangle and a data icon in the fifth embodiment;

FIG. 101 is a flowchart describing zoom-in in time-sequential display mode in the fifth embodiment;

DESCRIPTION OF THE PREFERRED EMBODIMENTS

Referring to the appended drawings, the preferred embodiments of the present invention will be described in detail below.

First Embodiment

<Example of System Configuration>

Figure 1:
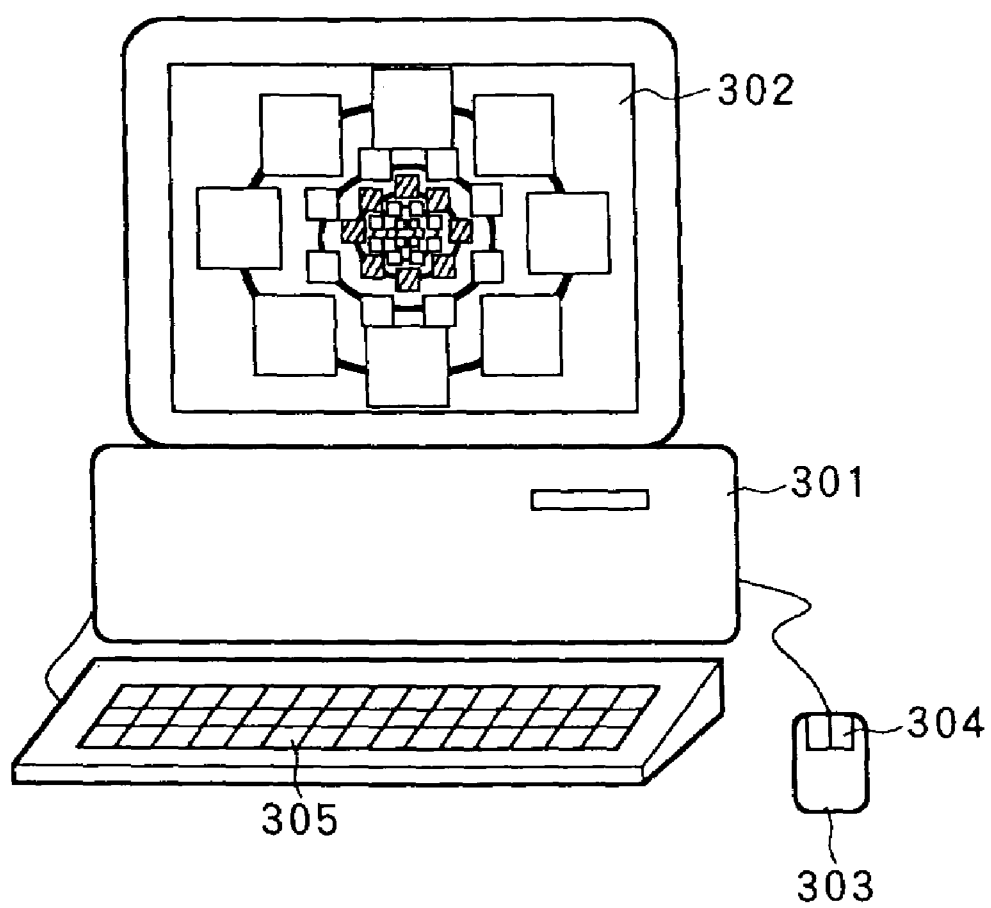
FIG. 1 shows an example of the configuration of a personal computer system of an embodiment.

FIG. 1 shows an example of the configuration of a personal computer system serving as a platform in which the present invention is implemented.

In FIG. 1, reference numeral 301 denotes a main unit of a computer system. 302 denotes a display for displaying data. 303 denotes a mouse typical of a pointing device. 304 denotes a mouse button. 305 denotes a keyboard.

Figure 2:
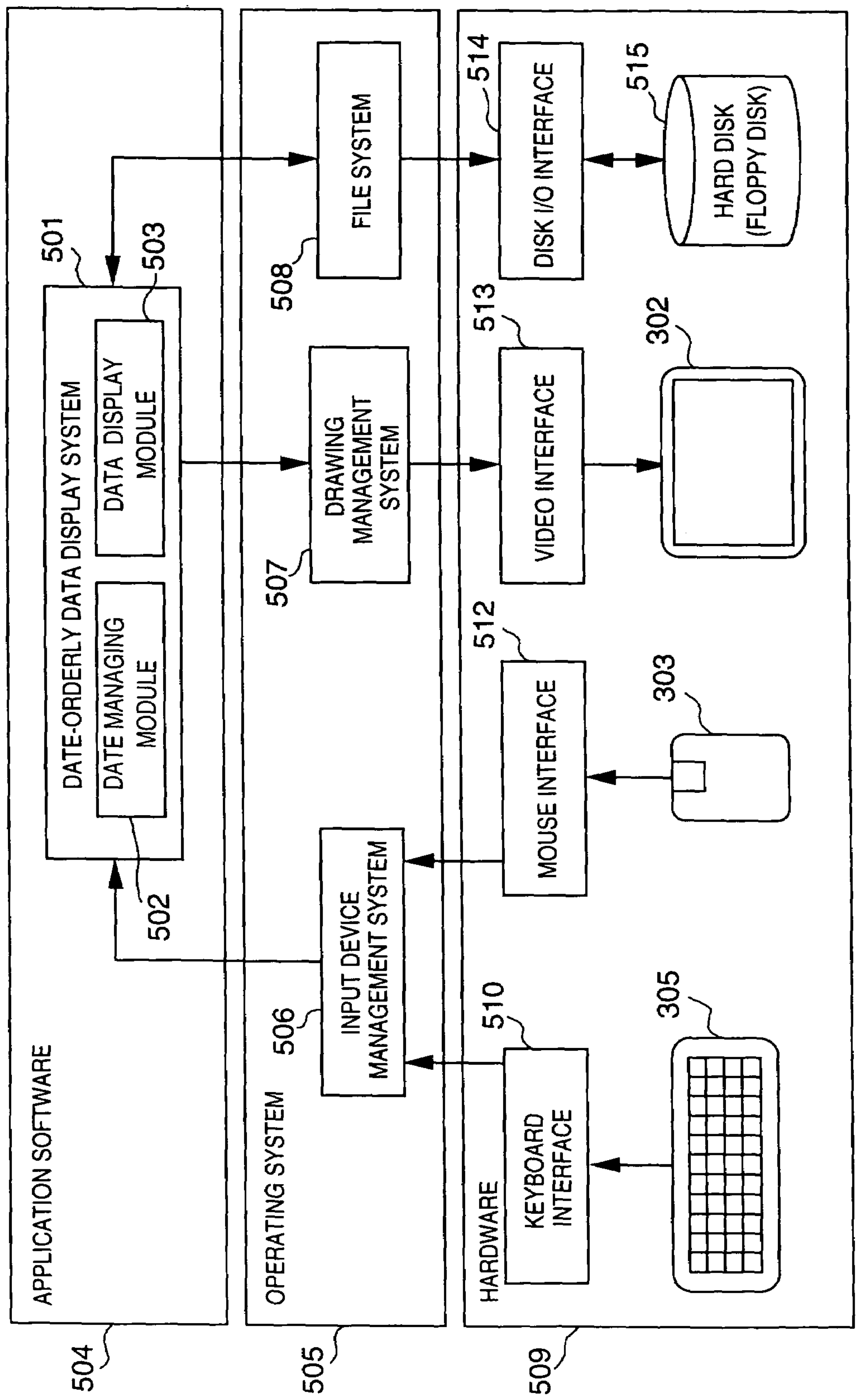
FIG. 2 shows an example of the configuration of a hierarchical data management system including software and hardware.

FIG. 2 shows the configuration of a hierarchical data management system including software and hardware.

In FIG. 2, reference numeral 509 denotes hardware. 505 denotes an operating system (OS) operating on the hardware 509. 504 denotes application software running under the OS 505. Some of blocks constituting the hardware 509 or OS 505 which are components of the hardware 509 or OS 505 but not directly needed for describing the present embodiment are not illustrated. The unshown blocks constituting the hardware include a CPU and memory, and those constituting the OS include a memory management system.

In FIG. 2, reference numeral 515 denotes a hard disk for physically storing files and data items. 508 denotes a file system constituting the OS. The file system 508 has the ability to enable application software to input or output files without awareness of hardware. 514 denotes a disk I/O interface for enabling the file system 508 to read or write data from or in the hard disk 515.

Reference numeral 507 denotes a drawing management system constituting the OS. The drawing management system 507 has the ability to enable application software to make a drawing without awareness of hardware. 513 denotes a video interface for enabling the drawing management system 507 to make a drawing on the display 302.

Reference numeral 506 denotes an input device management system constituting the OS. The input device management system has the ability to enable application software to receive a user input without awareness of hardware. 510 denotes a keyboard interface enabling the input device management system 506 to receive an input entered at the keyboard 305. 512 denotes a mouse interface enabling the input device management system 506 to receive an input from the mouse 303.

Reference numeral 501 denotes a date-orderly data browser. 502 denotes a date managing module for managing data items date-orderly. 503 denotes a data display module for displaying the data items managed date-orderly in such a manner that the data items can be displayed time-orderly at intervals of a time between each pair of dates.

Figure 40:
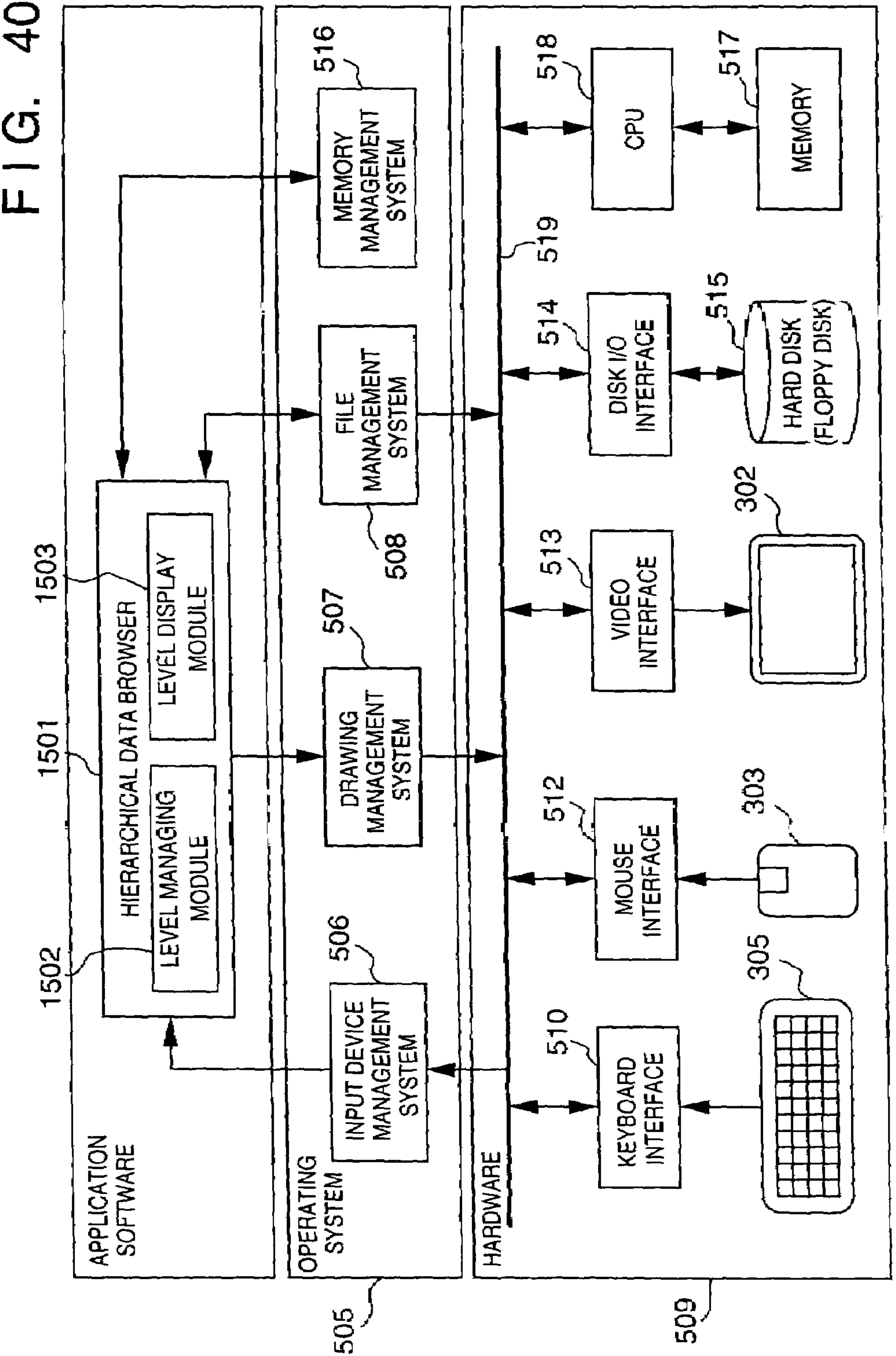
FIG. 40 shows the configuration of a hierarchical data browser system including software and hardware in an embodiment.

In FIGS. 2, 40 and 75 showing the configuration of systems, reference numeral 515 may be a floppy disk or the same for storing files, data and/or program-modules, which include application software only or may also include operating systems. Some files, data and/or program-modules stored in a floppy disk 515 are loaded down into a memory (RAM) of a personal computer system before a CPU performs processes of the present invention by using the program-modules in the RAM. The floppy disk may be replaced with a host computer or a communication network.

<Example of a Display>

Figure 3:
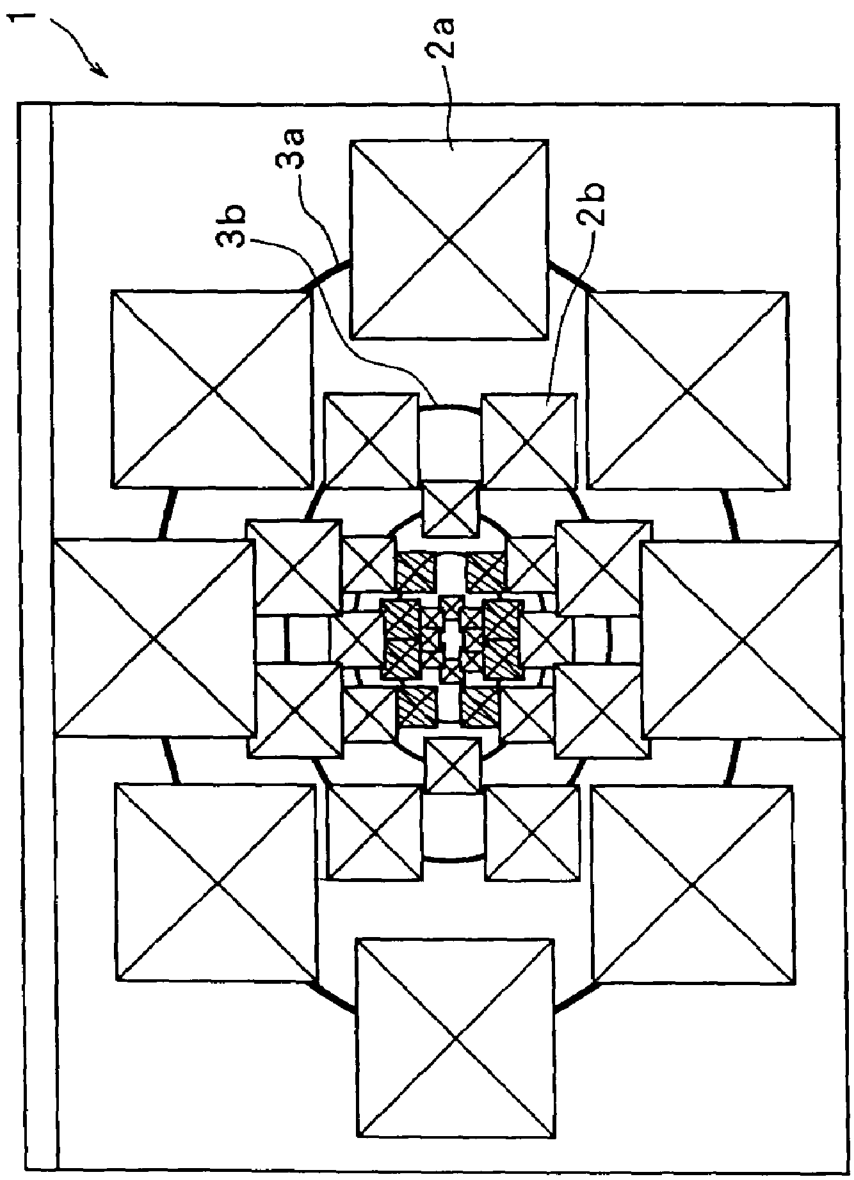
FIG. 3 shows an example of a display in an embodiment.

FIG. 3 shows an example of a display provided by a display method of this embodiment.

Reference numeral 1 denotes a display screen. Squares 2*a* and 2*b* and other squares represent data items (or may be referred to as data icons). 3*a* and 3*b* denote rings representing dates associated with the data items. On each ring, data items associated with the data expressed by the ring are arranged orderly. The rings are nested toward the center of the screen and timed day by day toward the past or future. Data items on a ring closest to the perimeter of the screen are displayed with the largest size. This results in a display providing depth perception in which the perimeter of the screen is seen closest and the center thereof is seen farthest. When a user wants to display data icons, which are seen far, with a larger size in the screen, he/she should execute zoom-in. By executing zoom-in, the data icons are displayed more largely. For example, the data icon 2*b* gets larger together with the ring 3*b*, and the ring 3*a* and data icon 2*a* are driven out of the screen and disappear. In contrast, when zoom-out is executed, the rings and data icons get smaller and gather around the center of the screen. Past or future data icons and rings come from outside of the screen.

In a file management system, after a certain directory is selected, when date-orderly display of this embodiment is designated, display is performed so that a ring of a date of that day can be seen closest. By default, a direction seen receding represents a direction toward the past, and a direction approaching represents a direction toward the present. A user can reverse this direction. When a desired data item is located, the data icon displayed is designated by double-clicking a mouse button. The data file is then opened in a separate window. The contents of the data file can be checked or edited.

<Zoom-In or Zoom-Out>

Figure 6:
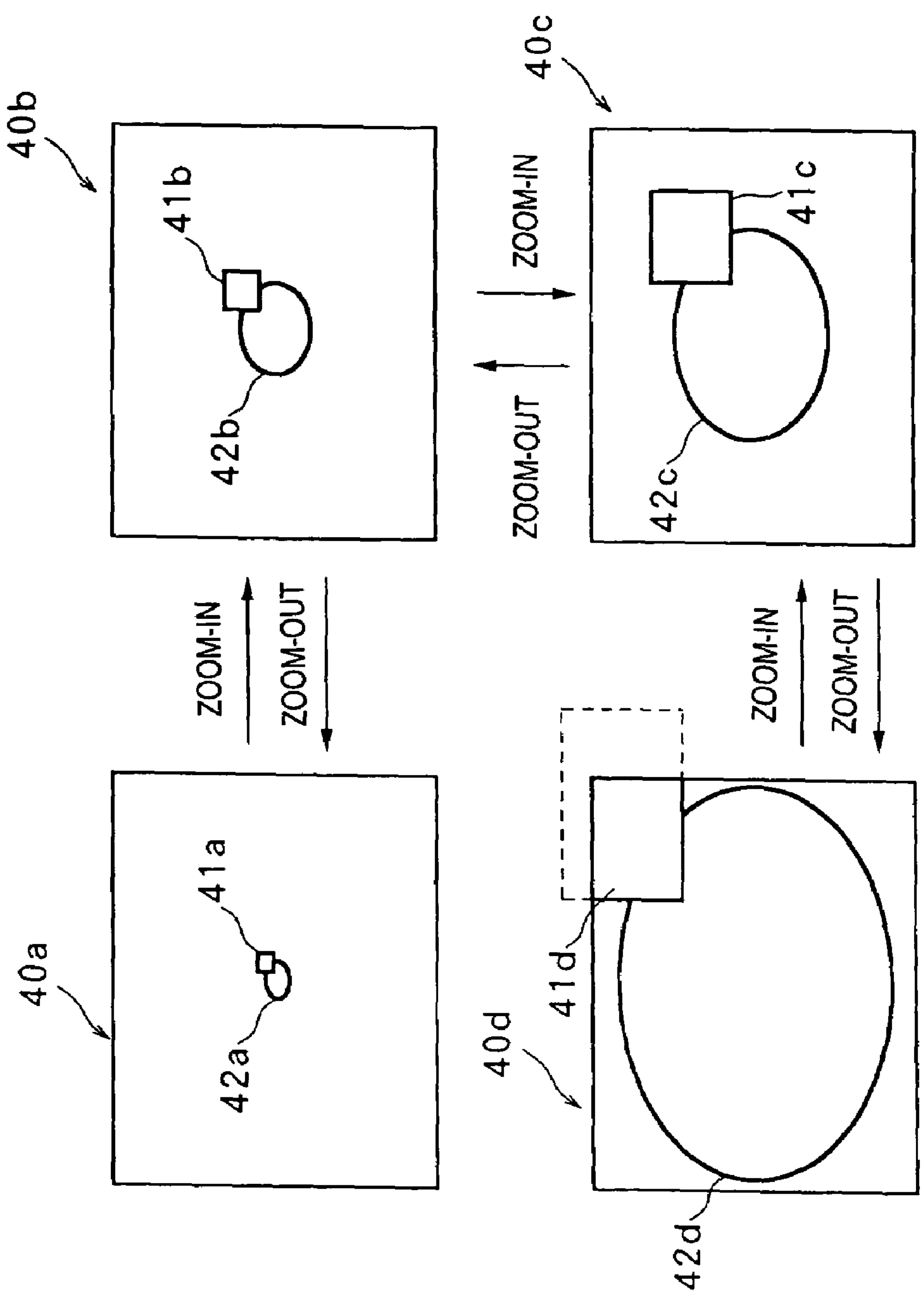
FIG. 6 is an explanatory diagram concerning zoom-in display and zoom-out display.

FIG. 6 shows examples of a ring and examples of zoomed-in and -out displays, wherein a data icon on the ring is marked.

In FIG. 6, a point displayed so as to appear far away represents a past point and a point seen close represents a future point. Reference numerals 40*a*, 40*b*, 40*c*, and 40*d* denote display screens. 42*a*, 42*b*, 42*c*, and 42*d* denote a ring representing a date in different states. 41*a*, 41*b*, 41*c*, and 41*d* denote a data icon on the ring (a data item in the time band represented by the ring) in the different states.

As shown in FIG. 6, when zoom-in is executed (past data items are viewed consecutively), first, the data icon 41*a* and ring 42*a* appear on the center of a screen with a small size (upper left). When zoom-in is continued, the data icon 41*a* and ring 42*a* become the data icon 41*b* and ring 42*b* (upper right), the data icon 41*c* and ring 42*c* (lower right), and then the data icon 41*d* and ring 42*d* (lower left). Thus, the data icon 41*a* and ring 42*a* are displayed with sizes increased orderly. The data icon 41*d* is displayed so largely that part thereof is visible. When zoom-in continues further, the data icon will disappear from the screen. When zoom-out is executed, the foregoing display direction is reversed.

In the state of the display screen 40*a*, in reality, the ring 42*a* is encircled by a larger ring representing a one-step future time band relative to the ring 42*a*. The ring is encircled by a larger ring representing a one-step future time band. In the display screen 40*d*, in reality, the ring 42*d* is encircling a smaller ring representing a one-step past time band relative to the ring 42*d*. The small ring is encircling a much smaller ring representing a one-step past time band. The displays shown in FIG. 6 are realized as a whole.

When data icons are sorted by date and displayed, if zoom-in or -out is executed in order to display the data icons consecutively, data display harmonious with a user's memory can be realized. Moreover, how data items are arranged in a time-axis direction can be grasped intuitively.

<Data Structure>

Figure 7:
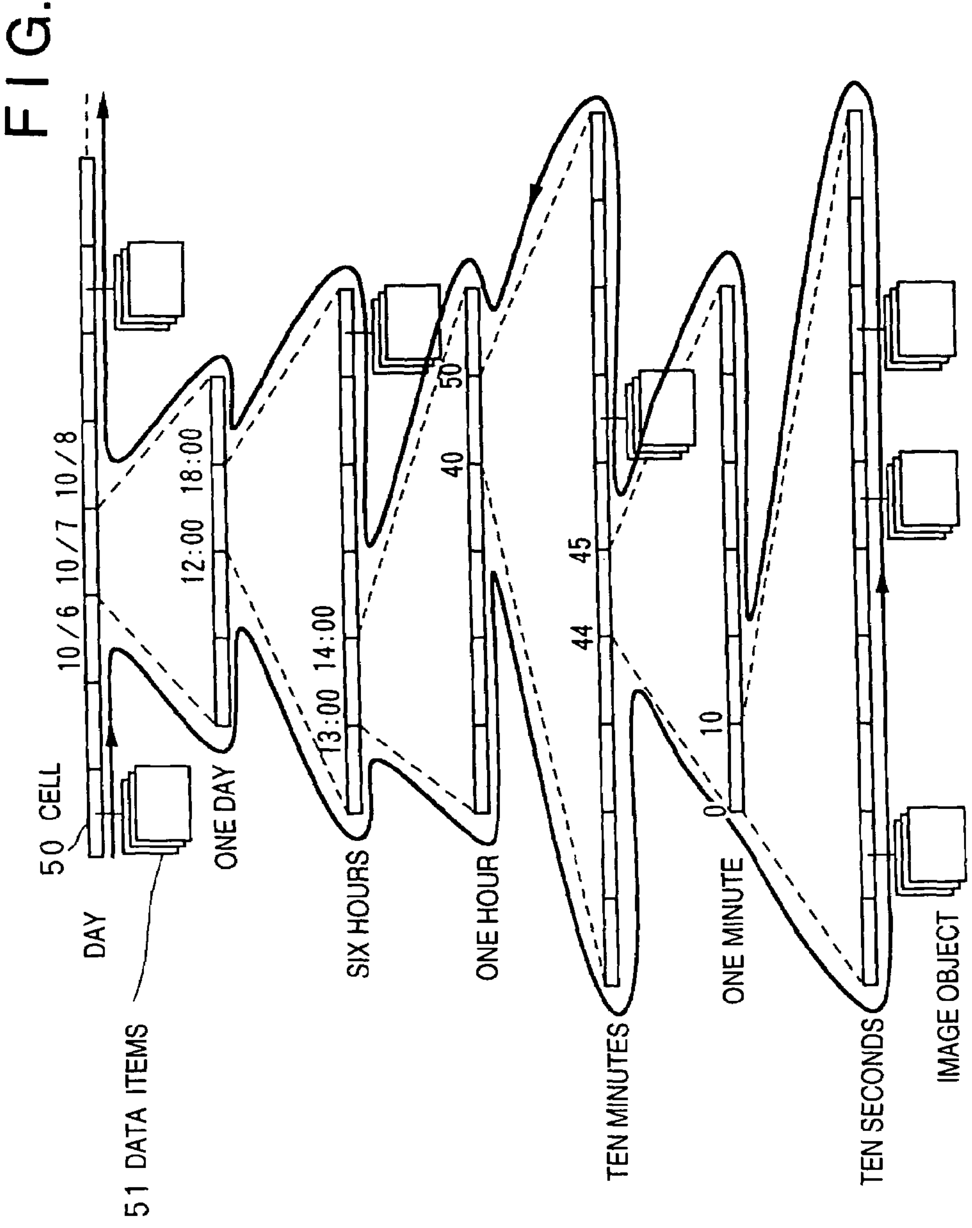
FIG. 7 shows cells used to manage time.

FIG. 7 is a conceptual diagram showing a data structure in this embodiment.

Reference numeral 50 denotes a time band segmented in units of a certain time interval and associated with one ring displayed. In this embodiment, the time band 50 represents one day and is referred to as a cell. Data items 51 associated with a time band of a cell are hung on the cell. For display, a ring is drawn for each cell, and data icons representing data items belonging to the cell are drawn on the ring. When zoom-in or -out is executed, the array of cells is advanced rightward or leftward and then data icons are displayed.

When numerous data items belong to a certain cell, or in other words, numerous data items are associated with a time band of a certain cell, the data items should be displayed slowly so that all the data items can be checked carefully. A cell containing a number of data items larger than a given number is divided into cells of a shorter time band. In the example of FIG. 7, many data items belong to cell 10/7. The cell is therefore divided into four cells each corresponding to an interval of six hours. Numerous data items belong to cell 12:00-18:00. The cell is therefore subdivided into intervals of one hour. Thereafter, a cell is subdivided at intervals of ten minutes, one minute, ten seconds, one second, etc.) until the number of data items belonging to one cell becomes smaller than or equal to the given number.

For display, as indicated with arrows, hierarchical cells are displayed orderly. Display is performed cell by cell. The display speed decreases in a time band around which many data items gather.

<Display of Dates>

Figure 8:
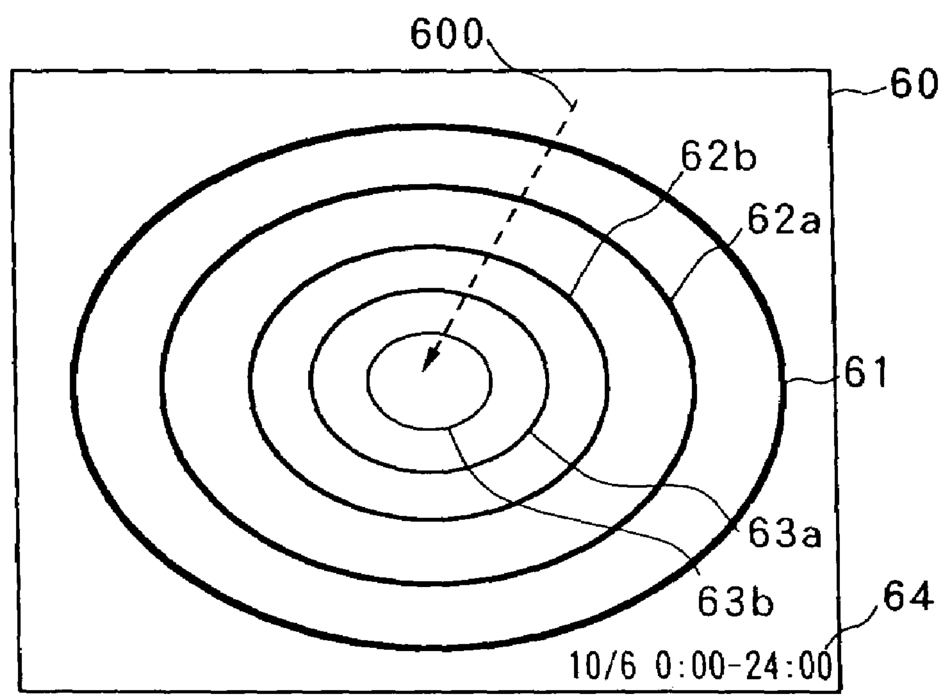
FIG. 8 shows an example of a display of rings corresponding to hierarchical cells.
Figure 10:
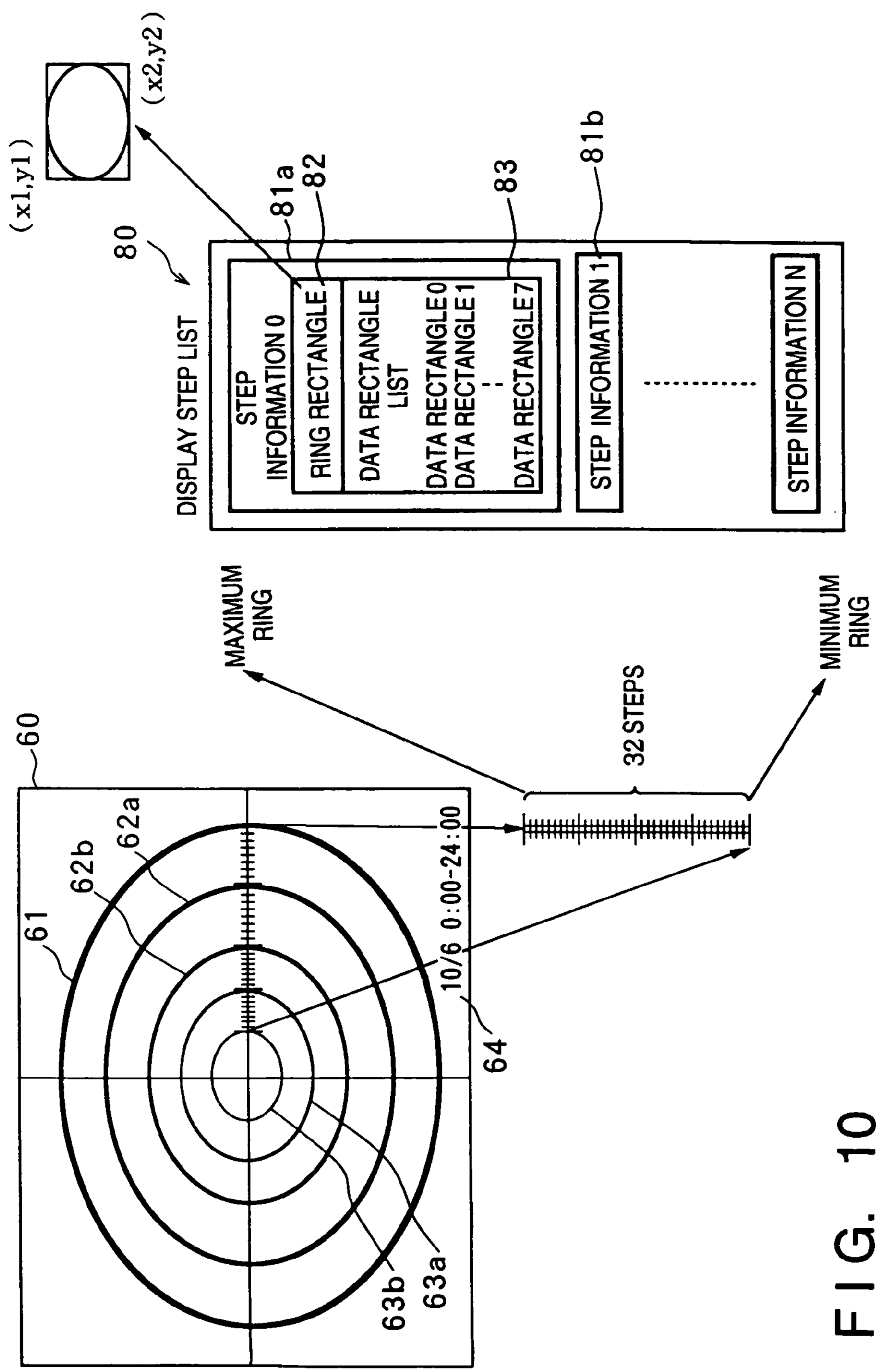
FIG. 10 shows a data structure of a display step list.

For explicitly informing a user of the fact that the display speed decreases, the rings shown in FIG. 8 are displayed with a color made lighter in a direction of an auxiliary arrow 60 depicted with a dashed line; that is, as the rings represent the cells of decreasing time intervals (in FIGS. 8 and 10, the depth of a color is indicated with the thickness of a ring). In FIG. 8, data icons are not illustrated for the sake of clarity of explanation. In FIG. 8, reference numeral 60 denotes a display screen. A ring 61 lies at an outermost position in the display screen. The ring 61 is displayed in the deepest color. The ring 61 represents cell 10/6,' day' in FIG. 7. Rings 62*a* and 62*b* represents time bands of six hours (0:00-6:00 and 6:00-12:00) and are displayed with lighter colors than the ring 61. Rings 63*a* and 63*b* represent time bands of one hour (12:00-13:00 and 13:00-14:00) and are displayed with lighter colors than the rings 62*a* and 62*b*. Reference numeral 64 denotes an area in which a time band represented by the outermost ring at that time (ring 61 in FIG. 8) is displayed. Owing to the foregoing display technique, a user can observe even a time band in which data items are congested, for a sufficiently long period of time while recognizing a change between time intervals.

Whether or not a cell should be subdivided is, as described in conjunction with FIG. 7, dependent largely on whether or not the number of data items belonging to the cell exceeds a certain given value. The given value is equal to a maximum number of data icons that can be displayed on one ring. As shown in FIG. 3, in this embodiment, up to eight data icons are placed on one ring. The given value is therefore eight.

<Data Structure of a Cell>

Figure 9:
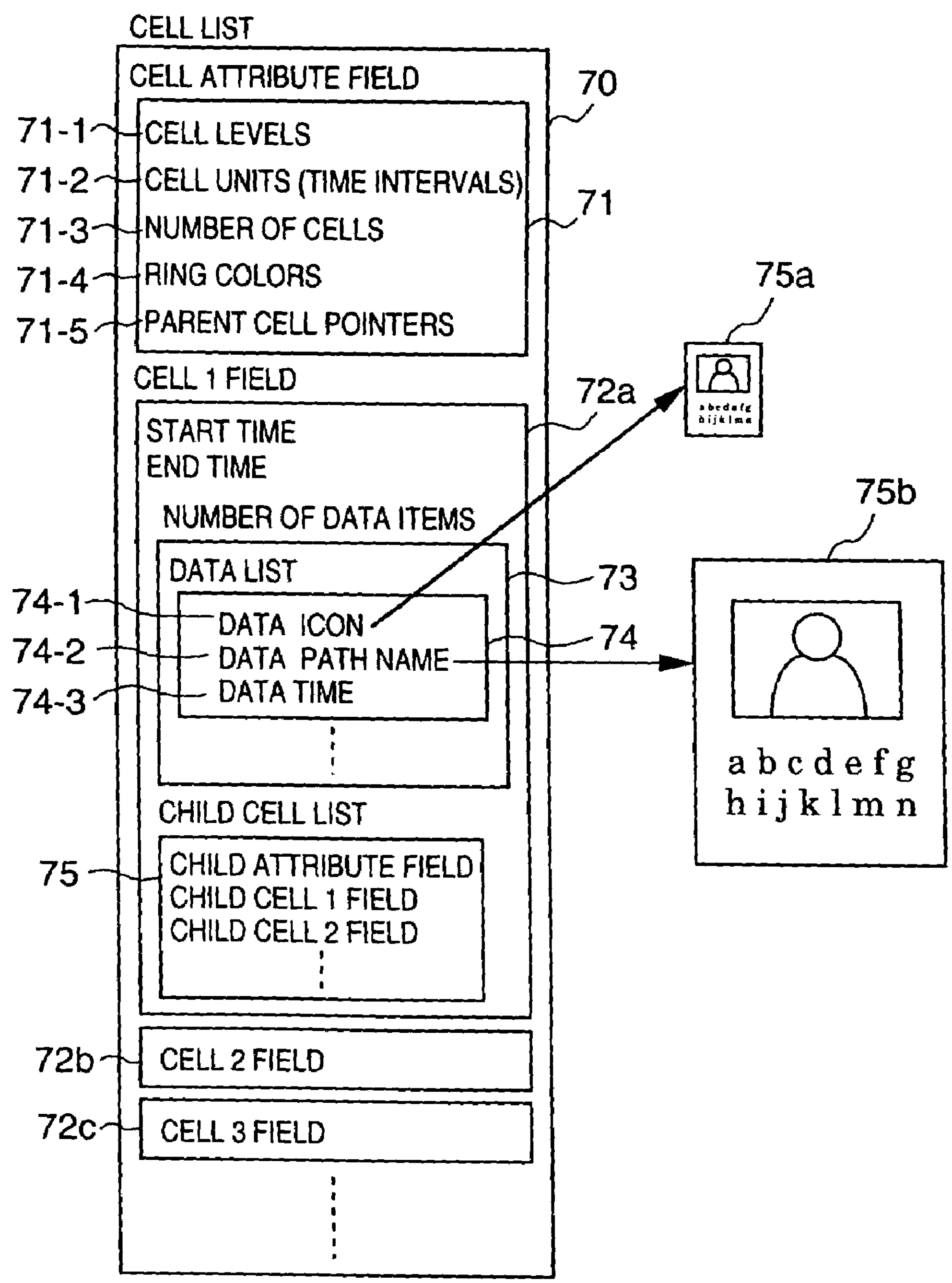
FIG. 9 shows a data structure of a cell list.

FIG. 9 shows a data structure of a cell described in conjunction with FIG. 7.

Reference numeral 70 denotes a whole list of cells. At the start of the cell list 70, there is a cell attribute field 71 containing attributes of cells listed in the cell list 71. In the cell attribute field 71, cell levels 71-1 indicating levels of cells are stored. The day-by-day cells in FIG. 7 are basic cells and of cell level 0. The cells representing a time band of six hours are of cell level 1. The cells representing a time band of one hour are of cell level 2. Reference numeral 71-2 denotes cell units (time intervals). As for the cell units 71-2, 24 hours is specified for the cells representing a day in FIG. 7, six hours is specified for the cells representing six hours, and one hour is specified for the cells representing one hour. 71-3 denotes the number of cells listed in the cell list 70. 71-4 denotes ring colors used for depicting the cells in the form of rings. As for the ring colors 71-4, black is set for cell level 0 (V(0)=0). As the cell level increases, black is lightened according to V(N)={255−V(N−1)}/2. 71-5 denotes pointers each indicating a parent cell relative to a child cell. When a cell is of cell level 0, the cell has no parent. No pointer is specified for the cell. A pointer pointing out cell 1 (72) is therefore specified as a child attribute in a child cell list 76.

In the cell list 70, the cell attribute field 71 is succeeded by cell fields 72*a*, 72*b*, 72*c*, etc. containing cells listed in the cell list 70. At the start of each cell field, a start time and end time of the cell, and the number of data items belonging to the cell are specified. Each cell field includes a data list 73 in which data information concerning the data items belonging to the cell is retained. Each data 74 listed in the data list 73 consists of a data icon 74-1, data path name 74-2, and data time 74-3. The data icon 74-1 is a bit-map image 75*a* or a reduction of actual data. The data path name 74-2 is used to reference a data file 75*b* residing in the disk. The data time 74-3 indicates a time instant at which the data belongs to the cell. In the file management system, the data time 74-3 is a date of creation of data or a date of correction of data.

The number of data items may exceed a given value (a maximum number of data icons that can be placed on one ring). When new data is added to a data list, therefore, the number of data items is checked. In the example of a display in FIG. 3, when the number of data items exceeds eight, a cell concerned must be subdivided. For this subdivision, a child cell list is produced. The child cell list 76 has the same structure as the cell list described above. When the child cell list 76 is produced, data items belonging to the cell are transferred to data lists preserved in child cell fields according to the data times 74-3 of the data items, and thus deleted from the cell field 72*a*. That is to say, when a data list is preserved in a cell field, no child cell list is produced. When a child cell list is preserved, no data list is present in the cell field. A child cell attribute field contains values that are larger by one than cell levels specified in the cell attribute field, and ring colors that are lighter than the ring colors specified therein.

<Example of a Display Algorithm (Initial Display)>

Next, a display algorithm for initial display will be described.

(Example of a Data Structure for Display Management)

FIG. 10 shows a data structure for display management.

For zoom display, as apparent from an example of a display in FIG. 10, a ring is inched in 32 steps and drawn in units of eight steps. A display step list 80 lists sizes and positions of a ring at the respective steps, and sizes of data icons drawn on the ring. In the display step list 80, step information 81*a*, 81*b*, etc. are stored in one-to-one correspondence to the 32 steps.

Each step information includes a rectangle 82 (defined with coordinates (x1, y1) of an upper left corner and coordinates (x2, y2) of a lower right corner) inscribing the ring at each step. A data rectangle list 83 is also included. The size of the ring is expressed with an ellipse inscribed by a ring rectangle 82. The size of a data icon is expressed with a data rectangle that is specified in the data rectangle list 83 and that inscribes a data icon with the aspect ratio of the data icon unchanged.

The number of data icons displayed on one ring is eight. The data rectangle list therefore lists eight data rectangles for each of which size information including a display position is specified. The sizes of the ring at respective steps and the display sizes for data icons are set so that the data icons will become larger as the ring changes from a minimum ring to a maximum ring. The sizes are listed in a table so that the data icons can be made larger linearly, made very large in the middle of zooming, or changed in any other way. Owing to such a table, sizes or positions need not be calculated in the middle of zooming. Therefore, displayed image moves smoothly. Therefore, displayed image moves smoothly.

(Retrieval of a Cell Corresponding to an Outermost Ring)

FIG. 11 describes an algorithm for retrieving a cell corresponding to an outermost ring.

At step S1, a selected date is retrieved. Basically, a date at that time is retrieved. When a user designates a date explicitly, the designated date is retrieved. At step S2, a cell list for cell level 0 that is an initial value is retrieved. At step S3, a cell unit (time interval) 71-2 and a start time of a leading cell 72*a* are retrieved from the cell list shown in FIG. 9. At step 4, the retrieved information is calculated to find to which cell the designated date belongs. At step S5, the cell is retrieved. At step S6, it is checked if the cell has child cells. If the cell has child cells, control is passed to step S7. A child cell list is retrieved. The sequence starting at step S3 is then repeated. When the cell has no child cell, it means that the designated date is included in the cell currently marked. The processing is therefore terminated.

(Display Algorithm)

Figure 12:
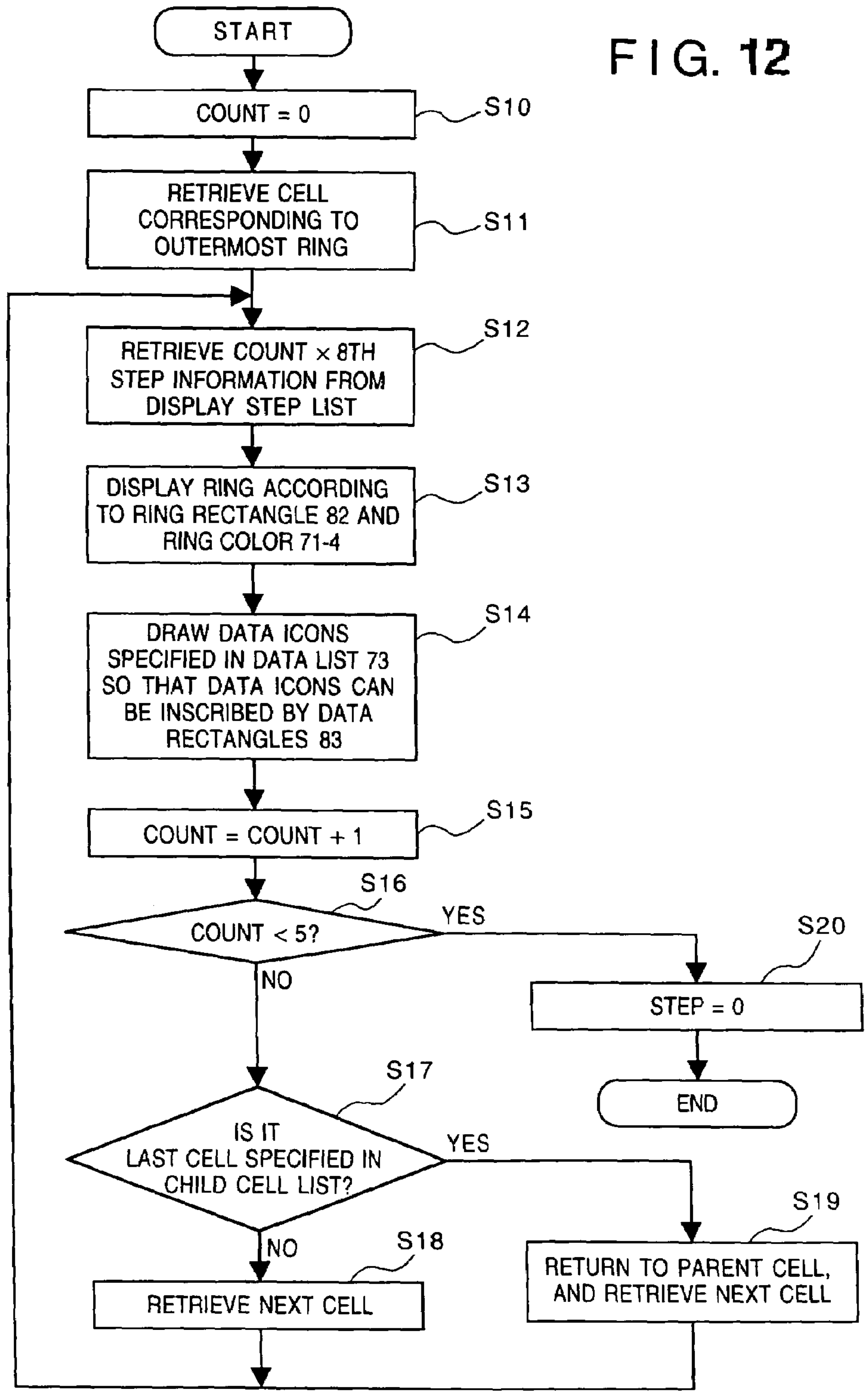
FIG. 12 is a flowchart describing a sequence of initial display.

FIG. 12 describes an initial display algorithm.

At step S10, a count value is reset to an initial value of 0. At step S11, the cell to be displayed as the outermost ring, which is retrieved through the processing described in conjunction with FIG. 11, is retrieved.

Figure 4:
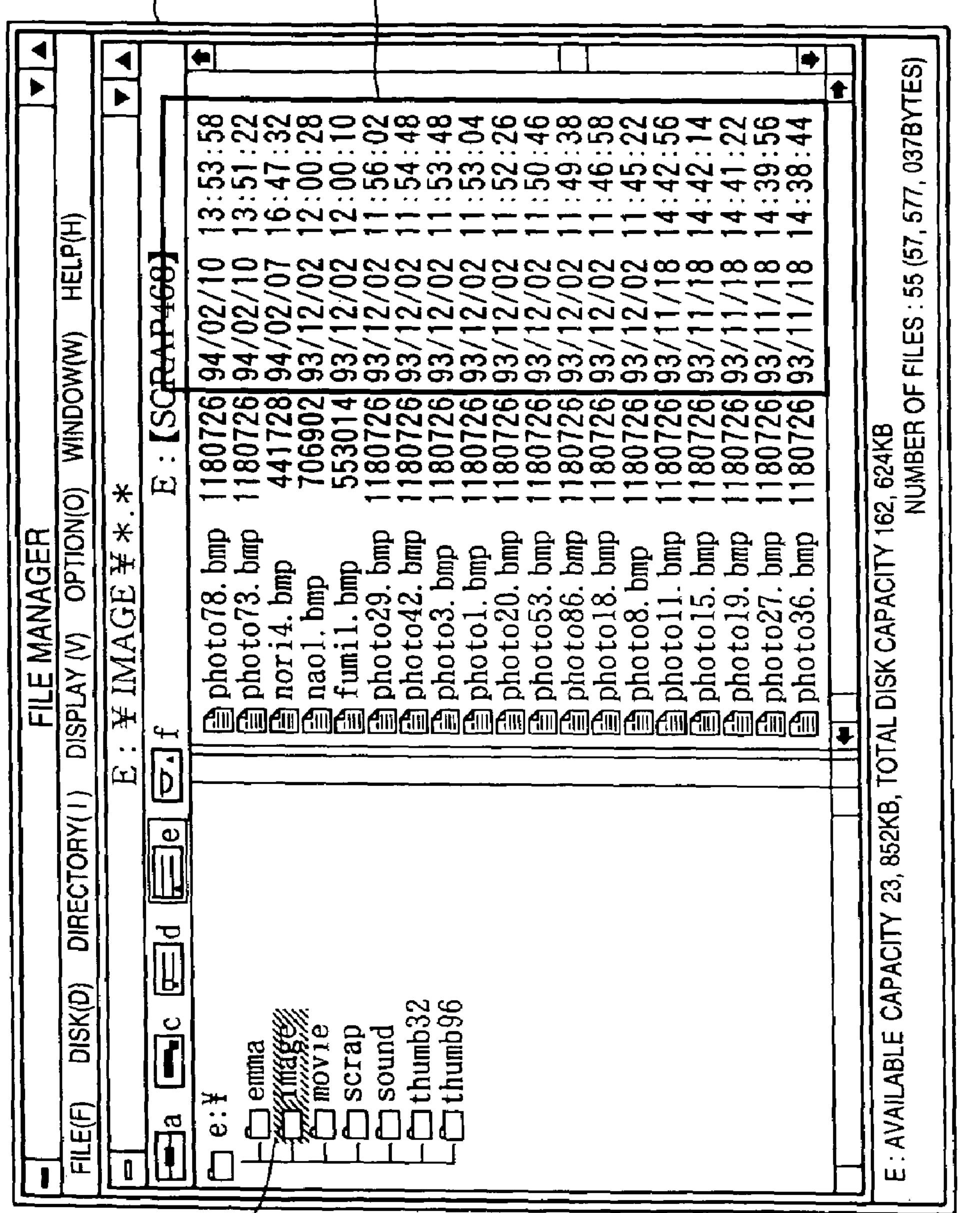
FIG. 4 shows a file management system of a prior art.
Figure 5:
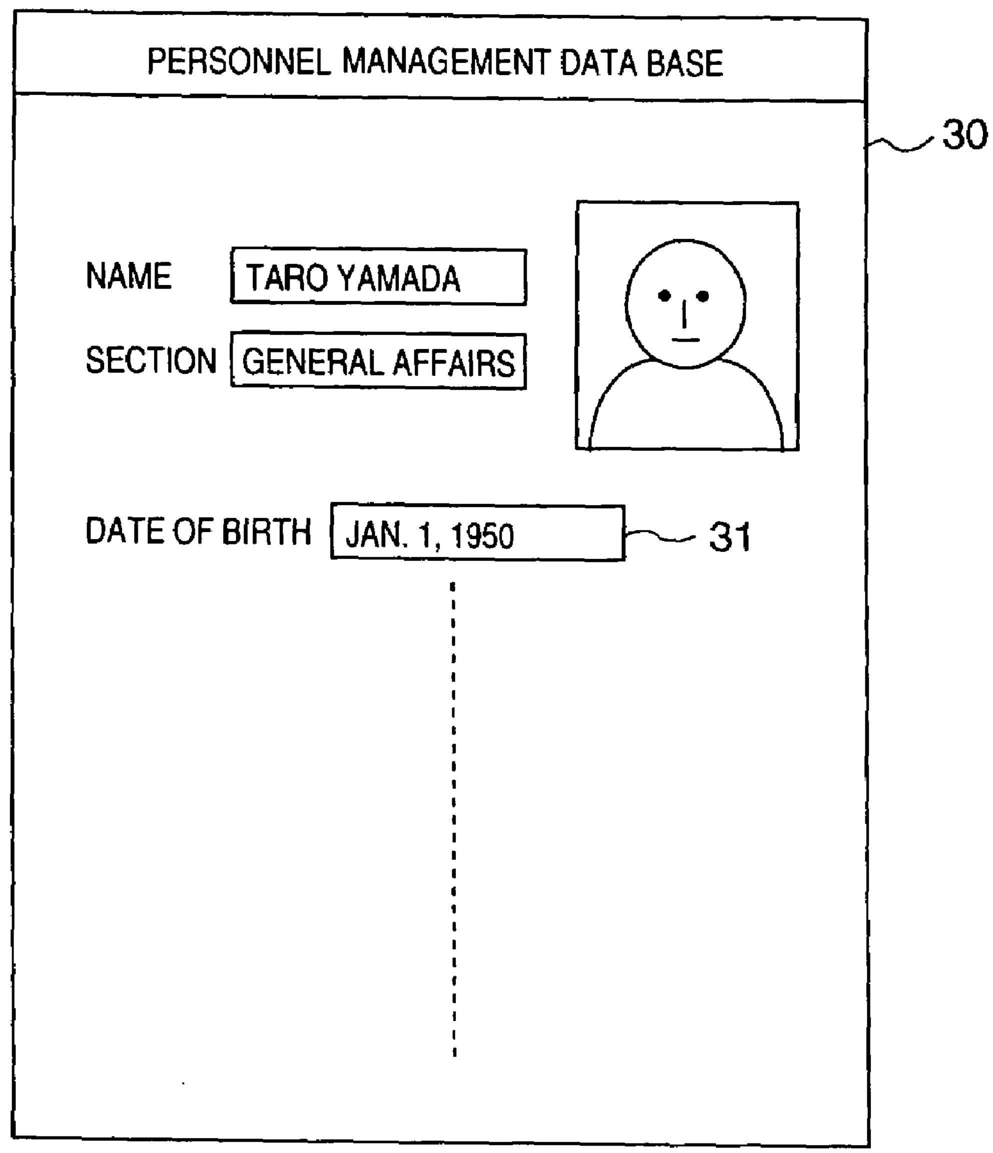
FIG. 5 shows a data base system of a prior art display.

At step S12, step information concerning a (count value by 8)-th step is retrieved from the display step list. The count value is multiplied by 8, because a space between each pair of five rings is stepped in eight and a total of 32 steps are created. Initially, since the count value is zero, the contents of the step information 0 81*a* shown in FIG. 10 are retrieved. At step S13, a ring rectangle 82 is extracted from the step information. Moreover, a ring color 74-4 for the cell, which is shown in FIG. 4, is retrieved. The ring is drawn according to the retrieved ring color and the retrieved position and size of the ring rectangle. At step S14, data icons are retrieved one by one from the data list in the cell field. The data icons are then drawn at drawing positions specified for data rectangles so that the data icons can be inscribed by the data rectangles 83. Up to eight data icons are drawn clockwise from top orderly.

At step S15, the count value is incremented by one. It is checked at step S16 if the count value has reached five that is the number of rings to be drawn at a time. If five rings have been drawn, control is passed to step S20. Zero is specified as a step value to be used for the subsequent processing described in FIG. 13. When five rings have not yet been drawn, it is checked at step S17 if a ring just drawn corresponds to a last child cell listed in the child cell list currently marked. When the ring does not correspond to the last child cell, control is passed to step S18. The next cell is then retrieved from the child cell list. If the cell is the last child cell listed in the child cell list, control is passed to step S19. A parent cell is extracted from a parent cell pointer 71-5. A cell listed next to the extracted cell is retrieved from the cell list. Control is then passed to step S12.

At step S12, since count=1×8 is established, the eighth step information is retrieved. This is because each ring is displayed with a space of eight steps interposed between adjoining rings. Thereafter, the aforesaid processing is repeated. Finally, initial drawing is carried out.

<Example of Zooming>

(i) Zoom-In

Next, an algorithm used during zooming will be described. FIG. 13 is a flowchart describing the algorithm (processing) used during zooming.

In this embodiment, a user can vary the speed of zoom-in or zoom-out in eight steps. A speed step is designated by positioning a mouse-driven cursor. When the left button on the mouse is held down, zoom-in is executed. When the right button thereon is held down, zoom-out is executed. During either of the operations, if the mouse-driven cursor is positioned on the center of a screen, the highest speed is attained. When the cursor is positioned on the perimeter thereof, the lowest speed is attained.

At step S30, the speed of zoom-in or zoom-out, skip, is calculated. Assuming that the distance of a cursor position from the center of a screen is d, the speed, skip, is calculated as follows:

$$skip=8-int((d/\text{distance from center to edge})\times 8)$$

At step S31, since the left button is held down, zoom-in is designated. Control is then passed to step S32. Otherwise, zoom-out is designated. Zoom-out of step S50 is executed. The zoom-out sequence is the reverse of the zoom-in sequence of step S32 and thereafter. The zoom-out sequence will be described briefly.

Figures 19A, 19B:
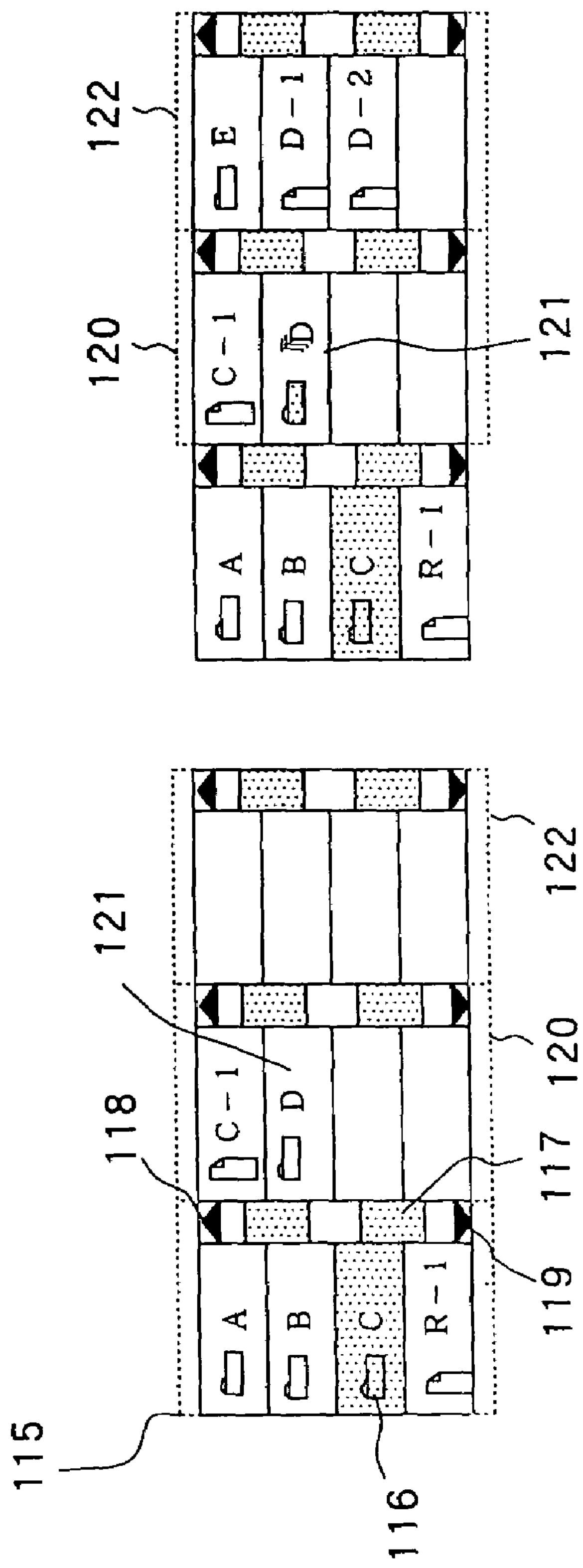
FIGS. 19A and 19B show examples of expressing the same hierarchical file system as the one shown in FIG. 18 in the form of a hierarchical list box.

The processing from step S32 to S41 is basically the same as the processing from step S10 to S19 in FIGS. 19A and 19B. A difference is that the (count×8−step)-th ring is drawn at step S34. The initial value for step which is 0 at step S20 in FIG. 12 is incremented by a skip value set for zooming. Thus, data is zoomed in or out at the designated speed (skip). At step S33-1, if the (count×8−step) value is smaller than 0, the outermost ring has already disappeared from the screen. Drawing is therefore not executed, but control is passed to step S37. During the processing from step S32 to S41, all rings and data icons that should be displayed are displayed.

At step S42 and thereafter, processing for the next zooming is carried out. At step S42, the step value is incremented in units of the skip value. When the cursor lies on the center of a screen, 8 is specified as a skip value. The step value is therefore incremented in units of 8. When the cursor lies on an edge, 1 is specified as a skip value. Steps are therefore skipped one by one. A user can therefore observe data items at a desired zoom-in or -out speed according to how the data items appear. If the user wants to observe data items carefully, he/she should merely press a mouse button. An event invoking the processing described as the flowchart of FIG. 13 will not occur. A display will therefore not be updated. The user can therefore observe the data items carefully. If it is found at step S43 that the step value is larger than or equal to 8, a residue after dividing the step value by 8 is specified for step at step S44. At step S45, the cell corresponding to the outermost ring is shifted to the next step. When the step value is smaller than 8, an event is waited.

If the left mouse button is continually held down, the same event occurs immediately. The foregoing processing is repeated.

(ii) Zoom-Out

Next, zoom-out will be described in terms of a difference from zoom-in. FIG. 14 is a flowchart describing zoom-out. Basically, zoom-out is the reverse of zoom-out. The processing from step S51 to S65 corresponds to the processing from step S32 to S44. A difference will be described below.

If it is found at step S53 that (count×8+step) is larger than or equal to 32, the ring is too small to be displayed. Control is passed to step S37. If (count×8+step) is smaller than 32, the (count×8+step)-th step information is retrieved at step S54. At step S65, the cell corresponding to the outermost ring is used as a new cell for a preceding step.

<Algorithm for Data Addition>

Figure 15:
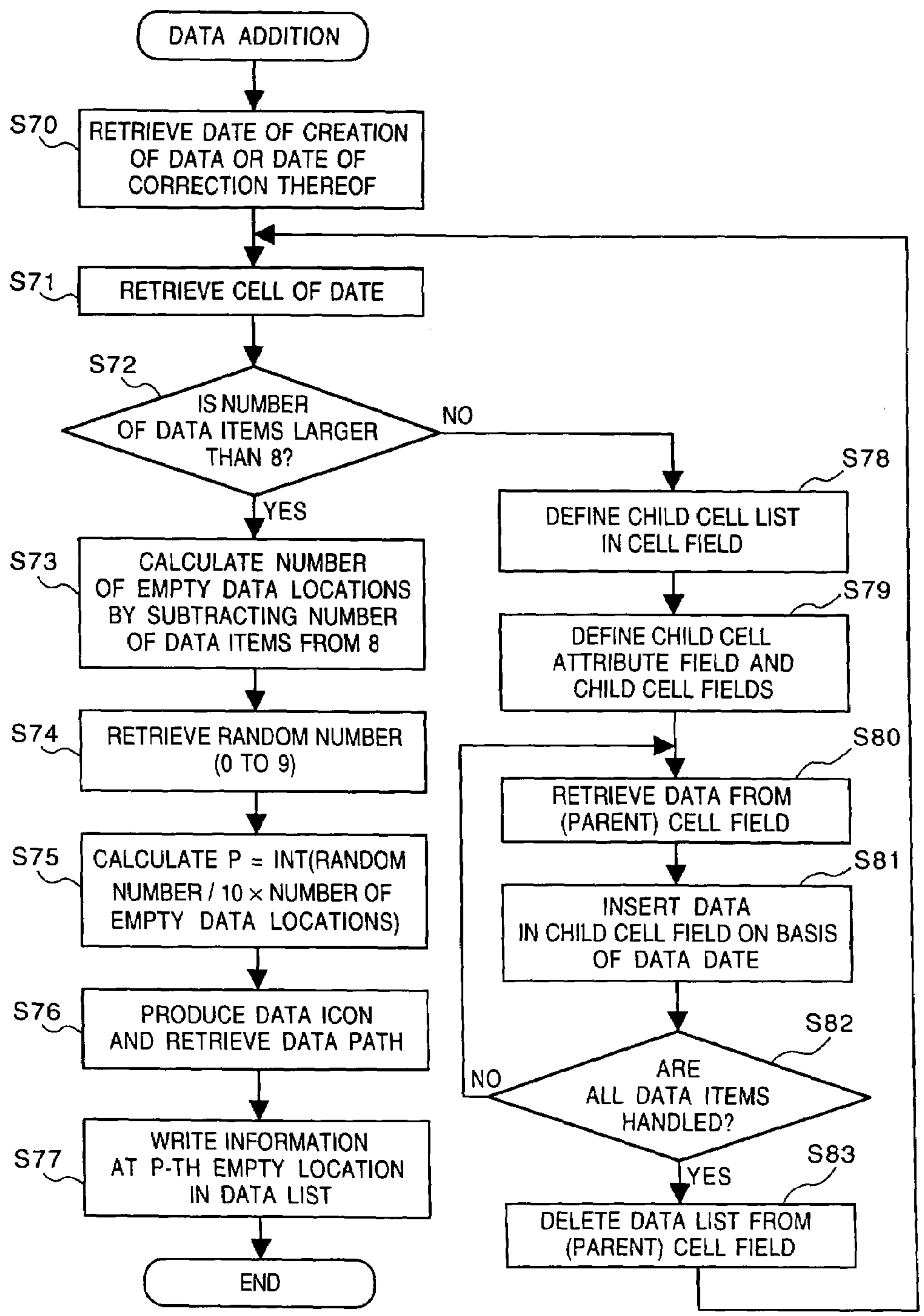
FIG. 15 is a flowchart describing a sequence of data addition.

Next, an algorithm for data addition will be described. FIG. 15 is a flowchart describing data addition.

At step S70, when a data file has newly been created, a date of creation is retrieved. When a data file has been corrected, a date of correction is retrieved. At step S71, the cell of the date is retrieved. For this retrieval, the sequence from step S2 to S7 in FIG. 11 is carried out. At step S72, the number of data items associated with the retrieved cell is checked to see if the number of data items is smaller than 8.

When the number of data items is smaller than 8, control is passed to step S73. Calculation is performed to see how many display positions are empty. At step S74, a random number ranging from 0 to 9 is retrieved. For example, the low-order character of a second of a time at that time of operation is used as the random number. Based on the random number, at step S75, the expression below is calculated in order to find in which empty location data should be entered in.

$$p=int(\text{random number}/10\times\text{number of empty places})$$

Thus, data items are not stored in a data list consecutively from the top of the data list but are entered at random in eight data locations in the data list. It is determined that the data listed at the top of the data list is displayed first on a ring and then the subsequent data items are displayed on the ring clockwise. By contrast, if data items are always stored in the data list consecutively from the top thereof, many data items are displayed at specific display positions. A screen cannot be used efficiently. There is a method for displaying data items at random position. Since a user may memorize a frequently-used data in relation to a display position, it is preferable that data display positions are fixed. For these reasons, the foregoing method is adopted. At step S77, empty data locations are traced in the data list. The data icon retrieved at step S76, path name of the data file, and data time are then written in the p-th data location in the data list.

When it is found at step S72 that the number of data items is 8, the cell is full. A child cell field is therefore defined in the cell field. At step S79, a child cell attribute field and child cell fields are defined. One data is retrieved from the parent cell field at step S80, and then inserted in a proper child cell field on the basis of a data time 74-3 of the data at step S81. At step S82, it is checked if the above processing is performed on all data items specified in a data list. When the processing has been performed on all data items, the data list is deleted from the parent cell field at step S83. Control is then passed to step S71. A new data file is then registered.

In the aforesaid embodiment, an example of an operation focused on the operation of a file management system have been described. In this embodiment, an example of an operation of schedule table software (scheduler) will be described.

Figure 16:
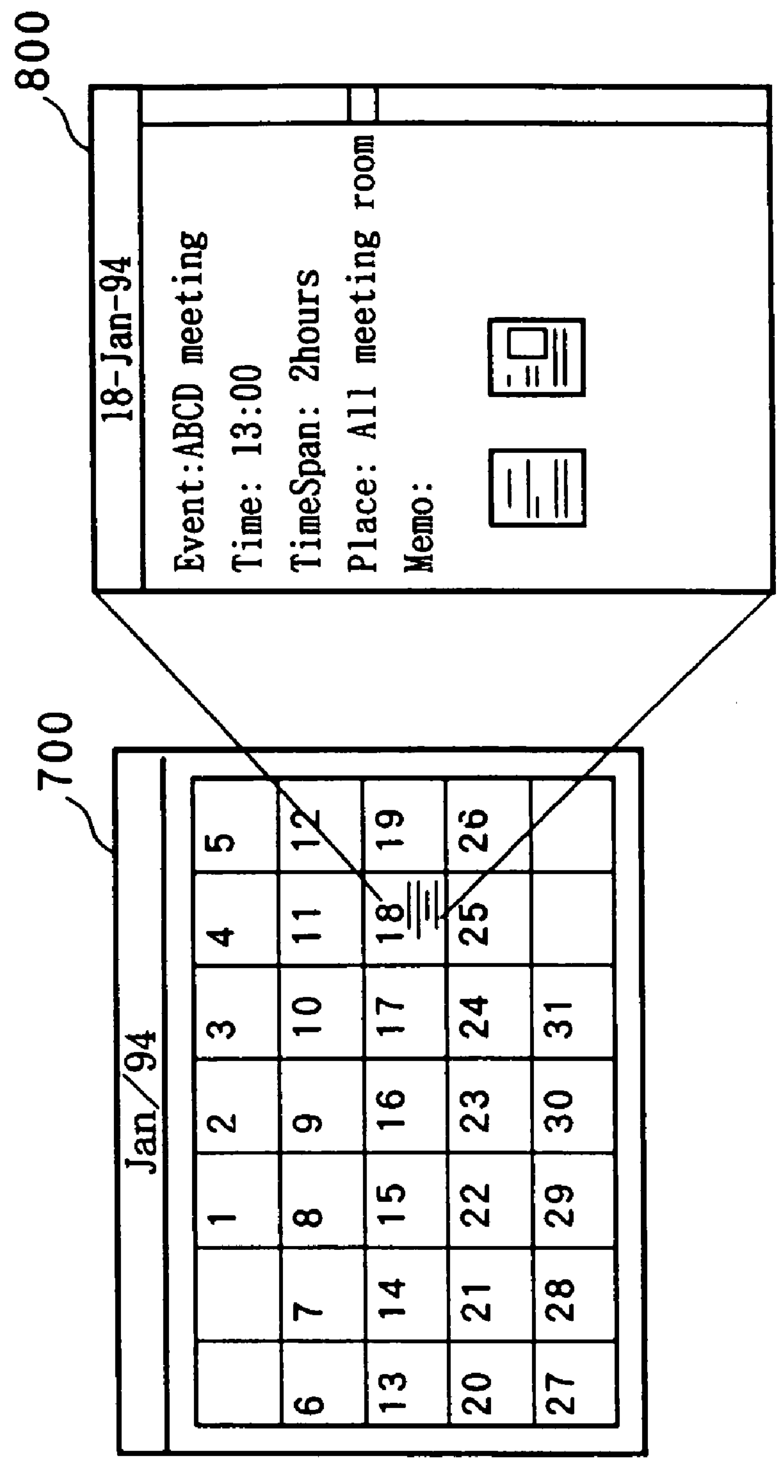
FIG. 16 shows an example of a display of a scheduler.

FIG. 16 shows an example of a scheduler.

The schedule of the month is displayed in a table form of a calendar with the heading on the center (700). When the schedule of a certain day is wanted to be checked in more detail or to be corrected, the day in the calendar is designated by double-clicking a mouse button. This causes a right-hand window 800 to open. In the window, an event, time, and place are visualized. If there is a data file relevant to the event, a user drags and drops the data icon representing the data file to the window. The data file is then registered. For example, when the contents of a schedule indicate a conference, if a document file scheduled to be used at the conference is registered, it will be able to check in the future what kind of material was used at the conference. This will be found very helpful.

For changing the display of the scheduler to a date-orderly display, when any day is not selected, the date of that day is represented as the outermost ring. When any day is selected, the date of the selected day is represented as the outermost ring. Display is thus started.

In this embodiment, data retrieval and display described in the previous embodiment are performed date-orderly according to the registered date information concerning events. In the data file management system described in the previous embodiment, the latest data is dated at that time. In the scheduler, future dates are also objects of management.

As mentioned above, this embodiment provides a time-series data display method for displaying time-series data items so that a user can grasp time more intuitively and sensuously, and an information processing system in which the time-series data display method is implemented.

A new unprecedented retrieval/display method and system can be constructed by exploiting zooming and zoom display, wherein data items are sorted by date so that time can be grasped sensuously. Thus, an unprecedented highly-flexible retrieval/display method and system are realized, whereby all data items can be checked to pick up any desired one of them or to grasp the trend of distribution of all the data items. This will not be attained in a method and system in which predetermined desired data items are searched for and displayed.

Second Embodiment

<Example of Configuration of a Browser System>

Figure 39:
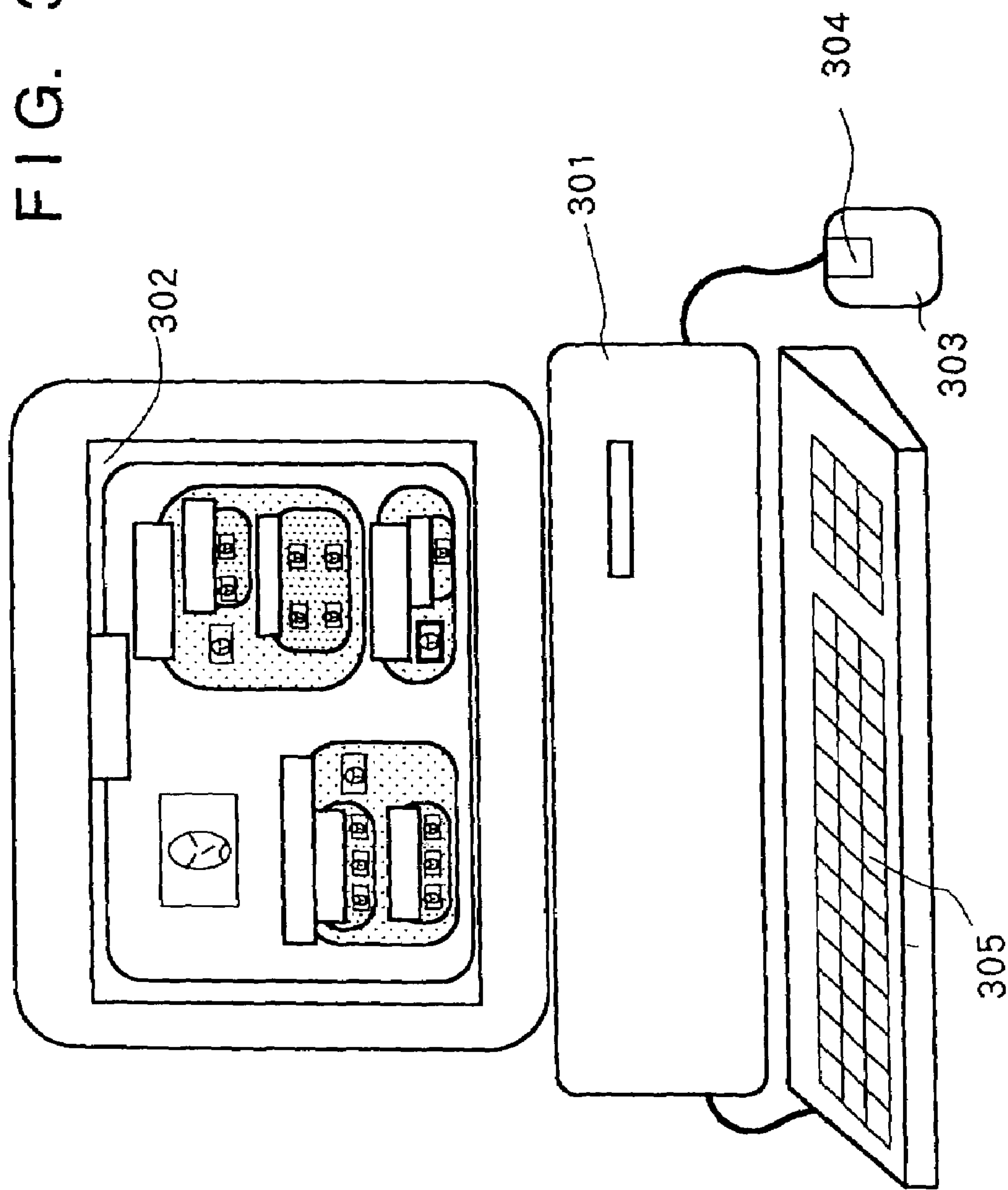
FIG. 39 shows the configuration of a personal computer system serving as a platform of an embodiment.

FIG. 39 shows an example of the configuration of a personal computer system that is a kind of platform in which the present invention is implemented.

In FIG. 39, similarly to FIG. 1, reference numeral 301 denotes a main unit of a computer system 302 denotes a display for displaying data. 303 denotes a mouse typical of a pointing device. 304 denotes a mouse button. 305 denotes a keyboard.

FIG. 40 shows the configuration of a hierarchical data browser system including software and hardware.

In FIG. 40, similarly to FIG. 2, reference numeral 509 denotes hardware. 505 denotes an operating system (OS) operating on the hardware 509. 504 denotes application software running under the OS 505.

In FIG. 40, reference numeral 518 denotes a CPU. 517 denotes a memory. 519 denotes a data bus. 515 denotes a hard disk for physically storing files and data items. 508 denotes a file management system constituting the OS. The file management system 508 has the ability to enabling application software to input or output a file without any awareness of the hardware. 514 denotes a disk I/O interface for enabling the file management system 508 to read or write data from or in the hard disk 515.

Reference numeral 507 denotes a drawing management system constituting the OS. The drawing management system 507 has the ability to enable application software to perform drawing without any awareness of the hardware. 513 denotes a video interface for enabling the drawing management system 507 to perform drawing on the display 302.

Reference numeral 506 denotes an input device management system constituting the OS. The input device management system has the ability to enable application software to receive a user input without any awareness of the hardware. 510 denotes a keyboard interface for enabling the input device management system 506 to receive an input from the keyboard 305. 512 denotes a mouse interface for enabling the input device management system 506 to receive an input from the mouse 303.

Reference numeral 516 denotes a memory management system. The memory management system 516 has the ability to enable application software to input or output data to or from the memory 517 without any awareness of the hardware. 1501 denotes a hierarchical data browser that is application software. 1502 denotes a level managing module for managing data items hierarchically. 1503 denotes a level display module for displaying the data items managed hierarchically so that a hierarchical structure can be grasped.

(Example of Level Attribute Data)

Figure 41:
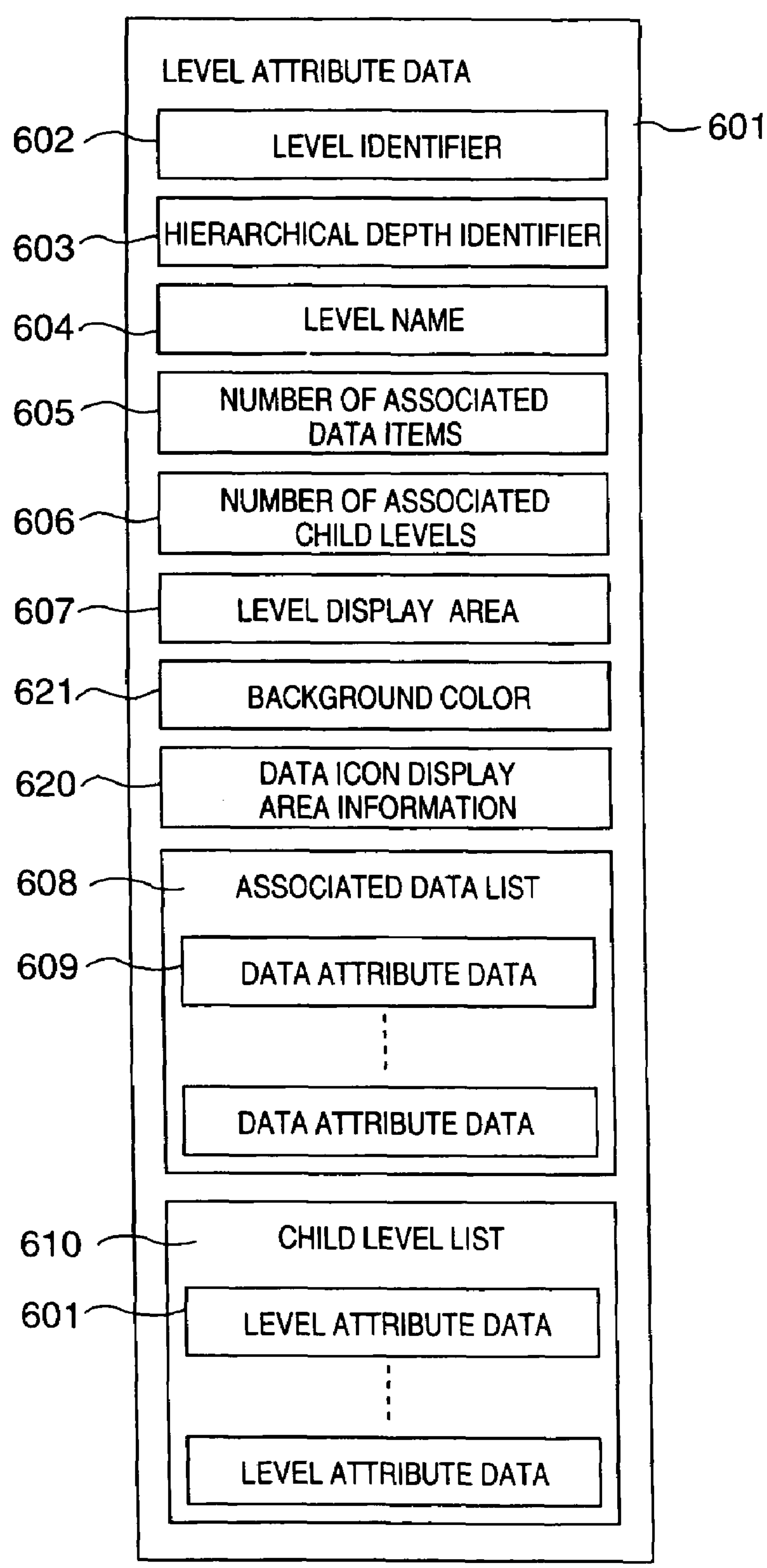
FIG. 41 is an explanatory diagram concerning hierarchical attribute data managed by a level manager in an embodiment.

FIG. 41 is an explanatory diagram concerning level attribute data managed by the level managing module 1502 in this embodiment.

Figure 18:
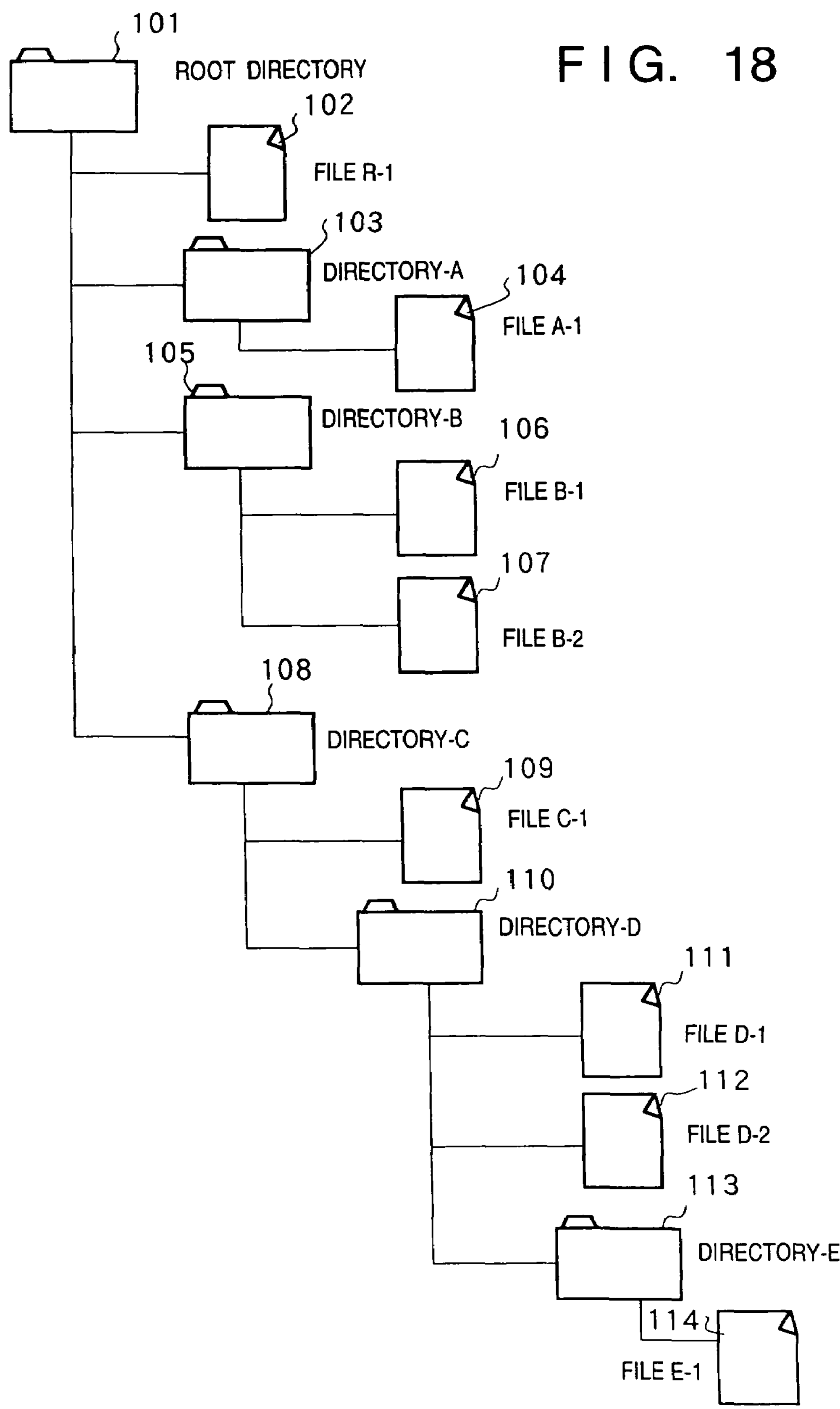
FIG. 18 shows a tree structure of a hierarchical file system.

In FIG. 41, reference numeral 601 denotes level attribute data. 602 denotes a level identifier for identifying a level uniquely. 603 denotes a hierarchical depth identifier for indicating a hierarchical depth. Taking the example of FIG. 18 for instance, the root directory is defined to be of hierarchical depth 1. Directories A, B, and C are of hierarchical depth 2. Directory D is of hierarchical depth 3. Reference numeral 604 denotes a level name. In the example of FIG. 18, A, B, C, D, and E are level names. 605 denotes the number of associated data items. For a hierarchical file browser, the number of associated data items equals to the number of files belonging to a directory. In the example of FIG. 18, the number of data items belonging to directory A is 1, and the number of data items belonging to directory B is 2. 606 denotes the number of levels subordinate to a level. In the example of FIG. 18, the number of child levels subordinate to the root directory is 3.

Reference numeral 607 denotes level display area information. An area allocated according to the ratio of the number of associated data items including data items belonging to all child levels to the total number of data items is specified as the level display area information 607 by the level manager 502. 602 denotes data icon display area information. A data icon display area is determined according to the ratio of the number of data items belonging to a level to the total number of data items all child levels and levels subordinate to the child levels. 608 denotes an associated data list. For data attribute data 609 concerning data items that belong to a level; that is, for a file browser, attribute data concerning files belonging to a directory is listed. 610 denotes a child level list. Level attribute data 601 concerning child levels that belong to a level is listed.

(Example of Data Attribute Data)

Figure 42:
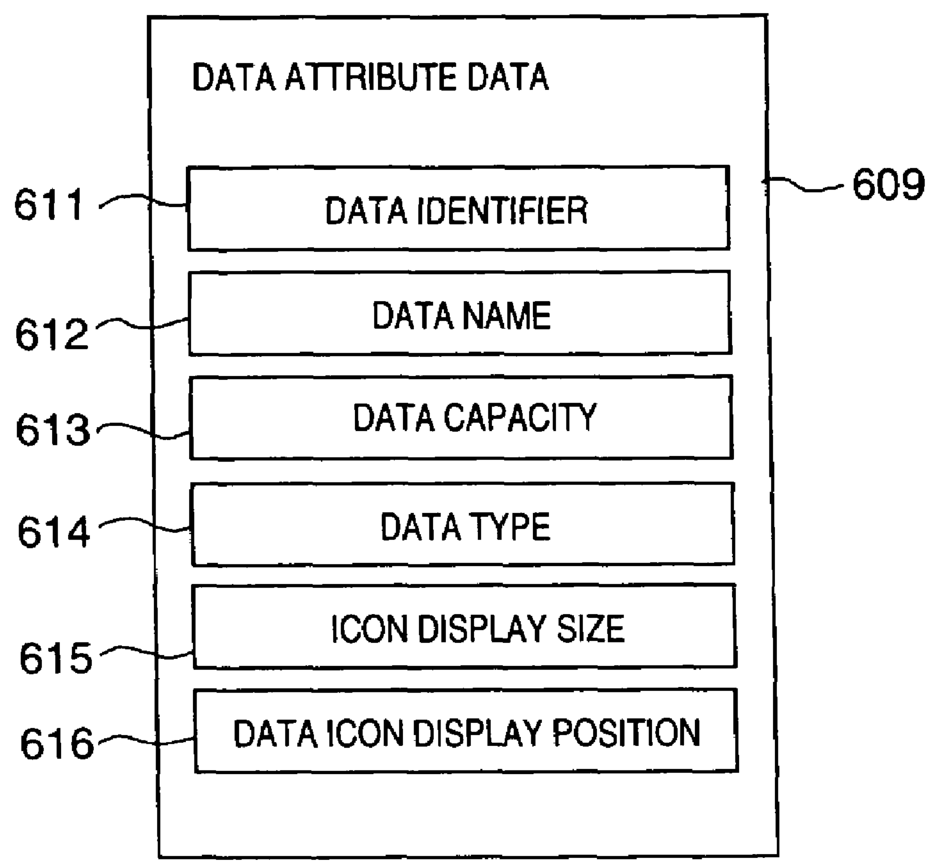
FIG. 42 shows a data structure of data attributes.

FIG. 42 shows the structure of the data attribute data 609.

In FIG. 42, reference numeral 611 denotes a data identifier for identifying data uniquely. 612 denotes a data name. In the example of FIG. 18, file names such A-1 and B-1 are data names. 613 denotes a data capacity indicating a data-occupied capacity of a file system. 614 denotes a data type indicating an image format for image data. 615 denotes an icon display size that is, as described later, determined by the level manager 1502 according to the number of data items belonging to a level. 616 denotes a data icon display position.

(Examples of Component Elements of a Display)

Figure 43:
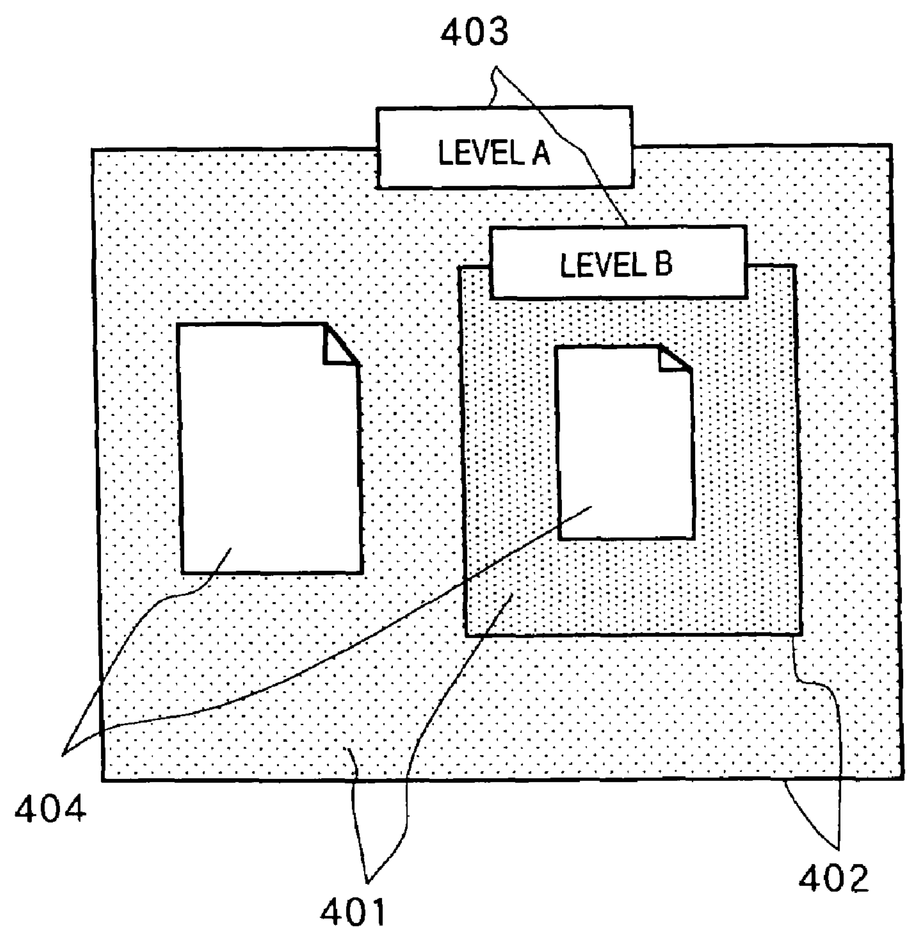
FIG. 43 is an explanatory diagram concerning component elements of a display used by a level display unit for displaying data items belonging to a level according to data managed by the level manager shown in FIG. 40.

FIG. 43 is an explanatory diagram concerning component elements of a display needed when the level display unit 1502 displays data items belonging to a level according to data managed by the level managing module 1502 shown in FIG. 40.

In FIG. 43, reference numeral 401 denotes a level display area in which data items belonging to a level or child levels are displayed. The same level display area is painted in the same background color. 402 denotes a border between a child level and a parent level. The border may be depicted explicitly with a line or expressed by differentiating the background colors of level display areas. 403 denotes a level name display area. 404 denotes a data icon representing the summary of data so as to identify the data. The component elements of the data icon 404 are varied depending on the type of data. For image data, the component elements are reduced image data and a data name. The component elements of data for a word processor are an icon inherent to an application program, which indicates that data concerned is produced by the application program, and a data name. A data icon is structured in order to provide the summary of data.

<Example of a Display of Hierarchical Data>

Figure 17:
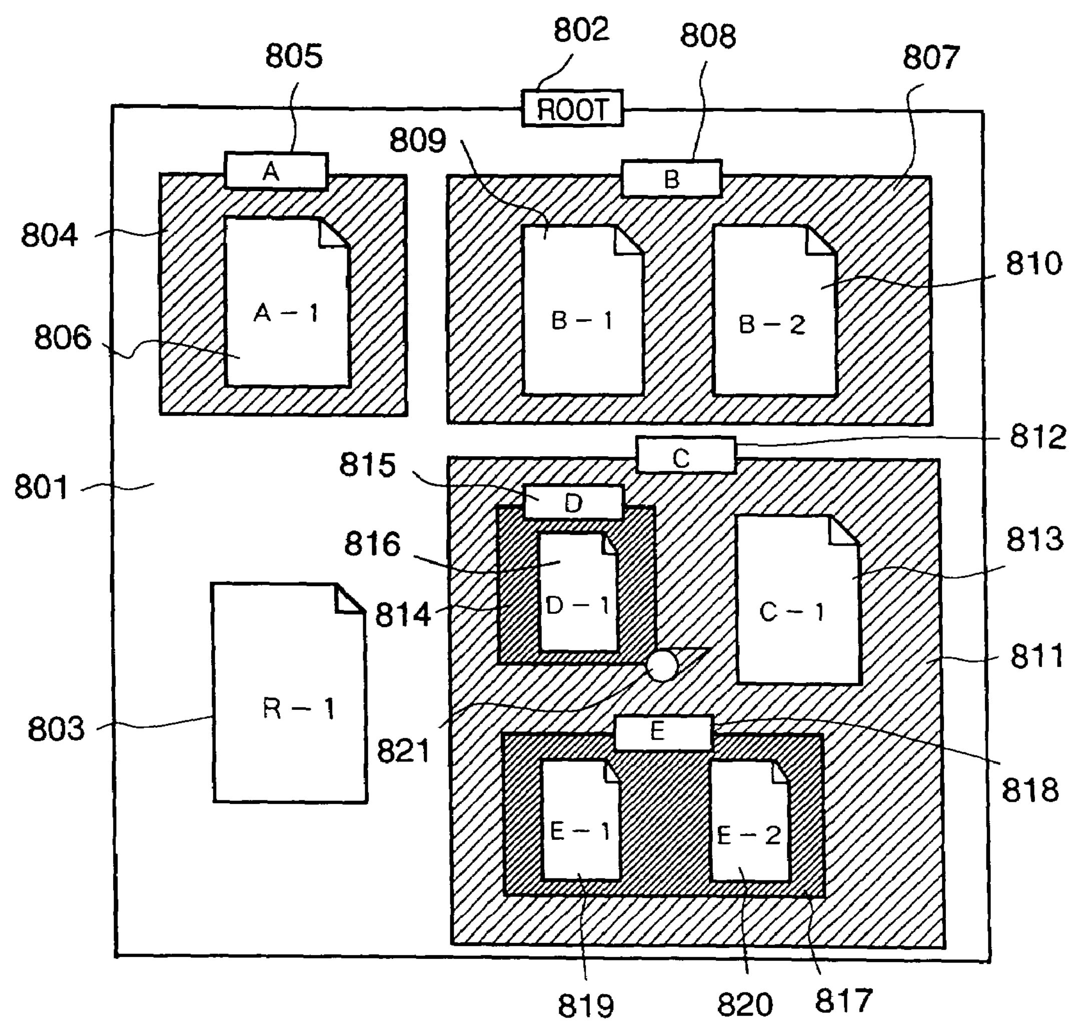
FIG. 17 shows an example of a display of hierarchical data in an embodiment.

FIG. 17 shows an example of a display of hierarchical data produced by the level display module 1503 according to data managed by the level managing module 1502 in FIG. 40. Data to be displayed is the same as the data displayed by the file browser in FIG. 18; that is, data in the hierarchical file system.

In FIG. 17, reference numeral 801 denotes a level display area for a root directory which is determined according to the level display area information 607. 802 denotes a level name display area in which a level name determined according to the level name 604 is displayed. 803 denotes a data icon representing file R-1 of which display size is determined according to the icon display size 615. 804 denotes a display area for directory A that is a child level of the root directory. 805 denotes a level name display area for directory A. 806 denotes a data icon representing file A-1. 807 denotes a level display area for directory B that is a child level of the root directory. 808 denotes a level name display area for directory B. 809 denotes a data icon representing file B-1. 810 denotes a data icon representing file B-2. 811 denotes a level display area for directory C that is a child level of the root directory. 812 denotes a level name display area for directory C. 813 denotes a data icon representing file C-1. 814 denotes a level display area for directory D that is a child level of directory C. 815 denotes a level name display area for directory D. 816 denotes a data icon representing file D-1. 817 denotes a level display area for directory E that is a child level of directory C. 818 denotes a level name display area for directory E. 819 denotes a data icon representing file E-1. 820 denotes a data icon representing file E-2. 821 denotes a navigation cursor used to designate a marked level or marked data.

The background color of a level display area is determined according to a hierarchical depth. In the example of FIG. 17, as the hierarchical depth increases, the background color is made deeper. This results in three-dimensional depth perception. As the hierarchical depth increases, the size of a data icon is made smaller. This makes it possible to display larger numbers of level display areas and data icons within a screen of a limited area.

<Example of a Sequence of Displaying Hierarchical Data>

(Setting Level Areas)

FIG. 25 is a flowchart describing a sequence according to which the level display module 1503 shown in FIG. 40 sets the sizes of level display areas 401 for levels and those of data icons 404 shown in FIG. 43.

In FIG. 25, a maximum hierarchical depth N is set at step S101. Taking the example of FIG. 17 for instance, 3 is specified for N. At step S102, the background color is determined according to the hierarchical depth of each level. For example, the background color may be the same color. That is to say, as the hierarchical depth increases, the color tone may be made deeper. This is effective in providing depth perception that allows a user to feel as if a deep hierarchy were extending inward. At step S103, the hierarchical depth n of a level for which a display area is about to be set is initialized to 0. At step S104, the hierarchical depth n is incremented by 1. At step S105, it is checked if the n value exceeds the maximum hierarchical depth N set at step S101. It the n value does not exceed the N value, control is passed to step S106. If the n value exceeds the N value, the processing is terminated.

At step S106, the n value is set as a hierarchical depth of an object of display area setting. At step S107, it is checked if a level for which a data icon display area and child level display area have not been set is present at the hierarchical depth n. When such a level is present at the hierarchical depth n, control is passed to step S108. The level is specified as an object level of display area setting. If such a level is not present at the hierarchical depth n, control is returned to step S104. At step S109, the area ratio of a data icon display area to a child level display area is determined for the level display area for the object level of display area setting according to the number of data items belonging to the object level of display area setting and the total number of data items belonging to child levels and levels subordinate to the child levels. At step S110, a display area for each child level subordinate to the object level of display area setting is defined according to the number of data items including data items belonging to levels subordinate to the child level. Control is then returned to step S107.

Figure 26:
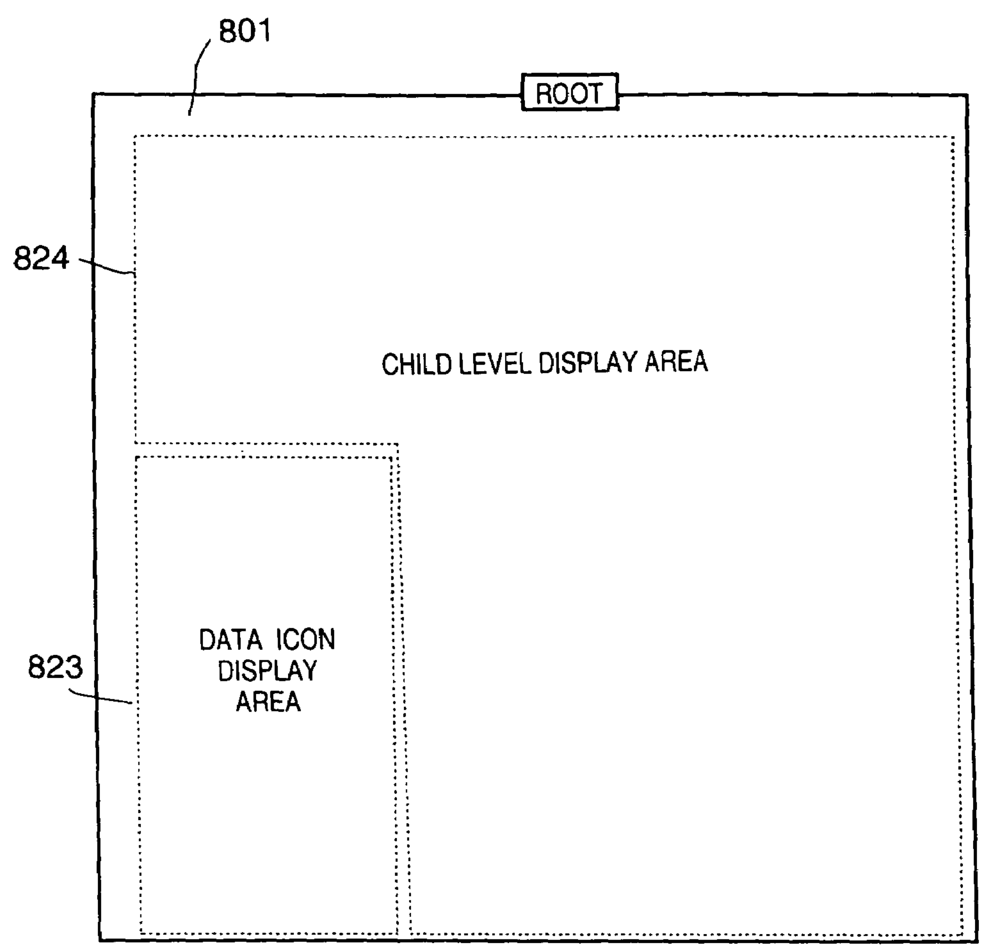
FIG. 26 shows an example of a result of dividing a screen for a root directory into a data icon display area and child level display area.

FIG. 26 shows an example of a result of dividing a level display area for the root directory into a data icon display area and child level display area. In FIG. 26, reference numeral 801 denotes a level display area for the root directly that is the same as the one shown in FIG. 17. 823 denotes a data icon display area. 824 denotes a child level display area.

(Dividing a Display Area)

Figure 30:
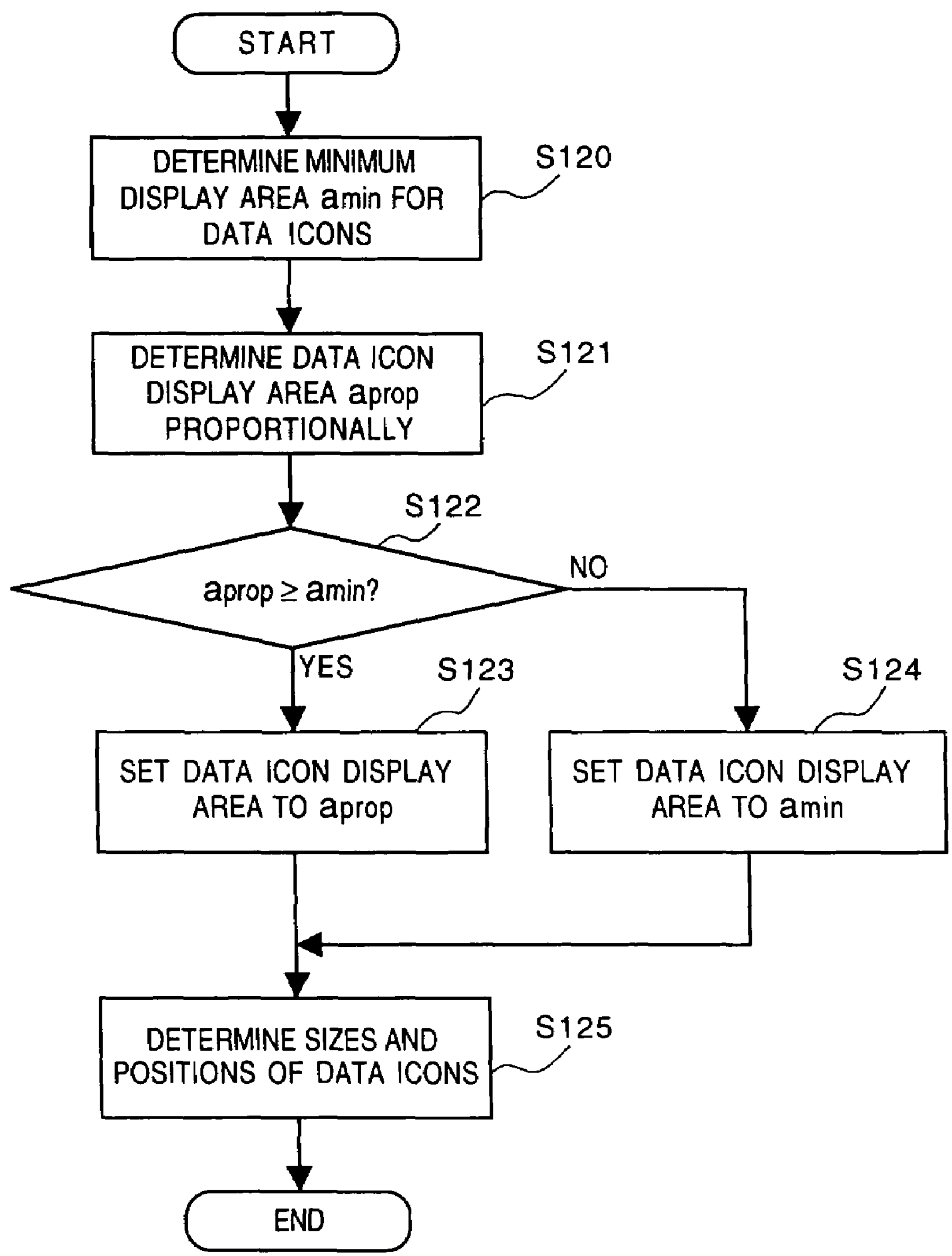
FIG. 30 is a flowchart describing a sequence for determining the display area for data icons.

FIG. 30 is a flowchart describing a sequence for dividing a level display area into a data icon display area and child level display area.

In FIG. 30, at step S120, a minimum display area $a_{min}$ for data icons is determined. Specifically, the size of a minimum data icon discernible as a data icon by a user is determined in advance, and a minimum area required for displaying minimum data icons representing data items that belong to a level is set as the minimum display area $a_{min}$. At step S121, a data icon display area $a_{prop}$ is determined on the basis of the ratio of the number of data items belonging to the level to the total number of data items belonging to all the child levels. Control is then passed to step S122. The $a_{prop}$ value is compared with the $a_{min}$ value. If the $a_{prop}$ value is larger than or equal to the $a_{min}$ value, the $a_{prop}$ value is set as data icon display area information 620. Otherwise, the $a_{min}$ value is set as data icon display area information 620 at step S124. At step S125, data icon display sizes 615 and data icon display positions 616 are determined. When the data icon display area information 620 represents the $a_{min}$ value, a data icon display size 615 is set to a predetermined minimum size. When the data icon display area information represents the $a_{prop}$ value, the data icon display size 615 is set to a maximum size permitting all associated data items to be displayed in the data icon display area.

Next, the description of FIG. 25 will be resumed. At step S110 in FIG. 25, a display area for each child level subordinate to the object level of display area setting is determined. The size of the display area for each child level is determined in proportion to the total number of data items belonging to the child level (including data items belonging to levels subordinate to the child level). However, if the determined size of the display area for a child level is smaller than a predetermined minimum size, the predetermined minimum size is adopted as the size of the display area for the child level. Control is then returned to step S107. The loop from step S107 to S110 is executed repeatedly until the display areas for all levels at the object hierarchical depth of display area setting are determined.

Figure 27:
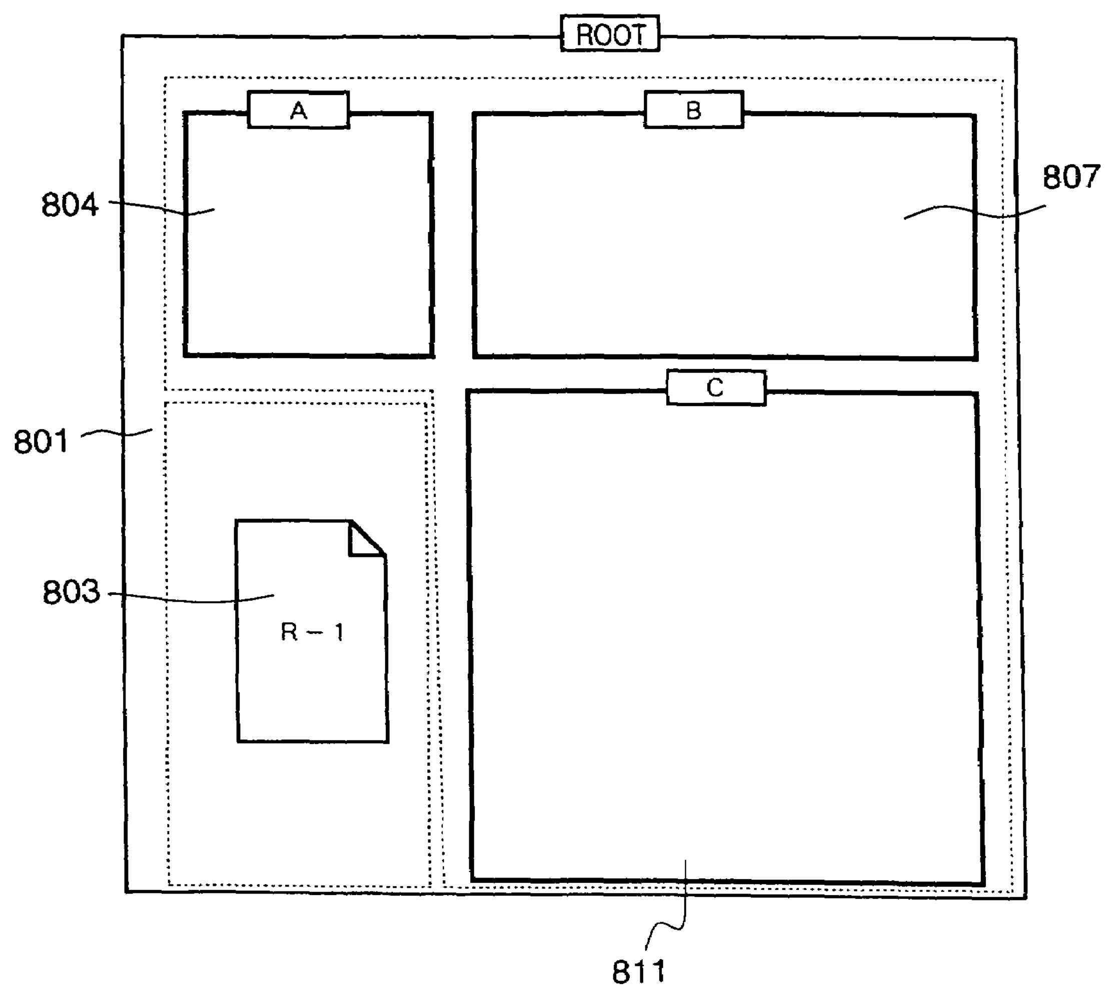
FIG. 27 shows a state in which the display areas for child levels subordinate to a root level of hierarchical depth 0, and the display size and position of a data icon are determined.

FIG. 27 shows a state in which the display areas for the child levels subordinate to the root level of hierarchical depth 1 are determined, and the display size and position of a data icon are determined. When the display areas for all levels at a hierarchical depth that is an object of display area setting are determined, the hierarchical depth is incremented by 1 at step S104 in FIG. 25. Control is then passed to step S105. If it is found at step S105 that the set hierarchical depth exceeds the maximum hierarchical depth, level display area setting is terminated. If the set hierarchical depth does not exceed the maximum depth, control is passed to step S106. The aforesaid work is repeated for all hierarchical depths. Thus, all level display areas 607 and data icon display area information 620 shown in FIG. 41 as well as all icon display sizes 615 and data icon display positions 616 shown in FIG. 42 are specified.

(Zoom-In or Zoom-Out)

In this embodiment, when a detail of a desired level of hierarchical data is marked, a display is zoomed. Only the data items belonging to a desired level are then displayed. When a hierarchical structure extending below a desired level at a small hierarchical depth is marked, a display is zoomed out. Data items in a wide range can then be visualized with a view point set at the high level.

Figure 20:
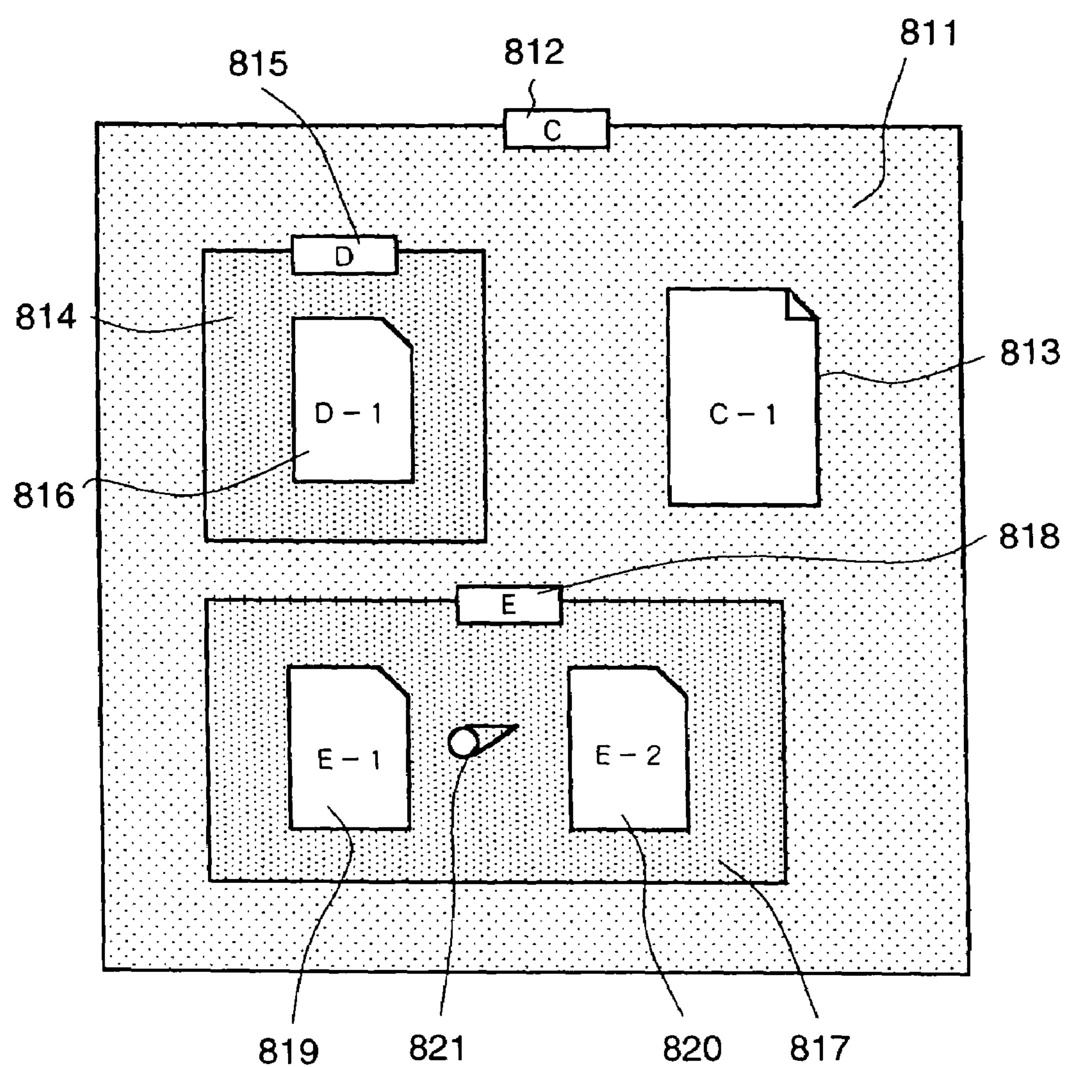
FIG. 20 shows an example of a zoomed-in display of directory C.

FIG. 20 shows a zoomed-in display of directory C. In FIG. 17, the navigation cursor 821 is pointed at any position except the child level display areas and data icons in the level display area 811 for directory C. The mouse button 304 is then held down. The display is duly zoomed in, whereby the whole of a screen is, as shown in FIG. 20, occupied by the level display area for directory C. The data icons are enlarged in proportion to the zoom-in ratio. The more detailed information of each data icon can be acquired.

Figure 21:
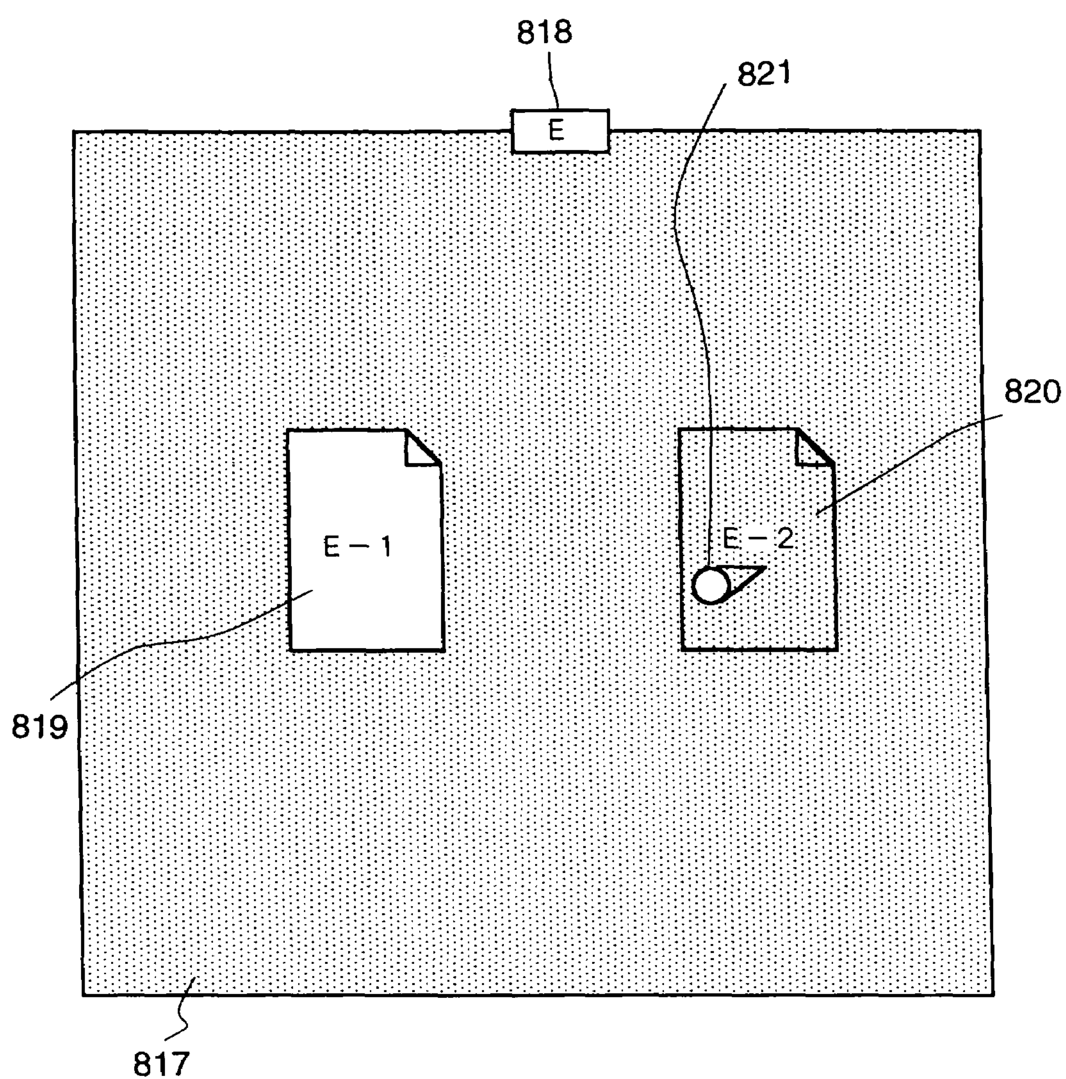
FIG. 21 shows an example of a zoomed-in display of directory E.

The navigation cursor 821 is pointed at any position within the level display area 817 for directory E, and the mouse button 304 is held down. The level display area 817 for directory E is then zoomed in to occupy the wholescreen. FIG. 21 shows a zoomed-in display of directory E.

Figure 22:
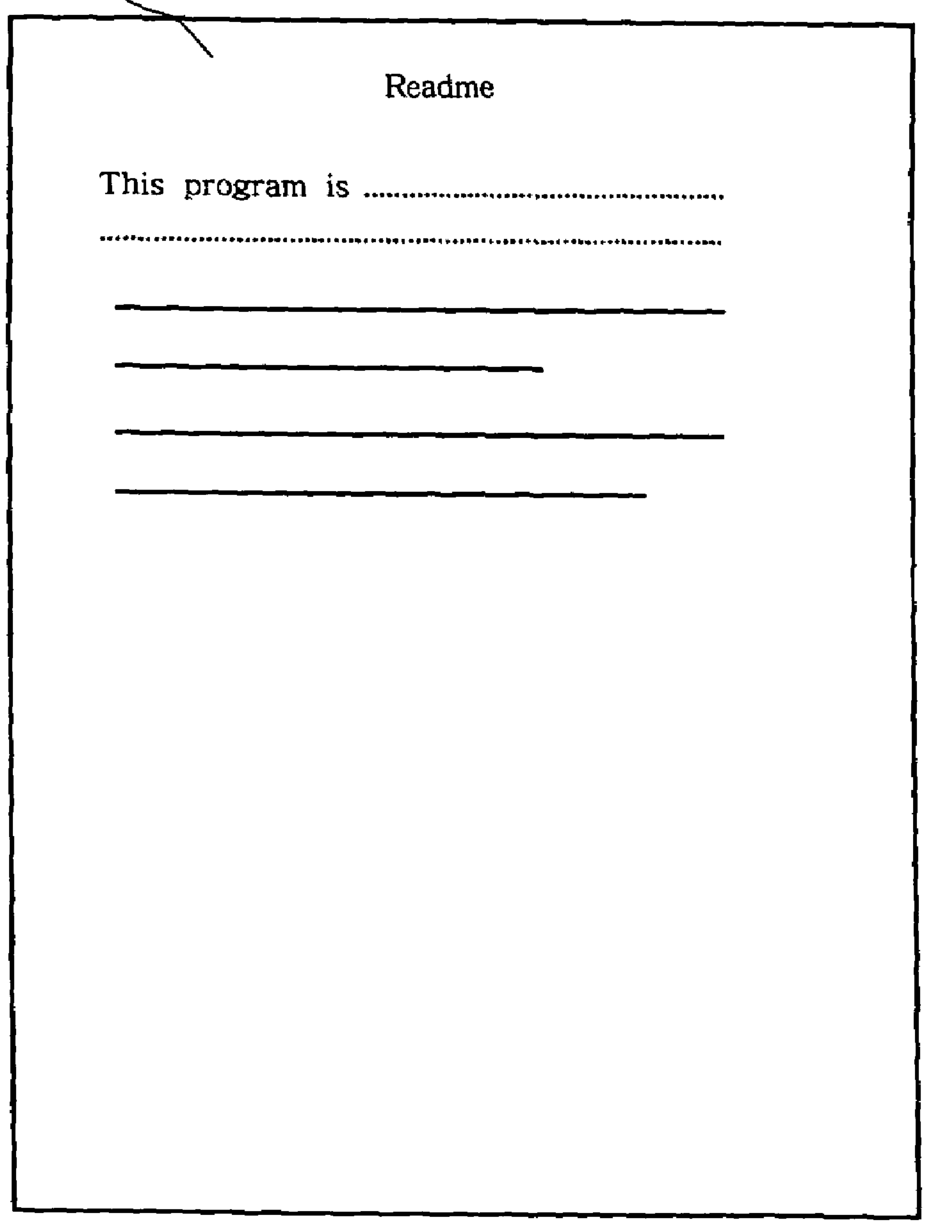
FIG. 22 shows the detailed contents of a file.

With the data icon representing file E-2 selected, the mouse button 304 is double-clicked (a double-click means in general that a mouse button is clicked twice for a short period of time). The level display unit displays the detailed contents of file E-2. In FIG. 22, reference numeral 822 denotes an example of a display of the detailed contents of a file.

Figure 23:
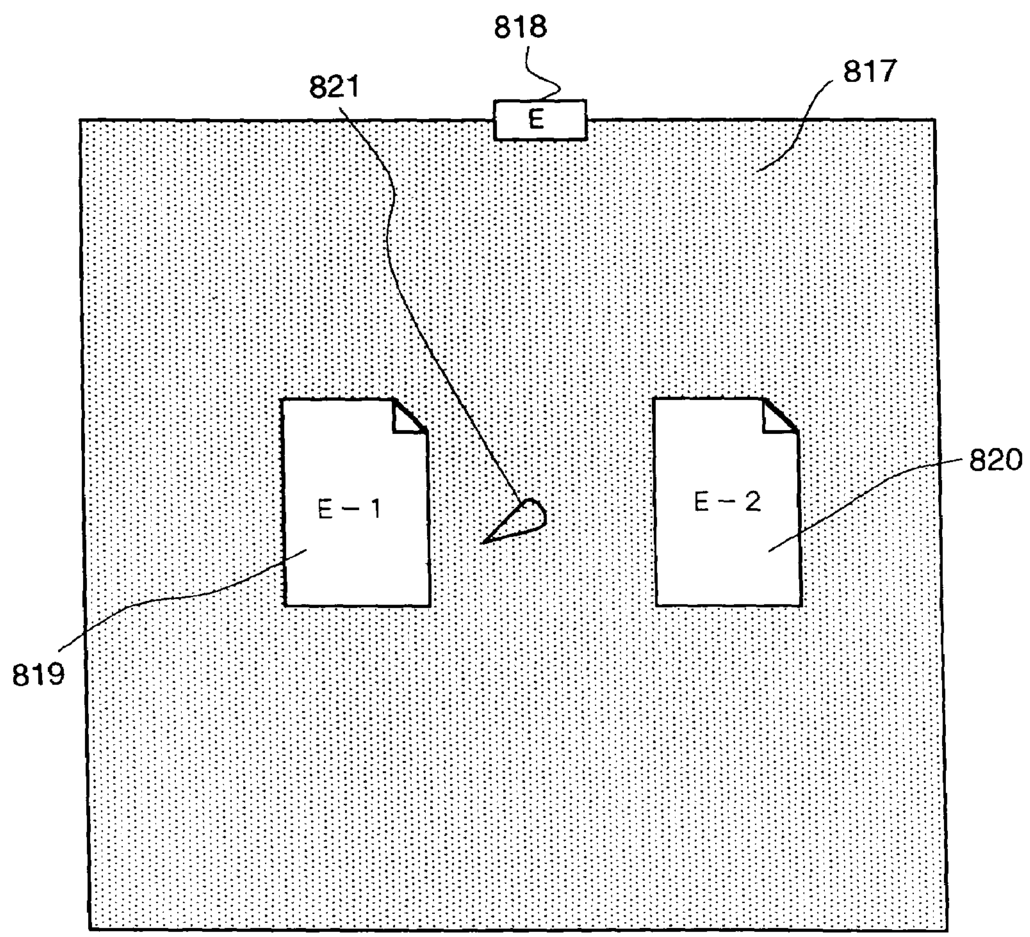
FIG. 23 is an explanatory diagram concerning zoom-out of a zoomed-in display of directory E.

By contrast, when a zoomed-in display of a low level is wanted to be changed to a display in which the low level is viewed from a higher level, the display is zoomed out. FIG. 23 shows a zoomed-in display of directory E. In the display state shown in FIG. 23, when a given key (for example, a shift key) is pressed, the orientation of the navigation cursor 821 is reversed and the navigation cursor 821 is oriented outward. In this state, when the mouse button 304 is held down, the display is zoomed out and the display shown in FIG. 20 appears (however, the navigation cursor 821 is oriented outward). When the mouse button 304 is still held down with the shift key pressed, the display is zoomed out until the display shown in FIG. 17 appears.

(Detailed Information Display)

Figure 24:
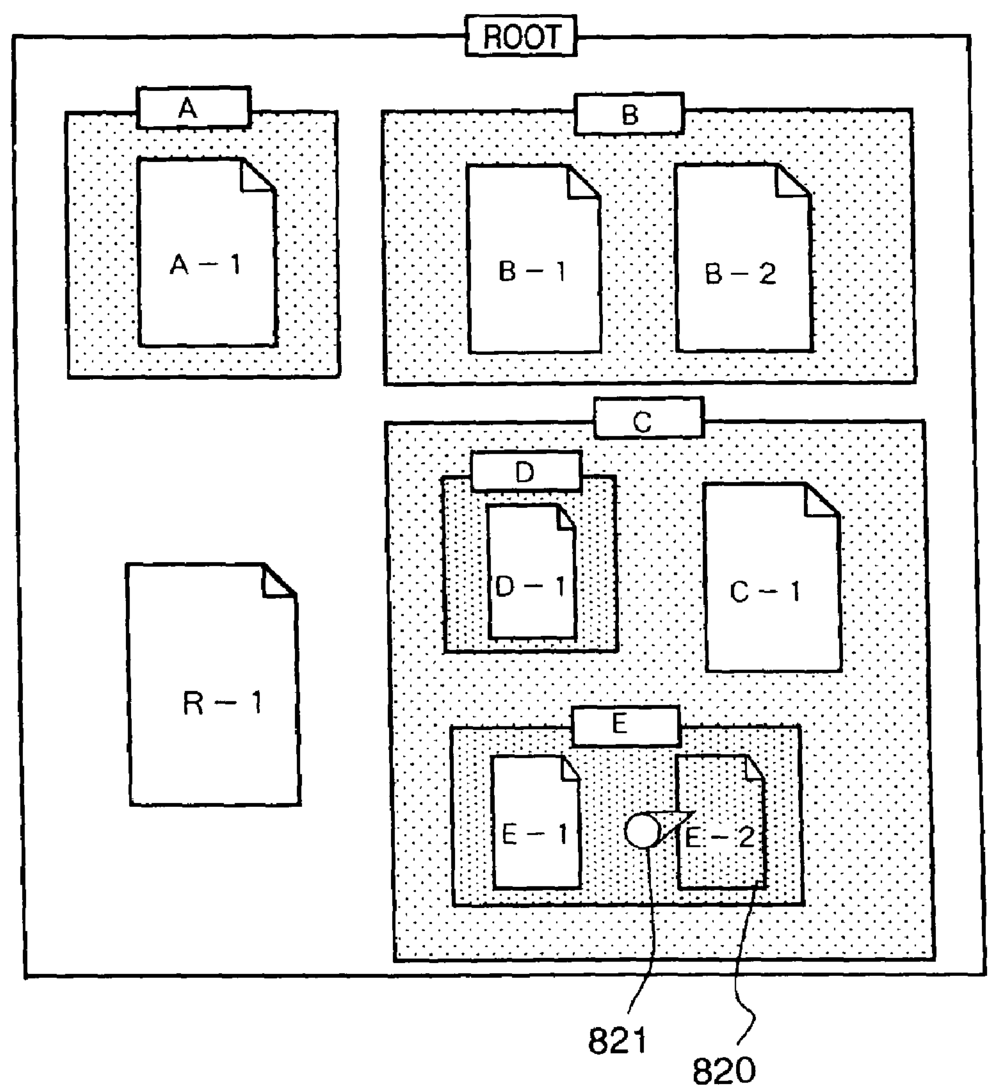
FIG. 24 shows a method for designating detailed information display of data indirectly.

In this embodiment, when a data icon representing desired data can be located without the necessity of zoom-in, detailed information display can be designated for the data using the navigation cursor 821. FIG. 24 shows a method for directly designating detailed information display for data. For displaying the detailed information of file E-2, as shown in FIG. 24, the data icon 820 representing file E-2 is designated directly using the navigation cursor 821. With a double-click, the detailed information shown in FIG. 22 can be acquired.

(Hierarchical Depth Display)

Figure 37:
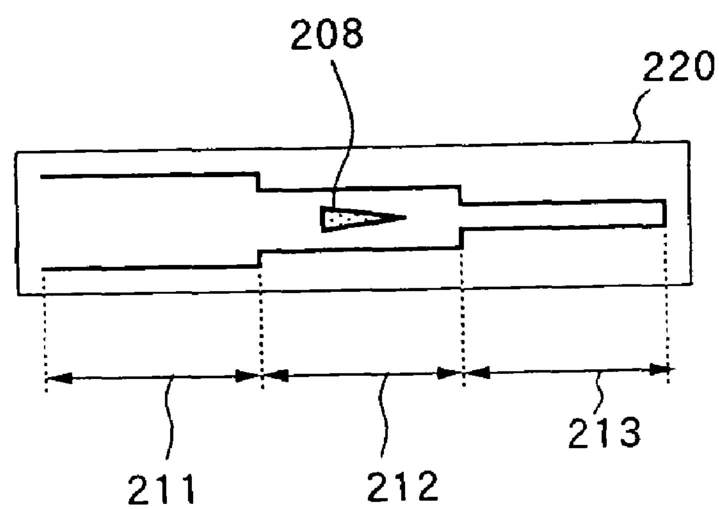
FIG. 37 is an explanatory diagram concerning a hierarchical depth indicator for indicating a hierarchical depth of a level for which a level display area is zoomed in by a user.

FIG. 37 shows an example of the hierarchical depth indicator 220 for indicating a hierarchical depth of a level corresponding to a level display area zoomed in by a user. In FIG. 37, reference numeral 211 denotes the first hierarchical depth zone. 211 denotes the second hierarchical depth zone. 213 denotes the third hierarchical depth zone. The number of zones indicating hierarchical depths is determined according to a maximum depth of a child level subordinate to the level of which display is currently zoomed in or a maximum depth of the level itself. For example, the maximum hierarchical depth of a level corresponding to a level display area is 3, the number of zones is 3. 208 denotes a hierarchical depth indicator icon that is displayed in a zone indicating a level of which zoomed-in display appears currently. The hierarchical depth indicator icon 208 is oriented in a direction, in which the hierarchical depth increases, during zoom-in The hierarchical depth indicator icon 208 is oriented in a direction, in which the hierarchical depth decreases, during zoom-out. As for the method for indicating hierarchical depth zones, in an example of hierarchical depth indication shown in FIG. 37, as the hierarchical depth increases, the hierarchical depth zones are displayed with decreasing widths. Thus, the hierarchical depth zones are differentiated mutually.

Figure 38:
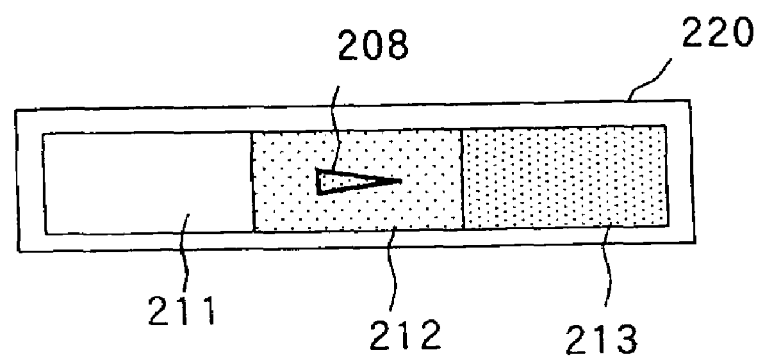
FIG. 38 shows another example of a hierarchical depth indicator.

FIG. 38 shows another example of the hierarchical depth indicator 220. In the example of FIG. 38, hierarchical depth zones are painted in background colors of corresponding level display areas. Thus, the hierarchical depth zones are differentiated mutually.

Figure 33:
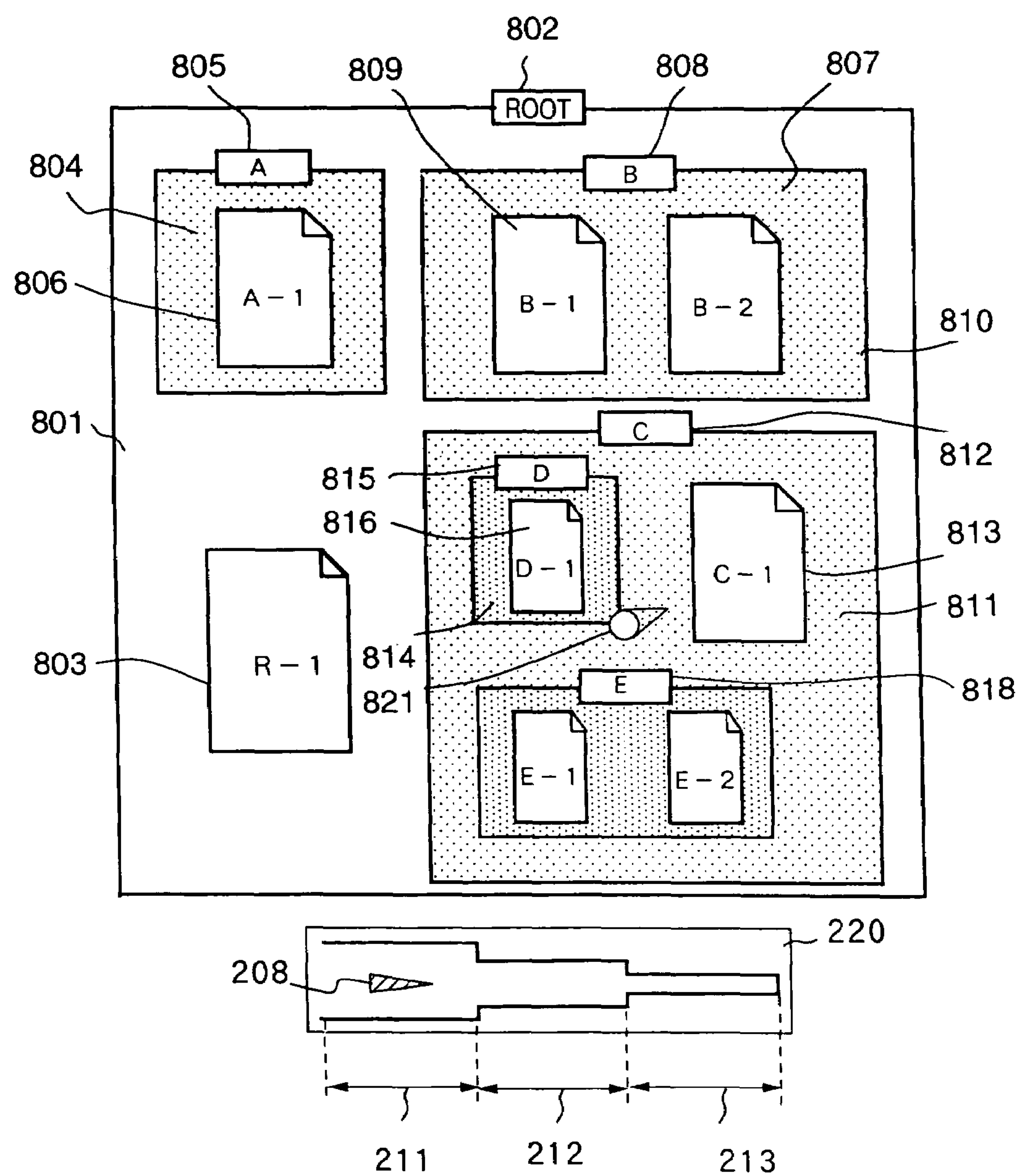
FIG. 33 shows an example of a display in a state in which a root level is displayed as a level display.

FIGS. 33 to 36 show examples of screen displays of this embodiment having hierarchical depth indicators. FIG. 33 shows an example of a display in which a root level is displayed for level display. In FIG. 33, reference numeral 220 denotes a hierarchical depth indicator. 208 denotes a hierarchical depth indicator icon. 211 denotes the first hierarchical depth zone. 212 denotes the second hierarchical depth zone. 213 denotes the third hierarchical depth zone.

The maximum hierarchical depth of each child level subordinate to the root level is 3. For the root level, therefore, the hierarchical depth indicator indicates three zones of hierarchical depths 1 to 3. When the navigation cursor 821 is oriented inward, the hierarchical depth indicator icon 208 is oriented in a direction in which the hierarchical depth increases, and displayed in the first hierarchical depth zone 211.

Figure 34:
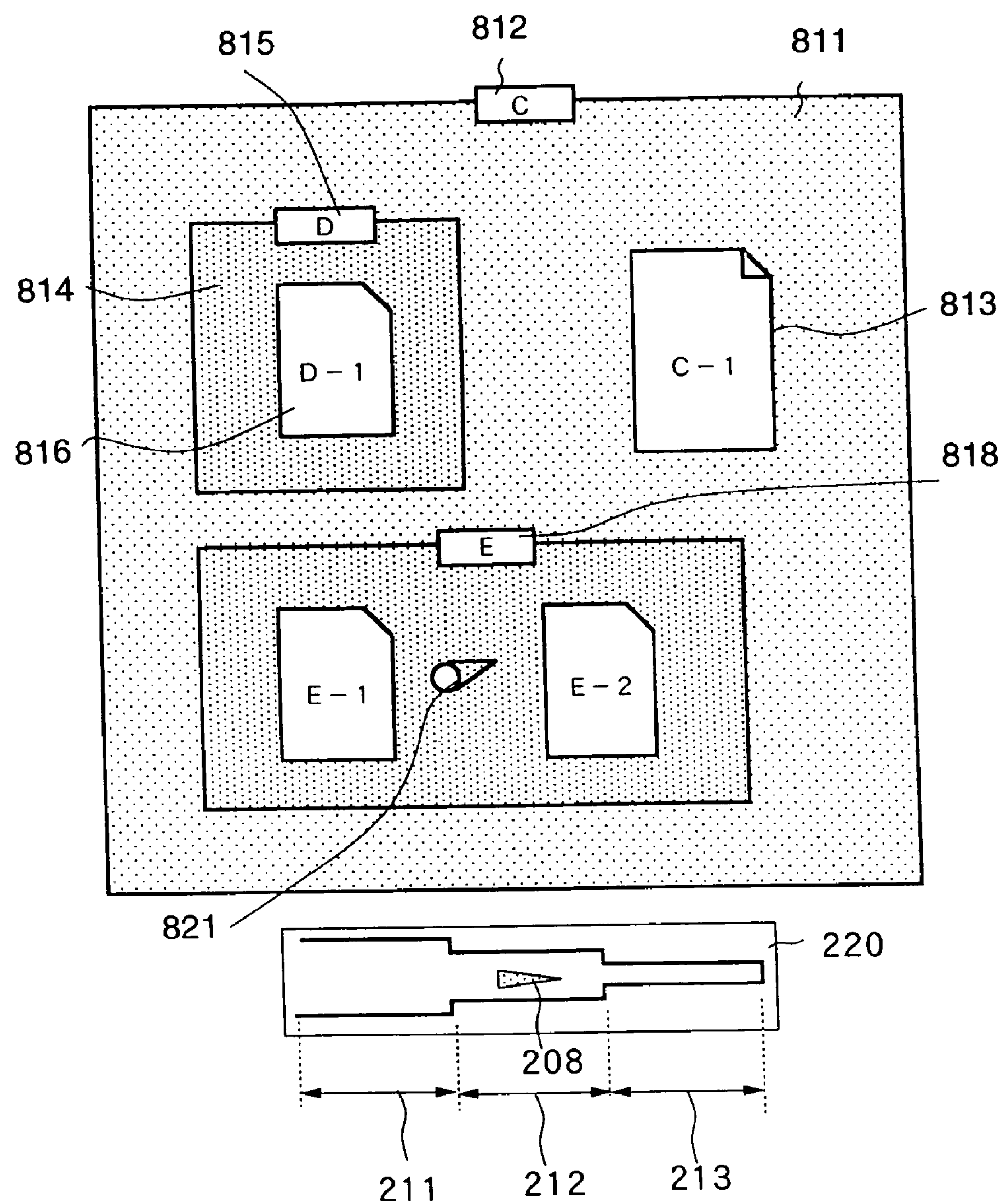

FIG. 34 shows a state in which the level display area for directory C is zoomed up. For this level, the hierarchical depth indicator icon 208 is displayed in the second hierarchical depth zone 212. The navigation cursor 21 is oriented in a direction in which the hierarchical depth increases. Accordingly, the hierarchical depth indicator icon 208 is oriented in a direction in which the hierarchical depth increases.

Figure 35:
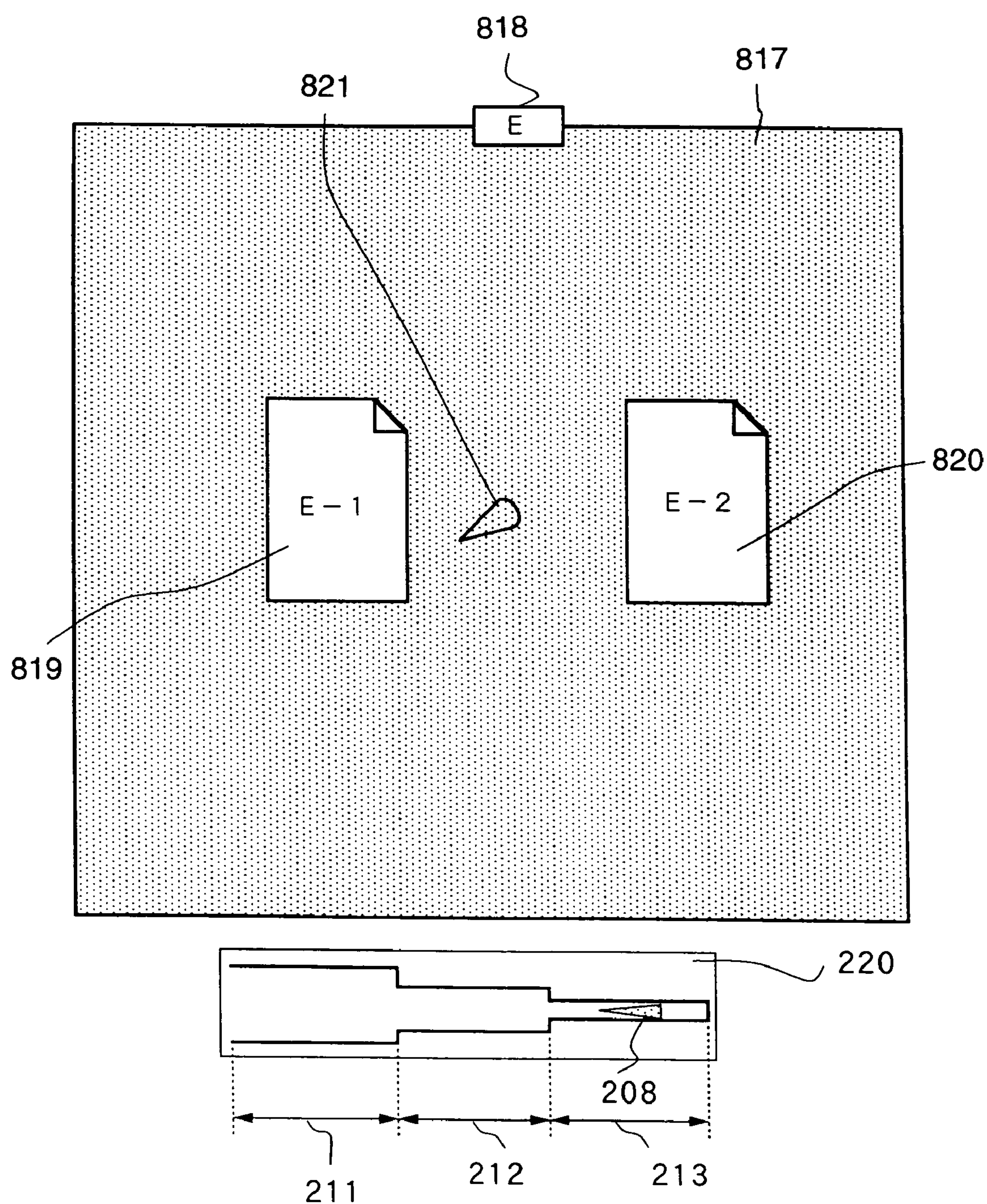

FIG. 35 shows a state in which the level display area for directory E is zoomed in. For this level, the hierarchical depth indicator icon 208 is displayed in the third hierarchical depth zone 213. The navigation cursor 821 is oriented in a direction in which the hierarchical depth decreases. Accordingly, the hierarchical depth indicator icon 208 is oriented in the direction in which the hierarchical depth decreases.

Figure 36:
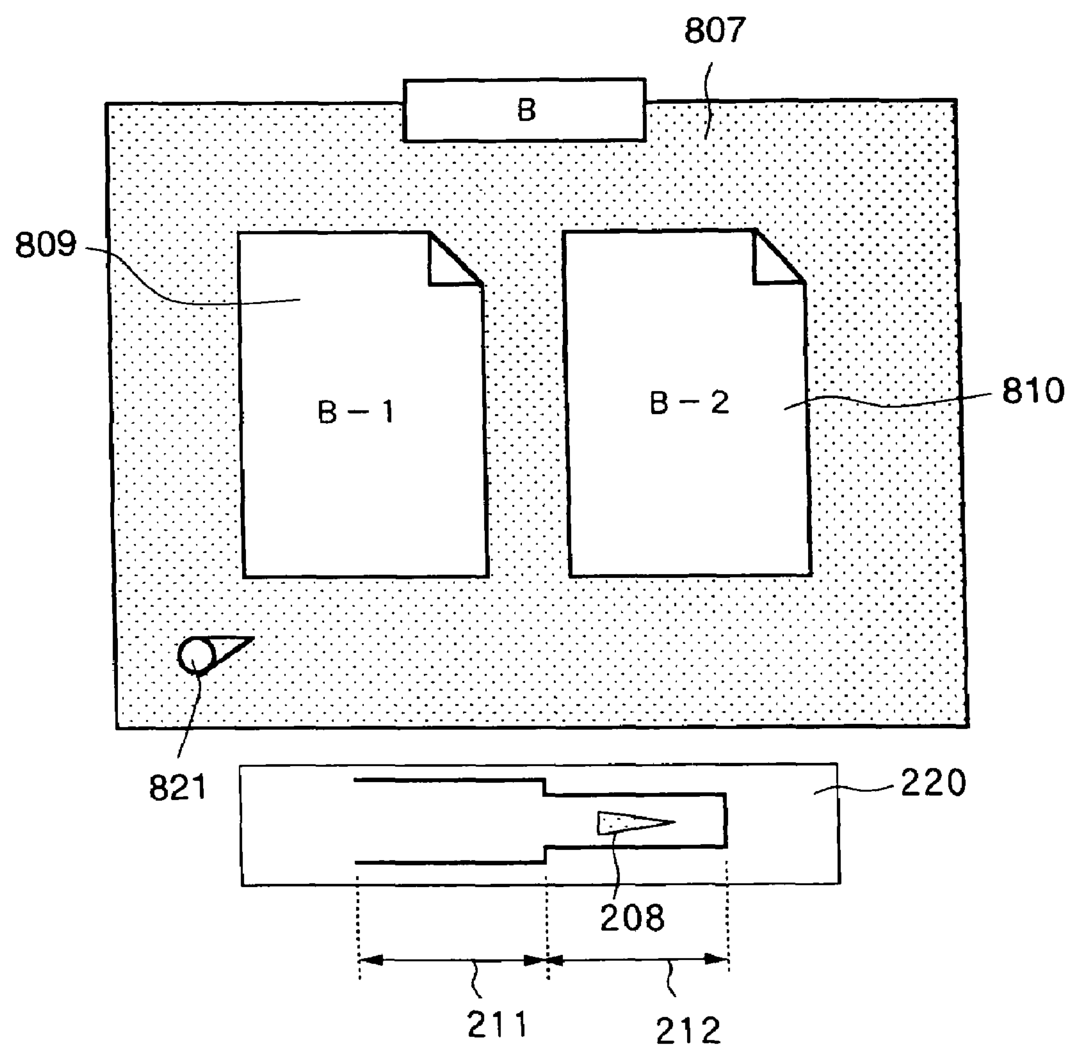

FIG. 36 shows a state in which the level display area for directory B is zoomed in. A level of the largest hierarchical depth within directory B is the level of directory B itself. The hierarchical depth is therefore 2. In this case, the hierarchical depth indicator 220 has the first hierarchical depth zone 211 and second hierarchical depth zone 212 alone.

(Example of a Zoom-In Sequence)

FIG. 28 is a flowchart describing a sequence for zooming in a given level as described previously.

In FIG. 28, step S141 means that an event wait loop is entered. A designation (event) entered by a user at a mouse or a keyboard is waited. When any event occurs, it is checked at step S142 if the user has double-clicked to designate a data icon. If the result of checking is in the affirmative, control is passed to step S143. The detailed information of data represented by the data icon is displayed. If the result of checking is in the negative, control is passed to step S144. It is then checked if the user has designated a position within a level display area and pressed a mouse button.

If the result of checking is in the affirmative, control is passed to step S145. The designated level display area is zoomed in. At step S146, the maximum hierarchical depth of the designated level to a child level displayed in the level display area due to zoom-in is specified for $D_{max}$. At step S147, the hierarchical depth indicator 220 is segmented into zones numbering the $D_{max}$ value. At step S148, a hierarchical depth indicator icon indicating the current hierarchical depth and an advancing direction is displayed.

If the result of checking performed at step S144 is in the negative, control is passed to step S149. Another event is handled, and control is returned to step S141 of an event wait state.

(Example of a Zoom-Out Sequence)

Figure 29:
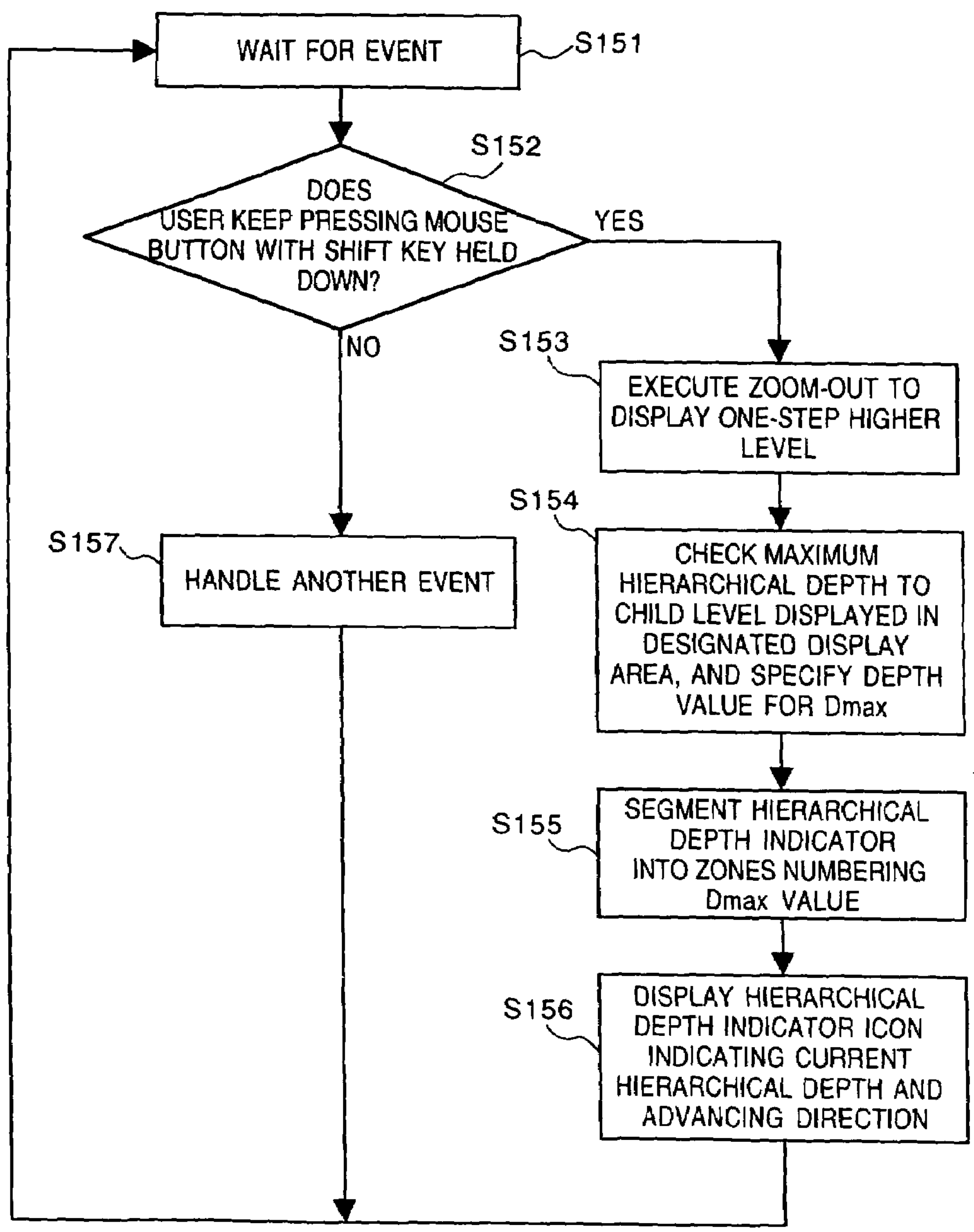
FIG. 29 is a flowchart describing a sequence for zooming out a given zoomed-in level so as to display the given level together with higher levels.

FIG. 29 is a flowchart describing a sequence for zooming out a zoomed-in display of a given level so as to display higher levels.

In FIG. 29, step S151 means that an event wait loop is entered. A designation (event) entered by a user at a mouse or keyboard is waited. When any event occurs, it is checked at step S152 if the user has pressed a mouse button with the shift key held down.

If the result of checking is in the affirmative, control is passed to step S153. Zoom-out is then executed to visualize a one-step higher level. At step S154, the maximum hierarchical depth of the designated level to a child level displayed in the level display area due to zoom-out is specified for $D_{max}$. At step S155, the hierarchical depth indicator 220 is segmented into zones numbering the $D_{max}$ value. At step S156, a hierarchical depth display icon indicating the current hierarchical depth and an advancing direction is displayed.

If the result of checking performed at step S152 is in the negative, control is passed to step S157. Another event is handled, and control is returned to step S151 of an event wait state.

(Example of Application to an Employee Data Base)

Figure 31:
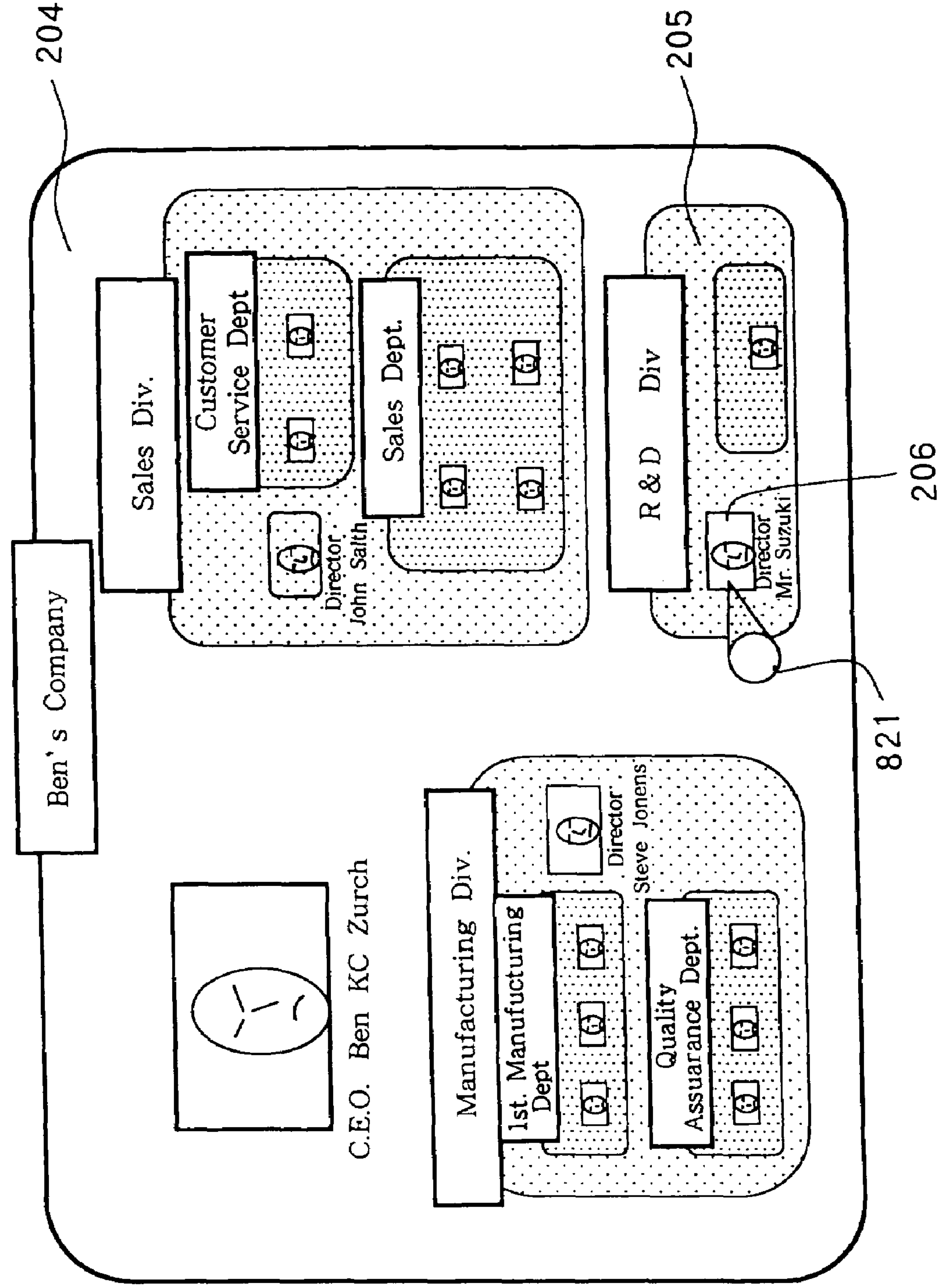
FIG. 31 shows an example of a display of an employee data base in an embodiment.

FIG. 31 shows an example of a display of an employee data base in accordance to this embodiment.

Figure 32:
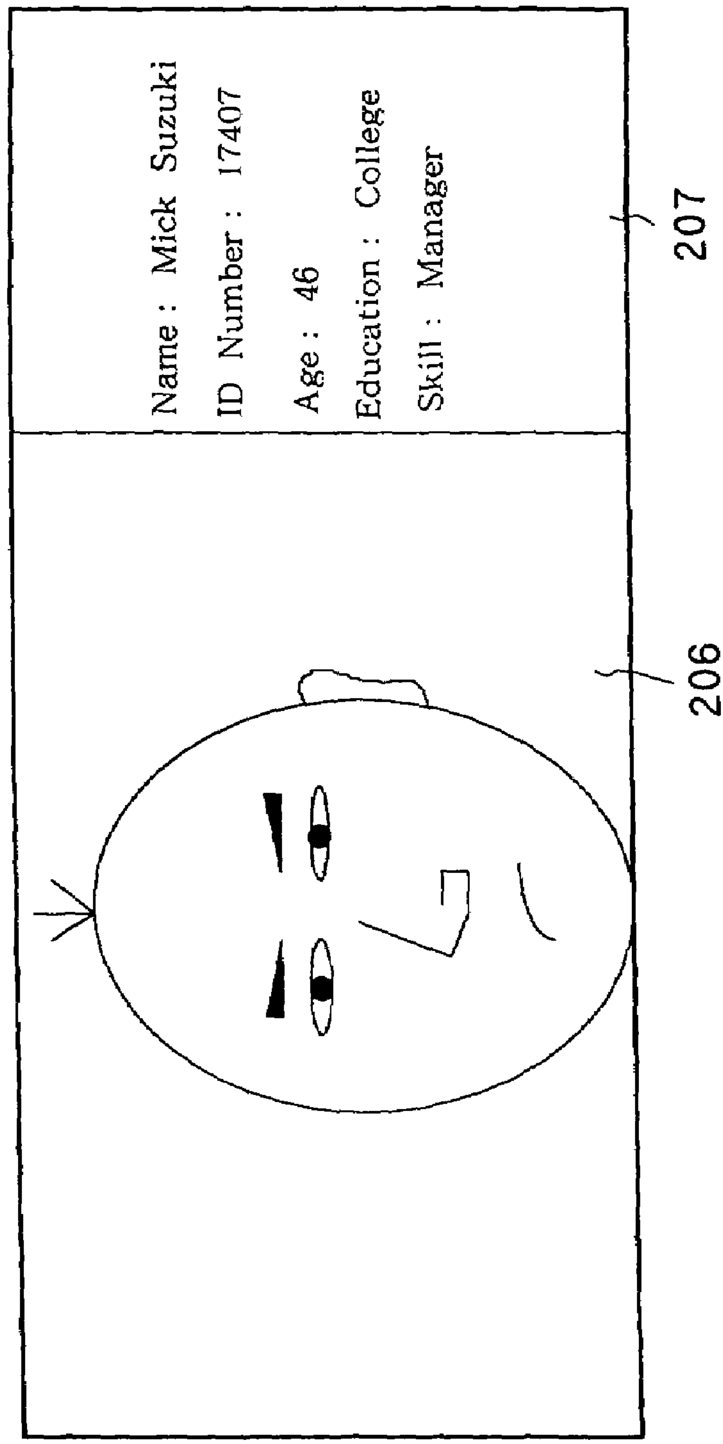
FIG. 32 shows an example of a display of detailed information.

Employees are sorted by organizing section, and a portrait image of an employee is displayed as a data icon. The organization of a company has a hierarchical structure. The organization can therefore be depicted in the form of a Venn diagram in the same manner as the hierarchical file system. In FIG. 31, reference numeral 204 denotes the highest level in the employee data base. 205 denotes a level of the R&D division. 206 denotes a data icon representing an R&D manager. When the navigation cursor 821 is pointed at the data icon representing an R&D manager and a mouse button is double-clicked, the detailed information 207 concerning the R&D manager is displayed as shown in FIG. 32.

Third Embodiment

The third embodiment is concerned with another mode of the present invention. In displays and control flowcharts similar to those described in the second embodiment, components having the same functions as those in the second embodiment are assigned the same reference numerals. The description of the components will be omitted. Components whose functions are different from those in the second embodiment will be described.

(Data Attribute Data)

Figure 44:
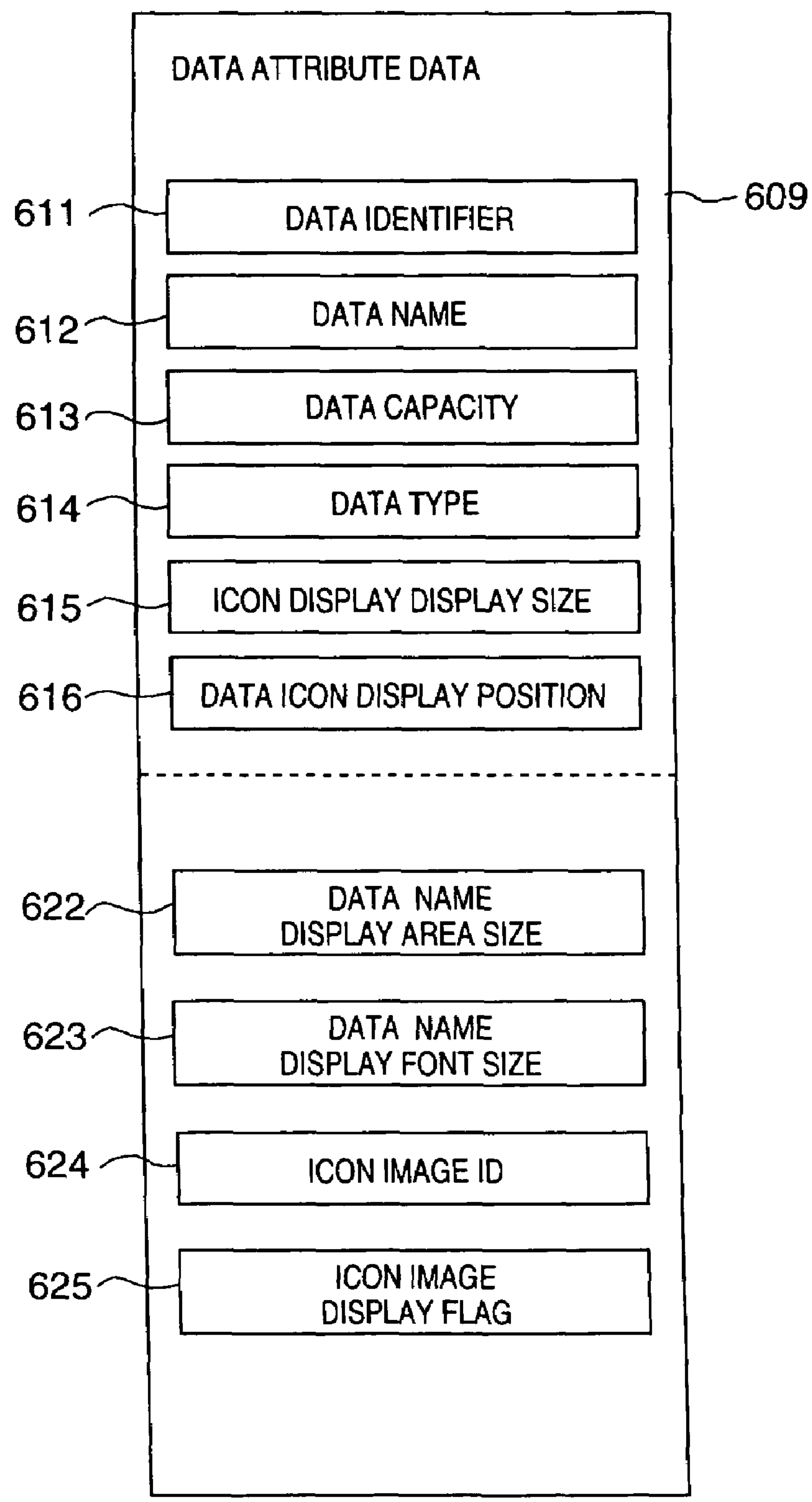
FIG. 44 shows a data structure of data attributes in the third embodiment.

Data attribute data 609 in this embodiment in FIG. 44 includes data items 622 to 625 shown under a dotted line in FIG. 44 in addition to the data attribute data in the second embodiment in FIG. 42. In FIG. 44, reference numeral 622 denotes a data name display area size. 623 denotes a data name font size. 624 denotes an icon picture ID. 625 denotes an icon picture display flag.

(Example of a Structure of a Data Icon)

Figure 45:
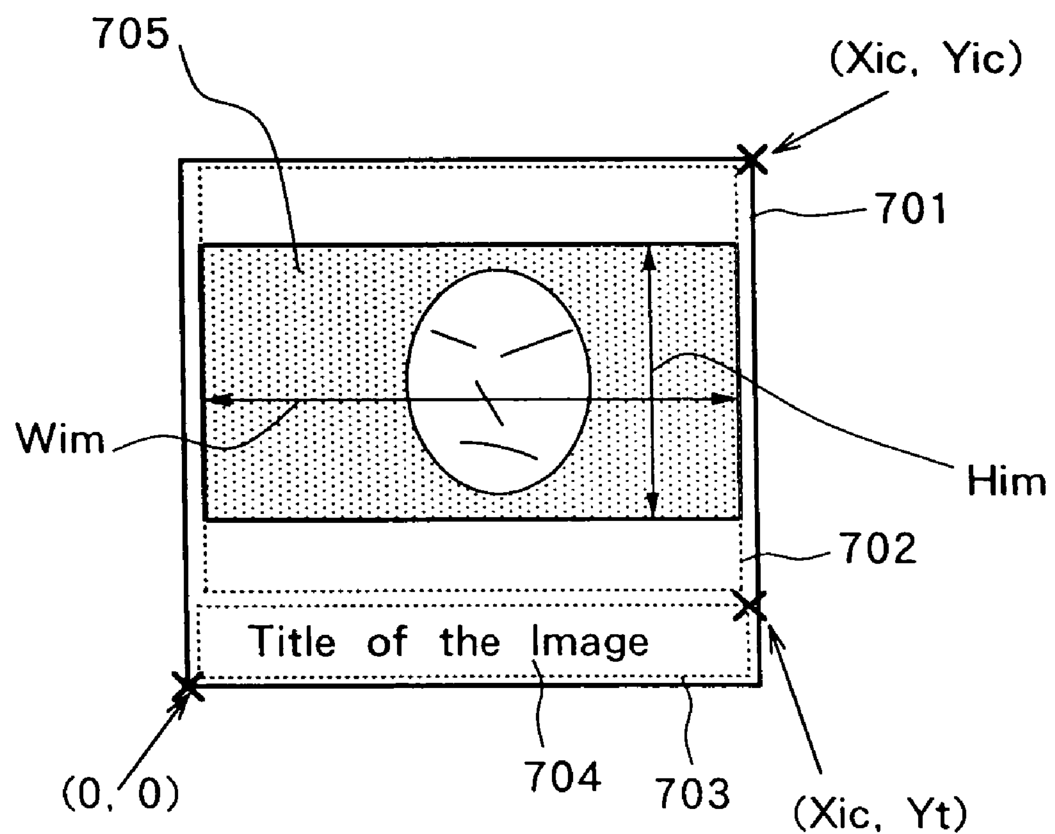
FIG. 45 is an explanatory diagram concerning component elements of a display of a data icon.

FIG. 45 is an explanatory diagram concerning component elements of a display of the data icon 404 shown in FIG. 43.

In FIG. 45, reference numeral 701 denotes a display area for the whole of one data icon. The display area 701 has a shape of a rectangle defined with an origin (0, 0) and coordinates ($X_{ic}$, $Y_{ic}$) wherein $X_{ic}$ denotes a width of a data icon and $Y_{ic}$ denotes a height thereof, and has a size specified with an icon display size 615 shown in FIG. 28. 702 denotes an icon picture display area in which an icon picture specified with an icon picture ID 624 shown in FIG. 28 is displayed. 705 denotes an icon picture. Assuming that the width of an original of an icon picture is $W_{imorg}$ and the height thereof is $H_{imorg}$, the icon picture is enlarged or reduced to have a width $W_{im}$ and height $H_{im}$ so that the icon picture can be fitted in the icon picture display area 702.

Reference numeral 703 denotes a data name display area that is a rectangle defined with an origin (0, 0) and coordinates ($X_{ic}$, $Y_t$) wherein $X_{ic}$ denotes a width and $Y_t$ denotes a height, and has a size specified with a data name display area size 622 shown in FIG. 44. 704 denotes a data name display visualizing a data name 612 shown in FIG. 44. When a whole data name 612 cannot be displayed in a data name display area 703, leading characters of the data name 612 are displayed by the number of characters that can be displayed. A symbol " . . . " indicating that a data name continues is appended to the end of the characters.

(Hierarchical Data Browser)

Figure 46:
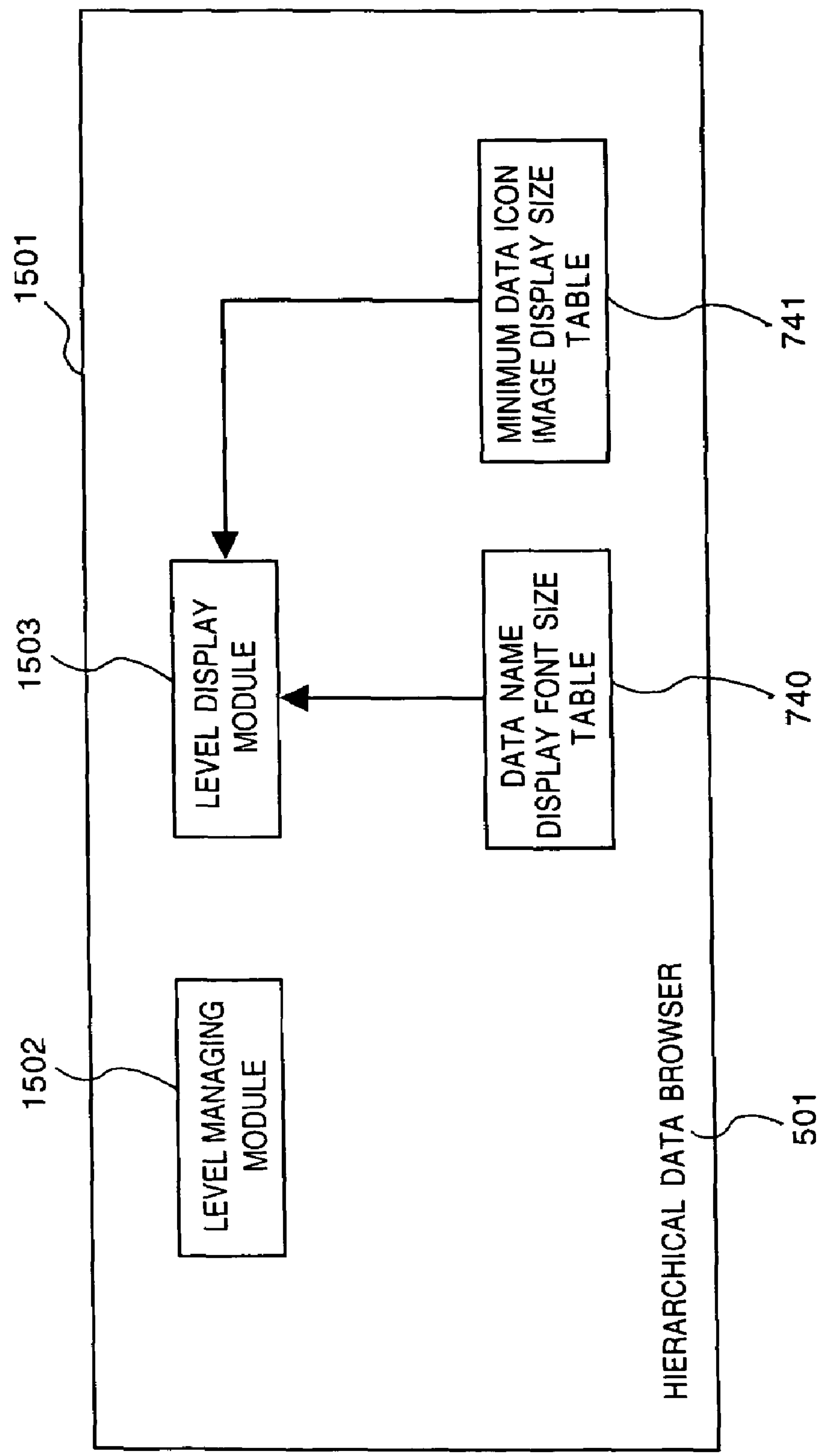
FIG. 46 shows the detailed configuration of a hierarchical data browser system.

FIG. 46 shows the detailed configuration of a hierarchical data browser 1501 of this embodiment. Reference numeral 740 denotes a data name display font size table that is referenced in order to set a font size for display of a data name 612. 741 denotes a minimum data icon picture display size table that is referenced in order to set a minimum display area size for an icon picture needed to display the data icon 404 shown in FIG. 43.

(Example of a Sequence for Displaying a Data Icon)

FIG. 47 is a flowchart describing a sequence for determining a data icon display format according to the size of a display area for one data icon which is allocated as a result of step S125 in the flowchart of FIG. 30. FIG. 48 shows an example of a data name display font size table 740 shown in FIG. 46. A width W(k) of a data icon, height H(k) thereof, and font size Fs(k) are extracted relative to an index k. FIG. 49 shows an example of a minimum data icon picture display size table 714 shown in FIG. 46. A width $W_{immin}$ and height $H_{immin}$ indicating a minimum image display area size are extracted relative to an index m determined according to an available memory capacity.

A sequence of determining a data icon display format will be described in conjunction with the flowchart of FIG. 47.

In FIG. 47, at a step S160, the index k needed to access the data name display font size table 740 is initialized to 0. At step S161, the size of a data icon extracted from the data name display font size table 740 in FIG. 48 is compared with a size actually allocated to the data icon. It is assessed if $X_{ic}$ W(k) AND $Y_{ic}$ H(k) is established. If the relationship is not established, control is passed to step S162. The k value is incremented, and control is returned to step S161. This loop is executed repeatedly until the condition at step S161 is met. Thus, the k value is incremented repeatedly and then finalized.

At step S163, a font size Fs(k) is extracted from the data name display font size table 740 in FIG. 48 and set as a data name font size 623 in FIG. 44. When the data name font size 623 is determined, a coordinate $Y_t$ defining a data name display area is determined with the height of a font, and set as a data name display size 622 in FIG. 44. In the data name display font size table 740 shown in FIG. 48, the larger the k value is, the larger the W(k), H(k), and Fs(k) values become. When the size of a display area for one data icon is very small, a data name is not displayed. As the size of a display area for one data icon gets larger, a data name is displayed with a larger easily-discernible font.

If it is found at step S164 that the k value equals to 0, control is passed to step S171. When the k value does not equal to 0, control is passed to step S165. At step S165, the index m needed to reference the minimum data icon picture display size table 741 in FIG. 49 is initialized to 0. At step S166, an available memory capacity calculated using a facility of the memory management system 516 is compared with a memory capacity Ma(m) extracted from the minimum data icon picture display size table 741 shown as an example in FIG. 49. Control is then passed to step S167 at which the index m is incremented continually until the available memory capacity becomes larger than or equal to the Ma(m) value. At step S166, the comparison judgment step is repeated to determine the index m.

At step S168, the $W_{immin}$(m) and $H_{immin}$(m) values are determined by referencing the minimum data icon picture display size table 741 in FIG. 49. At step S169, it is assessed if the conditional expression $X_{ic}-Y_t>HH_{immin}$(m) AND $X_{ic}$ $W_{immin}$(m) is true. If the expression is true, control is passed to step S170. An icon picture display flag 625 in FIG. 44 is set to a true state. If it is found at step S169 that the expression is false, control is passed to step S171. The icon picture display flag is set to a false state. When the size of a portion of a display area for one data icon excluding a data name display area is smaller than a minimum data icon picture display size defined with the height $H_{immin}$(m) and width $W_{immin}$(m), no icon picture is displayed.

In the minimum data icon picture display size table 741 shown in FIG. 49, as the index m become larger, the Ma(m) value is made larger and the $H_{immin}$(m) and $W_{immin}$(m) values are made smaller. When the available memory capacity decreases, if the size of a display area for one data icon gets larger, no icon picture is displayed. For displaying an icon picture, data representing an icon picture must be retained in a memory. However, when the minimum data icon picture display size table 741 is structured as shown in FIG. 49, if the available memory capacity is limited, display of an icon picture is disabled to save the memory capacity.

(Examples of Displays of a Data Icon)

FIG. 50 shows examples of a display format of a data icon determined as described in the flowchart of FIG. 47.

(a) of FIG. 50 shows an example of a display format used when the conditional expression k=0 AND ($Y_{ic}-Y_t<H_{immin}$ OR $X_{ic}<W_{immin}$) described in the flowchart of FIG. 47 is established. When k=0 is true, 0 is specified as a data name font size 623 in FIG. 44. In this format, a data name 612 in FIG. 44 is not displayed. Since an icon picture display flag 625 in FIG. 44 is set to the false state, no icon picture is displayed. A frame alone is displayed as a data icon 404*a*. (b) of FIG. 50 shows an example of a display format used when the conditional expression k=0 AND ($Y_{ic}-Y_t$ $H_{immin}$ AND $X_{ic}$ $W_{immin}$) is established. Similarly to (a) of FIG. 50, a data name 612 in FIG. 44 is not displayed. However, since an icon picture display flag 625 is set to the true state, a data icon. 404*b* accompanied by an icon picture is displayed.

(c) of FIG. 50 shows an example of a display format used when the conditional expression k=1 AND ($Y_{ic}-Y_t$ $H_{immin}$ AND $X_{ic}$ $W_{immin}$) is established. A data name 612 in FIG. 44 is displayed with a font size fsi. An icon picture larger than the one displayed in the display format of (b) of FIG. 50 is displayed as a data icon 404*c*. (d) of FIG. 50 shows an example of a display format used when the conditional expression k=2 AND ($Y_{ic}-Y_t$ $H_{immin}$ AND $X_{ic}$ $W_{immin}$) is established. A data name 612 in FIG. 44 is displayed with a font size fs2. An icon picture larger than the one displayed in the display format of (c) of FIG. 50 is displayed as a data icon 404*d*.

Figure 51:
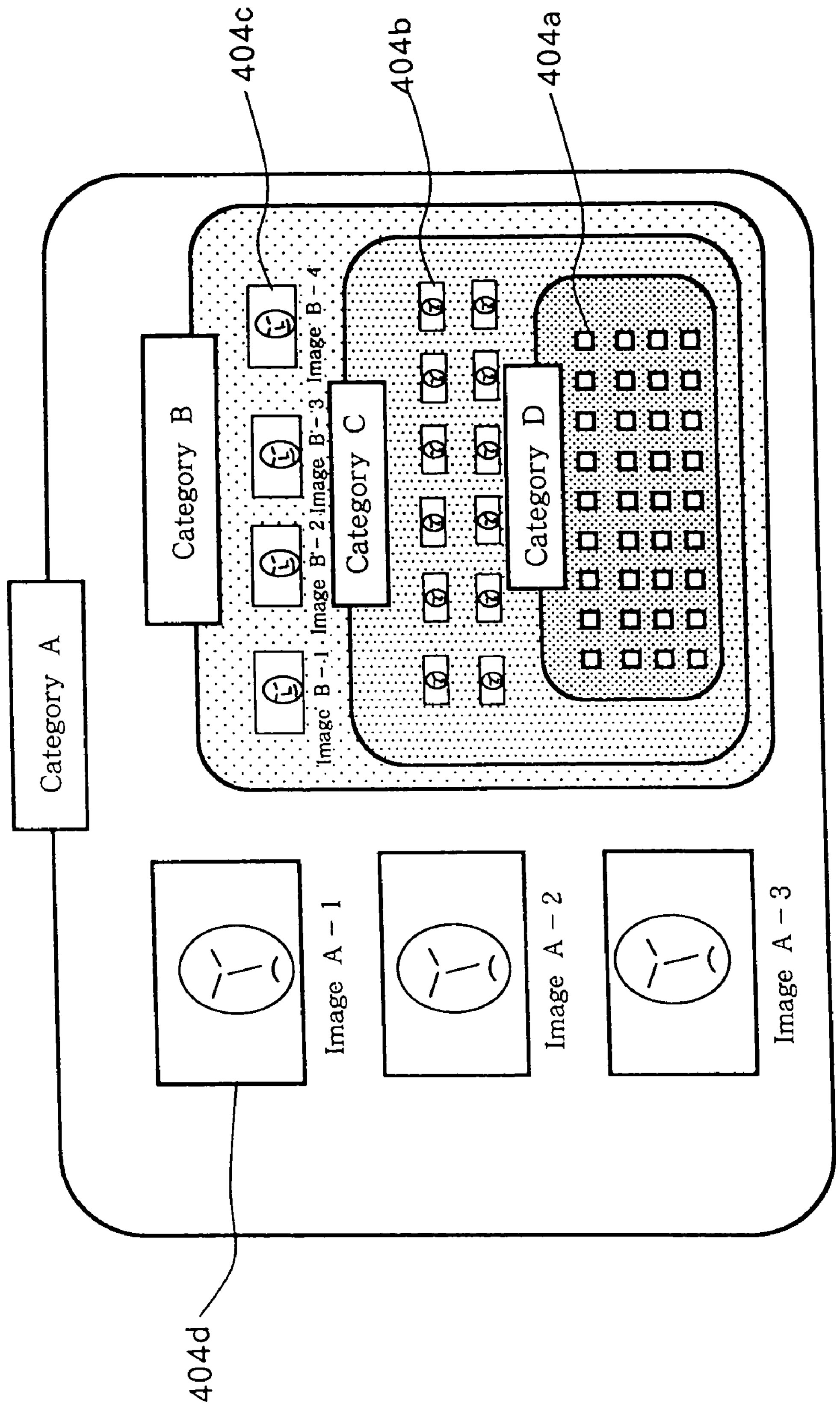
FIG. 51 shows an example of applying the sequence of FIG. 47 to display of data icons in which image data is categorized hierarchically and displayed in the form of a Venn diagram.

FIG. 51 shows an example in which image data is categorized hierarchically. The processing described with the flowchart of FIG. 47 is adapted to a sequence for displaying a data icon in the course of displaying the mage data in the form of a Venn diagram.

In FIG. 51, category A is the highest level. Categories B, C, and D are levels going lower in that order. As the hierarchical depth increases, the size of a display area for one data icon decreases. For category A, data icons are displayed according to the format of a data icon 404*d*. For category B, data icons are displayed according to the format of a data icon 404*c*. For category C, data icons are displayed according to the format of a data icon 404*b*. For category D, data icons are displayed according to the format of a data icon 404*a*.

When category B is zoomed in, display areas allocated to data icons of category B are changed. A display format is determined for data icons in each level display area according to the processing described with the flowchart of FIG. 47.

FIG. 59 shows examples of a display format for data icons which is determined as described with the flowchart of FIG. 47 when an available memory capacity is limited.

(a) of FIG. 59 shows an example of a display format used when the conditional expression k=0 AND ($Y_{ic}-Y_t<H_{immin}$ OR $X_{ic}<W_{immin}$) described in the flowchart of FIG. 47 is established. When k=0 is true, 0 is specified as a data name font size 623. In this format, a data name 612 is not displayed. Since an icon picture display flag 625 is set to the false state, no icon picture is displayed. A frame alone is displayed as a data icon 404*a*. In (b) of FIG. 59, an icon display area allocated under the same condition as that in (a) of FIG. 59 is larger than that in (a) of FIG. 59. A frame larger than that in (a) of FIG. 50 is displayed as a data icon 404*e*.

(c) of FIG. 59 shows an example of a display format used when the conditional expression k=1 AND ($Y_{ic}-Y_t<H_{immin}$ OR $X_{ic}<W_{immin}$) is established. A data name is displayed with a font size fs1, and no icon picture is displayed. This display is provided as a data icon 404*f*. (d) of FIG. 59 shows an example of a display format used when the conditional expression k=2 AND ($Y_{ic}-Y_t<H_{immin}$ AND $X_{ic}<W_{immin}$) is established. A data name 612 in FIG. 44 is displayed with a font size fs2, and an icon picture is displayed. This display is provided as a data icon 404*d*.

Figure 60:
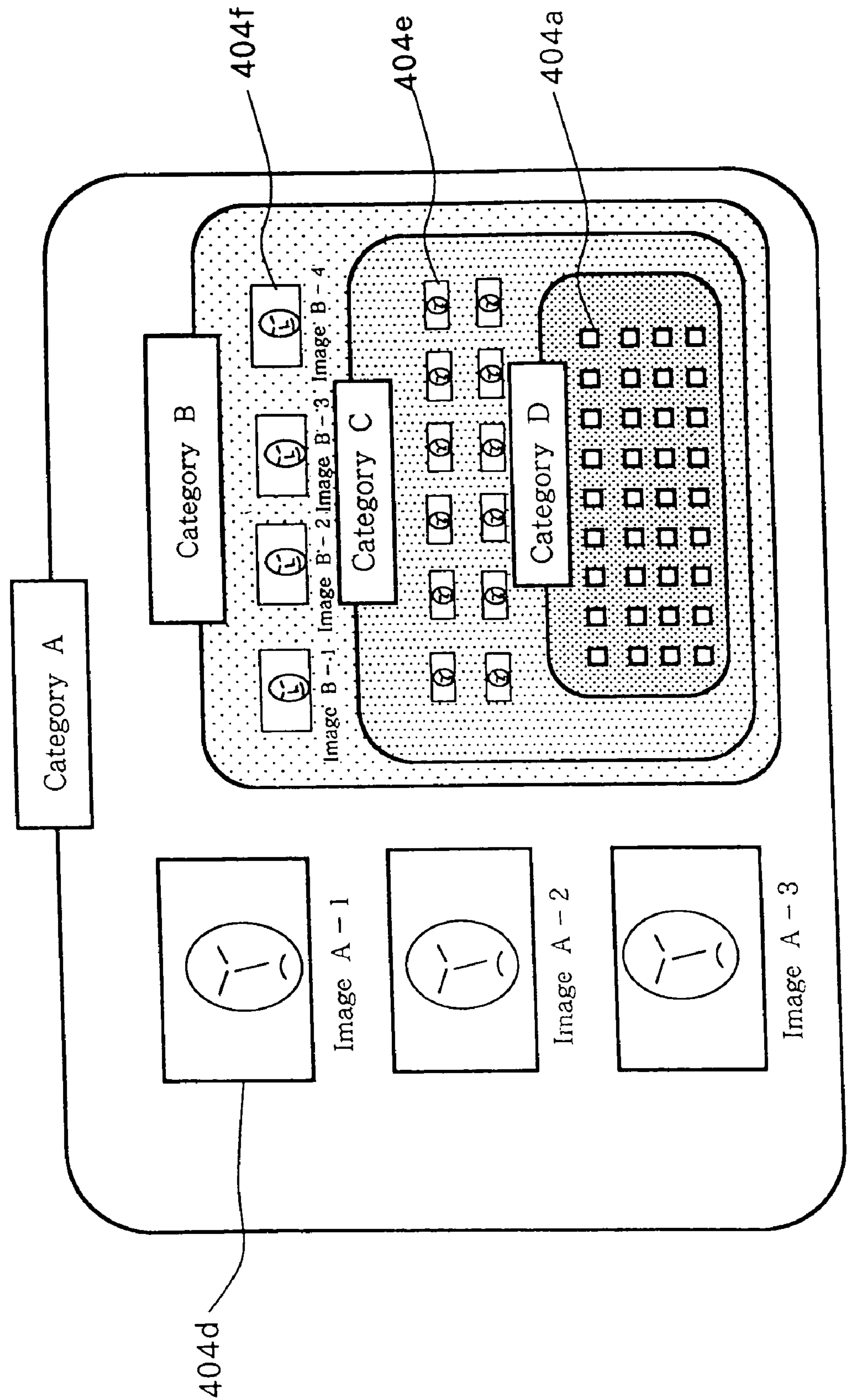
FIG. 60 shows an example of applying the sequence of FIG. 47 to display of data icons in which when an available memory is limited, image data is categorized hierarchically and displayed in the form of a Venn diagram.

FIG. 60 shows an example in which when an available memory capacity is limited, the processing described in FIG. 47 is adapted to a sequence for displaying data icons in the course of displaying image data categorized hierarchically in the form of a Venn diagram.

In FIG. 60, category A is the highest level. Categories B, C, and D are levels going lower in that order. As the hierarchical depth increases, the size of a display area for one data icon decreases. For category A, data icons are displayed according to the format of a data icon 404*d*. For category B, data icons are displayed according to the format of a data icon 404*c*. For category C, data icons are displayed according to the format of a data icon 404*b*. For category D, data icons are displayed according to the format of a data icon 404*a*. When category B is zoomed in, display areas allocated to data icons of category B are changed. A display format is determined for data icons in each level display area according to the processing described with the flowchart of FIG. 47.

(Grouping Data Icons)

Figure 52:
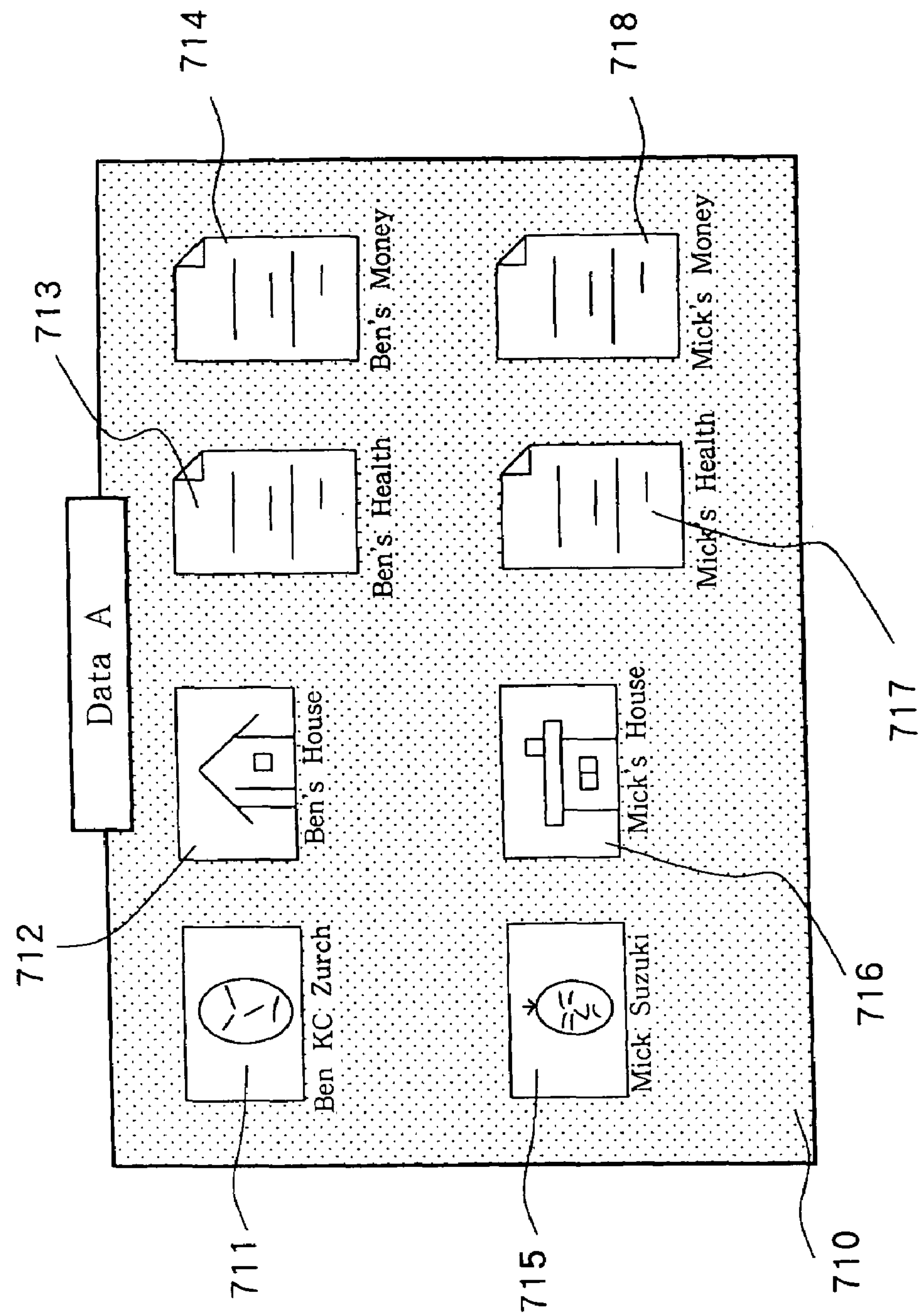
FIG. 52 shows an example of a data display in a level display area in a data base created by an insurance company for the purpose of acquisition of customer information.

FIG. 52 shows an example of a data display in a level display area for a certain level of a data base created by an insurance company for acquiring customer information.

In FIG. 52, reference numeral 710 denotes a level display area for a level of data A. 711 denotes a data icon representing portrait image data concerning person A. 712 denotes a data icon representing data concerning the house of person A. 713 denotes a data icon representing data concerning the health of person A. 714 denotes a data icon representing data concerning the property of person A. 715 denotes a data icon representing portrait image data concerning person B. 716 denotes a data icon representing image data concerning the house of person B. 717 denotes a data icon representing data concerning the health of person B. 718 denotes a data icon representing data concerning the property of person B. When the number of data items is small, all the data icons representing the data items can be arranged with a size extracted from FIG. 49. When the number of data items increases, the data icons must be made smaller or the display area must be made larger. Otherwise, all the data icons cannot be displayed.

Figure 53A:
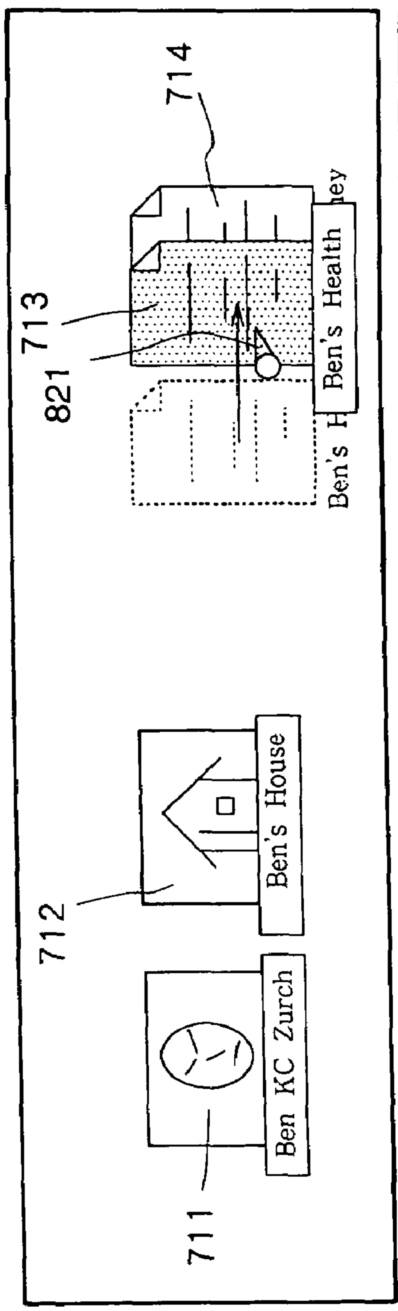
FIGS. 53A to 53C are explanatory diagrams concerning a method of grouping a plurality of data icons in a hierarchical data browser in an embodiment.
Figure 53B:
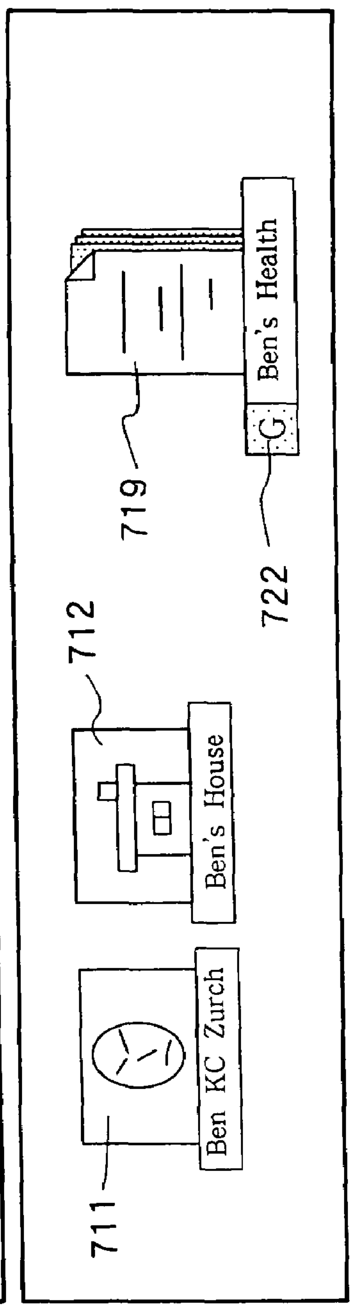
Figure 53C:
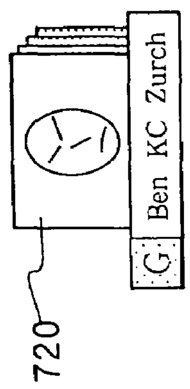

FIGS. 53A to 53C are explanatory diagrams concerning a procedure for grouping a plurality of data icons in a hierarchical data browser of this embodiment.

FIG. 53A shows an operation performed by a user for grouping together the data icon representing data on the property of person A and the data icon 713 representing data on the health of person A. The navigation cursor 21 is used to select the data icon 713 representing data on the health of person A. The data icon 713 is then superposed on the data icon 714 representing data on the property of person A. Thus, the data icon 714 representing data on the property of person A and the data icon 713 representing data on the health of person A are grouped together.

FIG. 53B shows a state in which the data icon 714 representing data on the property of person A and the data icon 713 representing data on the health of person A are grouped together and displayed as a group data icon 719. The group data icon 719 has a group mark 722 indicating that the data icon is produced by grouping data icons together.

The foregoing operation is repeated for the data icon 712 representing image data on the house of person A and the data icon 711 representing portrait image data on person A. As shown in FIG. 53C, four data icons are grouped together and displayed as a group icon 720. An icon picture of a group icon displayed as a representative of the group represents icon picture data superposed last. The operation of grouping is not limited to the means for superposing one data icon on another. Alternatively, a grouping menu (GUI) may be provided for helping a user select an instruction for grouping a plurality of preselected data icons together.

Figure 54:
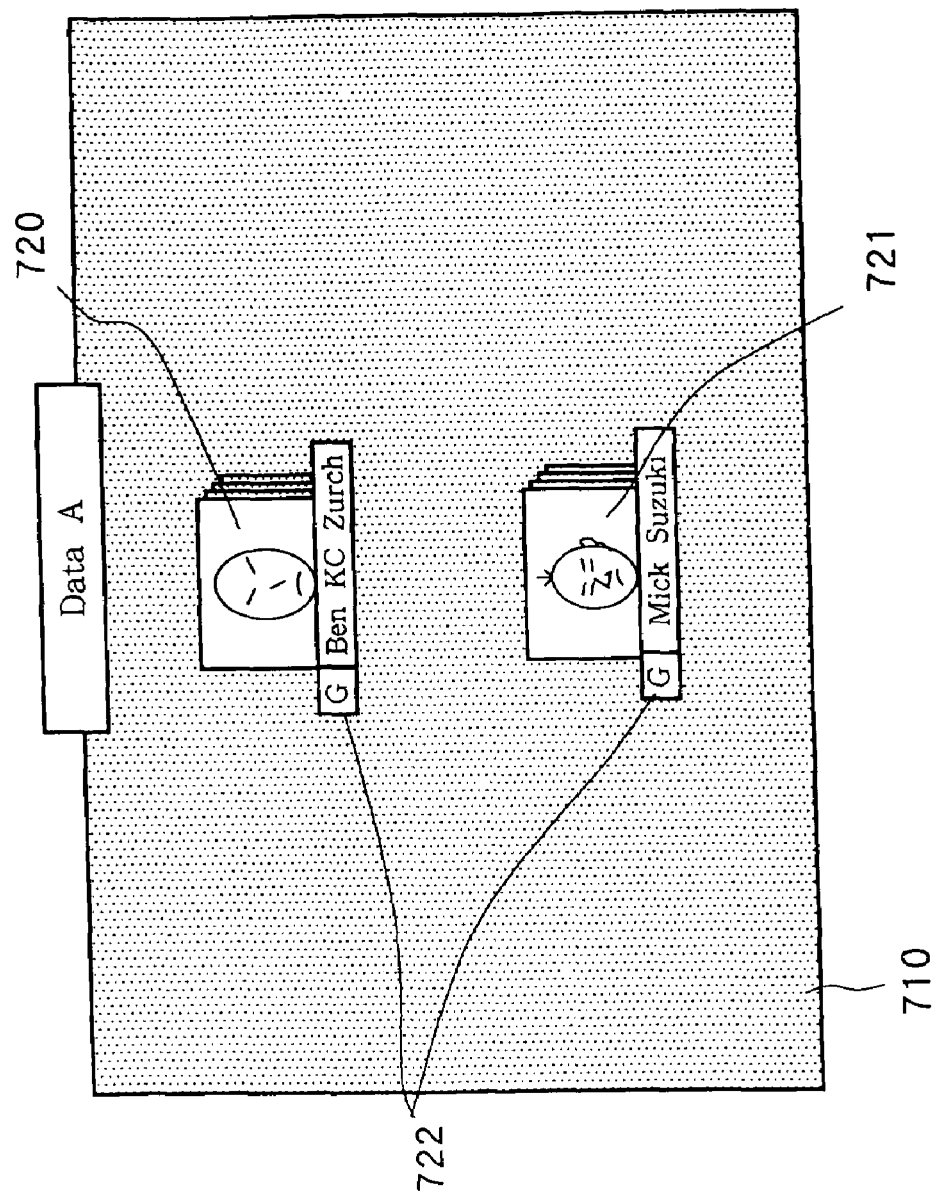
FIG. 54 shows an example of a display in which four high-level data icons shown in FIG. 52 are integrated into one group and four low-level data icons are integrated into one group.

FIG. 54 shows an example of a display in which four data icons set in array on an upper line in FIG. 52 are grouped together and four data icons set in array on a lower line in FIG. 52 are grouped together.

In FIG. 54, reference numeral 721 denotes a group icon produced by grouping together the data icon 715 representing portrait image data on person B, the data icon 716 representing image data on the house of person B, the data icon 717 representing data on the health of person B, and the data icon 718 representing data on the property of person B. Thus, eight data icons are grouped into two icons. A larger number of data items can thus be managed or displayed without the necessity of reducing or enlarging the level display area 710.

Figures 55A, 55B, 55C, 55D:
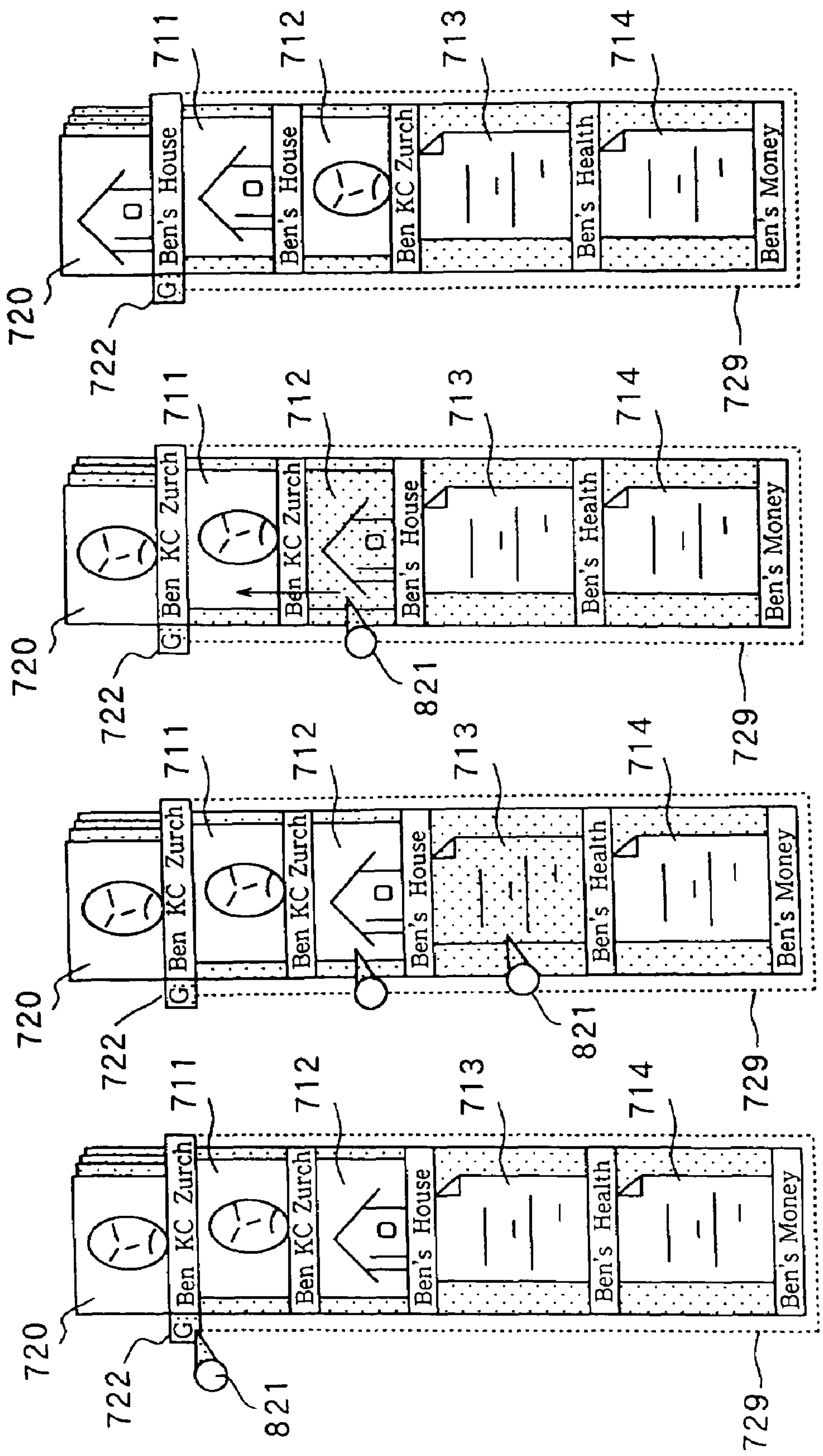
FIGS. 55A to 55D show methods for accessing each of several data icons grouped in an embodiment.

When the navigation cursor 821 is pointed at the group mark 722 shown in FIG. 54 and a mouse button is double-clicked, a data icon list 729 that is a list of data icons grouped together is displayed as shown in FIG. 55A. When the data icon 713 representing data on the health of person A is, as shown in FIG. 55B, designated using the navigation cursor 21 by double-clicking a mouse button, the detailed information of data concerning the health of person A is displayed. For changing an icon picture of a group icon from one picture to another, a data icon whose picture should be a representative of a group is, as shown in FIG. 55C, dragged to the start of the data icon list 729.

Figure 56B:
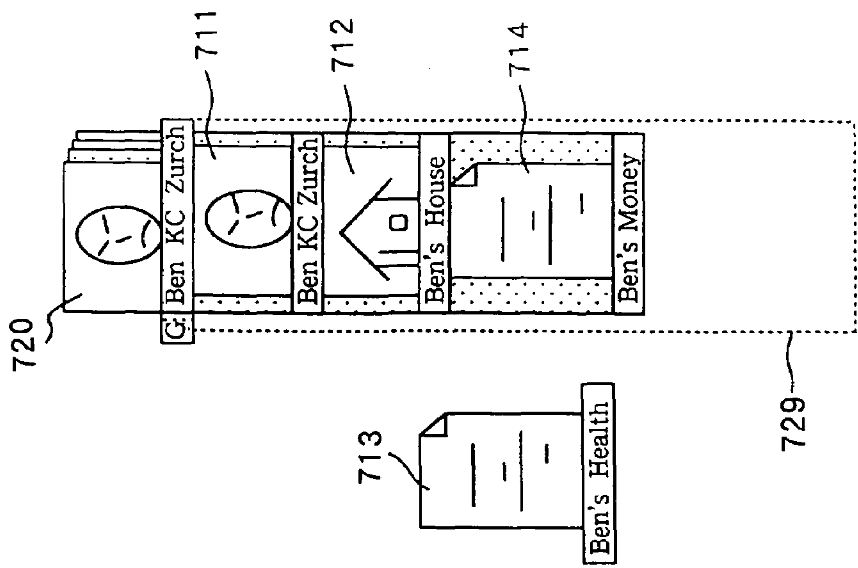
FIGS. 56A and 56B are explanatory diagrams concerning operations for removing data from a group.
Figure 56A:
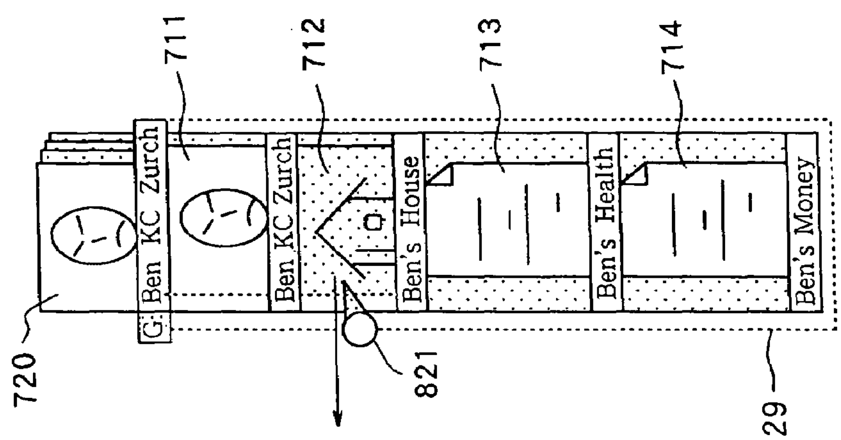

FIGS. 56A and 56B are explanatory diagrams concerning an operation for removing data from a group. As shown in FIG. 56A, data icons grouped are displayed in the form of a list, and the data icon 713 to be removed is selected using the navigation cursor 821 and dragged out of the data icon list 729. The data icon 713 is then removed from the group as shown in FIG. 56B. An instruction for releasing a designated group may be provided in the form of a group release menu (GUI) to be selected by a user.

Figure 57:
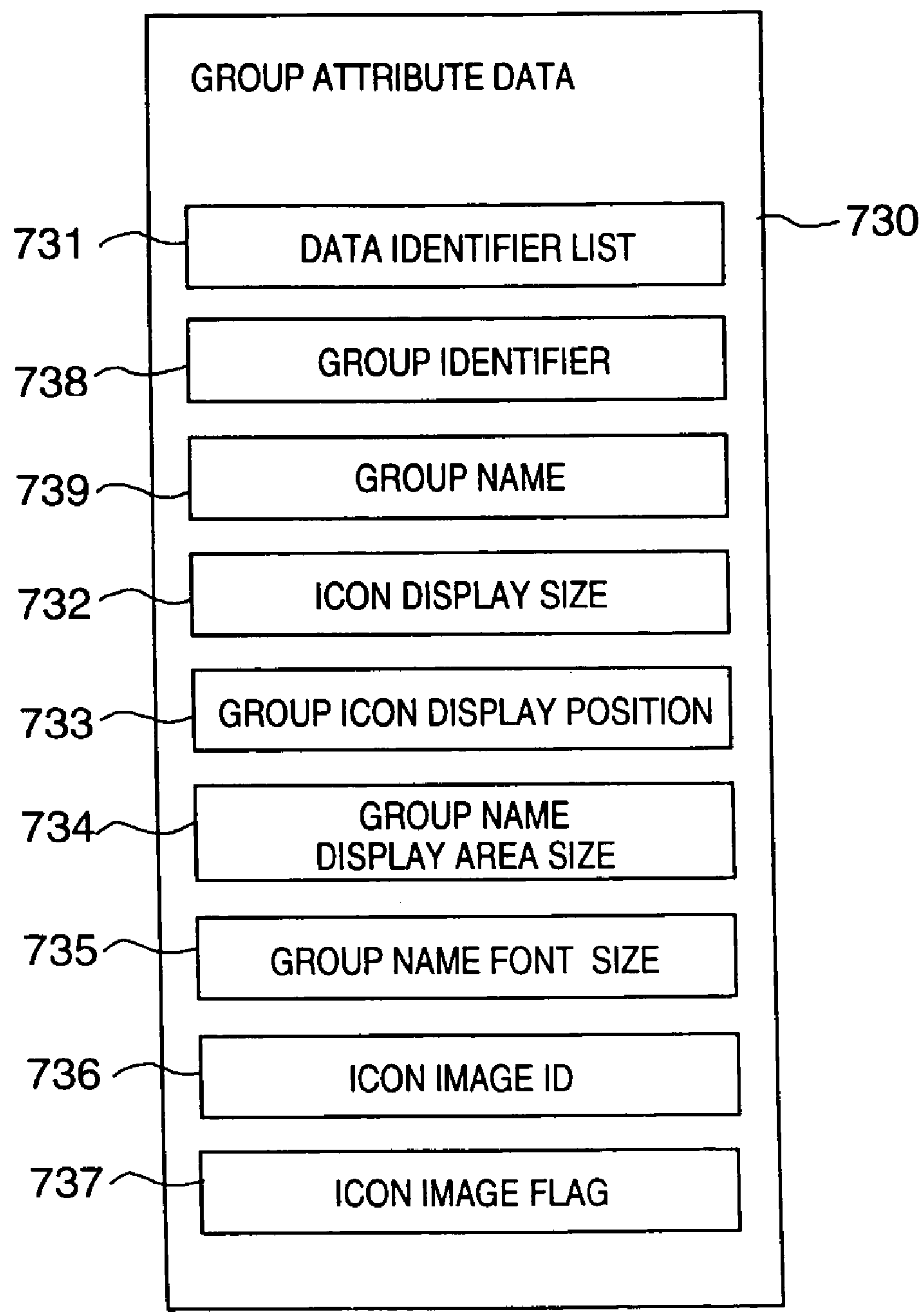
FIG. 57 is an explanatory diagram concerning a data structure of group attribute data used by a level managing means for managing grouped data icons.

FIG. 57 shows a structure of group attribute data used to manage grouped data icons by the level manager/502 shown in FIG. 40.

In FIG. 57, reference numeral 730 denotes-group attribute data. 738 denotes a group identifier for identifying a group uniquely. 739 denotes a group name. 731 denotes a data identifier list in which all data identifiers 611 in FIG. 44 of data items belonging to the group are listed. When the group mark 722 is designated by clicking a mouse button, data icons are displayed in the form of the data icon list 729 shown in FIGS. 55A to 55D in the order in which data identifiers for identifying data items represented by the data icons are registered in the data identifier list 731. 732 denotes an icon display size for a group icon. 733 denotes a group icon display position. 734 denotes a group name display area size. 735 denotes a group name font size. 736 denotes an icon picture ID. Any of icon picture IDs 624 associated with data items whose data identifiers are registered in the data identifier list 731 is specified as the icon picture ID 736. 737 denotes an icon picture display flag. When the icon picture display flag 737 is set to a true state, an icon picture is displayed. When it is set to a false state, no icon picture is displayed.

Figure 58:
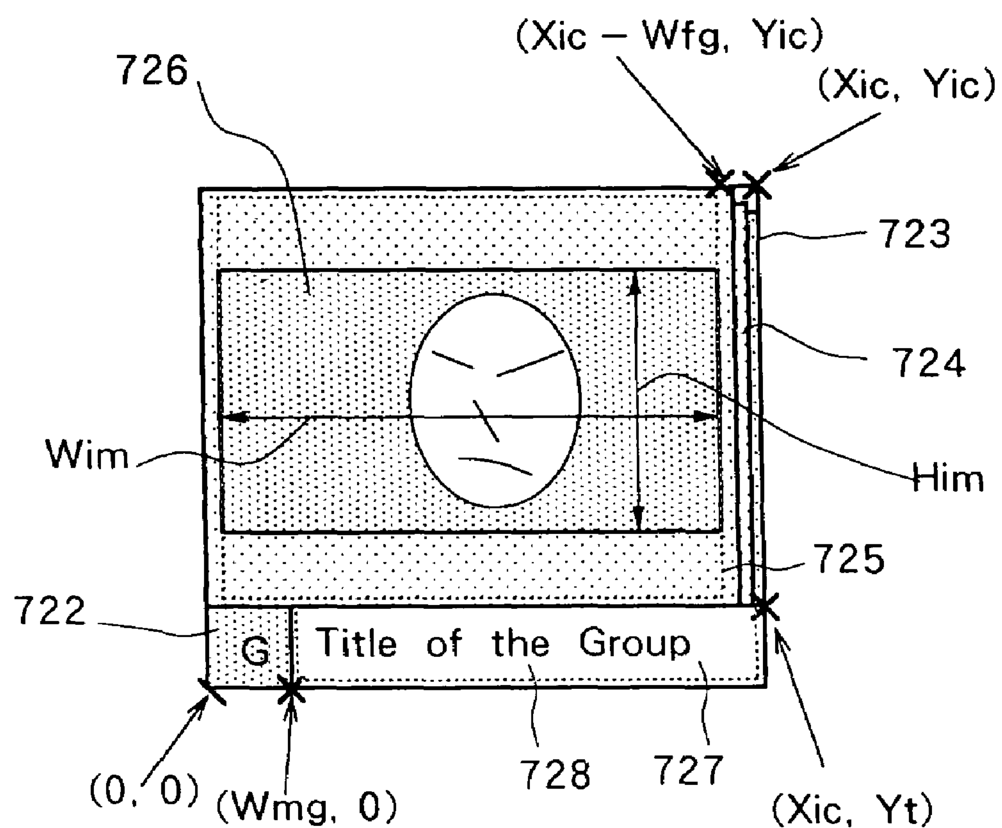
FIG. 58 is an explanatory diagram concerning the components of a group icon.

FIG. 58 is an explanatory diagram concerning the structure of a group icon.

In FIG. 58, reference numeral 723 denotes a display area for a whole group icon. The display area 723 is a rectangle defined, similarly to a display area for data icons, with an origin (0, 0) and coordinates ($X_{ic}$, $Y_{ic}$) where $X_{ic}$ denotes a width of a group icon and $Y_{ic}$ denotes a height thereof, and has a size specified with an icon display size 732. 724 denotes a background pattern of an icon picture display area for a group icon. A background pattern is drawn in such a way as to make it discernible that icons are grouped. 725 denotes an icon picture display area in which an icon image identified with an icon picture ID 736 is displayed. The icon picture display area 725 has a width calculated by subtracting the $W_{fg}$ value from the $X_{ic}$ value for fear the background pattern 724 be covered entirely. 726 denotes an icon picture display area. Assuming that an original of an icon picture is $W_{imorg}$ wide and $H_{imorg}$ high, the icon picture is enlarged or reduced to have a width $W_{im}$ and height $H_{im}$ so that the icon picture can be fitted in the icon picture display area 726.

Reference numeral 722 denotes a group mark that is displayed in an area having a width $W_{mg}$. 727 denotes a group name display area that is a rectangle defined with coordinates ($W_{mg}$, 0) and ($X_{ic}$, $Y_t$), and has a size specified with a group name display area size 734. 728 denotes a group name display visualizing a group name 739. When a group name is not designated in particular, a data name associated with a leading data identifier listed in the data identifier list 731 is displayed in the group name display area. After grouping is performed, if a group name is designated, the designated group name is set as a group name 739 and displayed in the group name display area. When the whole of a group name cannot be displayed in the group name display area 727, leading characters of the group name are displayed by the number of characters that can be displayed. A symbol " . . . " indicating that the group name continues is appended to the end of the characters.

Display or non-display of a group name and icon picture is controlled by the processing similar to the one described in FIG. 47. When data items are, as shown in FIGS. 53A to 53C, grouped together initially, group attribute data 730 shown in FIG. 57 is created by the level manager/502 shown in FIG. 40. When the group is released or the last data is removed from a group, the group attribute data 730 is deleted.

As described so far, according to this embodiment, an overall structure of a file system or data base having a hierarchical structure can be grasped intuitively owing to a display in the form of a Venn diagram. Data items belonging to child levels are not hidden but displayed in the form of reduced images. This makes it easier to locate an intended data.

As for lower levels, data items are displayed in reduced form. A deep hierarchical structure can be displayed within a screen of a limited area. Owing to a zoom-in means, a level display area for an intended level can be zoomed in in order to specify a data item belonging to the level. This obviates the necessity of tracing levels step by step. Detailed information concerning an intended level can be observed quickly. Even when a desired data item is of a low level, if a data icon representing the data item can be identified, the detailed information of the data can be acquired by designating the data icon directly at a root level.

By contrast, when a zoom-out means is used, the summary of a hierarchical structure viewed from a high level can be acquired easily. Data items belonging to a higher level can be accessed effortlessly.

Owing to a hierarchical depth indicator indicating the hierarchical depth of a level currently zoomed in, a hierarchical-depth can be grasped intuitively during navigation.

A level display areas for the same hierarchical depth is painted in the same color. As the hierarchical depth increases, a deeper-tone color is used. This results in a display providing depth perception in which a display area for the largest hierarchical depth is seen lying farthest.

When a display area allocated to one data icon is large, an icon picture and data name are displayed with large sizes. When a display area allocated to one data icon is small, an icon picture and data name are made small to such an extent that the icon picture and data name are discernible. When a display area allocated to one data icon is smaller, a data name is not displayed but an icon picture alone is displayed so that the data item represented by the data icon can be recognized. When a display area allocated to one data icon is much smaller, only the frame of the data icon is displayed so that the presence of the data item represented by the data icon can be recognized. Thus, data recognition is supported according to the size of a display area.

When an available memory is small, it may be preprogrammed that unless an area allocated to one data icon has a certain size, the icon picture of the data icon is not displayed. This is effective in saving a memory capacity.

A means is provided for grouping together a plurality of data icons representing data items and displaying them as a group icon. This enables management of a large number of data items within a narrow display area.

Fourth Embodiment

Figure 61:
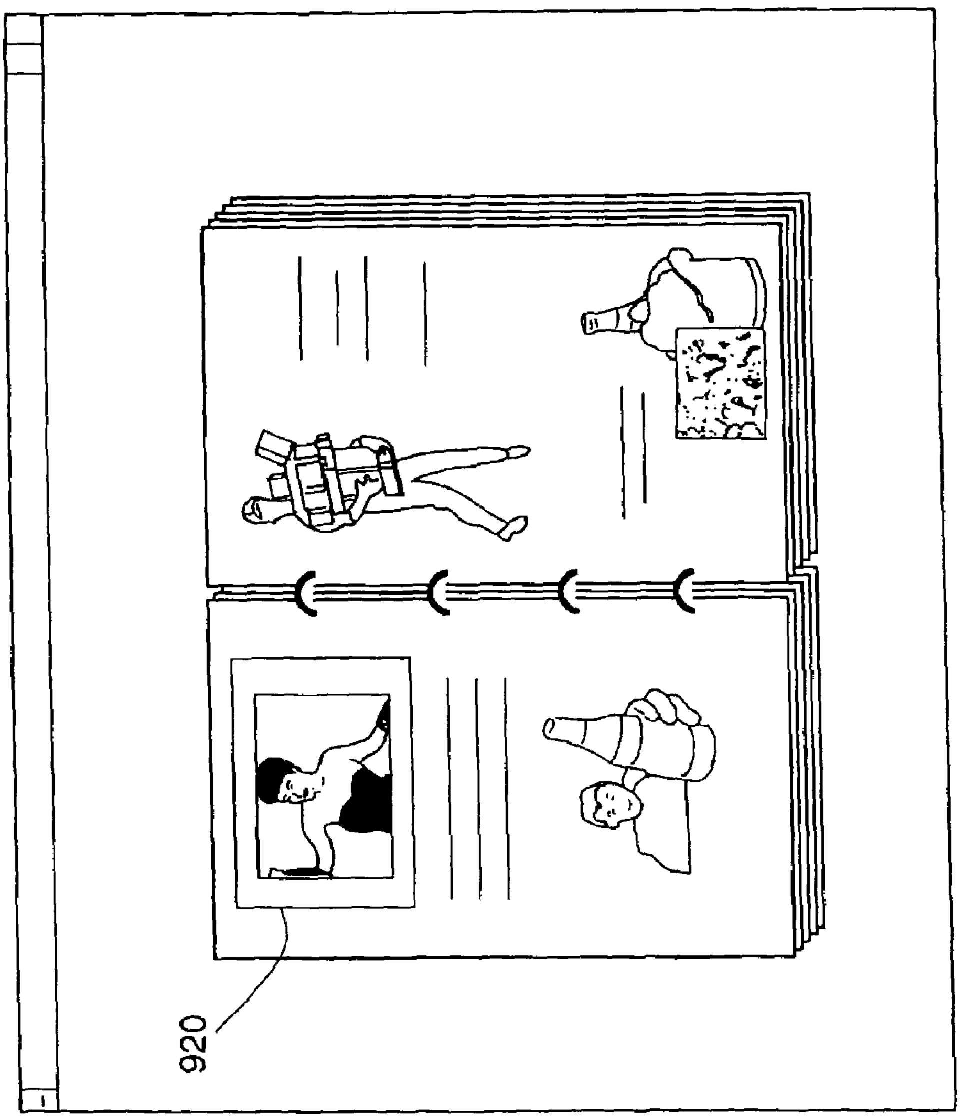
FIG. 61 shows an example of a display screen of album software in the fourth embodiment.
Figure 63:
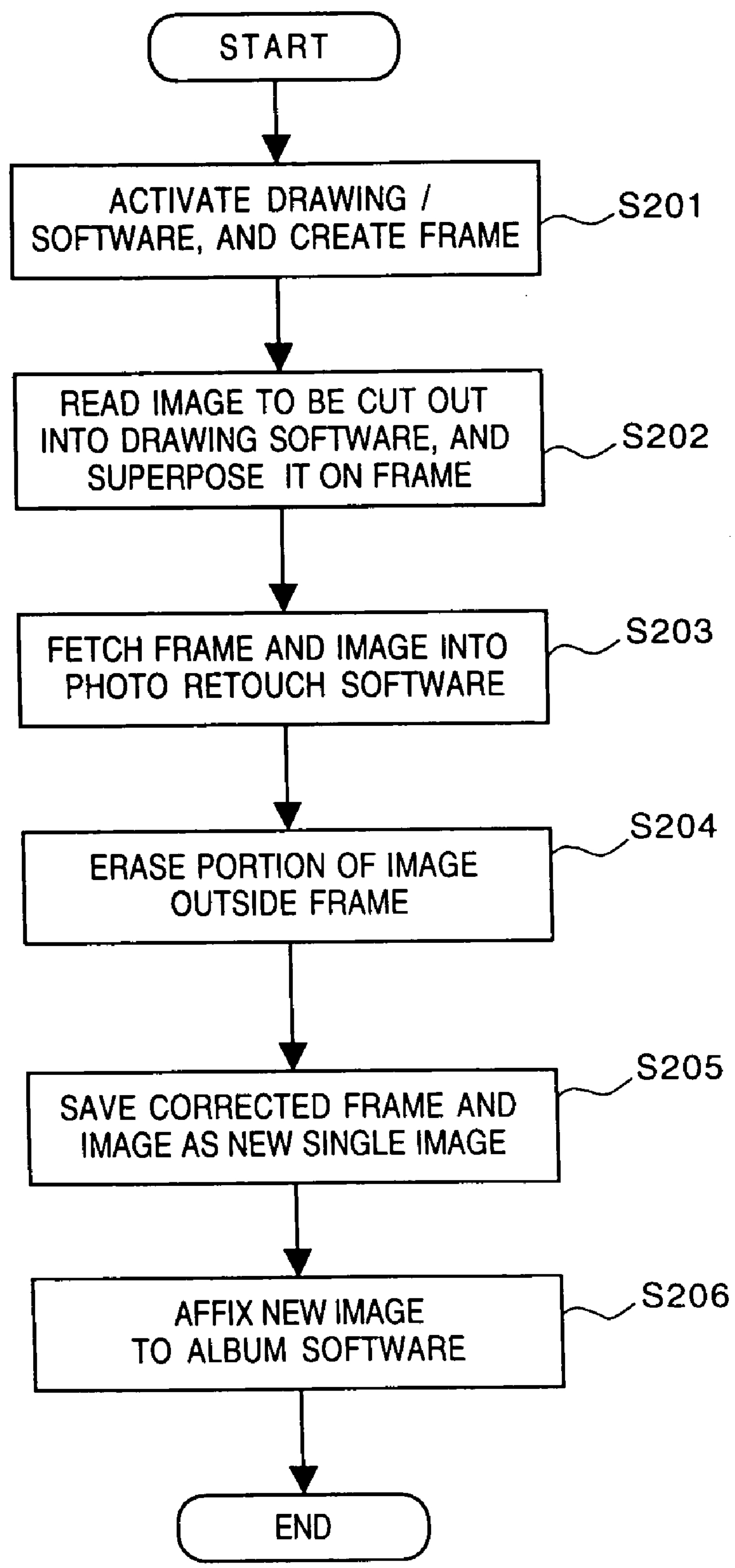
FIG. 63 is a flowchart describing a procedure for cutting out an image using known software.
Figure 64:
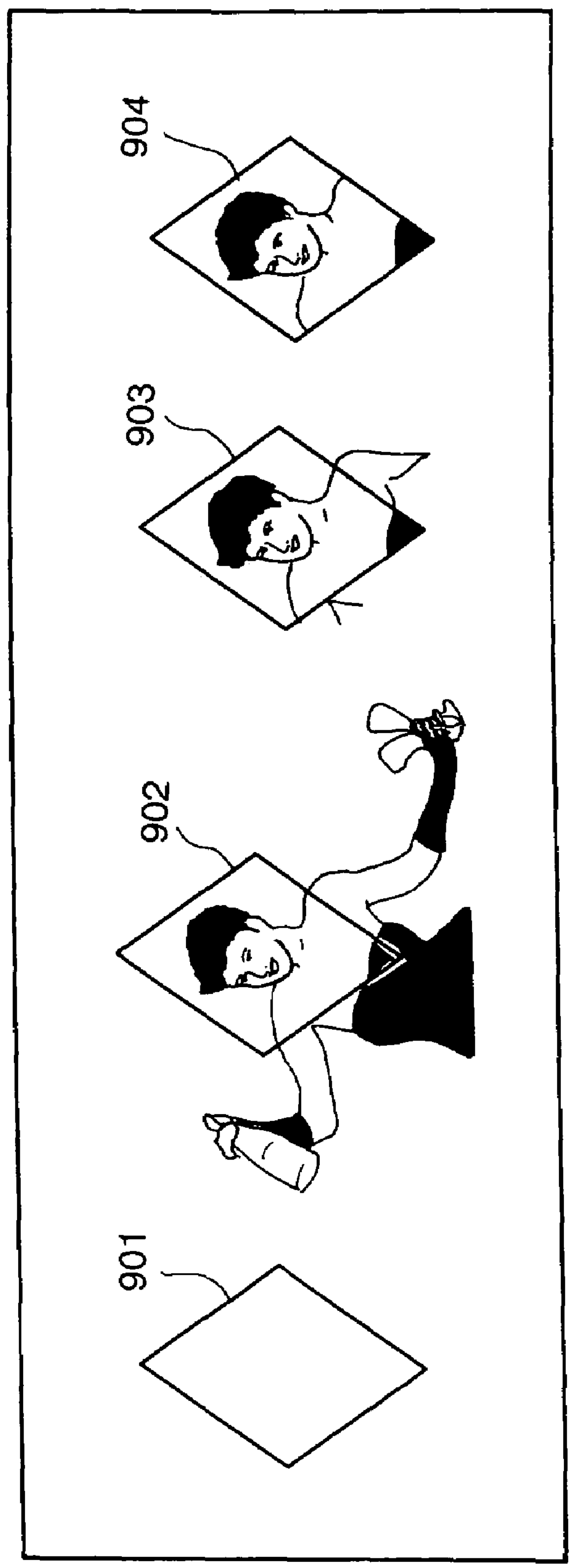
FIG. 64 shows a known example of producing a cutout of an image.

FIG. 61 shows an example of a display screen of album software of the fourth embodiment.

Figure 65:
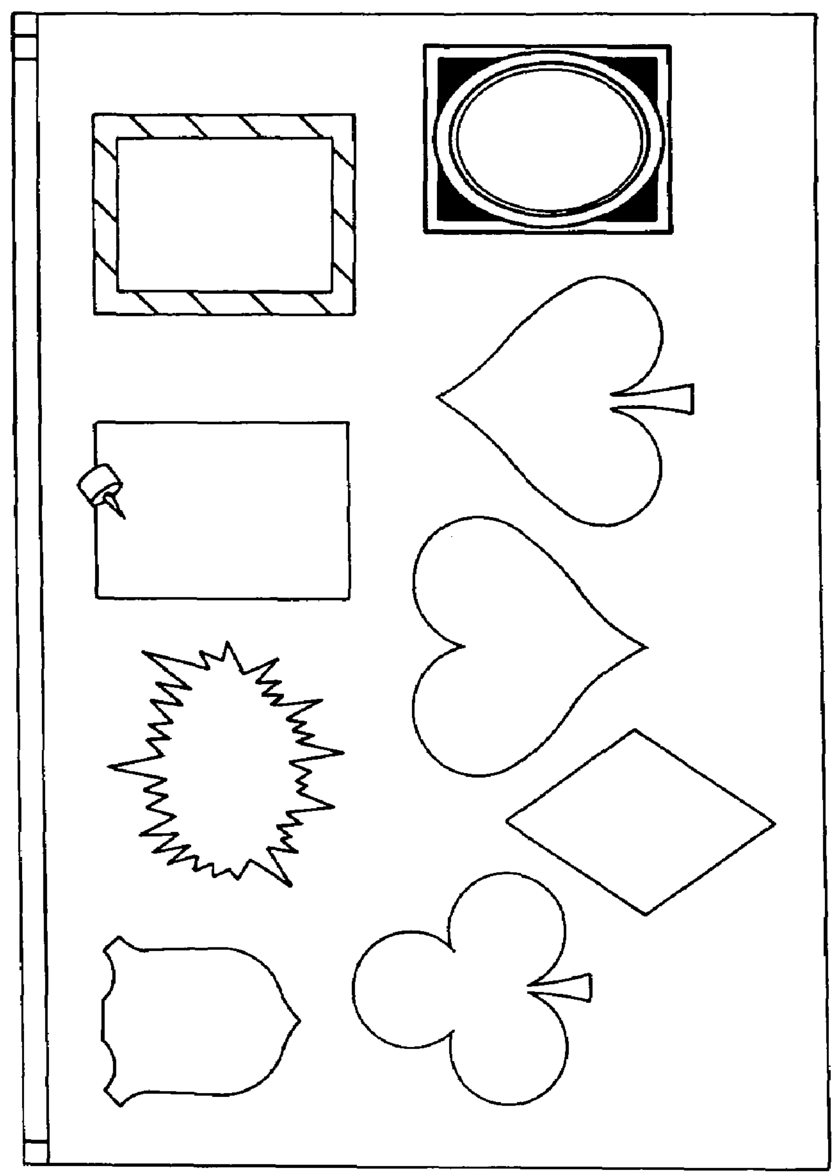
FIG. 65 shows an example of a palette in which frames are registered in the fourth embodiment.

As shown in FIG. 61, images are affixed to each page of an object looking like an album, and the images are accompanied by comments. In this album software, browsing in which pages are turned one by one is a basic operation for retrieval. A free keyword that is not shown can be appended to an image. In retrieval using the free keyword, a page containing an image concerned can be turned automatically. Reference numeral 920 denotes a state in which an image is cut out according to this embodiment. In this example, a square is a frame. An image within the frame is visualized. This frame is registered in a palette window shown in FIG. 65. Any frame is selected from the palette window in order to cut out an image.

<Example of the Configuration of a Picture Management System>

FIG. 39 shows an example of the configuration of a personal computer system serving as a platform in which this embodiment is implemented.

In FIG. 39, reference numeral 301 denotes a main unit of a computer system. 302 denotes a display for displaying data. 303 denotes a mouse typical of a pointing device. 304 denotes a mouse button. 305 denotes a keyboard.

FIG. 75 shows the configuration of a hierarchical data management system including software and hardware.

In FIG. 75, similarly to FIG. 2, reference numeral 509 denotes hardware. 505 denotes an operating system (OS) operating on the hardware 509. 504 denotes application software running under the OS 505. Some of blocks constituting the hardware 509 and OS 505 which are components but not needed directly in describing this embodiment are not illustrated. The unshown blocks constituting the hardware include a CPU and memory, and those constituting the OS include a memory management system.

In FIG. 75, reference numeral 515 denotes a hard disk for physically storing files and data items. 508 denotes a file system constituting the OS. The file system 508 has the ability to enable application software to input or output a file without any awareness of the hardware. 514 denotes a disk I/O interface for allowing the file system 508 to read or write data from or in the hard disk 515. 507 denotes a drawing management system constituting the OS. The drawing management system 507 has the ability to enable application software to perform drawing without any awareness of the hardware.

Reference numeral 513 denotes a video interface for allowing the drawing management system 507 to perform drawing on the display 302. 506 denotes an input device management system constituting the OS. The input device management system 506 has the ability to enable application software to receive a user input without any awareness of the hardware. 510 denotes a keyboard interface for allowing the input device management system 506 to receive an input from the keyboard 305. 512 denotes a mouse interface for allowing the input device management system 506 to receive an input from the mouse 303. 2502 denotes a frame managing module for registering or managing frame data in a palette. 2503 denotes a display module for displaying a cutout image by superposing frame data on an image.

<Example of a Data Structure>

(Frame Data)

Figure 68:
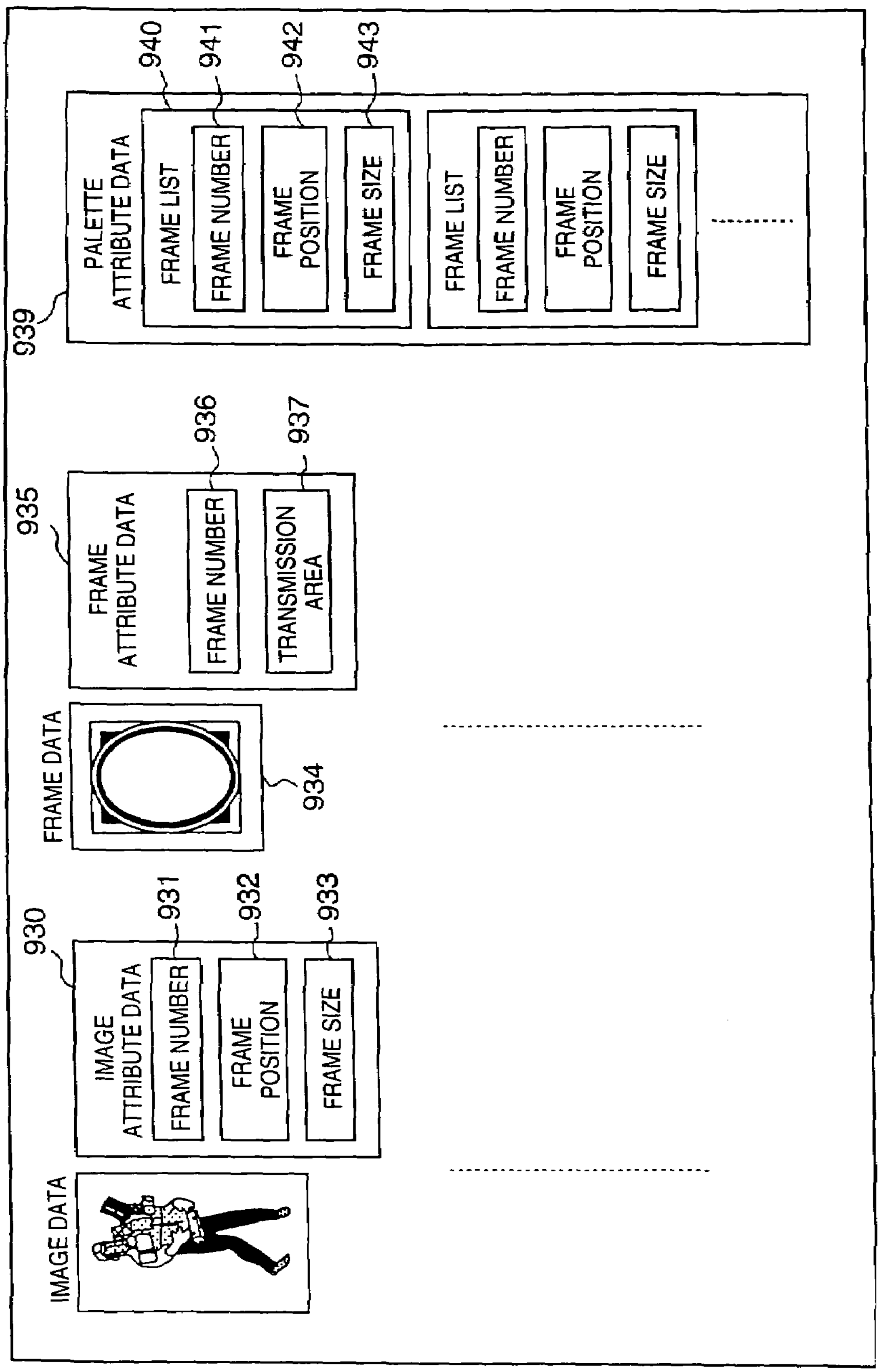
FIG. 68 shows a data management structure in the fourth embodiment.

In FIG. 68, reference numeral 934 denotes frame data.

The frame data is not bit-map data but a set of functions expressing a straight line and curves. The frame data is standard data available under an OS. For example, Windows of MicroSoft supports what is called a meta-file. A drawing facility included in the album software of this embodiment can create the meta-file. Drawing software that runs under the Windows OS can create a meta-file. Unlike the bit-map data, the meta-file that is expressed with drawing functions will not be degraded in quality by re-sizing. The meta-file can therefore be re-sized freely.

Reference numeral 935 denotes frame attribute data.

The frame attribute data is provided in one-to-one correspondence to frames 934. A frame number 936 included in the frame attribute data 935 is a number assigned to a frame when the frame is registered in a palette. In the album software of this embodiment, the frame number points out frame data 934 uniquely. The outside of a transparent area 937 included in the frame attribute data 935 is a hiding area, or in other words, an area of an image on which a frame is superposed. A transparent area is designated by a user when frame data is registered in the palette.

FIG. 69 is a flowchart describing a sequence for setting a transparent area 937 in the frame attribute data 935.

Step S250 means that a loop for waiting for an event request to be issued to a program is entered. When an event occurs, control is passed to step S251. At step S251, it is judged whether a frame should be registered in the palette. When a frame is registered in the palette, control is passed to step S260. Otherwise, another event is handled at step S259, and then control is returned to step S250. An event for registering a frame in the palette occurs when a user presses a mouse button with frame data designated, moves the frame data to the palette window as it is, and releases the mouse button at any position within the palette window. This operation is referred to as a drag & drop.

At step S260, frame attribute data 935 in FIG. 68 associated with a frame is retrieved. The frame attribute data 935 is produced relative to frame data at a time instant when a frame is created within this album software or when a graphic created by another drawing software is fetched as a frame into this album software. The frame attribute data 935 is then specified in an empty frame attribute data field. At step S252, it is checked if a transparent area 937 has not been set in the frame attribute data 935. If it has not been set, control is passed to step S255. If it has been set, control is passed to step S253. An inquiry box (dialogue box) is visualized for a user. It is inquired whether the user wants to modify the designation of a transparent area 937. At step S254, a response to the inquiry is waited. If the designation is modified, control is passed to step S255. If it is not modified, transparent area setting is skipped. Control is passed to step S258 for palette registration that will be described later.

Figure 70:
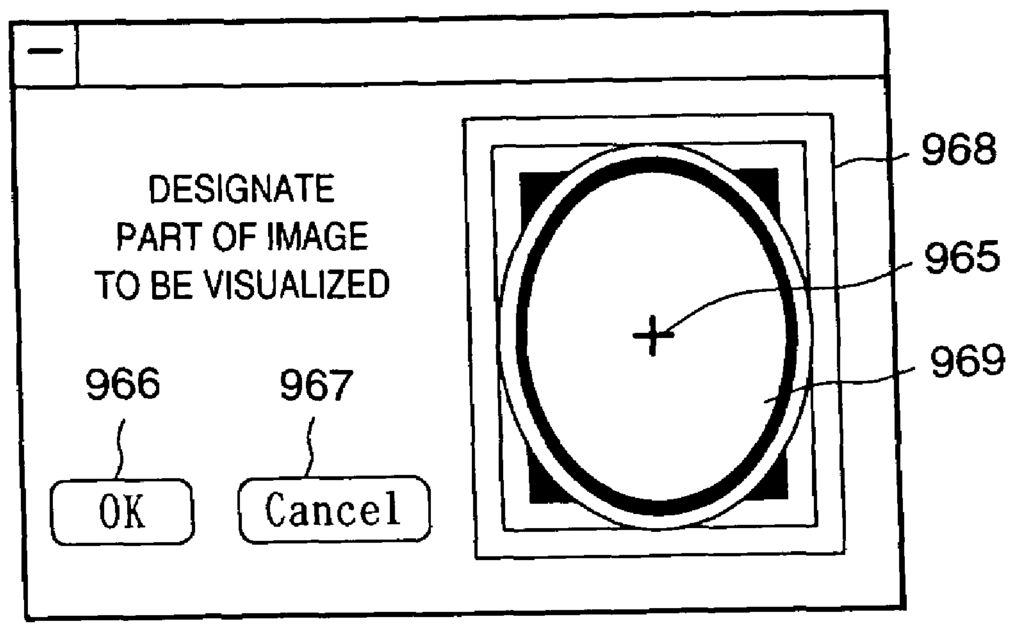
FIG. 70 shows an example of a dialogue box for setting a transparent area in the fourth embodiment.

At step S255, the dialogue box shown in FIG. 70 is displayed in order to prompt a user to designate a point within a transparent area. In FIG. 70, reference numeral 968 denotes a frame display area in which a frame currently being registered is displayed. A cursor 965 is displayed on the center of the frame display area 968. A user can move the cursor 965 to any position using the mouse or arrow keys. When an OK button 966 is pressed, the setting is validated and finalized. When a Cancel button 967 is pressed, the setting is invalidated.

The description of FIG. 69 will be resumed. At step S261, it is checked which of the OK button or Cancel button is pressed. When the Cancel button is pressed, the setting is invalidated. The processing is therefore terminated. Control is returned to step S250. When the OK button is pressed, control is passed to step S256. At step S256, based on frame data and a position designated by a user, a minimum graphic containing the position is drawn. When the cursor is positioned as shown in FIG. 70, a transparent area is an innermost ellipse containing the cursor. At step S257, the minimum graphic is set as a transparent area 937. Thus, the setting of a transparent area 937 is terminated. Step 258 is registration of a frame in the palette which will be described below.

(Palette Attribute Data)

Registering a frame in a palette attribute data field 939 in FIG. 68 will be described. FIG. 71 is a flowchart describing the sequence. Steps S271 to S278 correspond to step S258 in FIG. 69. Step S270 is the foregoing transparent area setting.

When the aforesaid setting of a transparent area 937 of step S270 is completed, a frame number 936 is retrieved from the frame attribute data field 935 in FIG. 68 at step S271. At step S272, it is checked if the frame number has not been set. If the frame number has not been set, it should be registered newly. Control is therefore passed to step S274. If the frame number has been set, it is already registered. A message saying that the frame number has already been registered is visualized for a user at step S273. The processing is terminated.

At step S274, a frame list 940 is newly created in the palette attribute data field 939 because of new registration. After the frame list 940 is newly created, a unique number is set as a frame number 941 at step S275. The unique number is a number that is not a duplicate of a frame number being used in any of existing frame lists. At step S276, the same numerical value as the frame number 941 is set as a frame number 936 in the frame attribute data field 935. At step S277, a position of a frame and a size of a display resulting from a drag & drop are retrieved. At step S278, the position and size are set as a frame position 942 and frame size 943. Thus, registration in a palette is completed.

(Picture Data)

Figure 73:
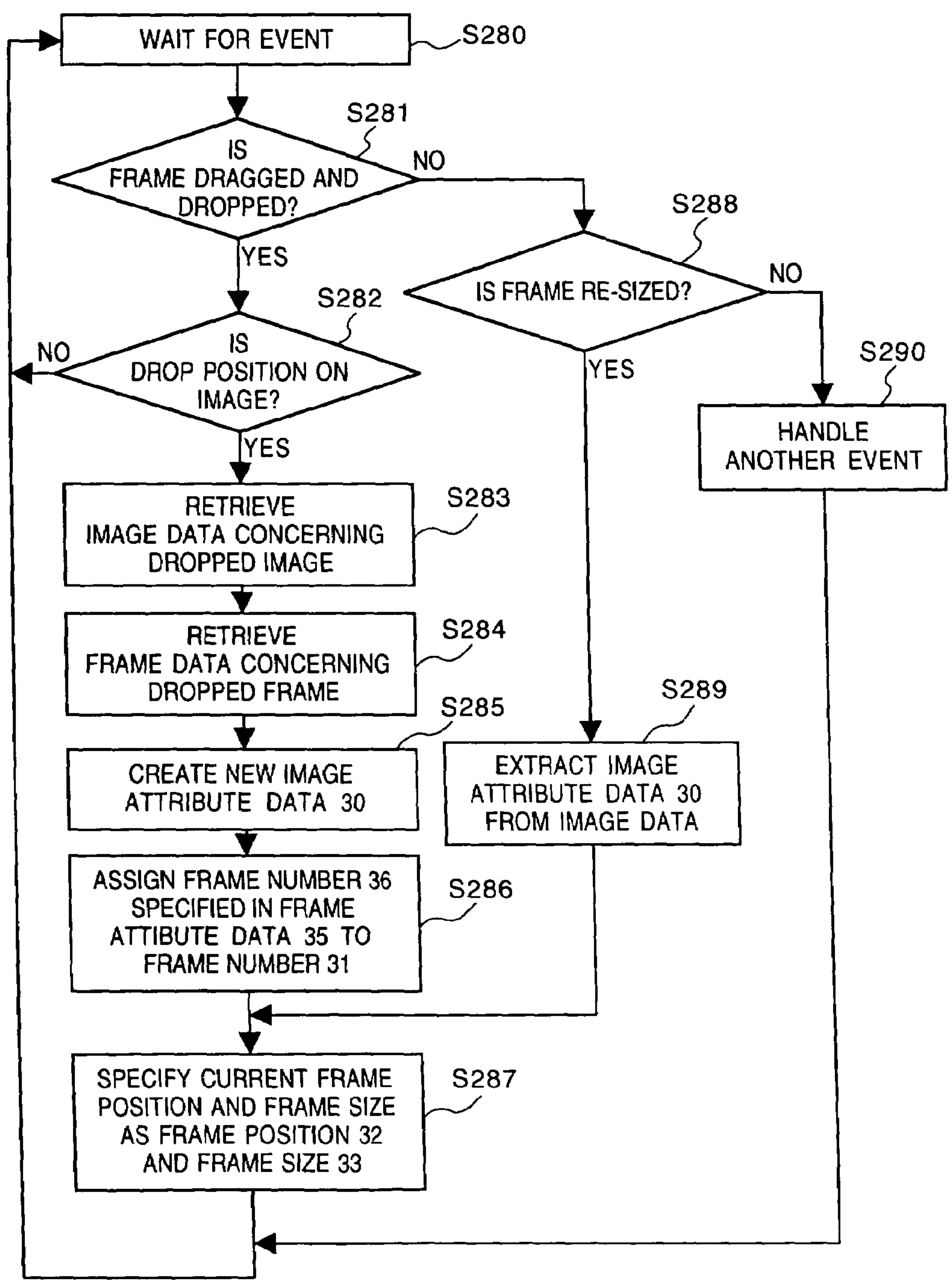
FIG. 73 is a flowchart describing a sequence for registering frame data for an image in the fourth embodiment.

FIG. 73 is a flowchart describing registration of frame data as picture attribute data 930 in FIG. 68.

At step S280, an event is waited. At step S281, the contents of the event are judged. If the event is a drag & drop of a frame, control is passed to step S282. At step S282, it is checked if the position of the frame dragged from the palette window and then dropped is on an image. If the position is not on an image, the processing is terminated.

When the position is on an image, the image data is retrieved at step S283. The frame data is retrieved at step S284. At step S285, image attribute data 930 associated with the image data, which is shown in FIG. 68, is created newly. At step S286, a frame number 936 specified in the frame attribute data field 935 is copied as a frame number 931 into the image attribute data field 930. Thus, a frame number is used to associate image data with frame data.

At step S287, current position information and size information concerning the frame are stored as a frame position 932 and frame size 933 respectively. At step S288, it is judged whether a re-sizing event occurs. If a frame re-sizing event occurs, control is passed to step S289. The image attribute data 930 is extracted from the image data. Control is then passed to step S287, and the current position and size are stored. When a re-sizing event does not occur, another event is handled at step S290. The processing is terminated.

<Example of a Sequence in this Embodiment>

(Picture Cutout)

A sequence for selecting a frame for an image from the palette, superposing the frame on the image, and then cutting out the image will be described. First, an example of an operating procedure performed on an example of a screen shown in FIGS. 72A and 72B will be described.

Figure 72A:
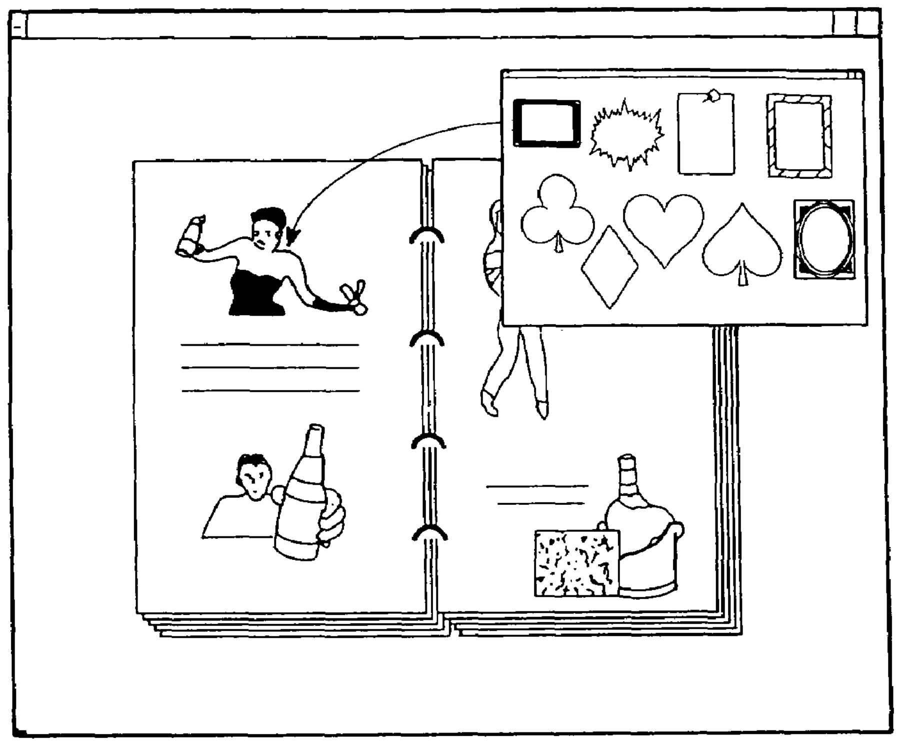
FIGS. 72A and 72B show examples of operations for cutting out an image in the fourth embodiment.

As shown in FIG. 72A, a user selects any frame from the palette window, and drags and drops it on any image on an album page. The selected frame is then placed on the image with the size of the frame in palette window unchanged. A shown in FIG. 72B, part of the image inside a transparent area is still visible but part thereof outside the transparent area becomes invisible.

The next user' operation is to re-sizing the frame to a desired size. First, The user presses a mouse button with a cursor on the frame, and drags the frame (moves the mouse with the mouse button held down) so that the center of the transparent area will align with the center of part of the picture that should be visible.

Figure 72B:
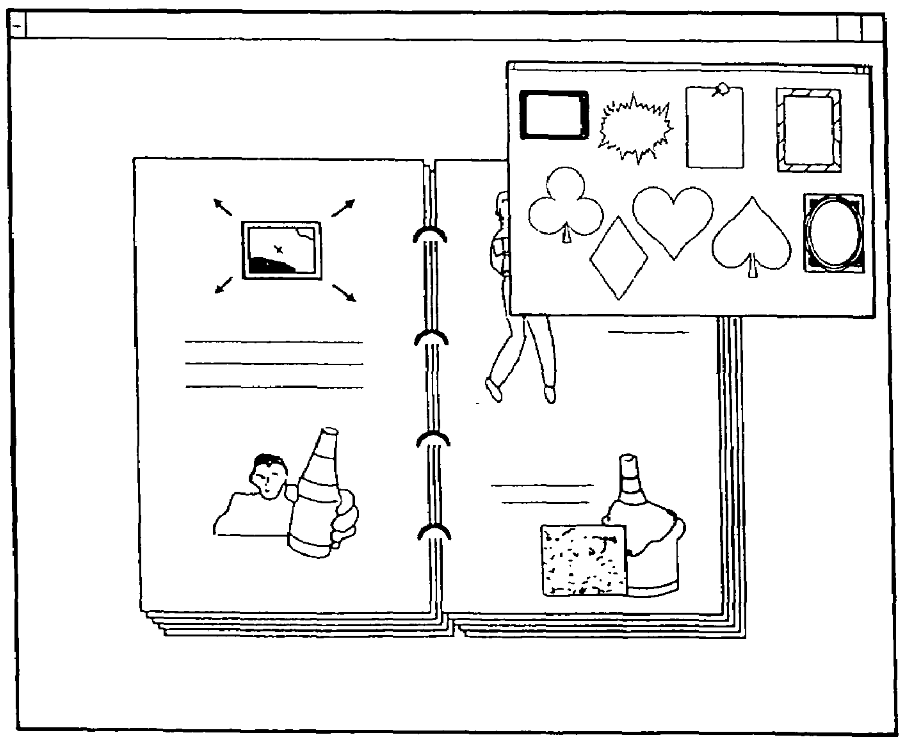

As shown in FIG. 72B, a black square is displayed on an edge of a frame selected in the same manner as it is in general drawing software. The black square is dragged in order to re-size the frame. The re-sizing is achieved with the center of the transparent area fixed and the aspect ratio unchanged (equal enlargement sideways and lengthwise), whereby a frame is made larger or smaller as a whole. In default re-sizing mode supported by drawing software or the like, the black square dragged by a user remains unchanged, while a square diagonal to the black square is fixed. For example, when a lower right corner of a square is dragged using the mouse, re-sizing is achieved with an upper left corner fixed (immobilized). This embodiment does not adopt this mode, because re-sizing performed with the center of a transparent area fixed is more suitable for fitting a picture in the transparent area. Thus, the operation is carried out. The resultant state is indicated with reference numeral 920 in FIG. 61.

FIG. 74 is a flowchart describing a sequence for displaying an image cutout state relative to image data and frame data that are registered and managed.

At step S300, an event is waited. When a display update event occurs, control is passed from step S301 to S302. The processing described below is then performed on all images to be displayed, or in other words, on all images prior to an image display end.

First, at step S303, it is checked if image attribute data associated with an image to be displayed is present. When image attribute data is present, a frame is superposed on the image. Control is therefore passed to step S304. At step S304, frame attribute data 935 having the same frame number 936 as the frame number 931 specified in the image attribute data is retrieved. A transparent area 37 is retrieved at step S305. Based on the frame size 933 and transparent area 937, an area of the image to be visualized (displayed) is defined at step S306. At step S310, the frame associated with the frame data is drawn at a frame position 932 with a frame size 933. With this processing, display of a cutout state of an image is completed.

If it is found at step S303 that no image attribute data is present, normal image display should be executed. All image data items are visualized at step S308. The processing is then completed. If it is found at step S301 that display update is not designated, control is passed to step S309. Another event is then handled, and the processing is terminated.

(Overall Operating Procedure)

Figure 66:
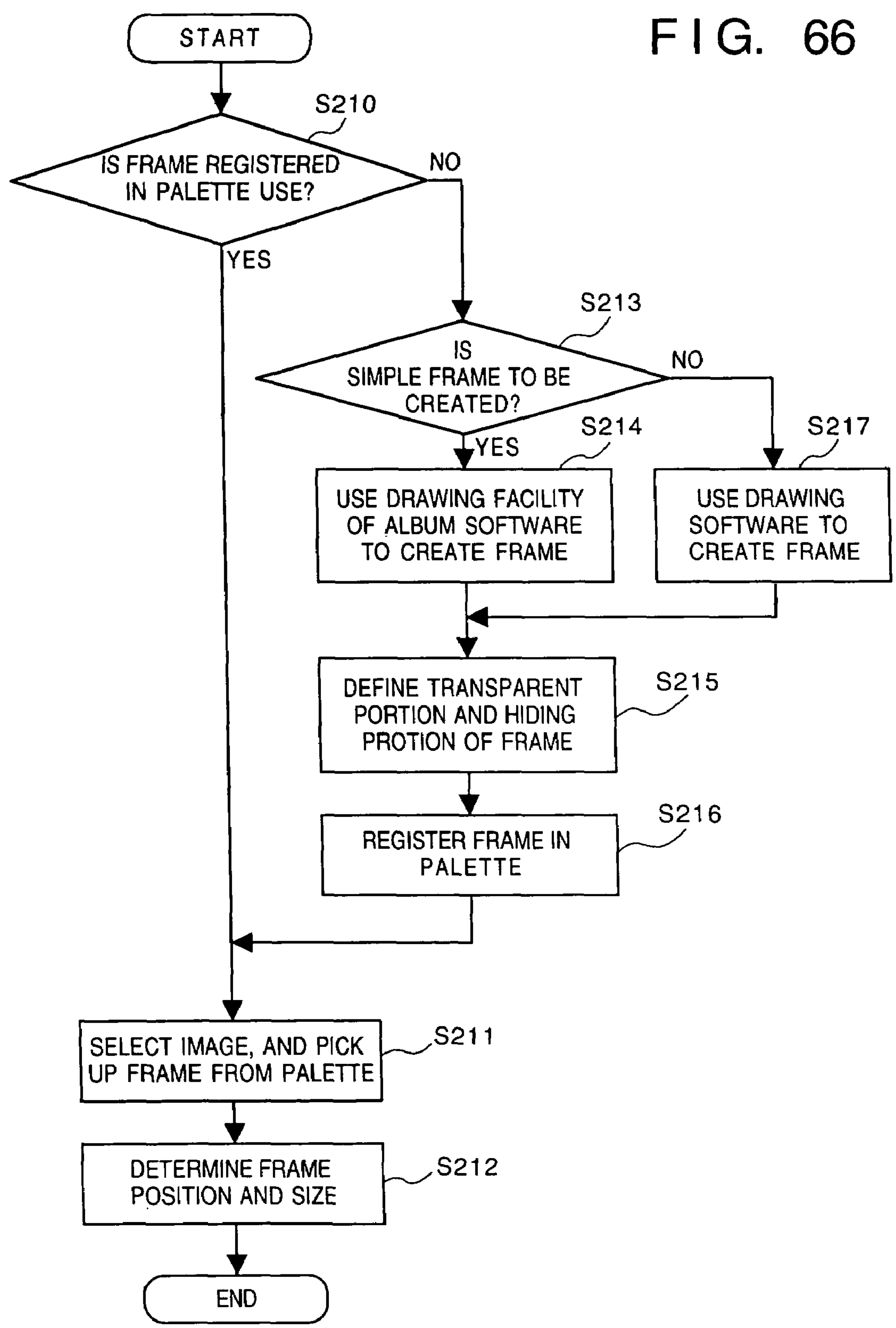
FIG. 66 is a flowchart describing a procedure for cutting of an image in the fourth embodiment.

FIG. 66 describes an overall operating procedure of this embodiment.

At step S210, it is checked if a frame registered in the palette is used. If a frame registered in the palette is used, control is passed to step S211. A frame and a picture to be manipulated are selected. At step S212, a position and size of the frame are designated. Thus, the operating procedure is completed. Owing to the palette in which frames are registered, processing can be executed easily.

For creating a new frame, control is passed to step S213. The album software of this embodiment has a simple drawing facility. For creating a frame of a simple shape, the facility of the album software is used to create the frame at step S214. For creating a frame of a more complex shape, drawing software is activated at step S217. At step S215, a transparent portion (inside) and hiding portion (outside) of the created frame are defined. Depending on the shape of the frame, the outside and inside may not be distinguished clearly. A creator designates the portions explicitly. After the frame is registered in the palette at step S126, control is passed to the aforesaid steps S211 and S212.

(Comparing a Cutout Image of this Embodiment with the One of a Prior Art)

Figure 67:
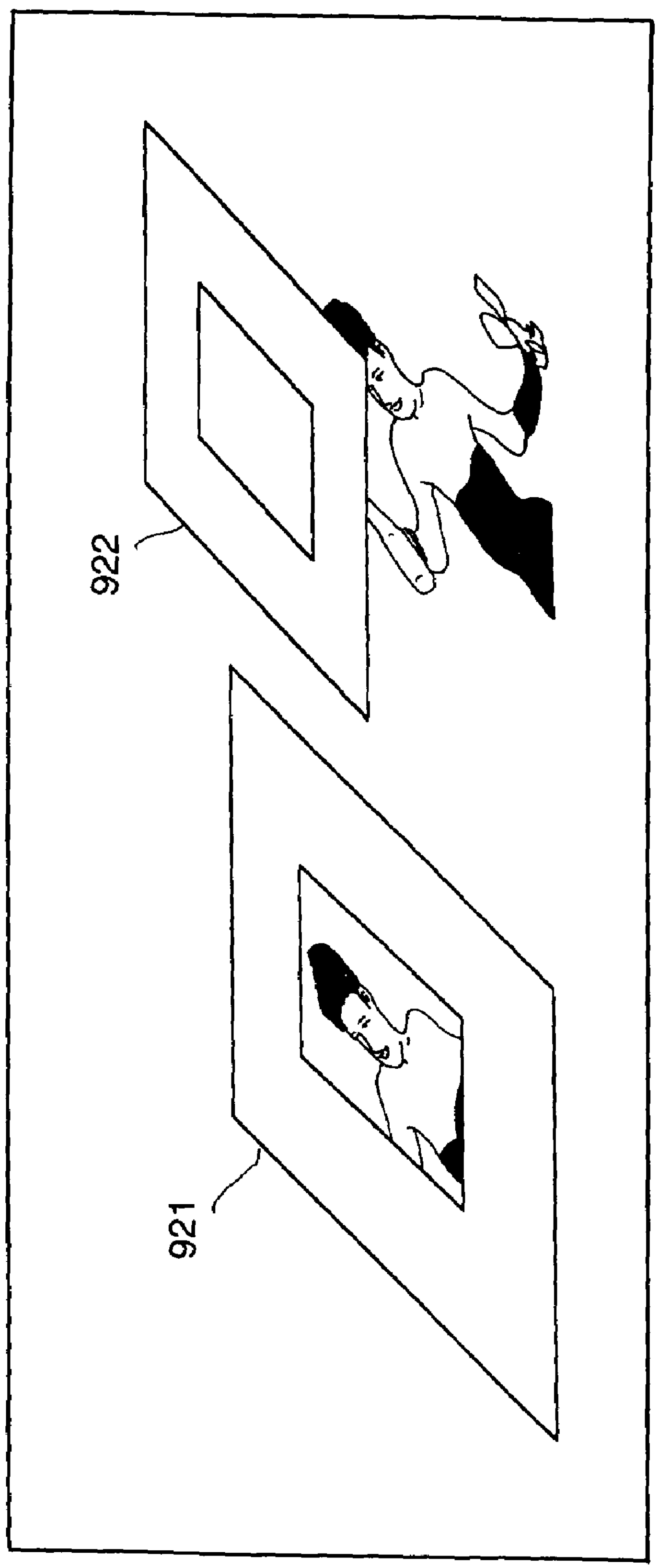
FIG. 67 is an explanatory diagram concerning comparison of a structure of a cutout image in a prior art with that in the fourth embodiment.

FIG. 67 shows a difference between the structure of a cutout image of a prior art and the structure of the one of this embodiment.

In the prior art, photo retouch software is used to edit a frame and image as a new image. An image 921 shown in left side of FIG. 67 is therefore produced. By contrast, this embodiment provides a structure in which a frame is, as indicated with reference numeral 922 in right side of FIG. 67, superposed on a raw image with the raw image unchanged. The raw image is retained as it is. The frame can therefore be changed from one kind to another. This embodiment is thus highly flexible.

Fifth Embodiment

The basic configuration and operation of this embodiment are analogous to those of the second embodiment. The operation typical of the fifth embodiment will be described below.

<Display Zoom-In or -Out>

In this embodiment, when the detail of a desired level of hierarchical data is to be marked, a display is zoomed in in proportion to a time interval during which the left button of the mouse 303 shown in FIG. 40 is pressed. For marking a level of a small hierarchical depth in a hierarchical structure or for viewing the whole of the hierarchical structure, a display is zoomed out in proportional to a time interval during which the right button of the mouse 303 is pressed. Data in a wide range can be observed with a view point set at a smaller hierarchical depth.

(Zoom-In)

Figure 76A:
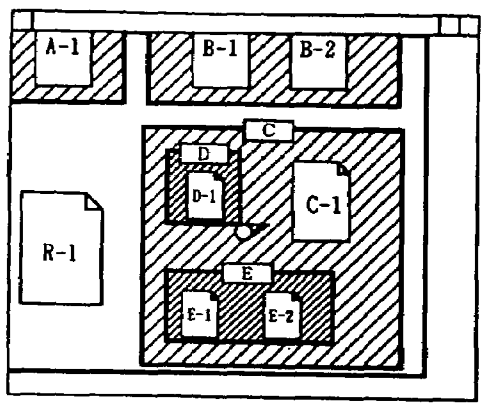
FIGS. 76A to 76C show an example of continual zoom-in display of directory C in the fifth embodiment.
Figure 76B:
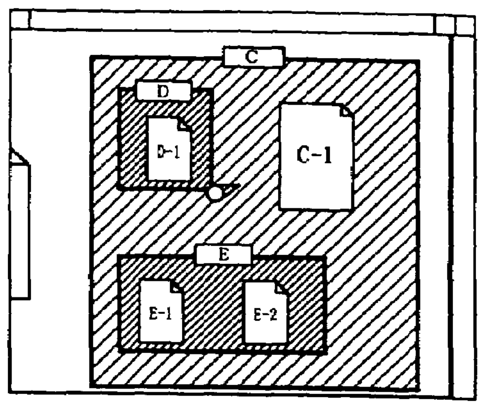
Figure 76C:
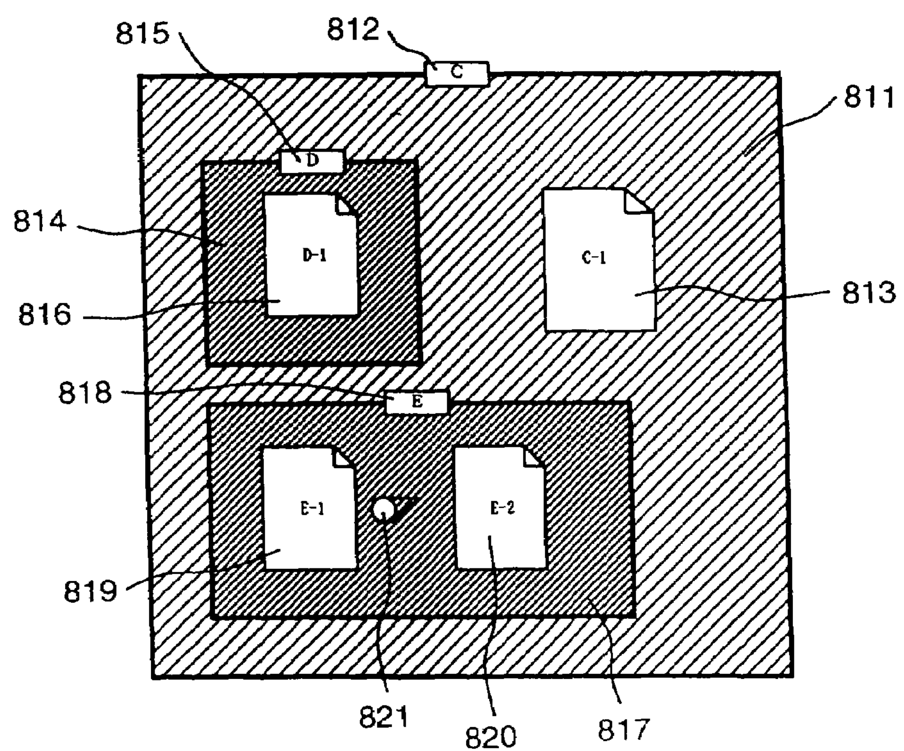

FIGS. 76A to 76C show examples of zoom-in display of directory C.

As shown in FIG. 76A, the navigation cursor 21 is moved to the center of an area to be enlarged, and the left button of the mouse 303 is held down. The display of the whole screen is, as shown in FIG. 76B, zoomed in with the level of directory C positioned on the center of the screen. The enlargement ratio is set on the basis of a predetermined zoom-in ratio per event; that is, per press of a mouse button. The size of a display is determined with the number of events; that is, of presses of a mouse button. In other words, a display is enlarged in proportion to a time interval during which a mouse button is held down. Data icons are enlarged according to the zoom-in ratio. The more detailed information concerning the data icons can be acquired. As shown in FIG. 76C, the navigation cursor 821 is pointed at a position in a level display area 817 for directory E, and the left button of the mouse 303 is held down. The level display area 817 for directory E is then zoomed in to occupy the whole of a screen.

Figure 77A:
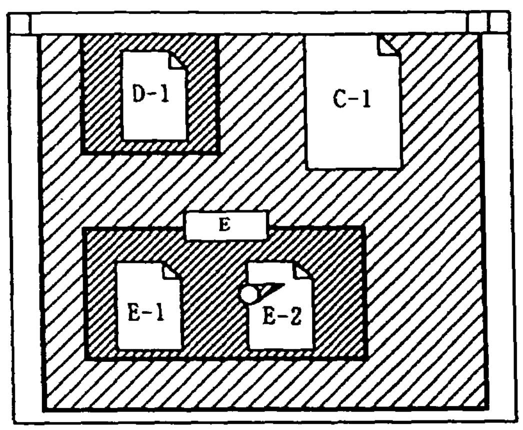
FIGS. 77A to 77C show an example of continual zoom-in display centered on directory E in the fifth embodiment.
Figure 77B:
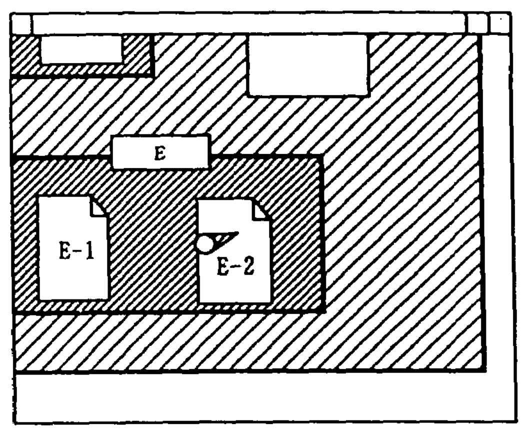
Figure 77C:
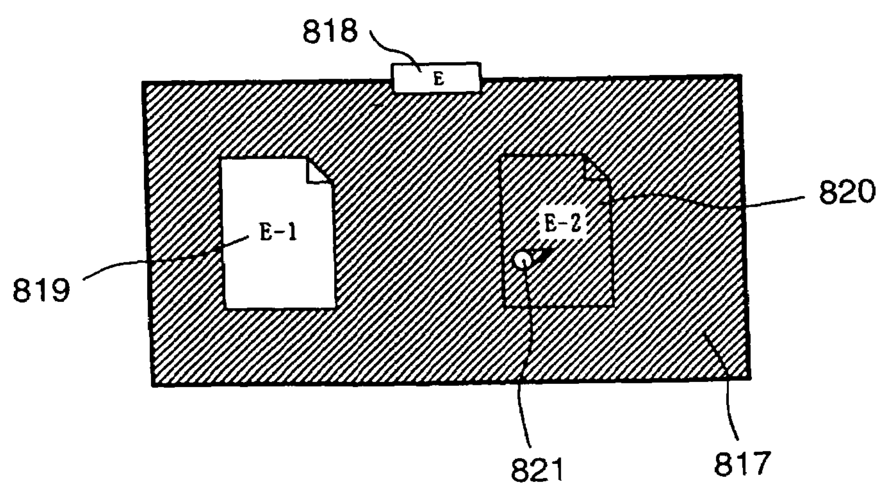

FIGS. 77A and 77C show examples of zoom-in display focused on directory E. When a data icon representing file E-2 is designated in FIG. 77A; that is, when a mouse button 304 is double-clicked (a double-click generally means an operation of clicking a mouse button twice during a short period of time) in the state of FIG. 77C, the level display unit displays the detailed contents of file E-2.

FIG. 22 shows an example of a display of the detailed contents 822 of a file.

(Panning)

Figure 85B:
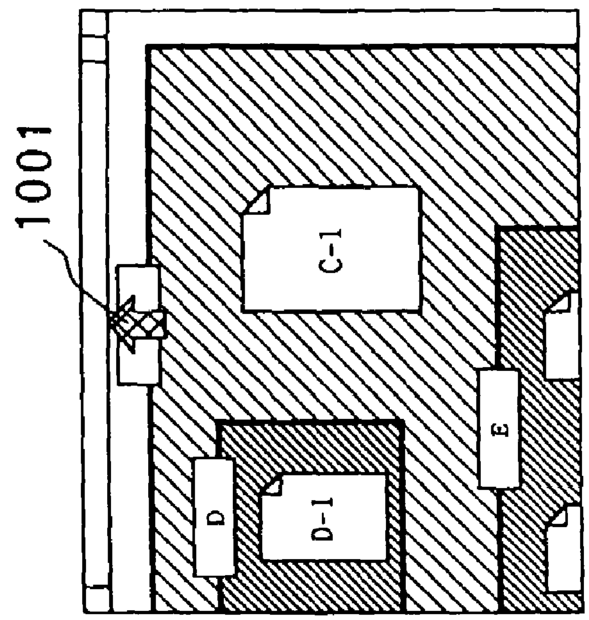
FIGS. 85A and 85B shows an example of panning display in the fifth embodiment.
Figure 85A:
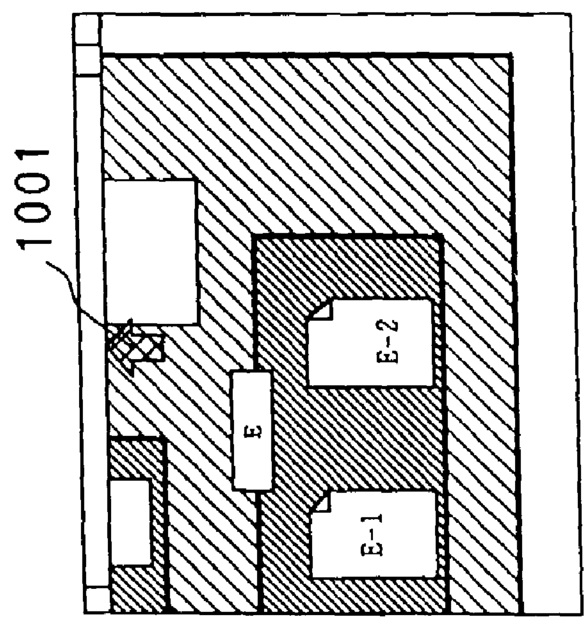

FIGS. 85A and 85B show a change of a current display state into another state with the zoom-in ratio unchanged (hereinafter, panning).

As shown in FIG. 85A, the navigation cursor 821 is moved to an edge of a display screen, it is changed into an arrow. In FIG. 85A, panning is achieved upward. The navigation cursor 821 is changed into an up arrow 1001. When a button (either of the right and left buttons) of the mouse 303 is held down in this state, the display screen is panned in a designated direction with the zoom-in ratio unchanged.

(Zoom-Out)

Figure 78:
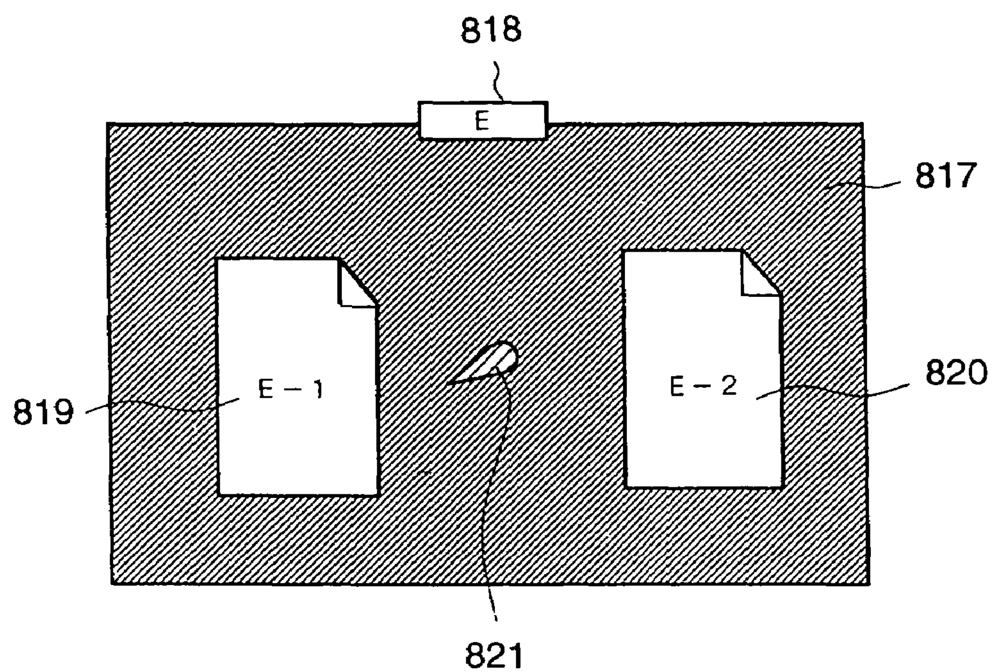
FIG. 78 shows a zoomed-in display of directory E in the fifth embodiment.

For changing a display state in which a low level is zoomed in into another state in which the low level is viewed from a higher level, the display is zoomed out. FIG. 78 shows a zoomed-in display of directory E. When the right button of the mouse 303 is pressed in the state of FIG. 78, the orientation of the navigation cursor 821 is changed outward. When the right button on the mouse 303 is held down, the display is zoomed out as shown in FIGS. 76A to 76C (however, the navigation cursor 821 is oriented outward). When the right button is further held down, zoom-out continues to finally provide the display in FIG. 17.

(Designating Detailed Information Display)

Figure 79:
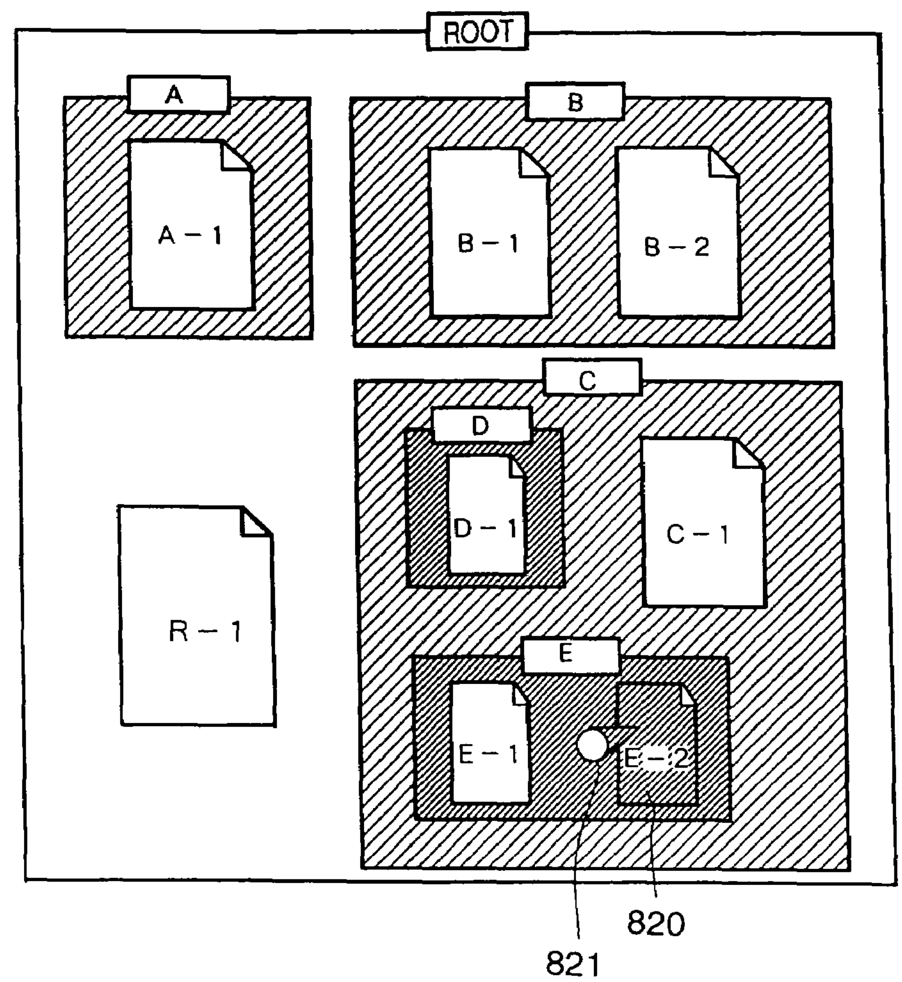
FIG. 79 shows a method for directly designating detailed information display of data in the fifth embodiment.

If a data icon representing desired data can be located without the necessity of zoom-in, the navigation cursor 821 is used to directly designate detailed information display of data. FIG. 79 shows a method for directly designating detailed information display of data. For displaying the detailed information concerning file E-2, as shown in FIG. 79, a data icon 20 representing file E-2 is designated with the navigation cursor 821, and then a mouse button is double-clicked. Detailed information shown in FIG. 22 can then be displayed.

(Zoom-In or Panning Sequence)

FIG. 80 is a flowchart describing a sequence for zooming in or panning a given level. For zoom-out display, a zoom-in ratio is decremented at step S345. The description of zoom-out will therefore be omitted.

In FIG. 80, step S341 means that an event wait loop is entered. A designation (event) entered by a user at a mouse or keyboard is waited. When an event occurs, control is passed to step S342. It is checked if the user has designated a data icon by double-clicking a mouse button. If the result of checking is in the affirmative, control is passed to step S343. The detailed information of data represented by the data icon is displayed. If the result of checking is in the negative, control is passed to step S344. It is checked if a mouse button 304 is pressed with the cursor at an edge of a screen, or in other words, which of zooming and panning is designated. If the result of checking is in the negative, zooming is designated. Control is therefore passed to step S345. If the result of checking is in the affirmative, panning is designated. Control is passed to step S349.

For zooming, a zoom-in ratio $Z_U$ is raised to a given ratio at step S345. Control is then passed to step S346. When a position deviating from the center of a screen is designated for zoom-in, it is requested that the position should come to the center of a screen gradually in the course of zoom-in. At step S346, given shift values shiftX and shiftY are calculated according to a distance from a position at which the mouse button is pressed to the center of a screen. At step S347, the level display areas and data icon display areas for all levels, of which position and size information is retained, are updated. Specifically, the areas are enlarged at the $Z_U$ ratio with respect to the center of the screen, and the positions of the areas is shifted by the shiftX and shiftY values. Thus, new positions and sizes of the areas are determined. At step S348, an icon display size and data icon display position that are information representing a position and size of data icons are calculated for each data. The calculation is the same as the one of step S347. The calculations required for updating a display are thus completed. A display screen is then updated at step S352.

For panning, given shift values shiftX and shiftY are set at step S349. At step S350, the level display areas and data icon display areas for all levels are shifted by the shiftX and shiftY values. At step S351, the data icon display positions are changed by the shiftX and shiftY values. The calculations required for updating a display are thus completed. A display screen is then updated at step S352.

<Example of a Change in Size of a Display>

Next, an example of a technique for making a display of a file relatively larger than any other file (data) according to the use frequency of the file (data) will be described in detail.

Figure 87B:
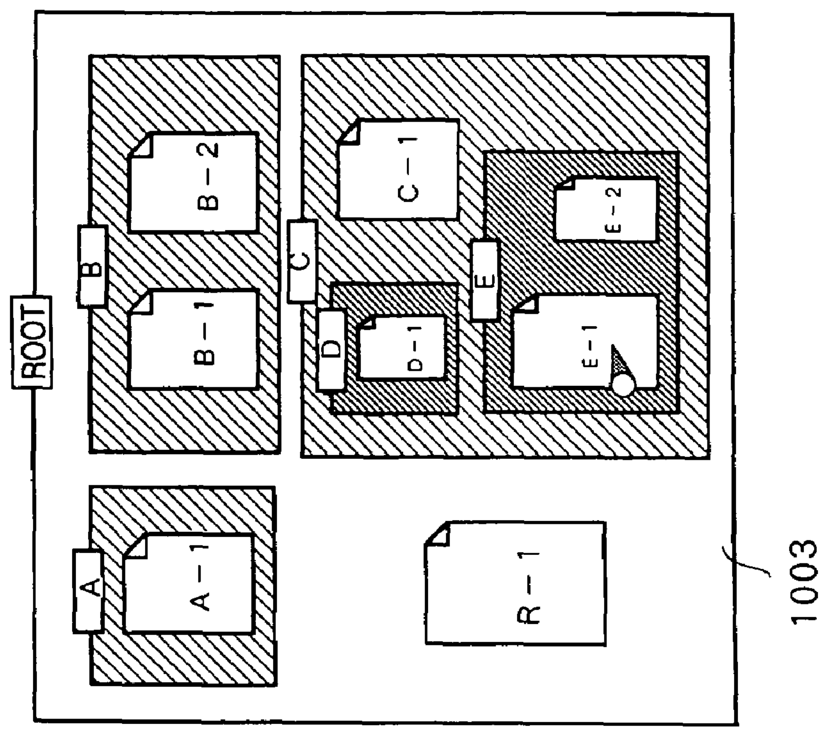
FIGS. 87A and 87B are explanatory diagrams concerning a technique for increasing the size of a display relatively according to a use frequency of a file.
Figure 87A:
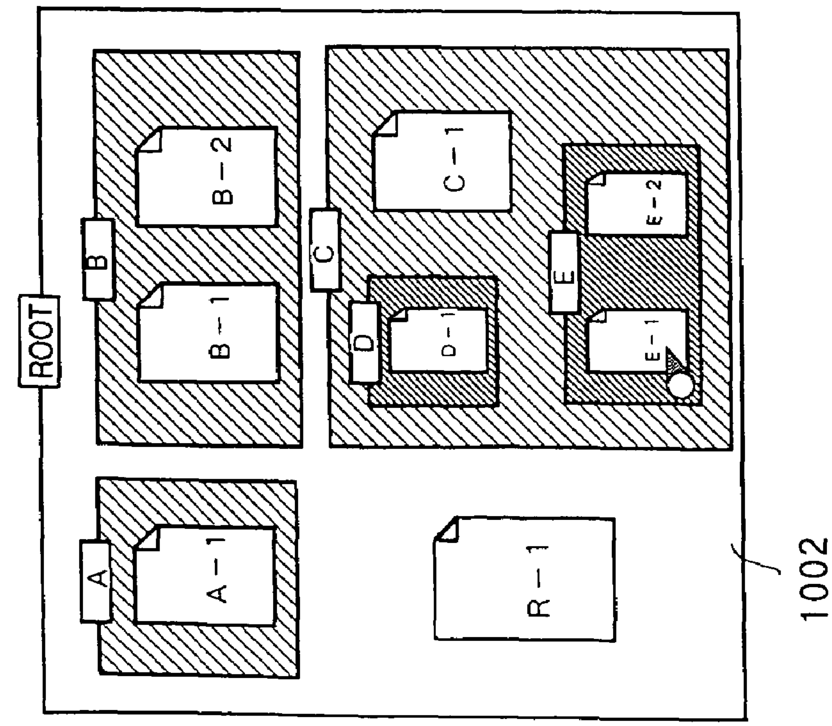

FIGS. 87A and 87B show examples of displays in this embodiment.

In the state of a display 1002 shown in FIG. 87A, document E-1 is opened and used several times. With every use, the display of document E-1 becomes larger. After all the uses (accesses), the display looks like a display 1003. Document E-1 is displayed with a larger size, and other files (data) are displayed with relatively small sizes.

Figure 86:
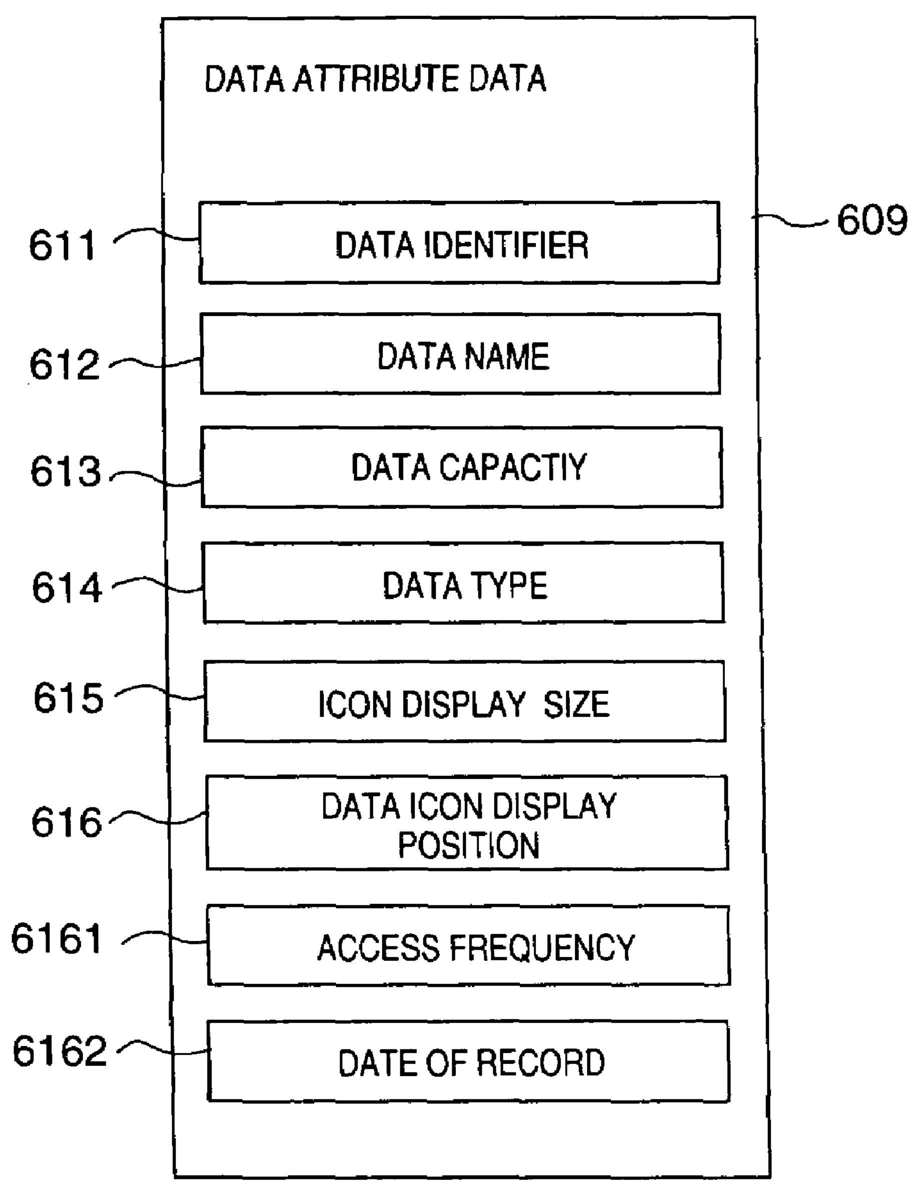
FIG. 86 shows data attribute data in the fifth embodiment.

FIG. 86 shows data attribute data in this embodiment.

The data attribute data in FIG. 86 is the same as the one in FIG. 42 except that an access frequency 6161 and a date of record 6162 are included additionally. The access frequency 6161 is incremented by one when the associated file (data) is designated with a double-click; that is, the file (data) is opened. Based on the count value of an access frequency, the size of a display of data is determined by means of a technique to be described later. Some files (data items) may have been accessed frequently for a certain period of time but not been used thereafter. When a file is accessed, an associated date of record 6162 is rewritten to the date of that day. If a given period of time set by a user has elapsed since the date, it is determined that the file has not been used for some time. The access frequency of the file is then decremented. The date of record 6162 is then rewritten to the date of that day.

Owing to the foregoing operation, a frequently-used file (data) gets larger gradually and becomes more discernible. Data that is not used gets smaller gradually and looks like retreating. Data, which has been used frequently for a certain period of time but not been used since a certain time instant, gets smaller gradually to have the same size as data that has never been used. A ratio at which a display of data is enlarged with every access, and a given period, during which a data item is not accessed, used as a reference for reducing the display of the data are specified by default. A user can change the default values according to the use situation.

Figure 88:
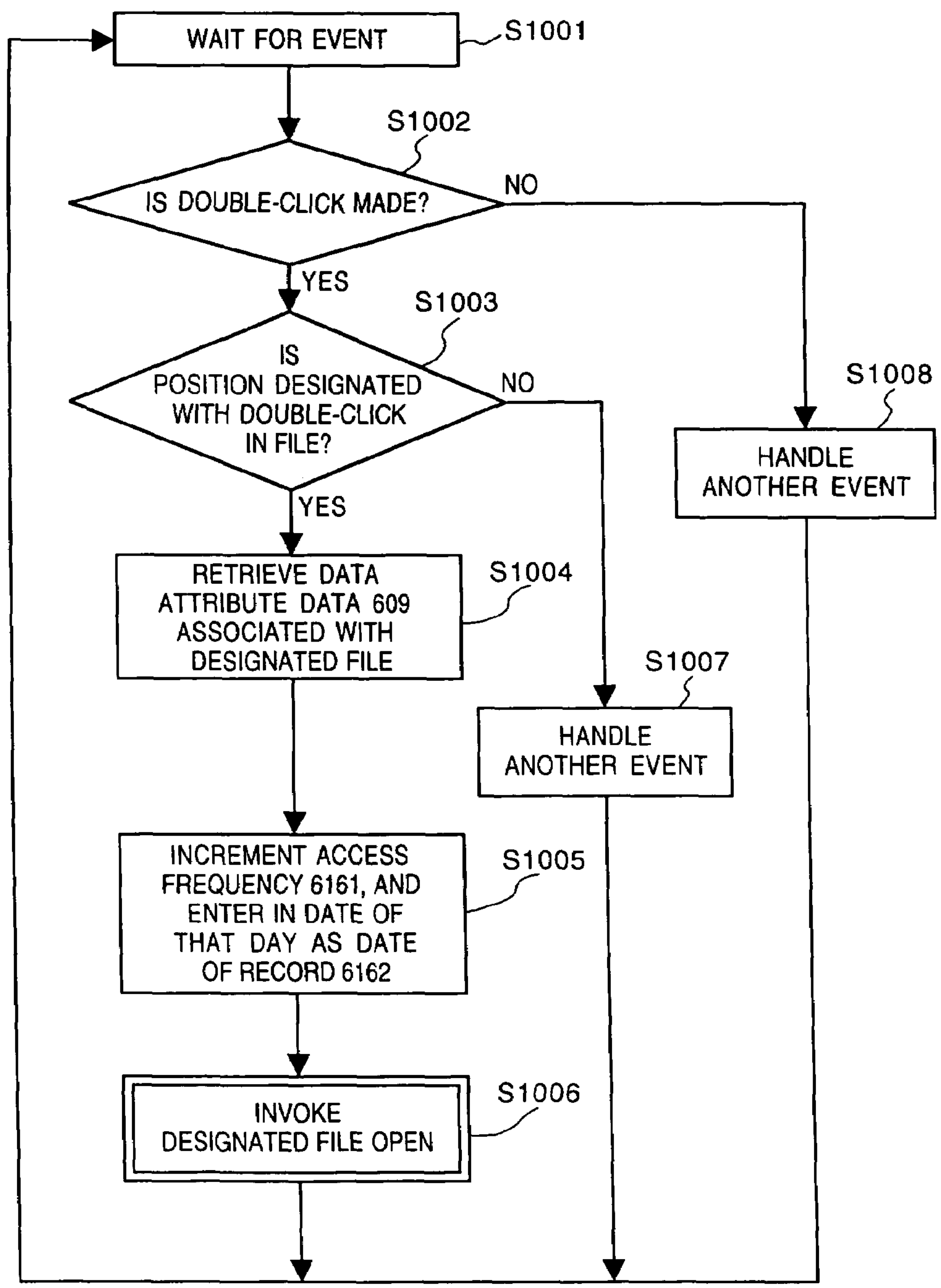
FIG. 88 is a flowchart describing a sequence for processing an accessed file in the fifth embodiment.
Figure 89:
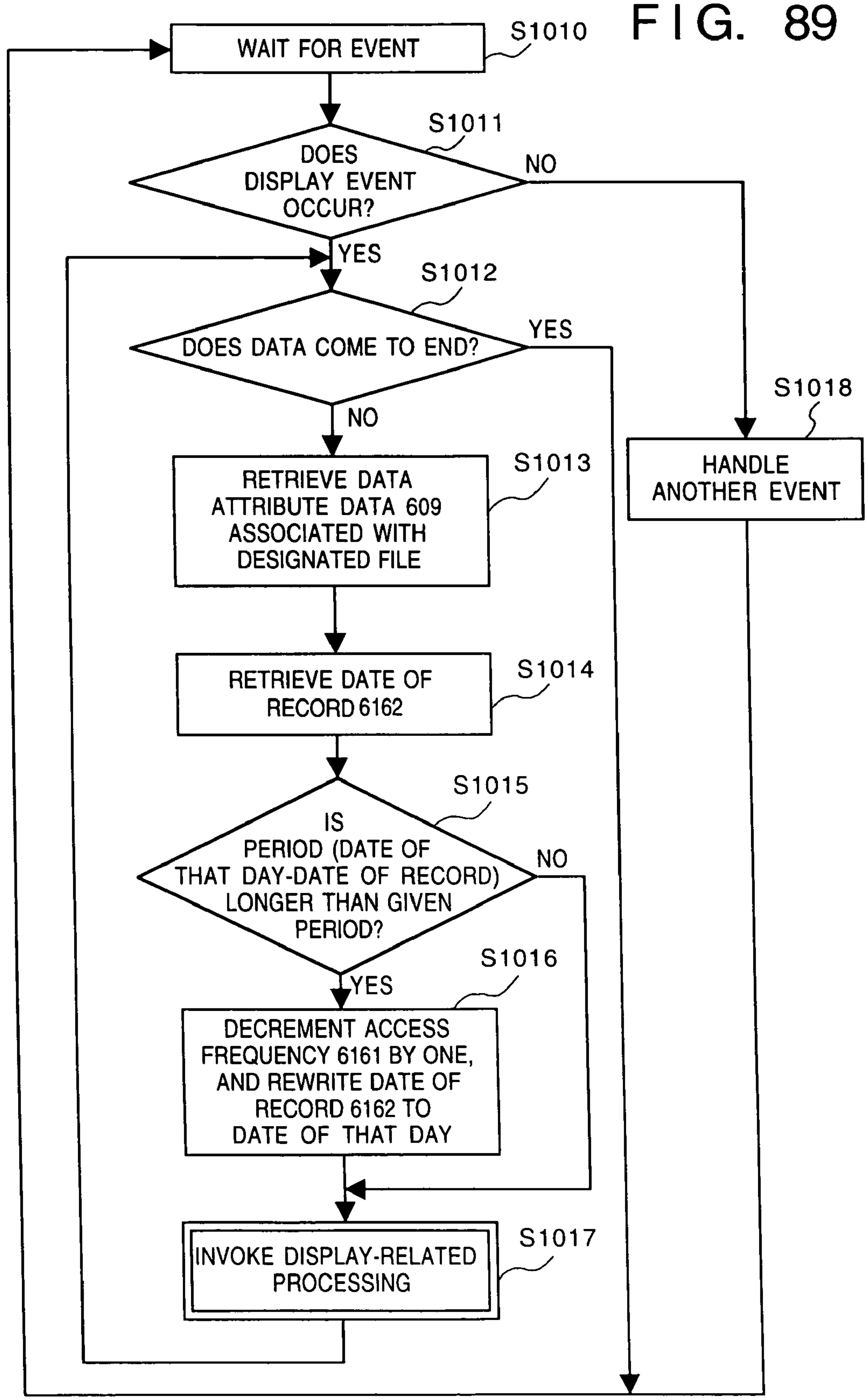
FIG. 89 is a flowchart describing a sequence for processing a file that has not been accessed for a given period of time in the fifth embodiment.

FIGS. 88 and 89 are flowcharts describing the foregoing sequence.

(Enlargement Responsive to an Access)

FIG. 88 is a flowchart describing a sequence for manipulating a file accessed.

At step S1001, an event entered by a user is waited. If it is found at step S1002 that a double-click is not made, it is determined that an event requesting to open a file (data) does not occurs. Another processing is executed at step S1008. When a double-click is made, it is checked at step S1003 if a position designated with the double-click is in a display of a file. If a position designated with the double-click is in a display of a file, the designated file is retrieved. Otherwise, another processing is executed at step S1007. At step S1004, data attribute data 609, which is shown in FIG. 38, associated with the designated file is retrieved. At step S1005, an access frequency 6161 specified in the data attribute data is incremented by one, and the date of that day is entered as a date of record 6162. At step S1006, the file is opened.

(Reduction Because of No Access)

FIG. 89 is a flowchart describing a sequence for manipulating a file that has not been accessed for a given period of time. When this program is activated, all files are displayed. Only when the program is activated, the processing below is executed.

At step S1010, an event to be entered by a user is waited. When an event not requesting for display of a screen occurs, control is passed to step S1018. Another event is then handled. When an event requesting for display of a screen occurs, if data comes to an end at step S1012, the processing is terminated. Otherwise, control is passed to step S1013. At step S1013, data attribute data associated with a display file is retrieved. A date specified as a date of record 6162 in the data attribute data is retrieved at step S1014. If it is determined at step S1015 that a period calculated by subtracting the date of record from the date of that day does not exceed a given period, control is passed to step S1017. If the period calculated exceeds the given period, control is passed to step S1016. An access frequency 6161 is decremented by one, and the date of record 6162 is rewritten to the date of that day. When an access frequency is decremented by one, if it will be smaller than 0, it is clipped to 0. Display is then executed at step S1017. The foregoing sequence is executed for each of display files. When all the files have been handled, control is returned to an event wait of step S1010.

(Setting the Sizes of a Level Display Area and Data Icons)

FIG. 91 is a flowchart describing a sequence followed when the level display unit 1503 shown in FIG. 40 sets the sizes of a level display area and data icons for each level. FIG. 91 is substantially identical to FIG. 25.

At step S101 in FIG. 91, a maximum hierarchical depth N is specified. Taking the example of FIG. 17 for instance, the N value is 2. The hierarchical depth of a level for which a display area is to be defined is initialized to 0 at step S103. At step S106, an object hierarchical depth of display area setting is set as an n value. It is then checked if a level, for which a data icon display area and child level display area are not defined, is present at the hierarchical depth n. If such a level is present, the level is set as an object level of display area setting at step S108. A level display area for the object level of display area setting is divided into a data icon display area and a child level display area according to the sum of numbers of data items belonging directly to the object level of display area setting and the total sum of numbers of data items belonging in child levels.

The sum of numbers is calculated at step S1009. Assuming that the number of data whose access frequency 6161 is 0 is 1.0, and that the number of data whose access frequency is n is ($1.0+n\times$enlargement ratio f), all the numbers are added up. For example, when certain data has an access frequency of 2 and an enlargement ratio of 0.2, the number of the data is calculated as $1.0+2\times0.2=1.4$. This number is added to other data numbers. An example of dividing a level display area for a root directory into a data icon display area and a child level display area is shown in FIG. 26. In FIG. 26, reference numeral 823 denotes a data icon display area. 824 denotes a child level display area.

Figure 90:
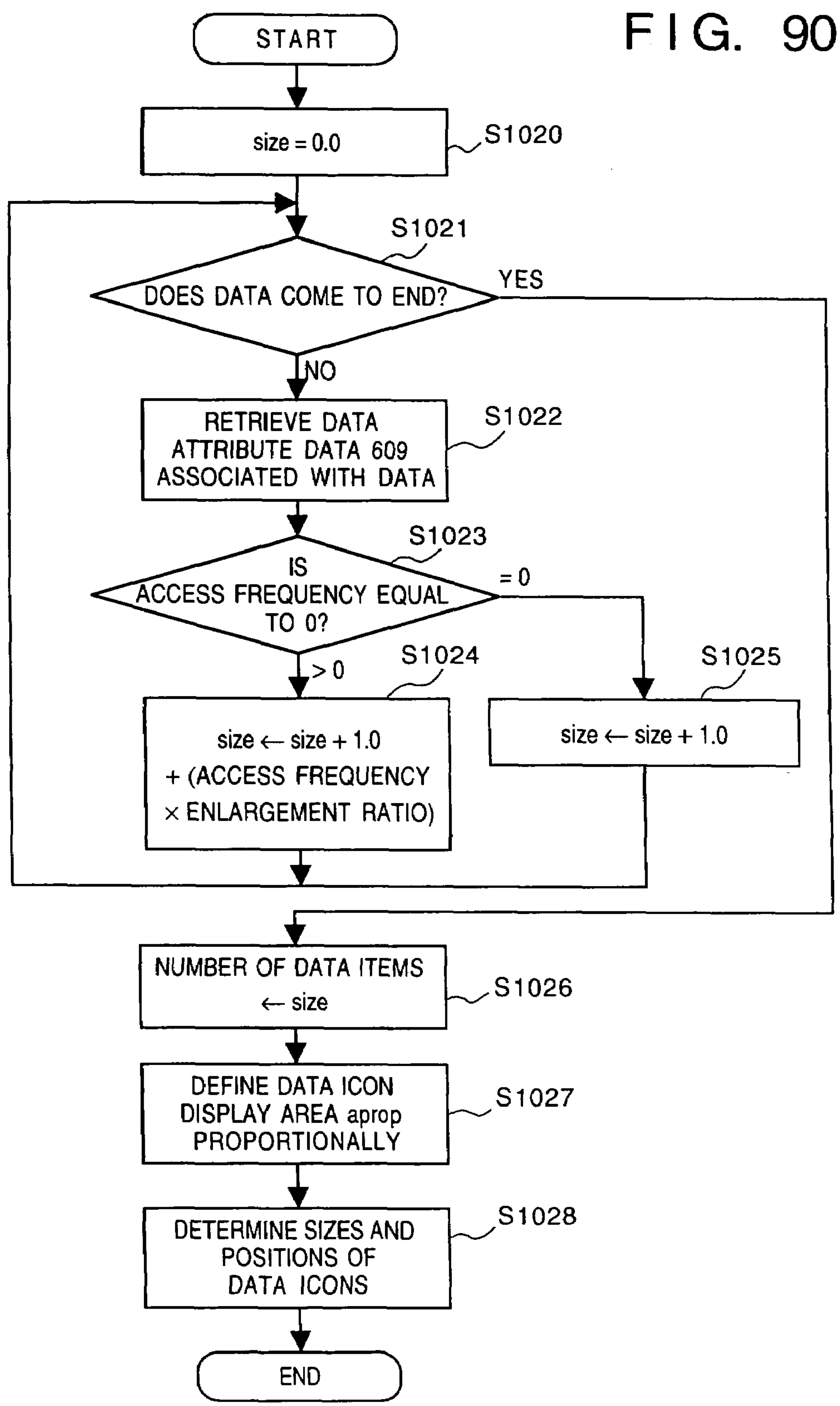
FIG. 90 is a flowchart describing a sequence for dividing a screen into a data icon display area and a child level display area in the fifth embodiment.

FIG. 90 is a flowchart describing a sequence for dividing a level display area into a data icon display area and a child level display area.

The sequence in FIG. 90 corresponds to the one in FIG. 30. In FIG. 90, the sum of numbers of data items belonging to a level concerned and the total sum of numbers of data items belonging to all child levels are calculated. For the calculation, the number of data whose access frequency 6161 is 0 shall be 1.0 and the number of data whose access frequency is n shall be (1.0+n×enlargement ratio). All the numbers are then added up (steps S1020 to S1025).

If it is found at step S1023 that certain data has an access frequency of 2 and an enlargement ratio of 0.2, the number of the data is calculated as 1.0+2×0.2=1.4. At step S1027, a data icon display area $a_{prop}$ is defined according to a ratio of the sum of numbers of data items belonging to the level to the total sum of numbers of data items belonging to all the child levels. At step S1028, data icon display sizes 615 and data icon display positions 616 in FIG. 86 are determined. The display size is determined with a ratio proportional to an access frequency according to the same technique described at steps S1020 to S1025 in FIG. 90. The enlargement ratio f is a numerical value defined by default. The default value can be changed by a user according to a use situation.

Owing to the aforesaid techniques in FIGS. 90 and 91, not only frequently-used data is displayed with a larger size but also a level area containing the data is made relatively large in relation to other level areas. In FIG. 87B, when data E-1 is visualized with a larger size, a level area E containing the data E-1 and a level area C containing the level area E are displayed with relatively large sizes. Since a user has divided (categorized) data into level areas for a certain purpose, when certain data is accessed frequently, a category containing the data is used frequently. From this viewpoint, when frequently-accessed data is displayed with a larger size and thus highlighted, a category containing the data is displayed with a larger size. This is natural and rather preferable.

(Example of Enlargement Display)

This example is concerned with enlargement display.

Enlargement displaying will be described, wherein a small raw image is enlarged and vignetted for displaying data designated using a cursor or belonging to a level subordinating a level for which a level area is displayed. For producing a defocused image, an image smaller than a raw image is averaged. A three-dimensional depth perception and a saving in occupied capacity of a memory can be attained at the same time. Thus, enlargement display is very effective.

Figure 92:
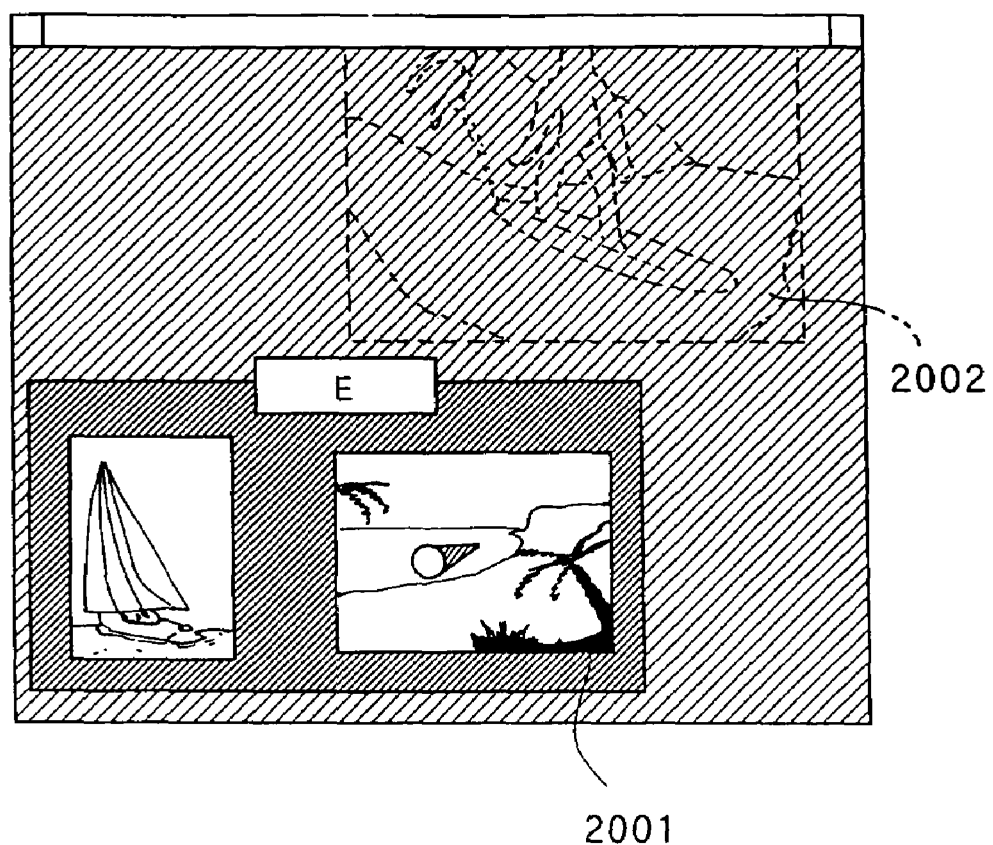
FIG. 92 shows an example of a display in a data base system handling images mainly in the fifth embodiment.

FIG. 92 shows an example of a display of this embodiment in a data base system handling mainly pictures. FIG. 92 shows a process in which a user positions a cursor at an image 2001 and zooms in the image. The image 2002 belongs to a level immediately above the level of an image 2001. The image 2002 is vignetted and displayed. Thus, an image belonging to a higher level than an image designated using a cursor can be seen closer than the image designated. This results in a display permitting a depth perception. At the same time, an image to be vignetted may be an image of a smaller image size. This leads to a saving in memory capacity.

FIG. 93 is a flowchart describing enlargement in this embodiment.

When an event requesting display occurs at step S1031, a hierarchical depth of a position indicated by a cursor is extracted from a hierarchical depth identifier 603. The processing below is then executed for each of data items to be displayed. At step S1034, a hierarchical depth identifier associated with a level containing data is retrieved. By comparing the hierarchical depth identifiers, it is judged which is higher; the level corresponding to a display area containing the position indicated by the cursor or the level containing the data. If the data belongs to a higher level, raw image data in a memory is replaced with data of a smaller size, and re-sizing (enlargement or reduction) is executed. Filtering is executed at step S1038.

Figure 94:
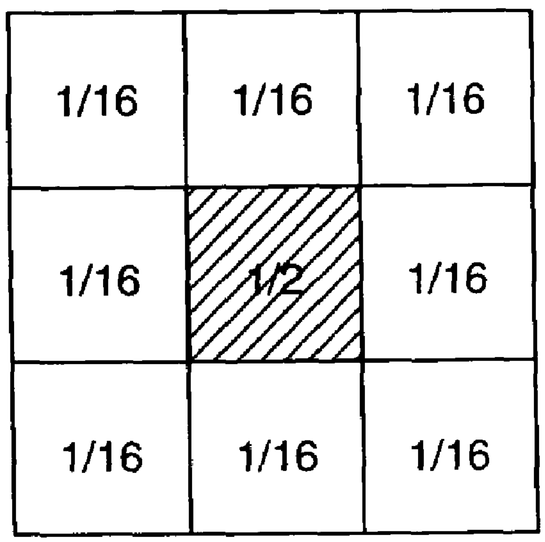
FIG. 94 shows an example of a filter array in the fifth embodiment.
Figure 95:
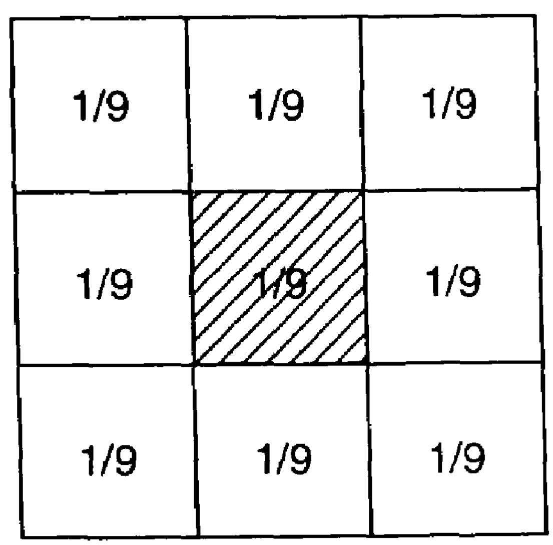
FIG. 95 shows an example of a filter array in the fifth embodiment.

FIG. 94 shows a simple filter array. The center of the filter corresponds to a coefficient (½) to be applied to a marked pixel. A given coefficient (1/16) is applied to pixels surrounding the marked pixel. The multiplied pixel values are added up, whereby a vignetted display image is produced. The filter array in FIG. 94 may be varied depending on the size of a display image. During zoom-in, when an image to be seen lying closest is vignetted most intensely, a display offering a greater depth perception can be realized. For example, a filter array in FIG. 95 exerts a more intense effect of vignetting than the one in FIG. 94. The filter in FIG. 95 is used for an image to be seen lying closest (for example, an image belonging to the highest level). Filters exerting weaker effects of vignetting are used step by step as a hierarchical depth increases.

When it is determined at step S1035 in FIG. 93 that the level containing the data is the same as or higher than the level corresponding to the display area containing the cursor position, normal re-sizing is executed. Display-related processing is then executed at step S1039.

Owing to the foregoing sequence, a display in which an image designated using a cursor is in focus and an image seen lying close than the image is out of focus can be realized as if it were a scene viewed through a zoom lens of a camera. This embodiment has been described in terms of a data base consisting mainly of images. Aside from the data base, this embodiment can be implemented in a file system, because the aforesaid processing should merely be executed for file icon images.

<Example of Time-Orderly Display>

This example is concerned with a time-orderly display mode. In this embodiment, display is performed in order of date of creation of a file or in the order in which data accessed last is displayed first. Even in this case, all files (data items) are displayed. Newer (or older) files are displayed at outward positions with larger sizes, and older (or newer) files are displayed at inward positions with smaller sizes. Using a means for continual enlargement and display in the same manner as mentioned above, a smaller display located inward can be enlarged. Using a means for continual reduction, an enlarged display can be returned to an original size. The time-orderly display mode can be entered from the aforesaid hierarchical display state when a user designates a level. When the time-orderly display mode is terminated, the original hierarchical display can be restored.

Figure 96:
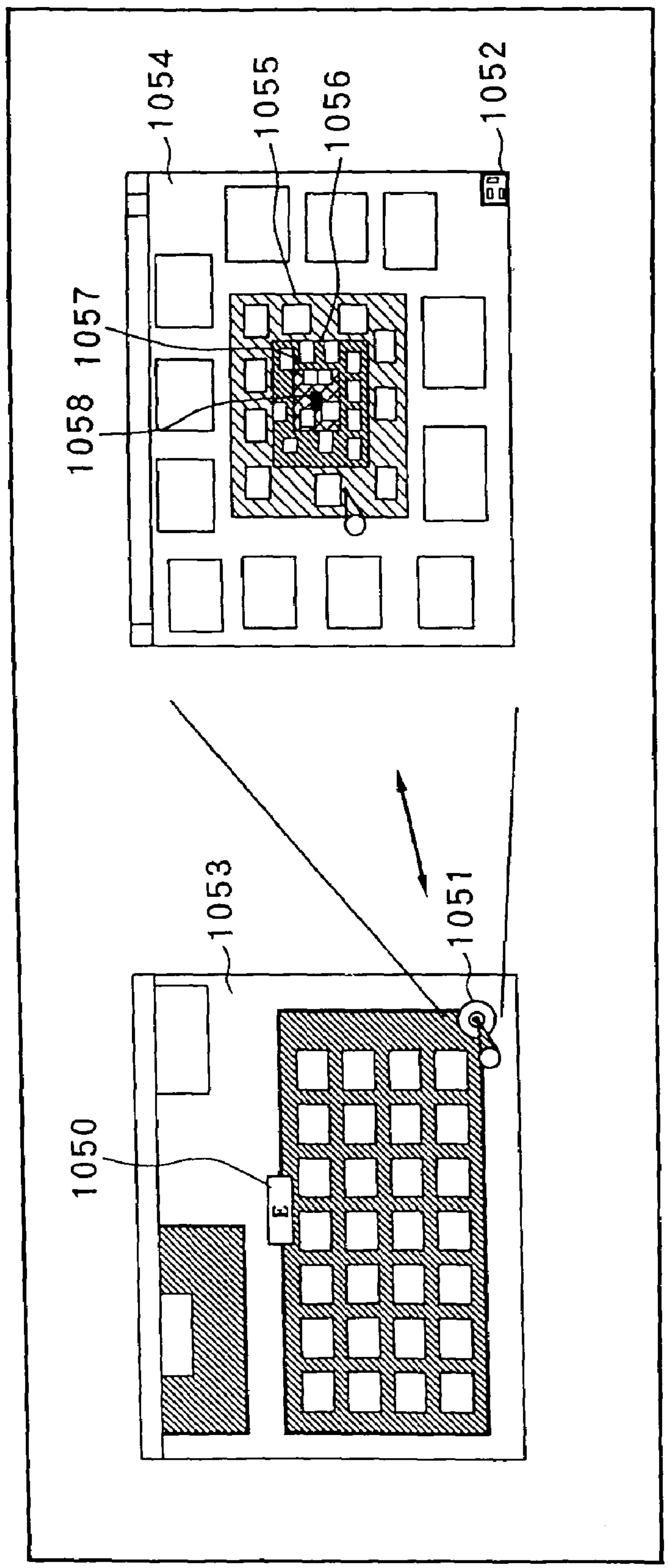
FIG. 96 shows an example of time-sequential display in the fifth embodiment.

FIG. 96 is explanatory diagrams concerning a time-orderly display of this embodiment.

Figure 97:
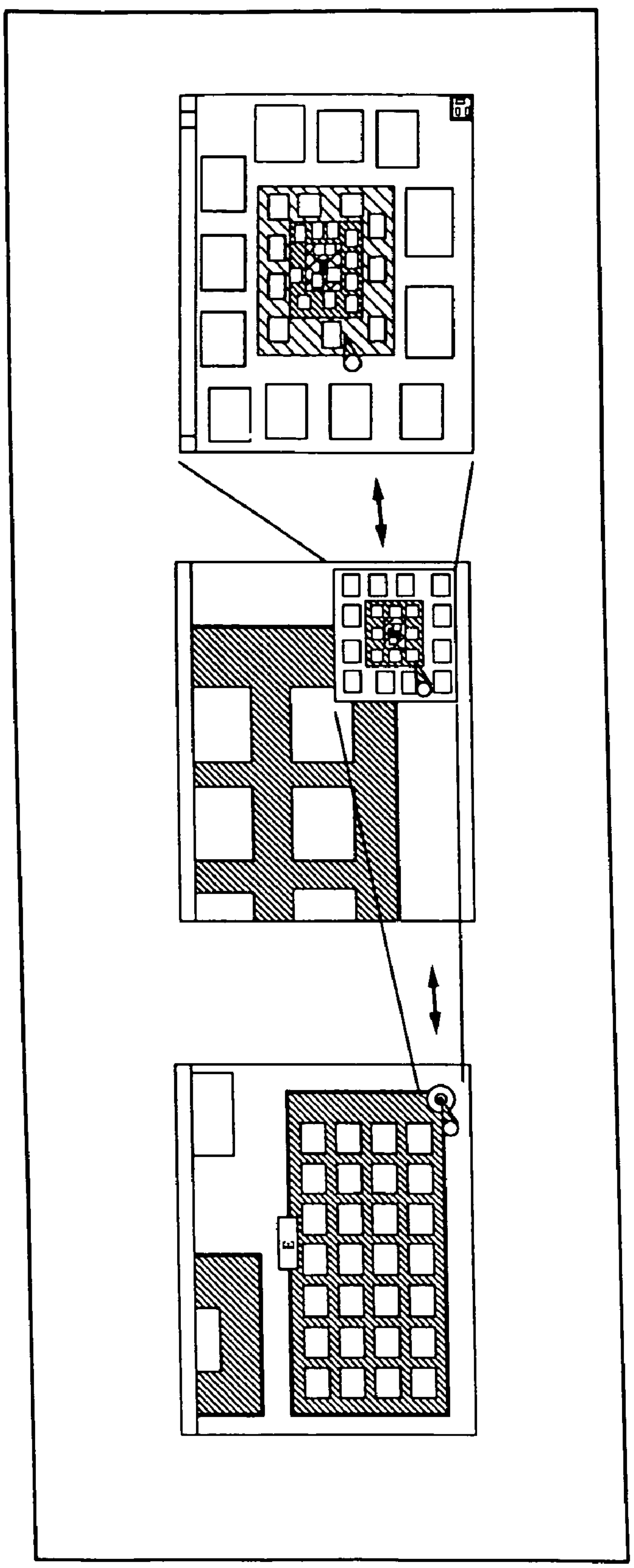
FIG. 97 shows an example of time-sequential display in the fifth embodiment.

In left side of FIG. 96, reference numeral 1053 denotes a hierarchical display. In this display state, when all data icons belonging to a level corresponding to a display area containing a cursor are displayed and occupy a certain area, a time-orderly display icon 1051 appears at a corner of the level display area. The icon 1051 indicates an entry to the time-orderly display mode. When a user positions the cursor on the icon 1051 and performs a zoom-in operation, the hierarchical display mode is changed to the time-orderly display mode 1054 shown in right side of FIG. 96. When the display mode is changed from the one in left side of FIG. 97 through another one in center of FIG. 97 to yet another one in right side of FIG. 97, the continuity of operations is attained. A greater effect can be exerted.

In a time display screen, all data icons belonging to the level including data icons belonging to child levels are displayed time-orderly. Rectangles 1055 to 1058 in right side of FIG. 96 (hereinafter, time rectangles) indicate time intervals defined by segmenting time by a means which will be described later. In the time-orderly display mode 1054, a data icon associated with the latest time is displayed an outermost position. Data icons associated with earlier times are displayed within inward rectangles. For realizing a display that offers a three-dimensional depth perception, a rectangle lying at the innermost position is painted in the darkest color, and a data icon in the rectangle is displayed with the smallest size. By contrast, when it is requested that old data items are seen close and new data items are seen far, if the rectangle lying at an outermost position is painted in the darkest color, a user can discern whether data items are visualized in the order in which new data items are seen close or in the order in which old data items are seen close. This display technique is effective.

In the time-orderly display, old data items can be visualized with larger sizes by executing zoom-in through the same operation as the one for the hierarchical display. New data items can be visualized by executing zoom-out.

(Time Rectangle Attribute Data)

Figure 102:
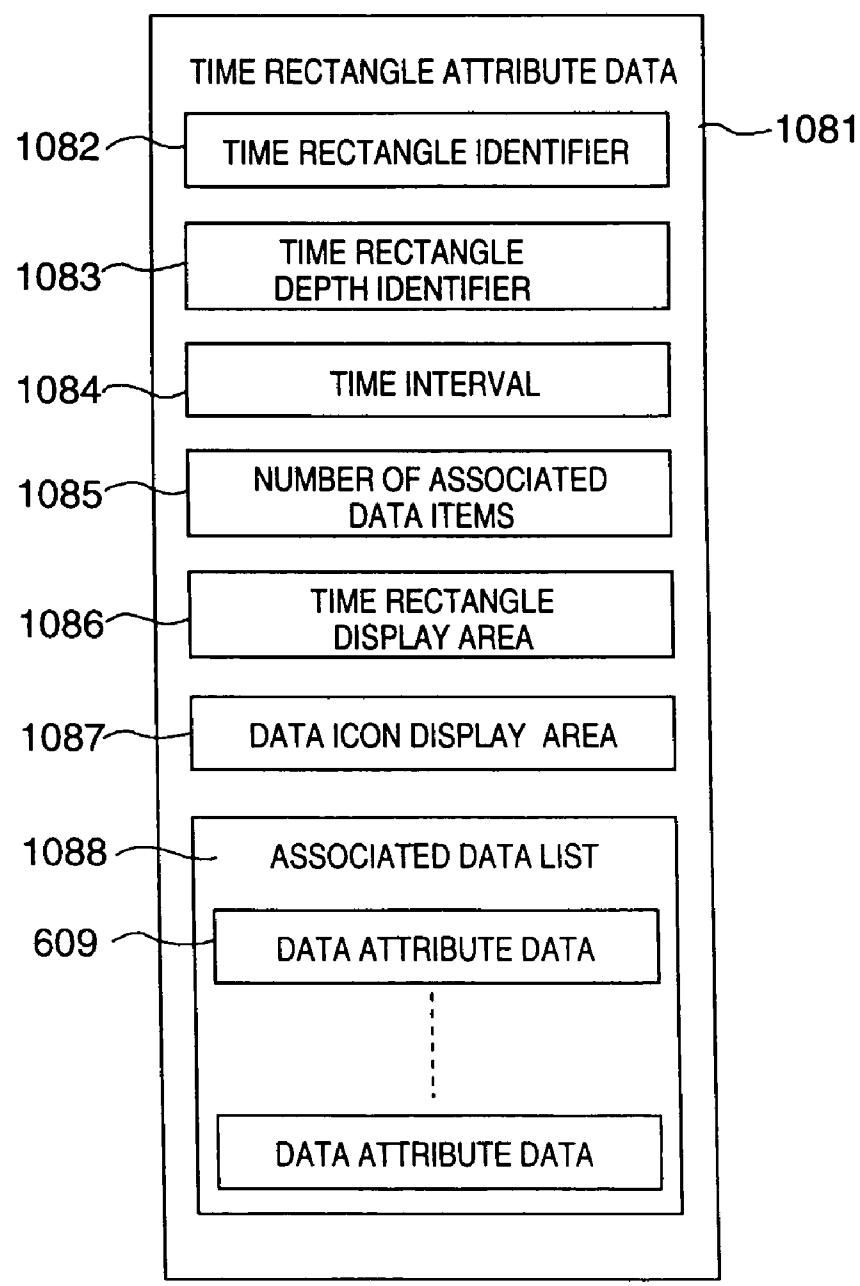
FIG. 102 is an explanatory diagram concerning time rectangle attribute data in the fifth embodiment.

FIG. 102 is an explanatory diagram concerning time rectangle attribute data used to manage time rectangles in this embodiment.

In FIG. 102, reference numeral 1081 denotes time rectangle attribute data. 1082 denotes a time rectangle identifier for uniquely identifying a time rectangle. 1083 denotes a time rectangle depth identifier for indicating a position in a depth direction of the time rectangle. 1084 denotes a time interval indicated by the time rectangle. 1085 denotes the number of associated data items; that is, the number of files associated to the time interval. 1086 denotes a time rectangle display area. 1086 denotes a data icon display area. 1088 denotes an associated data list in which attribute data 609 concerning data items associated with the time rectangle; that is, attribute data concerning files contained in a directory in a file browser is listed. The detail of the data attribute data 609 in FIG. 102 is identical to that in FIG. 42.

(Setting the Sizes of Time Rectangles and Data Icons)

FIG. 98 is a flowchart describing a sequence for setting the sizes of time rectangles and data icons belonging to the respective time rectangles.

In FIG. 98, the newest date and oldest date among dates of data items to be displayed are retrieved at step S401. When a user wants to display the data items in order of date of creation of a file, the dates of creation of all files to be visualized are retrieved via the OS. Among the dates, the oldest and newest dates are picked up. When a user wants to display data items in the order in which files are accessed, dates of record 6162 of all the files to be visualized are retrieved from the data attribute data 609 in FIG. 57. Among the dates, the oldest and newest dates are picked up.

At step S402, it is checked if a user has designated a time interval to be indicated by time rectangles. By default, a time interval from the date of the oldest one among all the data items to be displayed to the date of the newest one is divided by a given value N (for example, N=10) (step S403). In this embodiment, a user can designate the time interval as one day, one year, or any other desired time interval. In this case, the given value N is a value calculated by dividing a time interval from the date of the oldest one among all data items to be displayed to the date of the newest one by a user-designated time interval (step S404).

The processing below is then executed for each of the first to N-th time rectangles. At step S408, the size of a time rectangle currently handled is specified. The first time rectangle has the size of a display screen. The sizes of the subsequent time rectangles are determined by a means for dividing an area which will be described later. When it is judged at step S409 that a file icon or time rectangle n+1 is associated with a time rectangle n, the area of the time rectangle n is divided into a file icon display area and a display area for the time rectangle n+1. The division is effected at a ratio of the number of file data items associated with the time rectangle n to the number of file data items associated with the time rectangle n+1 and subsequent rectangles.

Figure 99B:
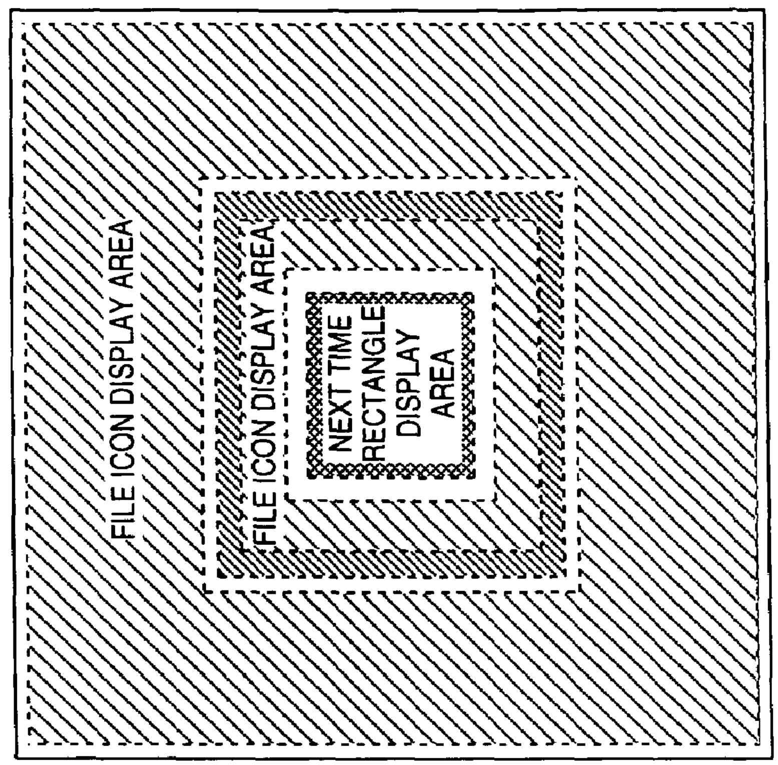
FIGS. 99A and 99B show an example of setting of a time rectangular area and file icon display area in the fifth embodiment.
Figure 99A:
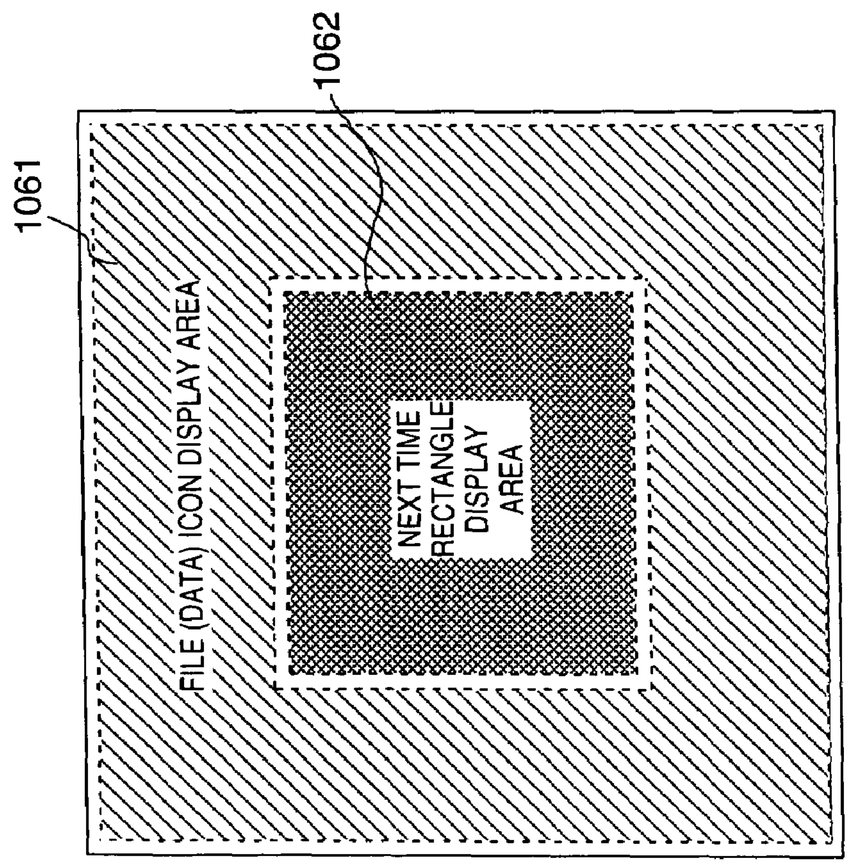
Figure 100:
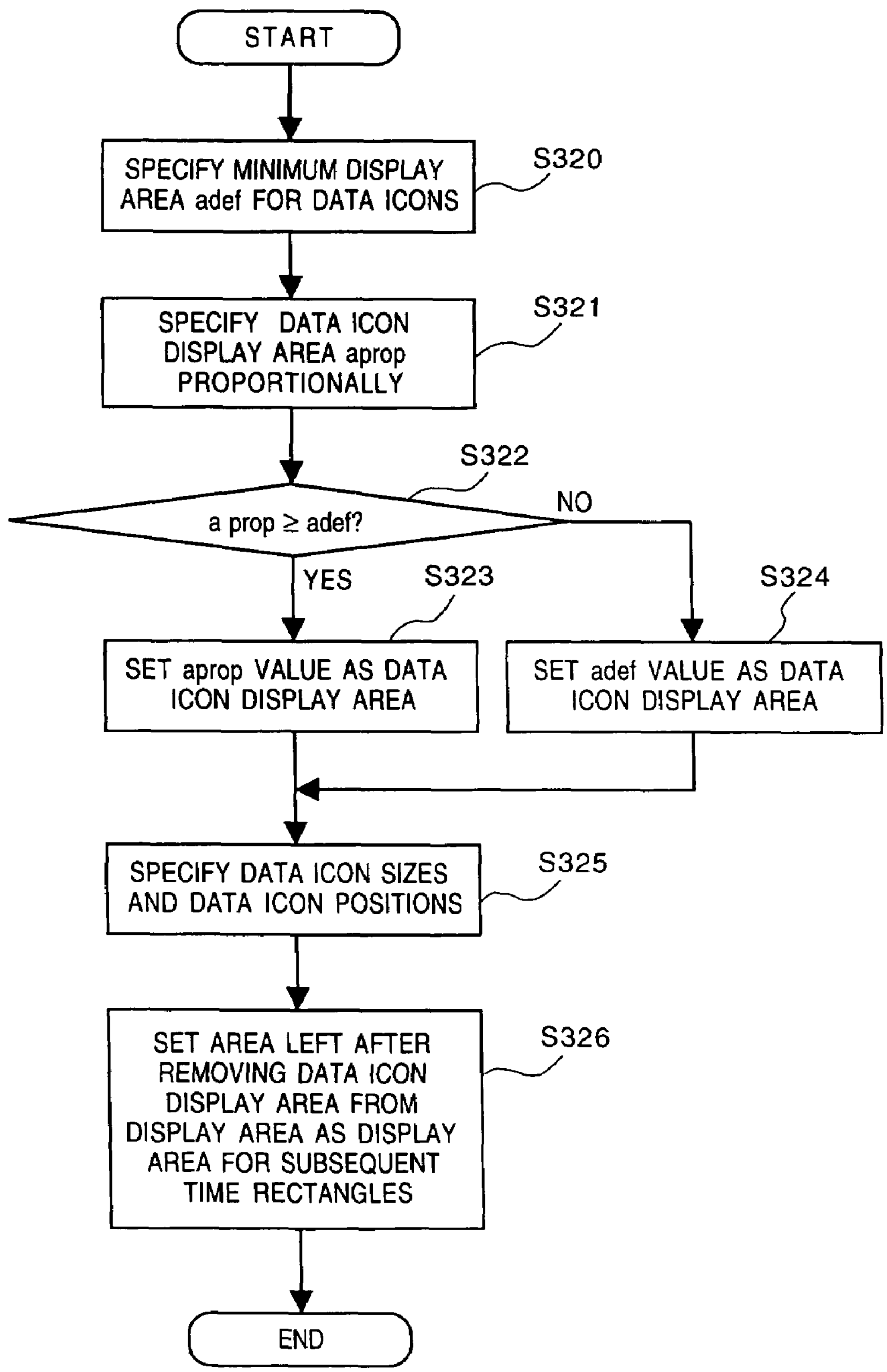
FIG. 100 is a flowchart describing a sequence for setting a data icon in time-sequential display mode in the fifth embodiment.

The resultant area of the time rectangle n+1 is defined at step S408 through the next loop, and then further divided at step S410. The detail of step S410 will be described later in conjunction with FIG. 100. As a display shown in FIG. 99A is changed to a display shown in FIG. 99B, a time rectangle display area is defined and a file icon display area is defined within the time rectangle display area. Depending on an area ratio, a file icon display area for file icons associated with a time rectangle is defined as an outer area, and the next time rectangle area is defined as an inner area. The next time rectangle area is then divided into a file icon area and the next time rectangle area. FIG. 100 is a flowchart describing the detail of step 410 in FIG. 98.

(Dividing a Display Area)

At step S320 in FIG. 100, a minimum display area $a_{min}$ for data icons to be displayed in association with a currently-marked time rectangle is determined. First, the size of a data icon is predetermined by default according to the position of the time rectangle in a depth direction. The default size is set to the largest value for a data icon associated with the first (outermost) time rectangle and to the smallest value for a data icon associated with the last (innermost) time rectangle. An area, $a_{def}$, required for visualizing all data items associated with the time rectangle with the default size is then determined. The $a_{def}$ value is calculated according to an expression $a_{def}$={(default data icon size+blank)×(number of data items associated with time rectangle)}. At step S321, a data icon display area $a_{prop}$ is determined according to a ratio of the number of data items associated with the time rectangle to the total number of data items associated with all the subsequent time rectangles. At step S322, the $a_{prop}$ value is compared with the $a_{def}$ value. If the $a_{prop}$ value is larger than or equal to the $a_{def}$ value, the $a_{prop}$ value is set as a data icon display area 1061 at step S323. Otherwise, the $a_{def}$ value is set as a data icon display area 1061 at step S324.

At step S325, data icon display sizes 615 and data icon display positions 616 shown in FIG. 86 are determined. When the data icon display area 1061 in FIGS. 99A and 99B represents the $a_{def}$ value, the data icon display size is set to a predetermined default value. When the data icon display area represents the $a_{prop}$ value, the data icon display size is set to a value permitting all date icons contained with the data icon display area 1061 to be displayed. At step S326, an area remaining after removing the determined data icon display area is set as a display area for subsequent (inward) time rectangles. The flowchart of FIG. 100 corresponds to step S410 in FIG. 98. Thus, a data icon area, and sizes and positions of data icons are determined relative to time rectangles starting with the first time rectangle.

(Zoom-In for Time-Orderly Display)

FIG. 101 is a flowchart describing a zoom-in sequence for the aforesaid time-orderly display. In this time-orderly display, data icons are sorted by time in a depth direction. A panning facility is therefore not provided. For zoom-out display, at step S1073, a zoom-in ratio is decremented. Since this step is the only difference from the zoom-in sequence, the description of the zoom-out sequence will be omitted.

In FIG. 101, step S101 means that an event wait loop is entered. A designation (event) entered by a user at a mouse or keyboard is waited. When any event occurs, it is checked at step S1072 if the user has designated a data icon with a double-click. If the result of checking is in the affirmative, the detailed information of data represented by the data icon is displayed at step S1079 (the data is opened and displayed. If the result of checking is in the negative, control is passed to step S1073 for zoom-in processing. A-zoom-in ratio $Z_U$ is raised to a given value. The processing below is then performed for each of time rectangles to be displayed. First, at step S1075, a time rectangle display area 1086 and data icon display area 1087 in FIG. 102 are updated according to the $Z_U$ value. For each of data icons associated with the currently-marked time rectangle, an icon display size 615 and data icon display position 616 in FIG. 86 are calculated according to the $Z_U$ value at step S1077. After the foregoing processing is performed for each of all the remaining time rectangles, a display screen is updated at step S1078.

(Navigation Window)

Figure 84:
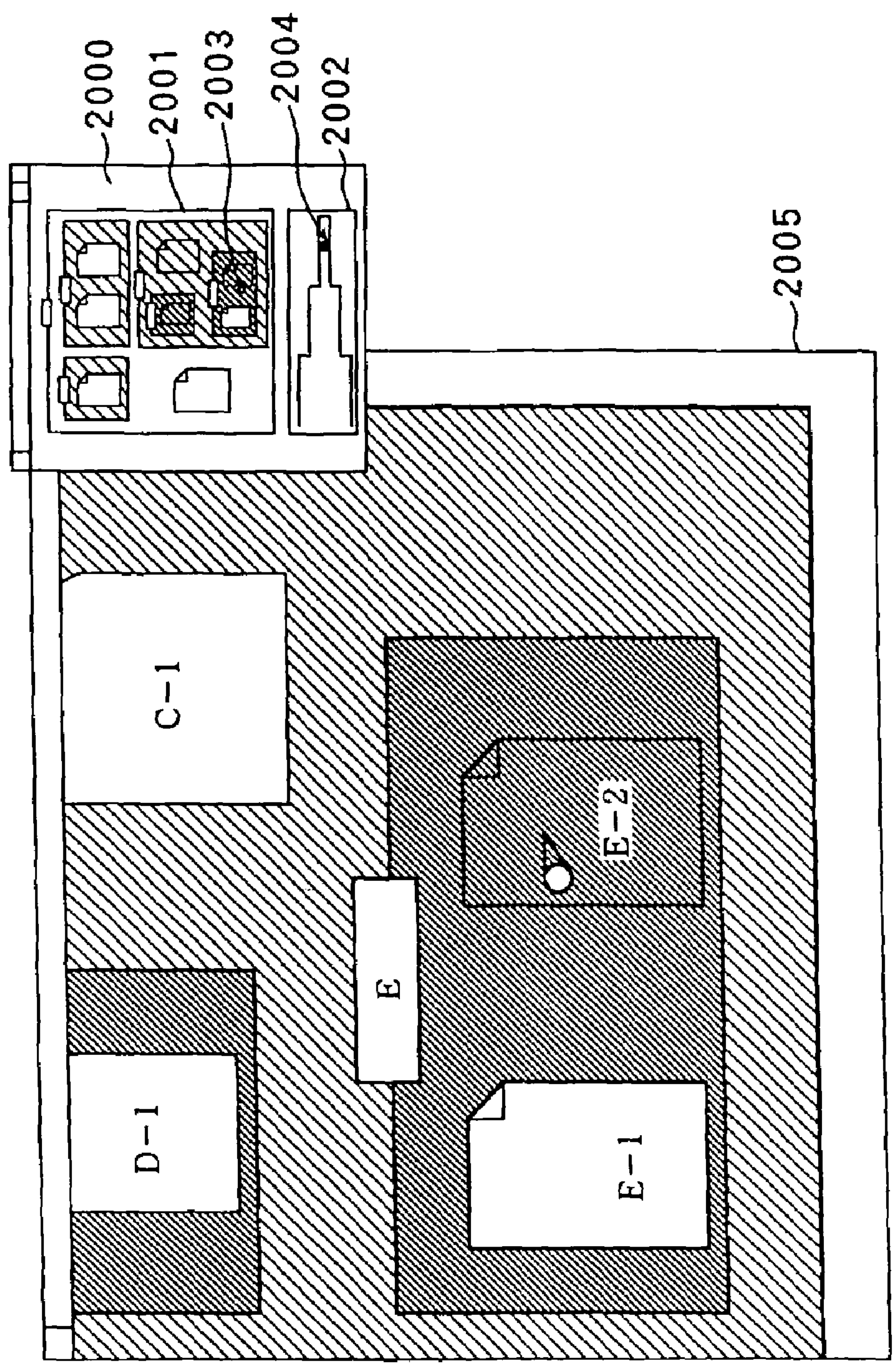
FIG. 84 shows an example of a display of a navigation window in the fifth embodiment.

FIG. 84 shows a navigation window allowing a user to recognize which part of a hierarchical structure the user is looking at during zoomed-in display. The navigation window is composed of a display 2001 showing an xy plane (plane defined with a height and width) and an indicator 2002 indicating a z-axis direction (depth direction). A current position is indicated by cursors 2003 and 2004 in the xy plane display and z-axis direction indicator respectively. Either the cursor 2003 or 2004 is moved to any position in either the display 2001 or indicator 2002 by clicking a mouse button. This makes it possible to shift from the currently-visualized position to a desired position quickly. The xy plane display 2001 shows the whole structure all the time. The display remains therefore unchanged except the cursor 2003. However, the z-axis direction indicator 2002 is updated according to the hierarchical depth of a position visualized in the display screen 2005.

Figure 81:
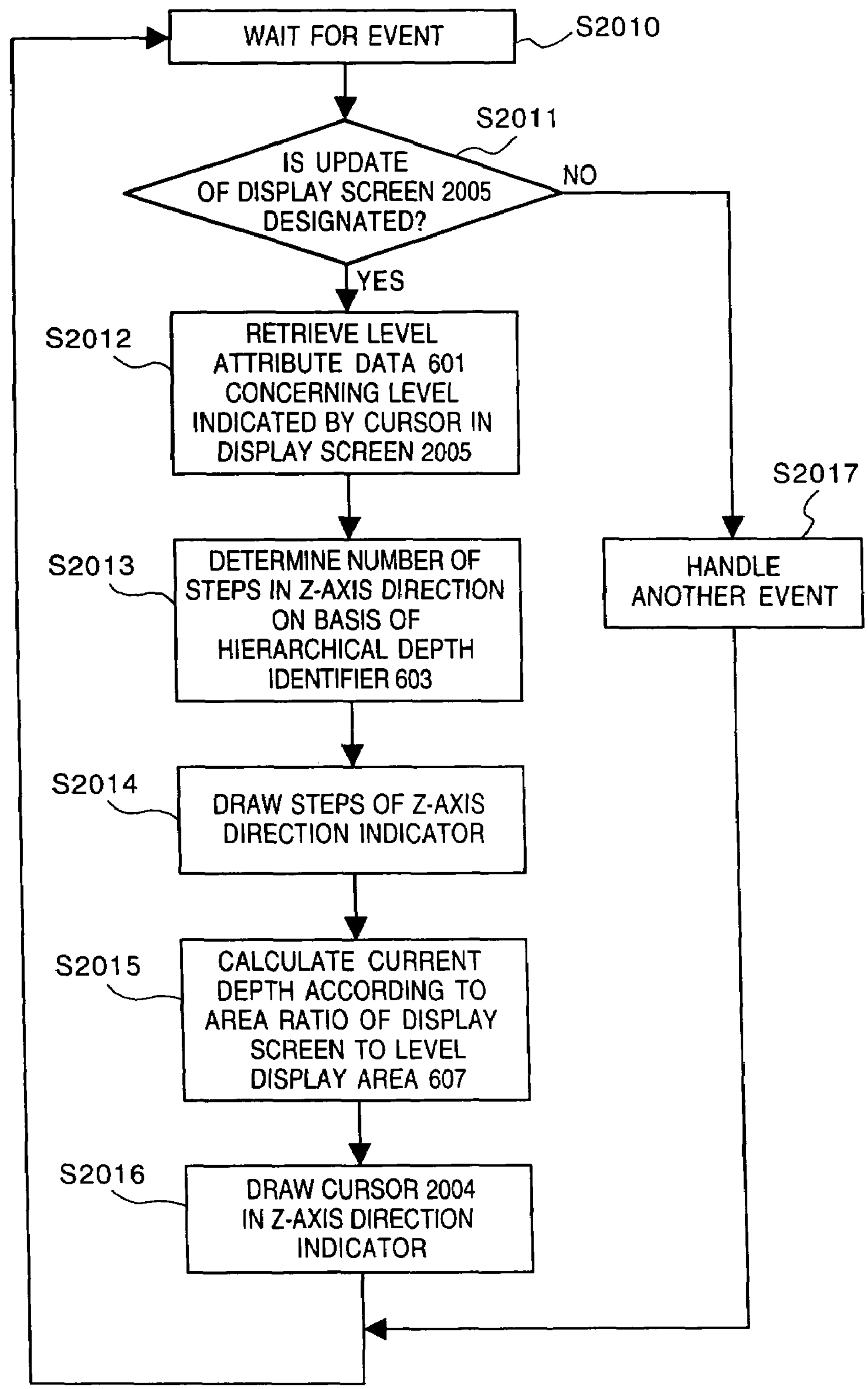
FIG. 81 is a flowchart describing a sequence for indicating a position in a z-axis direction in the fifth embodiment.

The flowchart describing a sequence for creating the xy plane display 2001 is identical to the one shown in FIG. 30. The sequence is carried out when this program is activated. FIG. 81 is a flowchart describing a sequence for creating the z-axis direction indicator.

In FIG. 81, step S2010 means that an event wait loop is entered. When it is judged at step S2011 that an event for reporting the fact that the display screen 2005 shown in FIG. 84 is updated occurs, control is passed to step S2012. Level attribute data 601 concerning a level indicated by a cursor in the display screen 2005 in FIG. 84 is then retrieved. At step S2013, a hierarchical depth is extracted from a hierarchical depth indicator 603 specified in the level attribute data. At step S2014, the z-axis direction indicator 2002 in FIG. 84 is drawn according to the hierarchical depth.

Figure 83A:
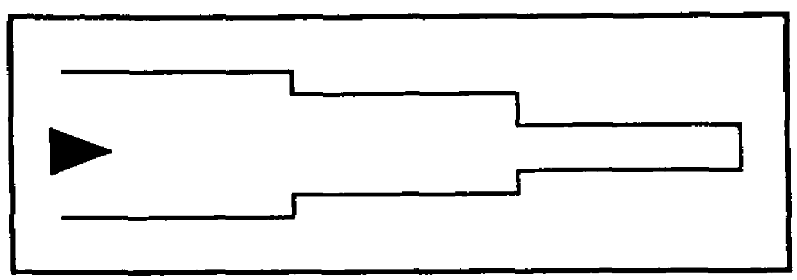
FIG. 83A shows an example of an indication in a z-axis direction in the fifth embodiment.
Figure 83B:
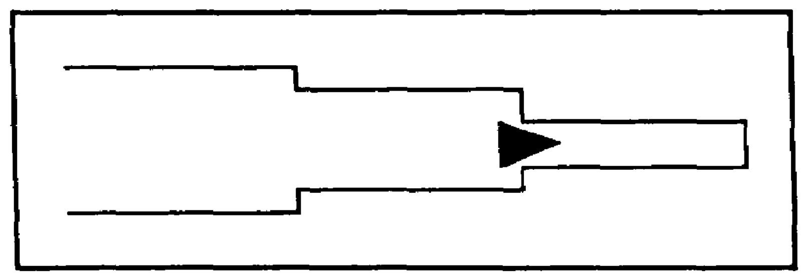
FIG. 83B shows an example of an indication in a z-axis direction in the fifth embodiment.

In the example 2002 in FIG. 84, the hierarchical depth is stepped in three. At step S2015 in FIG. 81, a current position in a depth direction is determined according to a ratio of the area of a display screen to a level display area 607. The determination is based on the calculation shown in FIG. 82. Assume that a ratio of a display area for a currently-marked level to a display screen in a state in which the display screen is zoomed out to the greatest extent so that all levels can be displayed in the display screen is "a," a ratio of the display area for the currently-marked level, which occupies the whole display screen, to the display screen is "b," and a ratio of the display area for the currently-marked level to a current display screen is "c." The position of the level can be calculated relative to the c value as follows:

$$y=(n-1)\times c/(c-1)-(n-1)\times a/(b-a)$$

where n denotes a hierarchical depth. When a display screen is zoomed out to the greatest extent (a), the z-axis direction indicator has a cursor positioned at a leftmost end as shown in FIG. 83A. The ratios are determined so that when a marked level occupies a whole screen, the cursor will come to an entry of a hierarchical depth indication step as shown in FIG. 83B.

Figure 82:
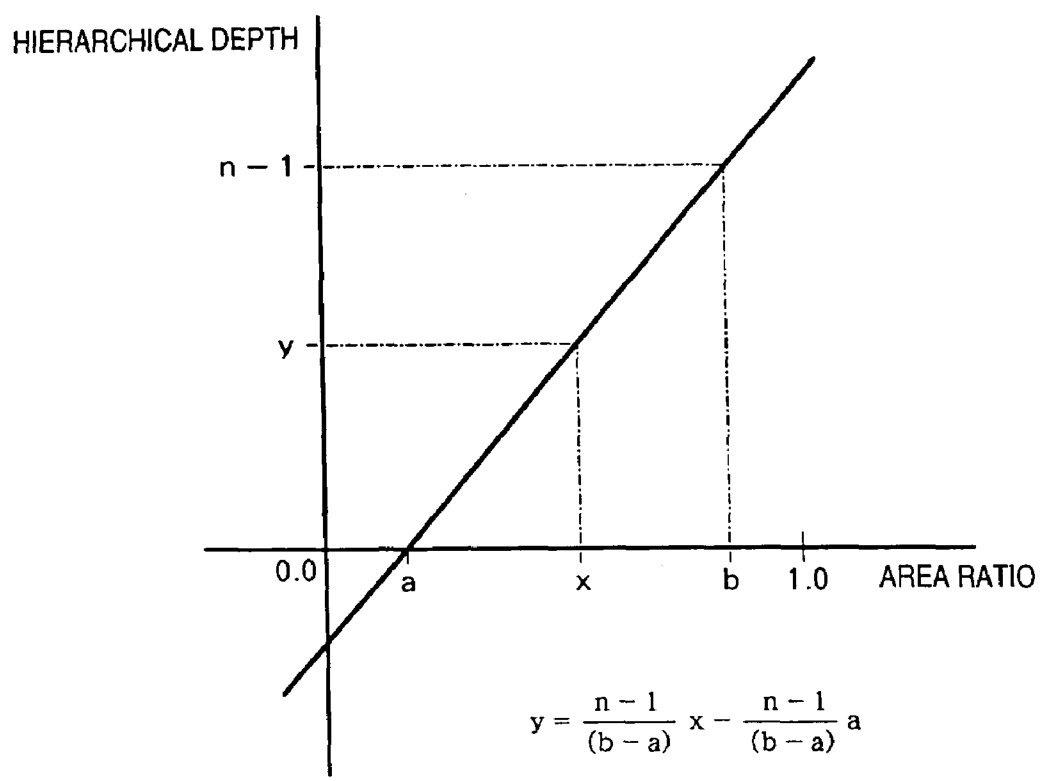
FIG. 82 shows an example of a calculation for determining a position in a z-axis direction in the fifth embodiment.

When the cursor in the navigation window is moved as mentioned above, a display screen is updated as described below. When a movement in the z-axis direction is made (the cursor 2004 in FIG. 84 is moved), update is carried out as follows: the expression in FIG. 82 is calculated inversely using the position of the moved cursor in order to work out an area ratio c' of a level display area to a display screen; c'/a is calculated to work out a zoom-in ratio $Z_U$ in FIG. 80; and then the display screen is updated relative to the $Z_U$ value. When a movement on the xy plane is made (the cursor 2003 in FIG. 84 is moved), update is carried out as follows: panning values shiftX and shiftY needed for panning as described in conjunction with FIG. 80 are worked out using a movement by which the cursor 2003 is moved, and then the whole screen is shifted by the panning values.

As described so far, according to this embodiment, there can be provided an image editing method and system for making it possible to cut out an image and fetch it into album software, or change cutouts by performing simple operations.

There can also be provided an image editing method and system making it easy to grasp what a whole hierarchical structure is like or to locate an intended file. There can also be provided an image editing method and system making it easy to locate a frequently-used file from among numerous files.

This embodiment enables highly-flexible management of images and frames through registration of cutout forms (frames) in a palette. Any cutout form is selected from the palette, dragged and dropped into an image, and enlarged or reduced with the center fixed. Thus, a simple and highly-flexible operating procedure can be provided. In the present invention, a raw image need not be manipulated or corrected but used as it is. It becomes easy to re-size a superposed frame or change frame data from one data to another.

This embodiment enables visualization of a whole hierarchical structure of a file system or data base system by representing the interrelationship among levels and the interrelationship between levels and files (or data items) in the form of a nested hierarchy. When a desired level subordinate to any level is continually enlarged and displayed, the more detailed information concerning levels subordinate to or files (or data items) contained in the level can be acquired. By contrast, a means for continually reducing and displaying a level is used to provide information including information concerning higher levels. Screen update based on zoom-in or -out is achieved in proportion to a time interval during which a specific key on a keyboard or a pointing device is pressed. This results in a user interface enabling a user to manipulate a display sensuously.

A frequently-used file (data) is displayed with a relatively larger size than other files according to the use frequency. The frequently-used file (data) can therefore be easily located.

In a zoomed-in state, it is considered that a camera is focused on a level area for a level containing data designated with a cursor. A display of data items belonging to a level subordinating the level are enlarged and vignetted. This results in a three-dimensional depth perception and a saving in occupied capacity of a memory alike.

Not only a hierarchical display mode but also a time-orderly display mode is available. By selecting either of them freely, time-orderly retrieval can be achieved concurrently with retrieval of hierarchically-sorted files (data items). Both of the modes can be realized by the same user interface that is zoom-in/out. The retrieving efficiency improves.

When a hierarchical display is zoomed in greatly, a currently-marked position in a whole can be grasped easily owing to a window for displaying a position on an xy plane and a position in a z-axis direction.

The present invention can be applied to a system constituted by a plurality of devices (e.g., host computer, interface, reader, printer) or to an apparatus comprising a single device.

Further, as described above embodiments, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

Figure 103:
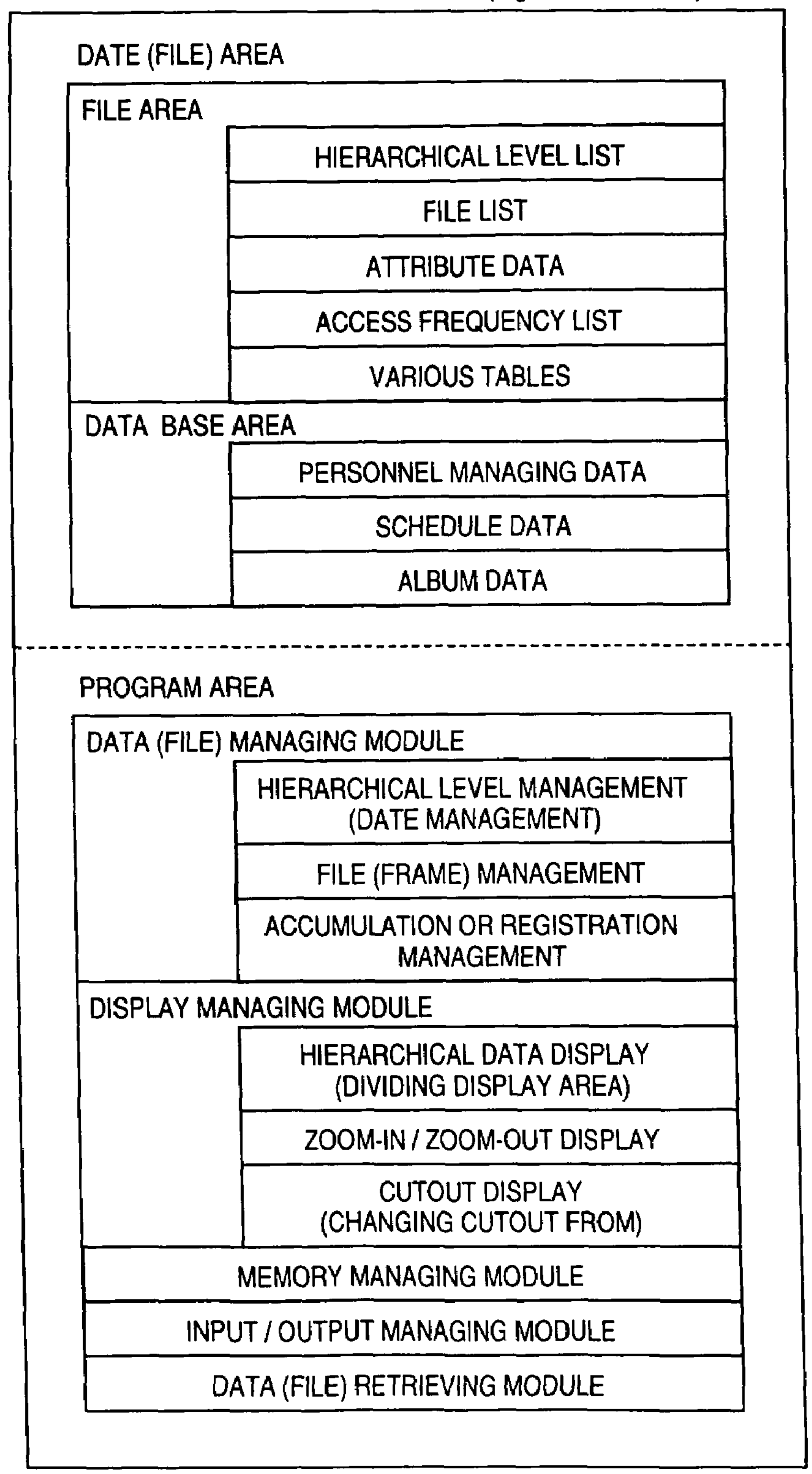
FIG. 103 is an example of data structure in an external storage medium such as a floppy disk.

In a case where the present invention is applied to the aforesaid storage medium, the storage medium stores program codes corresponding to the flowcharts described in the embodiments. Briefly, the storage medium stores each module shown as an example of a memory map in FIG. 103. More specifically, program codes which correspond to data (file) managing module, display managing module, memory managing module, input/output managing module, and data (file), and data (file) retrieving module, at least, are to be stored in the storage medium.

The data (file) managing module includes a hierarchical level management program, a date management program and a file (frame) management program. The display managing module includes a hierarchical data display program and a cutout display program.

The storage medium can also include files and/or data to be used for performing the present processes as well as program codes.

The data or file area is separated into a file area and a data base area. The file area stores a hierarchical level list, a file list, attribute data and various tables. The data base area stores personal management data, schedule data and album data.

The present invention may apply to a system composed of a plurality of equipment or an apparatus realized with one equipment. Needless to say, the present invention can apply to a mode in which a program is installed in a system or apparatus.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A time-series data display method for displaying accumulated time-series data items, comprising the steps of:

displaying a plurality of rings in a nested form in a display screen, each ring representing a respective predetermined time/date and having data items along its circumference, wherein data items along an inner ring are displayed smaller, while data items along an outer ring are displayed larger;

displaying first data items associated with a first time in which said first data items have been picked up, in a first size and along a first ring of the plurality of rings; and displaying second data items associated with a second time that is different from the first time and that is the time at which the second data items have been picked up, in a second size different from the first size and along a second ring of the plurality of rings, so that a difference of size between the first and second sizes corresponds to a temporal direction between the first time and the second time, wherein when zoom-in operation is instructed, sizes of every ring and of every data item are enlarged, a new ring associated with a new time and data items along the new ring are displayed in a center area of the plurality of rings and an outermost ring and data items along the outermost ring are deleted from the display screen, and when zoom-out operation is instructed, sizes of every ring and of every data item are reduced, an innermost ring and data items along the innermost ring are deleted from a display screen and a new ring associated with a new time and data items along the new ring are displayed in an area outside of the plurality of rings.

2. A time-series data display method according to claim 1, wherein the distinguishable display is such that the display screen for the second data items is displayed with a smaller size than one for the first data items.

3. A time series data display method according to claim 2, wherein the first data items are displayed at an outermost position in a display screen, and the second data items are displayed inside the first data items with a display area thereof made smaller.

4. A time-series data display method according to claim 3, wherein third data items associated with a time contiguous to the time of the second data items are retrieved, and the third data items are displayed inside the second data items with a display area thereof made smaller.

5. A time-series data display method according to claim 1, wherein a display of each date is limited to a given number of data items, and wherein, when the number of data items exceeds the given number, the data items are classified in units of a finer date and displayed distinguishably.

6. A time-series data display method according to claim 5, wherein, when zoom-in is designated for a screen display, the display positions of the first to third data items are shifted outward and the display areas thereof are made larger.

7. A time-series data display method according to claim 6, wherein, when the zoom-in is continued for a designated period of time, the first data items are moved out of a display screen, and new data associated with a date contiguous to a date of data displayed at an innermost position is retrieved and displayed at the innermost position.

8. A time-series data display method according to claim 6, wherein, when zoom-out is designated for a screen display, the display positions of the first to third data items are shifted inward and the display areas thereof are made smaller.

9. A time-series data display method according to claim 7, wherein, when the zoom-out is continued for a designated period of time, data displayed at an innermost position is moved out of a display screen, and new data associated with a date contiguous to a date of data displayed at an outermost position is retrieved and displayed at an outermost position is retrieved and displayed at the outermost position.

10. A time-series data display method according to claim 8, wherein, when the zoom-in or zoom-out is designated in a screen, a speed of shifting display positions is varied depending on a designated position in the screen.

11. A time-series data display method according to claim 1, wherein graphics such as rings or squares representing dates associated with displays are nested and displayed together with representations of data items.

12. A time-series data display method according to claim 11, wherein the nested display is realized by arranging the graphics such as rings or squares representing dates associated with displays concentrically in units of a given date, and then displaying data items orderly in the graphics.

13. A time-series data display method according to claim 11, wherein the graphics such as rings or squares representing dates associated with displays are displayed in different colors associated with the dates.

14. A time-series data display method according to claim 12, wherein the data items along a given one of the plurality of rings are positioned along that ring at random.

15. A time-series data display method according to claim 14, wherein the random positions are specified at the time of data registration.

16. A time-series data display method according to claim 1, wherein the accumulated time-series data items include data items accumulated in one-to-one correspondence to dates of creation of data files, data items accumulated in one-to-one correspondence to dates of correction of files, and data items accumulated in one-to-one correspondence to designated dates registered by a user.

17. An information processing system for displaying accumulated time-series data items, comprising:

a storage means for storing data picked up in one-to-one correspondence to times; and a displaying means for displaying a plurality of rings in a nested form, each representing a respective predetermined time/date and having data items along it, with data items along an inner ring being displayed smaller, while data items along an outer ring are displayed larger, first data items of a first time in which the first data item has been picked up, in a first size and along a first ring of the plurality of rings, and second data items of a second time that is different from the first time and that is the time at which the second data items have been picked up, in a second size different from the first size and along a second ring of the plurality of rings, so that a difference of size between the first and second sizes corresponds to a temporal direction between the first time and the second time, wherein when zoom-in operation is instructed, sizes of every ring and of every data item are enlarged, a new ring associated with a new time and data items along the new ring are displayed in a center area of the plurality of rings and an outermost ring and data items along the outermost ring are deleted from a display screen, and when zoom-out operation is instructed, sizes of every ring and of every data item are reduced, an innermost ring and data items along the innermost ring are deleted from the display screen and a new ring associated with a new time and data items along the new ring are displayed in an area outside of the plurality of rings.

18. An information processing system according to claim 17, wherein said displaying means displays a display screen for the data items associated with a time contiguous to the desired time with a smaller size than a display screen for the data items of the desired time according to an elapsed time.

19. An information processing system according to claim 18, wherein said displaying means displays the data items of the desired time at an outermost position in a display screen, and displays the data items of a time contiguous to the desired time inside the data items of the desired date with a display area therefore made smaller according to an elapsed time.

20. An information processing system according to claim 17, wherein said displaying means includes a display limiting means for limiting a display of each time to a given number of data items, and a display dividing means that when the number of data items exceeds the given number, classifies the data items in units of a finer time and displays the data times mutually distinguishably.

21. An information processing system according to claim 20, wherein said storage means includes a subdividing and accumulating means for subdividing a data accumulation unit into finer units of time in the event that the number of data items should exceed the given number, and then accumulating data items.

22. An information processing system according to claim 19, further comprising a zoom designation means for use in designating zoom-in or zoom-out for a screen display, and a zoom control means that, when zoom-in is designated, shifts the display positions of data items outward so as to increase the display areas thereof, and that when zoom-out is designated, shifts the display positions of data items inward so as to decrease the display areas thereof.

23. An information processing system according to claim 22, wherein, when zoom-in is designated, said zoom control means moves the data items of the desired time out of a display screen, retrieves new data items associated with a time contiguous to a time of data items displayed at an innermost position, and displays new data items at the innermost position, and when zoom-out is designated, said zoom control means moves the data items displayed at the innermost position out of a display screen, retrieves new data items associated with a time contiguous to a time of data items displayed at an outermost position, and displays new data items at the outermost position.

24. An information processing system according to claim 22, wherein said zoom designation means includes a designation input means for making a designation in a screen, and said zoom control means varies a speed of shifting display positions depending on a designated position in the screen.

25. An information processing system according to claim 17, wherein said displaying means includes a means for displaying graphics such as rings or squares representing times associated with displays concentrically in units of a given time, and a means for displaying data items orderly in the graphics and wherein the graphics such as rings or squares representing times associated with displays are nested and displayed together with representations of data items.

26. An information processing system according to claim 25, wherein said displaying means displays the graphics such as rings or squares representing times associated with displays in different colors associated with the times.

27. An information processing system according to claim 25, wherein said displaying means positions the data items that are along a given one of the plurality of rings, at random along that ring.

28. An information processing system according to claim 27, wherein said storage means determines the random positions at the time of data registration.

29. An information processing system according to claim 17, wherein said stored time-series data items include data items stored in one-to-one correspondence to times of creation of data files, data items stored in one-to-one correspondence to times of correction of files, and data items stored in one-to-one correspondence to designated times registered by a user.

30. A computer program product comprising a computer usable medium having computer readable program code means for displaying accumulated time-series data items, said computer program product including:

computer readable program code means for displaying a plurality of rings in a nested form, each representing a respective predetermined time/date and having data items along it, with data items along an inner ring being displayed smaller, while data items along an outer ring are displayed larger, first data items associated with a first time in which the first data items have been picked up, in a first size and along a first ring of the plurality of rings, and second data items associated a second time that is different from the first time and that is a time at which the second data items have been picked up, in a second size different from the first size and along a second ring of the plurality of rings, so that a difference of size between the first time and the second sizes corresponds to a temporal direction between the first time and the second time, wherein when zoom-in operation is instructed, sizes of every ring and of every data item are enlarged, a new ring associated with a new time and data items along the new ring are displayed in a center area of the plurality of rings and an outermost ring and data items along the outermost ring are deleted from a display screen, and when zoom-out operation is instructed, sizes of every ring and of every data item are reduced, an innermost ring and data items along the innermost ring are deleted from the display screen and a new ring associated with a new time and data items along the new ring are displayed in an area outside of the plurality of rings.

31. A computer program product according to claim 30, further including computer readable program code means for zooming in the first and second data items by shifting data in a direction of the second data items to the first data items and making a display area larger, and for zooming out the first and second data items by shifting data in a direction of the first data items to the second data items and making the display area smaller.

32. A computer program product according to claim 30, the computer usable medium further having time-series data to be used by said computer readable program code means.

33. A time series data display method according to claim 1, wherein new data items on the temporal direction are displayed in relatively large size while old data items on the temporal direction are displayed in relatively small size.

34. A time series data display method according to claim 1, wherein data items on a perimeter of a screen are displayed in relatively large size while data items on a center of the screen are displayed in relatively small size.

35. An information processing system according to claim 17, wherein said display means displays new data items on the temporal direction in relatively large size while displaying old data items on the temporal direction in relatively small size.

36. An information processing system according to claim 17, wherein said display means displays data items on a perimeter of a screen in relatively large size while displaying data items on a center of the screen in relatively small size.

37. A computer program producing according to claim 30, wherein a new data item on the temporal direction is displayed in relatively large size while old data items on the temporal direction are displayed in relatively small size.

38. A computer program product according to claim 30, wherein data items on a perimeter of a screen are displayed in relatively large size while data items on a center of the screen are displayed in relatively small size.

39. An information processing apparatus for displaying accumulated time-series data items, comprising:

displaying means for displaying a plurality of rings in a nested form, each representing a respective predetermined time/date and having data items along it, wherein data items along an inner ring are displayed smaller, while data items along an outer ring are displayed larger;

displaying means for displaying first data items associated with a first time at which the first data items have been picked-up, in a first size and along a first ring of the plurality of rings; and displaying means for displaying second data items associated with a second time different from the first time and at which the second data items have been picked-up, in a second size different from the first size and along a second ring of the plurality of rings, so that a difference of size between the first and second sizes corresponds to a temporal direction between the first time and the second time, wherein when zoom-in operation is instructed, sizes of every ring and of every data item are enlarged, a new ring associated with a new time and data items along the new ring are displayed in a center area of the plurality of rings and an outermost ring and data items along the outermost ring are deleted from a display screen, and when zoom-out operation is instructed, sizes of every ring and of every data item are reduced, an innermost ring and data items along the most inside ring are deleted from a display screen and a new ring associated with a new time and data items along the new ring are displayed in an area outside of the plurality of rings.

40. An information processing apparatus according to claim 39, wherein new data items on a temporal direction are displayed in relatively large size while old data items on the temporal direction are displayed in relatively small size.

41. An information processing apparatus according to claim 39, wherein data items on a perimeter of a screen are displayed in relatively large size while data items on a center of screen are displayed in relatively small size.

* * * * *

UNITED STATES PATENT AND TRADEMARK OFFICE

CERTIFICATE OF CORRECTION

PATENT NO. : 7,336,279 B1
APPLICATION NO. : 08/573519
DATED : February 26, 2008
INVENTOR(S) : Hideo Takiguchi It is certified that error appears in the above-identified patent and that said Letters Patent is hereby corrected as shown below:

ON THE TITLE PAGE [56] REFERENCES CITED:

Other Publications, "Mackinlay et al., "Developing Calendar Visualizers for the Information Visualizer", ACM, Nov. 1994, pp. 109-118.*" (duplicate) should be deleted.

SHEET 11:

Figure 11, "OUTMOST" should read --OUTERMOST--.

SHEET 13:

Figure 13, "VISING" should read --USING-- and "RETURNTO" should read --RETURN TO--.

SHEET 14:

Figure 14, "VISING" should read --USING--, "IINFORMATION" should read --INFORMATION--, and "RETURNTO" should read --RETURN TO--.

SHEET 25:

Figure 25, "ARE SETTING" should read --AREA SETTING--.

SHEET 64:

Figure 66, "PROTION" should read --PORTION--.

SHEET 72:

Figure 74, "TRANSPAREENT" should read --TRANSPARENT--.

SHEET 84:

Figure 86, "CAPACTIY" should read --CAPACITY--.

SHEET 89:

Figure 91, "BELOGING" should read --BELONGING--.

UNITED STATES PATENT AND TRADEMARK OFFICE

CERTIFICATE OF CORRECTION

PATENT NO. : 7,336,279 B1
APPLICATION NO. : 08/573519
DATED : February 26, 2008
INVENTOR(S) : Hideo Takiguchi It is certified that error appears in the above-identified patent and that said Letters Patent is hereby corrected as shown below:

COLUMN 1:

Line 16, “handing” should read --handling--; and
Line 45, “C 1-8” should read --C 108--.

COLUMN 5:

Line 7, “an” should read --a--.

COLUMN 6:

Line 18, “the” should be deleted.

COLUMN 9:

Line 62, “of a” should read --of an--.

COLUMN 10:

Line 45, “a entire” should read --an entire--; and
Line 59, “potion” should read --portion--.

COLUMN 14:

Line 43, “of” should read --out--.

COLUMN 18:

Line 21, “etc.)” should read --etc.,--;
Line 39, “10/6,’ day’” should read --10/6, for one day,--; and
Line 40, “represents” should read --represent--.

COLUMN 20:

Line 14, “displayed” should read --the displayed--;
Line 15, “Therefore, displayed image moves” should be deleted; and
Line 16, “smoothly.” should be deleted.

COLUMN 22:

Line 4, “of zoom-out.” should read ---of zoom-in.--.

UNITED STATES PATENT AND TRADEMARK OFFICE
CERTIFICATE OF CORRECTION

PATENT NO. : 7,336,279 B1
APPLICATION NO. : 08/573519
DATED : February 26, 2008
INVENTOR(S) : Hideo Takiguchi It is certified that error appears in the above-identified patent and that said Letters Patent is hereby corrected as shown below:

COLUMN 23:

Line 50, “system” should read --system.--; and
Line 65, “enabling” should read --enable--.

COLUMN 25:

Line 1, “such” should read --such as--.

COLUMN 27:

Line 63, “wholescreen.” should read --whole screen.--.

COLUMN 28:

Line 46, “zoom-in” should read --zoom-in.--.

COLUMN 32:

Line 42, “icon.” should read --icon--; and
Line 59, “mage” should read --image--.

COLUMN 35:

Line 9, “denotes-group” should read --denotes group--.

COLUMN 36:

Line 31, “chical-depth” should read --chical depth--; and
Line 32, “areas” should read --area--.

COLUMN 39:

Line 67, “A” should read --As--.

COLUMN 40:

Line 4, “user”” should read --user--; and
Line 5, “The” should read --the--.

UNITED STATES PATENT AND TRADEMARK OFFICE

CERTIFICATE OF CORRECTION

PATENT NO. : 7,336,279 B1
APPLICATION NO. : 08/573519
DATED : February 26, 2008
INVENTOR(S) : Hideo Takiguchi It is certified that error appears in the above-identified patent and that said Letters Patent is hereby corrected as shown below:

COLUMN 43:

Line 67, "occurs." should read --occur.--.

COLUMN 47:

Line 12, "displayed" should read --displayed at--.

COLUMN 52:

Line 66, "time series" should read --time-series--.

COLUMN 53:

Line 14, "claim 5," should read --claim 4,--; and
Line 28, "claim 7," should read --claim 8,--.

COLUMN 55:

Line 53, "associated" should read --associated with--; and
Line 59, "sizes" should read --time--.

COLUMN 56:

Line 18, "time series" should read --time-series--;
Line 22, "time series" should read --time-series--;
Line 35, "producing" should read --product--;
Line 53, "picked-up," should read --picked up,--; and
Line 57, "picked-" should read --picked--.

UNITED STATES PATENT AND TRADEMARK OFFICE

CERTIFICATE OF CORRECTION

PATENT NO. : 7,336,279 B1
APPLICATION NO. : 08/573519
DATED : February 26, 2008
INVENTOR(S) : Hideo Takiguchi It is certified that error appears in the above-identified patent and that said Letters Patent is hereby corrected as shown below:

COLUMN 58:

Line 6, "of" should read --of the--.

Signed and Sealed this

Twenty-third Day of September, 2008

JON W. DUDAS
*Director of the United States Patent and Trademark Office*